United States Patent
Porter

(10) Patent No.: US 7,346,628 B2
(45) Date of Patent: Mar. 18, 2008

(54) TIME IN DATABASES AND APPLICATIONS OF DATABASES

(76) Inventor: Luke Martin Leonard Porter, 46 Margaret Grove, Harborne, Birmingham, West Midlands (GB) B17 9JL (*) Notice: Subject to any disclaimer, the term of this patent is extended or adjusted under 35 U.S.C. 154(b) by 436 days.

(21) Appl. No.: 10/665,818

(22) Filed: Sep. 19, 2003

(65) Prior Publication Data
US 2004/0139116 A1    Jul. 15, 2004

(30) Foreign Application Priority Data
Jan. 15, 2003    (GB)    ................ 0300813.3

(51) Int. Cl.
*G06F 17/30* (2006.01)
(52) U.S. Cl. .................. 707/104.1
(58) Field of Classification Search ......... 707/1, 707/2, 8, 9, 200, 104.1; 709/224
See application file for complete search history.

(56) References Cited

U.S. PATENT DOCUMENTS

| | | | | |
|---|---|---|---|---|
| 5,924,103 | A * | 7/1999 | Ahmed et al. | 707/201 |
| 6,754,657 | B2 * | 6/2004 | Lomet | 707/8 |
| 2002/0107831 | A1 * | 8/2002 | Sturms et al. | 707/1 |
| 2003/0208490 | A1 * | 11/2003 | Larrea et al. | 707/9 |

OTHER PUBLICATIONS

V Kelly et al "Managing Data-Based Systems Across Releases Using Historical Data Dictionaries".
Gisele Pham "Access Methods for Temporal Databases—Prof. Vassilis Tsotras".
Time Consult "What are Temporal Databases?".
Vassills Tsotras "Access Methods for Bitemporal Databases".
N. Edelweiss et al "A Temporal Database Management System Implemented on Top of the Conventional Database"—Nov. 16, 2000; pp. 58-67.
Wei, Li et al "Efficient Sequenced Temporal Integrity Checking" Apr. 2, 2001; pp. 131-140.
Martin C et al "An Integrity Constraint Checking Method for Temporal Deductive Databases"; May 19, 1996; pp. 136-141.
Gal A et al "Combining Simultaneous Values and Temporal Data Dependencies"; May 19, 1996; pp. 112-117.
White Paper "What is a Temporal Database?" by Chris Klassen.
Thesis by Christian S Jensen "Temporal Database Management"—defended Apr. 2000.

* cited by examiner

*Primary Examiner*—Etienne LeRoux
(74) *Attorney, Agent, or Firm*—Michael Best & Friedrich LLP

(57) ABSTRACT

A database having data entries with attributes having values that can vary over system time (the time according to a computer clock) and also over valid time (the start time and end time of an interval during which the values of the attributes are true). All logical operations of updates and deletes of values are performed by insert operations that insert new entries into the database, so that all old entries that were present at previous system times still exist and still include their previously-assigned start times and end times for the value of the attribute.

5 Claims, 118 Drawing Sheets

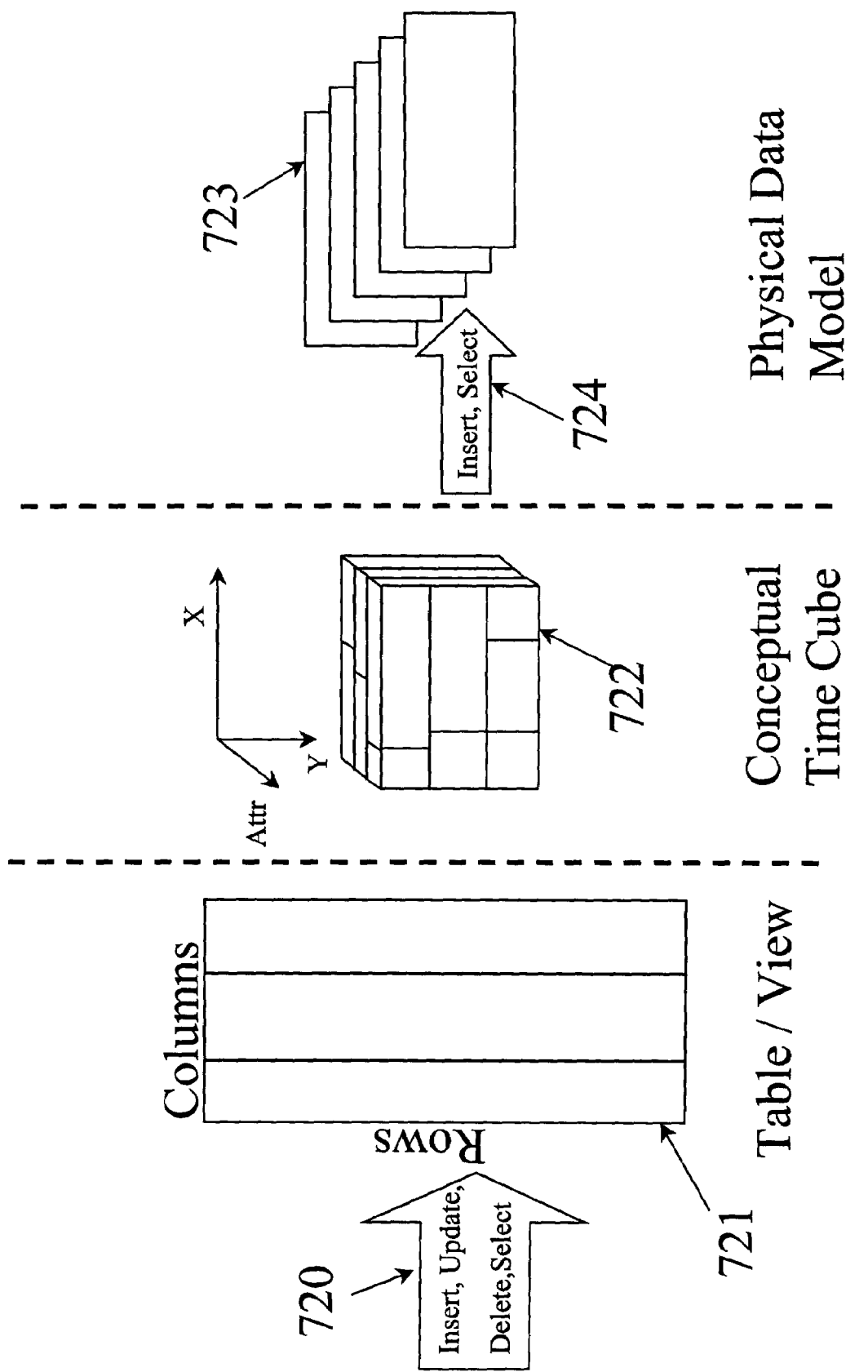

| Action | Rule | This Invention | Prior Art |
|---|---|---|---|
| Insert | cascade (extend) | yes | no equivalent |
| | bounded | yes | no equivalent |
| | restrict | yes | no equivalent |
| | cascade (default) | yes | no equivalent |
| | cascade (nullify) | yes | no equivalent |
| Alter Insert Back | cascade (extend) | yes | no equivalent |
| | bounded | yes | no equivalent |
| | restrict | yes | no equivalent |
| | cascade (default) | yes | no equivalent |
| | cascade (nullify) | yes | no equivalent |
| Alter Insert Forward | cascade (extend) | yes | no equivalent |
| | bounded | yes | no equivalent |
| | restrict | yes | no equivalent |
| | cascade (default) | yes | no equivalent |
| | cascade (nullify) | yes | no equivalent |
| Update | cascade (extend) | yes | no equivalent |
| | bounded | yes | no |
| | restrict | yes | part (via server side code) |
| | cascade (default) | yes | no |
| | cascade (nullify) | yes | no |
| Delete | cascade (extend) | yes | yes |
| | bounded | yes | no equivalent |
| | restrict | yes | yes |
| | cascade (default) | yes | no |
| | cascade (nullify) | yes | no |
| Alter Delete Back | cascade (extend) | yes | no equivalent |
| | bounded | yes | no equivalent |
| | restrict | yes | no equivalent |
| | cascade (default) | yes | no equivalent |
| | cascade (nullify) | yes | no equivalent |
| Alter Delete Forward | bounded | yes | no equivalent |
| | restrict | yes | no equivalent |
| | cascade (default) | yes | no equivalent |
| | cascade (nullify) | yes | no equivalent |

FIG. 25

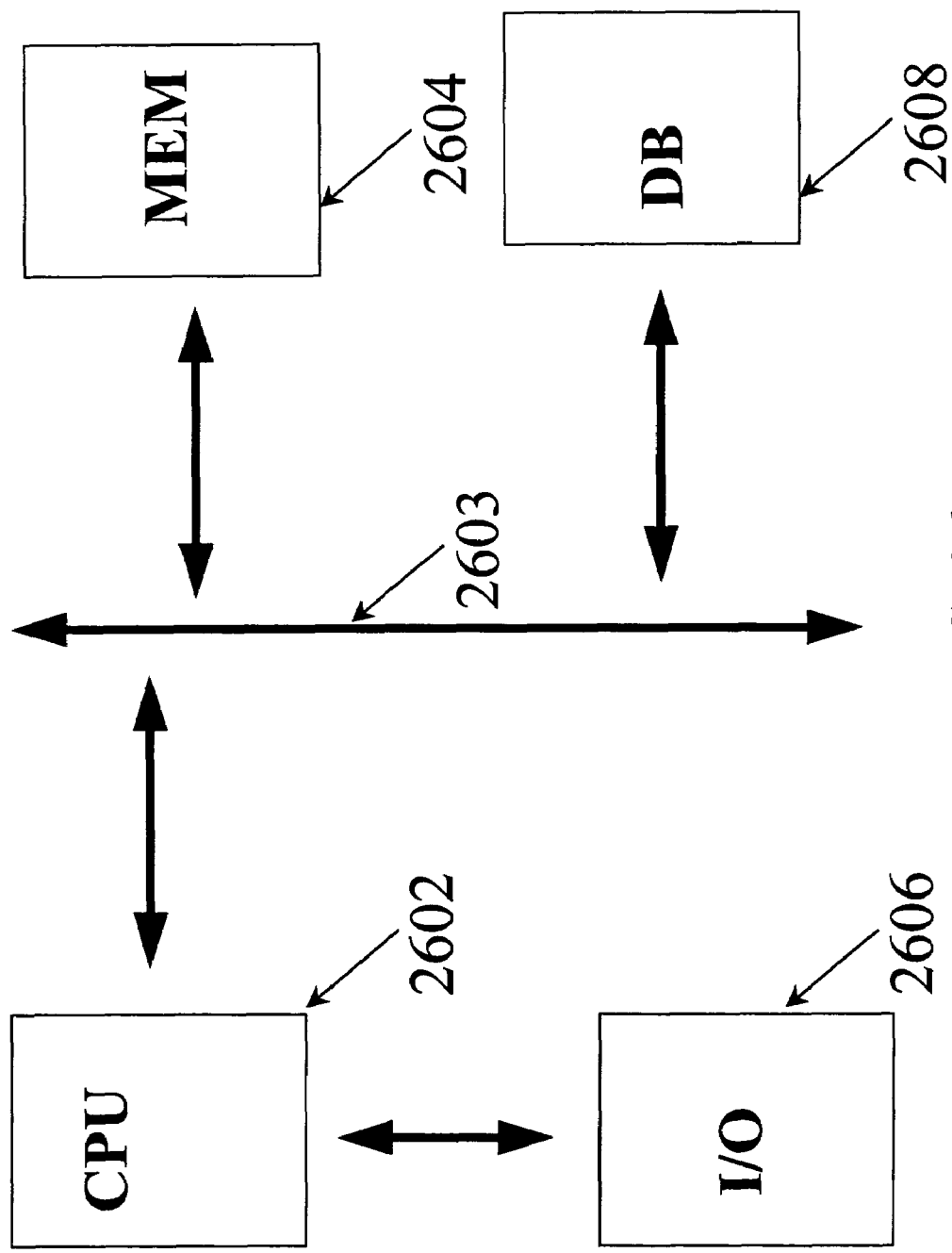

If Rule on foreign key attribute on focus entity = cascade then
   Actual ui = ui (e.g. Figure 22a).
   Actual fi -> Actual ui (e.g. Figure 22a).
end if If Rule on foreign key attribute on focus entity = bounded cascade then
Actual ui -> ui' (e.g. Figure 22b) which is not allowed as this would effectively change ui therefore the action is not allowed by the system.
Focus entity NOT inserted or alter inserted.
end if If Rule on foreign key attribute on focus entity = restrict then
Actual ui -> ui' (e.g. Figure 22c) which is not allowed as this would effectively change ui therefore the action is not allowed by the system.
Focus entity NOT inserted or alter inserted.
end if If Rule on foreign key attribute on focus entity = Defaults then
Only applies to transferable optional and transferable mandatory foreign keys.
Actual ui = ui (e.g. Figure 22d).
Actual fi = Requested fi.
Focus entity connected to default upstream entity from Requested fi to ui.
Focus entity connected to upstream entity from ui.
end if If Rule on foreign key attribute on focus entity = Nullifies then
Only applies to transferable optional foreign keys.
Actual ui = ui (e.g. Figure 22e).
Actual fi = Requested fi.
Focus entity connected to null from Requested fi to ui.
Focus entity connected to upstream entity from ui.
end if

FIG. 58a

If Rule on foreign key attribute on focus entity = cascade then
Actual mi = mi.
Actual fi -> Actual mi.
end if If Rule on foreign key attribute on focus entity = bounded cascade then
Actual mi -> mi' which is not allowed as this would effectively change mi therefore the action is not allowed by the system.
Focus entity NOT inserted or alter inserted.
end if If Rule on foreign key attribute on focus entity = restrict then
Actual mi -> mi' as which is not allowed as this would effectively change mi therefore the action is not allowed by the system.
Focus entity NOT inserted or alter inserted.
end if If Rule on foreign key attribute on focus entity = Defaults then
Only applies to transferable optional and transferable mandatory foreign keys as all master relations are by inspection non transferable then this case is not applicable.
end if If Rule on foreign key attribute on focus entity = Nullifies then
Only applies to transferable optional foreign keys as all master relations are by inspection non transferable then this case is not applicable.
end if

FIG. 58b

If Rule on foreign key attribute on focus entity = cascade then
Actual ud = ud.
Actual fd -> Actual ud.
end if If Rule on foreign key attribute on focus entity = bounded cascade then
Actual ud -> ud' which is not allowed as this would effectively change ud therefore the action is not allowed by the system.
Focus entity NOT alter deleted.
end if If Rule on foreign key attribute on focus entity = restrict then
Actual ud -> ud' which is not allowed as this would effectively change ud therefore the action is not allowed by the system.
Focus entity NOT alter deleted.
end if If Rule on foreign key attribute on focus entity = Defaults then
Only applies to transferable optional and transferable mandatory foreign keys.
Actual ud = ud.
Actual fd = Requested fd.
Focus entity connected to default upstream entity from ud to requested fd.
Focus entity connected to upstream entity upto ud.
end if If Rule on foreign key attribute on focus entity = Nullifies then
Only applies to transferable optional foreign keys.
Actual ud = ud.
Actual fd = Requested fd.
Focus entity connected to null from ud to Requested fd.
Focus entity connected to upstream entity from upto ud.
end if

FIG. 58c

If Rule on foreign key attribute on focus entity = cascade then
Actual md = md.
Actual fd -> Actual md.
end if If Rule on foreign key attribute on focus entity = bounded cascade then
Actual md -> md' which is not allowed as this would effectively change md therefore the action is not allowed by the system.
Focus entity NOT alter deleted.
end if If Rule on foreign key attribute on focus entity = restrict then
Actual md -> md' as which is not allowed as this would effectively change md therefore the action is not allowed by the system.
Focus entity NOT alter deleted.
end if If Rule on foreign key attribute on focus entity = Defaults then
Only applies to transferable optional and transferable mandatory foreign keys. As all master relations are by inspection non transferable then this case is not applicable.
end if If Rule on foreign key attribute on focus entity = Nullifies then
Only applies to transferable optional foreign keys. As all master relations are by inspection non transferable then this case is not applicable.
end if

FIG. 58d

Action occurs on a row in a Focus Entity:

Refer to the Temporal Referential Tree to create stack of related entities i.e. all immediate upstream entities and all downstream entities.

Determine Referential Boundary Conditions using related rows in Affected Entities Determine the order in which to process related rows.

For each row

Apply referential rules, taking into account the attribute and entity rules of the related entities as defined in the Temporal Data Dictionary End-For

FIG. 59

| Abbreviation for Relationship Type | Description of Relationship Type | Example of focus entity | Example of related entity |
|---|---|---|---|
| dlnto | downstream lookup non transferrable optional | product | order line |
| dlntm | downstream lookup non transferrable mandatory | product | order line |
| dlto | downstream lookup transferrable optional | department | employee |
| dltm | downstream lookup transferrable mandatory | department | employee |
| ulnto | upstream lookup non transferrable optional | order line | product |
| ulntm | upstream lookup non transferrable mandatory | order line | product |
| ulto | upstream lookup transferrable optional | employee | department |
| ultm | upstream lookup transferrable mandatory | employee | department |
| mst | master ( always nontransferrable nt and mandatory m ) | order | na |
| chd | child ( always nontransferrable nt and mandatory m ) | order line | order |

FIG. 61

| Abbreviation for Rule Type | Rule Type |
|---|---|
| e | cascade (with attribution rule of extend) |
| b | bounded |
| r | restrict |
| d | cascade (with attribution rule of default) |
| n | cascade (with attribution rule of nullify) |

FIG. 62

| Time Points | Description |
|---|---|
| xs | start of xtime |
| fi | focus insert time |
| fd | focus delete time |
| di | downstream insert time |
| dd | downstream delete time |
| mi | master insert time |
| md | master delete time |
| ui | upstream insert time |
| ud | upstream delete time |
| ci | child insert time |
| cd | child delete time |
| xe | end of xtime |

FIG. 63

| Action | Description of Action |
|---|---|
| Insert | entity inserted with a delete time of xe |
| Alter Insert Back | entity insert time moved to an earlier time |
| Alter Insert Forward | entity insert time moved to a later time |
| Update | change to a primary or foreign key value |
| Delete | entity delete time altered from xe to an earlier time |
| Alter Delete Back | entity delete time altered to an earlier time |
| Alter Delete Forward | entity delete time altered to a later time |

FIG. 64

| Code | Description of Result |
|---|---|
| 1 | Action not allowed / breaks referential rules or entity rules / rollback |
| 2 | Action allowed / referential rules activated |
| 3 | Action allowed / no referential rules activated |
| 4 | Rule does not apply to case e.g. nullifies on master relation |

FIG. 65

| ACTION | | RULE TYPE | | | | | | | | |
|---|---|---|---|---|---|---|---|---|---|---|
| | | | dInto | | dIntm | | dIto | | dItm | |
| | xs/fi | fd/xe | result | note | result | note | result | note | result | note |
| insert | | e | 3 | | 3 | | 3 | | 3 | |
| | | b | 3 | | 3 | | 3 | | 3 | |
| | | r | 3 | | 3 | | 3 | | 3 | |
| | | d | 4 | | 4 | | 4 | | 4 | |
| | | n | 4 | | 4 | | 4 | | 4 | |

| RULE TYPE | ulnto | | ultnm | | ulto | | ultm | |
|---|---|---|---|---|---|---|---|---|
| | result | note | result | note | result | note | result | note |
| e | 2 | fi -> ui, fig50 and fig22a | 2 | fi -> ui, fig50 and fig22a | 2 | fi -> ui, fig50 and fig22a | 2 | fi -> ui, fig50 and fig22a |
| b | 1 | fig50 and fig22b | 1 | fig50 and fig22b | 1 | fig50 and fig22b | 1 | fig50 and fig22b |
| r | 1 | fig 50 and fig22c | 1 | fig 50 and fig22c | 1 | fig 50 and fig22c | 1 | fig22c |
| d | 4 | | 4 | | 2 | fi stays, fig50 and fig22d | 2 | fi stays, fig50 and fig22d |
| n | 4 | | 4 | | 2 | fi stays, fig50 and fig22e | 4 | |
| e | 3 | fig51 | 3 | fig51 | 3 | fig51 | 3 | fig51 |
| b | 3 | fig51 | 3 | fig51 | 1 | | 1 | |
| r | 3 | fig51 | 3 | fig51 | 1 | | 1 | |
| d | 4 | | 4 | | 3 | fig51 | 3 | fig51 |
| n | 4 | | 4 | | 3 | fig51 | 4 | |

FIG. 68b

| ACTION | | | RULE TYPE | |
|---|---|---|---|---|
| | | | mst | |
| | | | | result note |
| insert | | e | 2 | fi -> mi, fig50 and fig22a |
| | | b | 1 | fig50 and fig22b |
| | | r | 1 | fig50 and fig22c |
| | | d | 4 | |
| | | n | 4 | |
| insert | | e | 2 | fi -> mi, fig52 |
| | | b | 1 | fig52 |
| | | r | 1 | fig52 |
| | | d | 4 | fig52 |
| | | n | 4 | fig52 |

| RULE | TYPE | ulnto | | ulntrm | | ulto | | ultm | |
|---|---|---|---|---|---|---|---|---|---|
| | | result | note | result | note | result | note | result | note |
| | e | 2 | fi -> ui, fig50 and fig22a | 2 | fi -> ui, fig50 and fig22a | 2 | fi -> ui, fig50 and fig22a | 2 | fi -> ui, fig50 and fig22a |
| | b | 1 | fig50 and fig22b | 1 | fig50 and fig22b | 1 | fig50 and fig22b | 1 | fig50 and fig22b |
| | r | 1 | fig 50 and fig22c | 1 | fig 50 and fig22c | 1 | fig 50 and fig22c | 1 | fig22c |
| | d | 4 | | 4 | | 2 | fi stays, fig50 and fig22d | 2 | fi stays, fig50 and fig22d |
| | n | 4 | | 4 | | 2 | fi stays, fig50 and fig22e | 4 | |
| | e | 3 | | 3 | | 3 | | 3 | |
| | b | 3 | | 3 | | 1 | | 1 | |
| | r | 3 | | 3 | | 1 | | 1 | |
| | d | 4 | | 4 | | 3 | | 3 | |
| | n | 4 | | 4 | | 3 | | 4 | |
| | e | 1 | positive lifespan rule | 1 | positive lifespan rule | 1 | positive lifespan rule | 1 | positive lifespan rul |
| | b | 1 | positive lifespan rule | 1 | positive lifespan rule | 1 | positive lifespan rule | 1 | positive lifespan rule |
| | r | 1 | positive lifespan rule | 1 | positive lifespan rule | 1 | positive lifespan rule | 1 | positive lifespan rule |
| | d | 4 | | 4 | | 1 | | 1 | |
| | n | 4 | | 4 | | 1 | | 4 | |

FIG. 70b

| RULE | TYPE | dinto | | dlntm | | dlto | | dltm | |
|---|---|---|---|---|---|---|---|---|---|
| | | result | note | result | note | result | note | result | note |
| e | | 3 | fig20 | 3 | fig20 | 3 | fig20 | 3 | fig20 |
| b | | 3 | fig20 | 3 | fig20 | 3 | fig20 | 3 | fig20 |
| r | | 3 | fig20 | 3 | fig20 | 3 | fig20 | 3 | fig20 |
| d | | 4 | | 4 | | 3 | fig20 | 3 | fig20 |
| n | | 4 | | 4 | | 4 | | 4 | |
| e | | 3 | fig21 | 3 | fig21 | 3 | fig21 | 3 | fig21 |
| b | | 3 | fig21 | 3 | fig21 | 3 | fig21 | 3 | fig21 |
| r | | 3 | fig21 | 3 | fig21 | 3 | fig21 | 3 | fig21 |
| d | | 4 | | 4 | | 3 | fig21 | 3 | fig21 |
| n | | 4 | | 4 | | 4 | | 4 | |
| e | | 2 | fig22a | 2 | fig22a | 2 | fig22a | 2 | fig22a |
| b | | 2 | fi -> dl, fig22b | 2 | fi -> dl, fig22b | 2 | fi -> dl, fig22b | 2 | fi -> dl, fig22b |
| r | | 2 | fig22c | 2 | fig22c | 2 | fig22c | 2 | fig22c |
| d | | 4 | | 4 | | 2 | fig22d | 2 | fig22d |
| n | | 4 | | 4 | | 2 | fig22e | 4 | |
| e | | 2 | disconnect or delete, fig23a | 2 | disconnect or delete, fig23a | 2 | disconnect or delete, fig23a | 2 | disconnect or delete, fig23a |
| b | | 2 | fi -> dl, fig23b | 2 | fi -> dl, fig23b | 2 | fi -> dl, fig23b | 2 | fi -> dl, fig23b |
| r | | 3 | fig23c | 2 | fig23c | 2 | fig23c | 2 | fig23c |
| d | | 2 | disconnect, fig23d | 2 | disconnect, fig23d | 2 | disconnect, fig23d | 2 | disconnect, fig23d |
| n | | 2 | disconnect, fig23e | 2 | disconnect, fig23e | 2 | disconnect, fig23e | 4 | |
| e | | 1 | positive lifespan rule, fig24 | 1 | positive lifespan rule, fig24 | 1 | positive lifespan rule, fig24 | 1 | positive lifespan rule, fig24 |
| b | | 1 | positive lifespan rule, fig24 | 1 | positive lifespan rule, fig24 | 1 | positive lifespan rule, fig24 | 1 | positive lifespan rule, fig24 |
| r | | 1 | positive lifespan rule, fig24 | 1 | positive lifespan rule, fig24 | 1 | positive lifespan rule, fig24 | 1 | positive lifespan rule, fig24 |
| d | | 4 | | 4 | | 1 | positive lifespan rule, fig24 | 1 | positive lifespan rule, fig24 |
| n | | 4 | | 4 | | 4 | | 4 | |

| RULE | TYPE ulnto | | ulntm | | ulto | | ultm | |
|---|---|---|---|---|---|---|---|---|
| | result | note | result | note | result | note | result | note |
| e | 2 | fi -> ui, fig50 and fig22a | 2 | fi -> ui, fig50 and fig22a | 2 | fi -> ui, fig50 and fig22a | 2 | fi -> ui, fig50 and fig22a |
| b | 1 | fig50 and fig22b | 1 | fig50 and fig22b | 1 | fig50 and fig22b | 1 | fig50 and fig22b |
| r | 1 | fig 50 and fig22c | 1 | fig 50 and fig22c | 1 | fig50 and fig22c | 1 | fig22c |
| d | 4 | | 4 | | 2 | fi stays / disconnect, fig50 and fig22d | 2 | fi stays, fig50 and fig22d |
| n | 4 | | 4 | | 2 | fi stays / disconnect, fig50 and fig22e | 4 | |
| e | 3 | fig51 | 3 | fig51 | 3 | fig51 | 3 | fig51 |
| b | 3 | fig51 | 3 | fig51 | 3 | fig51 | 3 | fig51 |
| r | 3 | fig51 | 3 | fig51 | 3 | fig51 | 3 | fig51 |
| d | 4 | | 4 | | 3 | fig51 | 4 | |
| n | 4 | | 4 | | 3 | fig51 | 4 | |
| e | 3 | | 3 | | 3 | | 3 | |
| b | 3 | | 3 | | 3 | | 3 | |
| r | 3 | | 3 | | 3 | | 3 | |
| d | 4 | | 4 | | 4 | | 4 | |
| n | 4 | | 4 | | 4 | | 4 | |
| e | 1 | positive lifespan rule | 1 | positive lifespan rule | 1 | positive lifespan rule | 1 | positive lifespan rule |
| b | 1 | positive lifespan rule | 1 | positive lifespan rule | 1 | positive lifespan rule | 1 | positive lifespan rule |
| r | 1 | positive lifespan rule | 1 | positive lifespan rule | 1 | positive lifespan rule | 1 | positive lifespan rule |
| d | 1 | positive lifespan rule | 1 | positive lifespan rule | 1 | positive lifespan rule | 1 | positive lifespan rule |
| n | 4 | | 4 | | 4 | | 4 | |
| e | 1 | positive lifespan rule | 1 | positive lifespan rule | 1 | positive lifespan rule | 1 | positive lifespan rule |
| b | 1 | positive lifespan rule | 1 | positive lifespan rule | 1 | positive lifespan rule | 1 | positive lifespan rule |
| r | 1 | positive lifespan rule | 1 | positive lifespan rule | 1 | positive lifespan rule | 1 | positive lifespan rule |
| d | 4 | | 4 | | 1 | positive lifespan rule | 1 | positive lifespan rule |
| n | 4 | | 4 | | 4 | | 4 | |

FIG. 74b

| ACTION | | xs | fi/mi | md/fd | xe | RULE TYPE | | |
|---|---|---|---|---|---|---|---|---|
| | | | | | | | mst | |
| | | | | | | | result | note |
| alter insert back | | ▓ | | | | e | 2 | fi -> mi, fig50 and fig22a |
| | | | | | | b | 1 | fig50 and fig22b |
| | | | | | | r | 1 | fig50 and fig22c |
| | | | | | | d | 4 | |
| | | | | | | n | 4 | |
| alter insert forward | | | ▓ | | | e | 2 | fi -> mi, fig52 |
| | | | | | | b | 1 | fig52 |
| | | | | | | r | 1 | fig52 |
| | | | | | | d | 4 | fig52 |
| | | | | | | n | 4 | fig52 |
| alt r insert forward | | | | ▓ | | e | 1 | positive lifespan rule |
| | | | | | | b | 1 | positive lifespan rule |
| | | | | | | r | 1 | positive lifespan rul |
| | | | | | | d | 4 | |
| | | | | | | n | 4 | |

CASE 1

| RULE | TYPE | | |
|---|---|---|---|
| | chd | result | note |
| e | | | 4 |
| b | | | 4 |
| r | | | 4 |
| d | | | 4 |
| n | | | 4 |
| e | | | 3 |
| b | | | 3 |
| r | | | 3 |
| d | | | 3 |
| n | | | 3 |
| e | | | 4 |
| b | | | 4 |
| r | | | 4 |
| d | | | 4 |
| n | | | 4 |

FIG. 77b

| CASE 2 | RULE | TYPE | | |
|---|---|---|---|---|
| | | chd result | note | |
| | e | | 4 | |
| | b | | 4 | |
| | r | | 4 | |
| | d | | 4 | |
| | n | | 4 | |
| | e | | 1 | |
| | b | | 1 | |
| | r | | 1 | |
| | d | | 1 | |
| | n | | 1 | |
| | e | | 4 | |
| | b | | 4 | |
| | r | | 4 | |
| | d | | 4 | |
| | n | | 4 | |

FIG. 77c

| RULE | TYPE | | | | | ulto | | ultm | | |
|---|---|---|---|---|---|---|---|---|---|---|
| | ulnto result | note | ulntm result | note | | result | note | result | note | |
| e | 4 | | | | | | | | | |
| b | 4 | | 4 | | | | | | | |
| r | 4 | | 4 | | | see fig 70a and 70b for ulto, ultm | | see fig 70a and 70b for ulto, ultm | | |
| d | 4 | | 4 | | | | | | | |
| n | 4 | | 4 | | | | | | | |
| e | 4 | | 4 | | | | | | | |
| b | 4 | | 4 | | | | | | | |
| r | 4 | | 4 | | | see fig 70a and 70b for ulto, ultm | | see fig 70a and 70b for ulto, ultm | | |
| d | 4 | | 4 | | | | | | | |
| n | 4 | | 4 | | | | | | | |
| e | 4 | | 4 | | | | | | | |
| b | 4 | | 4 | | | | | | | |
| r | 4 | | 4 | | | see fig 70a and 70b for ulto, ultm | | see fig 70a and 70b for ulto, ultm | | |
| d | 4 | | 4 | | | | | | | |
| n | 4 | | 4 | | | | | | | |
| e | 4 | | 4 | | | | | | | |
| b | 4 | | 4 | | | | | | | |
| r | 4 | | 4 | | | see fig 70a and 70b for ulto, ultm | | see fig 70a and 70b for ulto, ultm | | |
| d | 4 | | 4 | | | | | | | |
| n | 4 | | 4 | | | | | | | |
| e | 4 | | 4 | | | | | | | |
| b | 4 | | 4 | | | | | | | |
| r | 4 | | 4 | | | see fig 70a and 70b for ulto, ultm | | see fig 70a and 70b for ulto, ultm | | |
| d | 4 | | 4 | | | | | | | |
| n | 4 | | 4 | | | | | | | |

FIG. 78b

| ACTION | | RULE | Result |
| --- | --- | --- | --- |
| | xs | ui | fd/ud/xe |
| delete | ▓ | | | e b r d n | see fig 86a and 86b for ulnto, ulntm, ulto, ultm |
| delete | | ▓ | | e b r d n | see fig 86a and 86b for ulnto, ulntm, ulto, ultm |
| delete | | | ▓ | e b r d n | see fig 86a and 86b for ulnto, ulntm, ulto, ultm |

| ACTION | | RULE | Result |
|---|---|---|---|
| | xs | fi/mi | md/fd/xe | | | |
| delete | | | | e | |
| | | | | b | |
| | | | | r | see fig 87 |
| | | | | d | for mst |
| | | | | n | |
| delete | | | | e | |
| | | | | b | see fig 87 |
| | | | | r | for mst |
| | | | | d | |
| | | | | n | |

FIG. 84b

| RULE TYPE | dInto result | note | dIntm result | note | dIto result | note | dItm result | note |
|---|---|---|---|---|---|---|---|---|
| e | 1 | positive lifespan rule | 1 | positive lifespan rule | 1 | positive lifespan rule | 1 | positive lifespan rul |
| b | 1 | positive lifespan rule | 1 | positive lifespan rule | 1 | positive lifespan rule | 1 | positive lifespan rul |
| r | 1 | positive lifespan rule | 1 | positive lifespan rule | 1 | positive lifespan rule | 1 | positive lifespan rule |
| d | 4 | | 4 | | 1 | positive lifespan rule | 1 | positive lifespan rule |
| n | 4 | | 4 | | 1 | positive lifespan rule | 4 | |
| b | 2 | disconnect or delete | 2 | disconnect or delete | 2 | disconnect or delete | 2 | disconnect or delete |
| r | 2 | fd -> dd | 2 | fd -> dd | 2 | fd -> dd | 2 | fd -> dd |
| d | 3 | | 2 | | 2 | | 2 | |
| d | 2 | disconnect | 2 | disconnect | 2 | disconnect | 2 | disconnect |
| n | 2 | disconnect | 4 | | 2 | disconnect | 4 | |
| b | 2 | fd -> dd | 2 | fd -> dd | 2 | fd -> dd | 2 | fd -> dd |
| r | 2 | | 2 | | 2 | | 2 | |
| d | 4 | | 4 | | 2 | | 2 | |
| n | 4 | | 4 | | 4 | | 4 | |
| e | 3 | | 3 | | 3 | | 3 | |
| b | 3 | | 3 | | 3 | | 3 | |
| r | 3 | | 3 | | 3 | | 3 | |
| d | 4 | | 4 | | 3 | | 3 | |
| n | 4 | | 4 | | 3 | | 4 | |
| e | 3 | | 3 | | 3 | | 3 | |
| b | 3 | | 3 | | 3 | | 3 | |
| r | 3 | | 3 | | 3 | | 3 | |
| d | 4 | | 4 | | 3 | | 3 | |
| n | 4 | | 4 | | 3 | | 4 | |

| ACTION | xs | fi/ci | cd/fd | xe | RULE TYPE | | |
|---|---|---|---|---|---|---|---|
| | | | | | | chd | |
| | | | | | | result | note |
| alter delete back | | | | | e | 1 | positive lifespan rule |
| | | | | | b | 1 | positive lifespan rule |
| | | | | | r | 1 | positive lifespan rule |
| | | | | | d | 4 | |
| | | | | | n | 4 | |
| alter delete back | | | | | e | 2 | |
| | | | | | b | 2 | fd ->cd |
| | | | | | r | 2 | |
| | | | | | d | 4 | |
| | | | | | n | 4 | |
| alter delete forward | | | | | e | 3 | |
| | | | | | b | 3 | |
| | | | | | r | 3 | |
| | | | | | d | 4 | |
| | | | | | n | 4 | |

| RULE | TYPE | | | | | | | |
|---|---|---|---|---|---|---|---|---|
| | ulnto | | ulntm | | ulto | | ultm | |
| | result | note | result | note | result | note | result | note |
| e | 1 | positive lifespan rule | 1 | positive lifespan rule | 1 | positive lifespan rule | 1 | positive lifespan rule |
| b | 1 | positive lifespan rule | 1 | positive lifespan rule | 1 | positive lifespan rule | 1 | positive lifespan rule |
| r | 1 | positive lifespan rule | 1 | positive lifespan rule | 1 | positive lifespan rule | 1 | positive lifespan rule |
| d | 4 | | 4 | | 4 | | 4 | |
| n | 4 | | 4 | | 4 | | 4 | |
| e | 1 | positive lifespan rule | 1 | positive lifespan rule | 1 | positive lifespan rule | 1 | positive lifespan rule |
| b | 1 | positive lifespan rule | 1 | positive lifespan rule | 1 | positive lifespan rule | 1 | positive lifespan rule |
| r | 1 | positive lifespan rule | 1 | positive lifespan rule | 1 | positive lifespan rule | 1 | positive lifespan rule |
| d | 4 | | 4 | | 4 | | | |
| n | 4 | | 4 | | 4 | | | |
| e | | | 3 | | 3 | | 3 | |
| b | | | 3 | | 3 | | 3 | |
| r | | | 3 | | 3 | | 3 | |
| d | | | 4 | | 4 | | 4 | |
| n | | | 4 | | 4 | | 4 | |
| e | 3 | fig 54 | 3 | fig 54 | 3 | fig 54 | 3 | fig 54 |
| b | 3 | fig 54 | 3 | fig 54 | 3 | fig 54 | 3 | fig 54 |
| r | 3 | fig 54 | 3 | fig 54 | 3 | fig 54 | 3 | fig 54 |
| d | 4 | | 4 | | 4 | | 4 | |
| n | 4 | | 4 | | 4 | | 4 | |
| e | 2 | fd -> ud, fig 53 | 2 | fd -> ud, fig 53 | 2 | fd -> ud, fig 53 | 2 | fd -> ud, fig 53 |
| b | 1 | fig53 | 1 | fig53 | 1 | fig53 | 1 | fig53 |
| r | 1 | fig53 | 1 | fig53 | 1 | fig53 | 1 | |
| d | 4 | | 2 | fd stays / disconnect, fig53 | 2 | fd stays / disconnect, fig53 | 2 | fd stays / disconnect, fig53 |
| n | 4 | | 4 | | 4 | | 4 | |

FIG. 86b

TIME IN DATABASES AND APPLICATIONS OF DATABASES

FIELD OF THE INVENTION

This invention relates to how a time value for a data entry is handled in a database (e.g. hierarchical, relational, object-oriented, and object-relational), and how databases that handle time in a better way can be used, and to machines programmed to operate in the new way, software for such machines, and methods associated with the treatment of time. It is especially but not exclusively applicable to relational databases.

BACKGROUND OF THE INVENTION

Databases are very important in the modern world. Data is input to the database, and many kinds of data have a time-related value: the database is a time-relational database. For example, Mr Smith works for a company. This database entry shows that he joined on 1st Mar. 1995. That database entry has a time-associated with it: 1st Mar. 1995. The database entry may have been created before, on, or after 1st Mar. 1995. When an enquiry is made, today, of the database it says that Mr Smith joined on 1st Mar. 1995. A second example is the price of goods sold by a business. A price list database shows that product XP2001 costs $100. That is what the database says today.

However, the value of an attribute of a database entry is often not static in time. For example, Mr Smith may really have started a week later. If this is discovered on, say, 10 Jun. 2003, and corrected that day in the database, an enquiry performed on 9th Jun. 2003 would say Mr Smith jointed on 1st Mar. 1995. The same enquiry performed on 11 Jun. 2003 would say he joined on 8th Mar. 1995.

Similarly, the price of goods can change. Product XP2001 has its price set at $100 on, say, 1st Jun. 1996 changed from $100 to $110 on 1st Jan. 1997, a special discount offer had reduced it to $80 on 1st Jun. 1997, and it went up to $120 on 1st Jan. 1998. An enquiry of the database "how much is product XP2001" will give a different answer at different times of making the enquiry.

The above examples illustrate two types of change of value of an attribute (price/start date): one because of an error, now accepted as being an error, and another due to a real change in the value of the attribute.

Other attributes of a data entry can change with time for other reasons. For example Mr Smith joined the company in the accounts department, but was transferred to the marketing department on 1st Jan. 1999. The enquiry "who is in the accounts department" will give a different answer if it is asked at different times.

How the above types of problem (attributes of data entries changing with time, and the, consequential effect of that on data structure, and the need to be able to turn the clock back and see what the answer would have been had the question been asked at a different time) are dealt with is a difficulty for database designers, especially designers of relational database where relational rules between different data entries exist, and need to be made consistent. Creating an audit trail is necessary before changes are made—so as to preserve the previous picture. Additional application software, such as audit and history tables can be built to do this automatically as a change is made—but that software takes up memory, and the data saved/stored in the audit trail takes up disk storage.

The problem is resolved currently by having a set of relational rules that control what can be done allowably in a computer with a specific data entry (or data entity), depending upon the attributes of the entry and the rules relating to those attributes, and also by arranging the data entry so as to be able to roll-back the database to an earlier time. This necessitates setting up the structure of the database originally in such a way that an attribute that can change with time has a series of value entries associated with different times, and flags to enable a search command to identify and use the correct attribute value when a "search as of time X" command is used.

This works, but has limitations. Firstly, if an attribute in the database is not set up initially to be able to have different values at different times, then it is not possible to roll back the time for that value (short of locating all database entries that have that attribute, modifying the data structure, and entering values at different historical times for them—which is an appalling prospect).

Secondly, the relational rules required are complex, and take up a lot of processing power of a computer when a query is made; and/or when a change to an attribute is made.

Furthermore, some changes just cannot be made to the database (for example Update Cascade). It is possible to implement Delete Restrict and Delete Cascade, but not, for example Update Cascade. There are no foreign key rules for update: it is simply not allowed.

The above is a relatively high-level discussion of some of the issues in the background to the invention. Their now follows a more technical level discussion.

The majority of commercially available non temporal databases use essentially the teachings of Dr. E. F. Codd, the leading authority on relational database technology and the originator of the relational model, who sets out the rules for a relational model in a paper entitled "Codd's 12 Rules for Relational DBMS" published in The Relational Journal—Issue 1.

A relatively brief and concise definition of the relational model itself, appears in the article "RM/T: Extending the Relational Model to Capture More Meaning." (Chapter 2 of "The Basic Relational Model) in the Association for Computing Machinery's "Transactions on Data Base Systems" (December 1979). The reader is directed to read these now, and the content is hereby incorporated by reference.

However, the work done by Dr. E. F. Codd does not incorporate time in the relational model. In fact, the database technologies that have been built according to Codd's model hold data at an instant in time i.e. current time or now. Incorporating time into database models is currently an area for debate and the modelling of temporal data and temporal databases has been the subject of much work, for many years, by both academia and the biggest computer/software companies in the world. We refer the reader to the publication "C. J. Date, An Introduction To Database Systems", Volume 1, Fifth Edition, published by Addison-Wesley Publishing Company, and in particular to pages 717 to 720 where, there is a discussion of time in databases. The reader is directed to read that now, and the content of pages 717 to 720 is hereby incorporated by reference.

In general, the research and commercial databases are based on an approach where each tuple (row) representing a database object is augmented by two attributes to denote a lifespan i.e. from the time of the insert of the data object to the time of the deletion of the data object. These attributes are typically denoted as a start-date and an end-date. There is a great deal of published work on how the attributes might be managed, and how they relate to each other. How to initiate updates and deletions of related entities/objects in a database without creating logical inconsistencies in the data is a big area for research.

Indeed, the number and complexity of the algorithms that are running in the background for a relational database with entries that have a temporal dimension is ever increasing, and uses up quite a lot of processing power of the computer. This can slow data transfer rates (e.g. in networked/telecommunicated systems).

Current Temporal Relational models and theories allow physical update and delete actions and as a result the maintenance of data integrity is a complex task that is magnified by the introduction of time.

In 'An Introduction to Database Systems', C. J. Date discusses the topic of time with respect to database systems. He points out that a considerable amount of research has gone into the problem in recent history. He also notes that although the theory of modelling time has been explored, there are relatively few papers that concern themselves with implementation and the issues surrounding the actual delivery of a relationally consistent, time based system.

Most research is based on extending a schema, FIG. 7a, by adding a Start attribute 701 and End attribute 702 to either a tuple 705 or an attribute 706. These Start and End attributes are managed by the system. This prior art research concentrates in the main on the management of these attributes as data is updated, deleted and inserted. This research typically restricts itself to using a single-entity with simple entity attributes such as surname to demonstrate the theory. Even with this unrealistic, restricted view of data the complexities of this research soon manifest themselves in the form of discussions and theoretical dissertations on the management of these simple attributes. Unresolved problems remain such as how to manage updates and deletions of these simple models without creating logical inconsistencies in the data such as current duplicates, value equivalent duplicates, sequenced duplicates and non-sequenced duplicates. These and many other topics are the substance of thousands of theoretical dissertations in the temporal database community.

The prior art rarely considers the next logical step of more realistic examples involving multiple entities related by foreign keys such as employee and department or order and orderline. Applying the available prior art research to more realistic data models with multiple related entities means that the problems of current research are magnified greatly and so are often ignored by the theorists as they struggle to provide a complete solution to even the most simple examples.

C. J. Date concludes that a single pair of Start/End attributes is easily seen to be inadequate, because it is necessary to distinguish between effective time and update time and he surmises that there is a need, depicted in FIG. 7a, for an effective (or valid) Start/End pair of attributes 701, 702 and an update (or transaction) pair of attributes 703, 704 for each attribute in a tuple 706. Furthermore, he states that the effective Start/End pair may or may not be hidden from the user, but either way there must be a means of performing retrievals based on those attributes, and there must also be a means of updating them.

The conclusion of much of this research is that when one comes to implement the theory then certain, as yet unavailable, constructs are necessary such as the use of assertions, complex check constraints, multiple select statements in triggers, extensions to the SQL-92, and creation of new SQL3 standards.

We are aware of U.S. Pat. No. 6,233,573 that relates to dimensional databases having a temporal dimension. This has a discussion of the prior art and problems that complements that given above. We hereby incorporate by reference from column 1, line 24 to column 4, line 2, of that patent, and the reader is directed to read that discussion of the prior art, and indeed the whole patent U.S. Pat. No. 6,233,573.

Whilst U.S. Pat. No. 6,233,573 addresses similar general problems to those of the present invention, it is written in the context of providing a temporal extension to existing dimensional database theory such that one can accurately select records from a dimensional database that depend on a time of a change or effective date of a value of an attribute in a table of a dimensional database.

We are also aware of U.S. Pat. No. 5,440,730. This was filed over 10 years ago, but has a useful discussion of the prior art, and addresses allied problems to the present invention. We hereby incorporate by reference from column 1, line 7 to column 2, line 40 of U.S. Pat. No. 5,440,730 and direct the reader to read the whole of that patent now.

Whilst U.S. Pat. No. 5,440,730 recognises difficulties in the current approach to how time is handled in relational database, it is mainly concerned with the provision of an efficient indexing scheme for supporting high-level temporal operators especially when the search involves time intervals i.e. rather than time points. For example, where it is desired to retrieve object versions that are valid during a given time period, e.g. the names of all employees who worked for the company during 1985, this time index will lead directly to the desired versions, i.e. the names, without requiring the search of a version index for each individual object, i.e. employee, separately.

A further fact associated with existing relational databases with a time dimension is that access to the database is session-based: only one person has access at a time: only one person can change things at a time. Application and session cookies are often used to control who has access to what and when. As the number of people who want to access the database grows there may be times when getting control of the database to access it becomes slow. This may be especially so in, say, internet accessed databases.

A further fact is that if a database manager is in the process of changing a large number of attributes (e.g. the price of 10,000 stock items), users may need to be locked out of the system for a long time, for example tens of minutes, or even for hours. Typically such revisions to the entries in a database are performed in the middle of the night so as to minimise disruption to users. However, with Internet access to a web site spreading the usage of a web site database over many time zones it can be difficult to find a time when few people are using the database.

U.S. Pat. No. 6,363,387 discloses a system for enhancing concurrency of a database using row level locking. It discloses prior art, and we hereby incorporate by reference the prior art discussion of its "background of the invention". Section of that patent, from the first line of page 1 up until the start of the "screening of the invention".

SUMMARY OF THE INVENTION

According to a first aspect of the invention, there is provided a method of providing data entities of a database with a time dependent value for an attribute of the entity, the method comprising:

i) having values of attributes of said entities in said database;

ii) for said entities providing a valid time start time associated with each said value of said attribute;

iii) for said entities providing a valid time end time associated with each said value of said attributes;

iv) for said entities providing a transaction time associated with said valid time start time and said valid time end time for each said value; and v) using an appropriate said transaction time when querying said database so as to ensure that an appropriate value for said attribute is used and that appropriate valid time start and end times are used.

By having attributes of an entity associated with both a transaction time and a valid time we can allow a query of the database to look at what was the position in the past according to transaction time by selecting the value and valid time that were true at a selected transaction time. This approach also enables us to update, alter, and delete using insert-only software. This reduces the software burden on a database processor of running extensions to Structrured Query Languages, and has other unexpected benefits.

Changes to said values may be achieved by inserting new entries for linked transaction time, valid time start time, valid time end time, and associated attribute value over a thereby specified valid time period, there being no actual delete operator used to change said values.

This is an advantage of some embodiments of the invention: insert-only functionality greatly simplifies the task of achieving data integrity over transaction time as values are changed in a database.

There may be no update operator, update being achieved by insertion. There may be no delete operator, delete being addressed by insertion: a logical delete operation for a value of an attribute of an entity may be achieved by an insert operation which sets the said value to Non Existence for a period in which it is intended to delete said attribute or value.

We have come to the surprising realisation that an insert-only treatment of time dependent attributes of a data entity simplifies the way a database is constructed and used, especially a relational database where there are referential rules detailing how different entities in the database are related. We have realised that how "delete" and "update" commands for an entity in a relational database are treated is an area that consumes a lot of computer processor power in the prior art. A lot of the computer code relating to referential rules linking data entities is present to cope with deleting an entity. What happens to other related entities when a change is made? Is the entity deleted a primary key (or identifier), or a foreign key? Maintaining data integrity in a relational database requires, currently, a lot of software code to say what happens to the entities that used to be related to the deleted entity. Similar comments apply to "update" commands. Updating an attribute of an entity can cause logical inconsistencies in a relational database, and a significant amount of code is written to ensure that this cannot occur—to maintain data integrity.

By not having a genuine delete, or update, operation (at the atomic level), and instead simply writing a new summary position in which values for attributes in valid time are written/possibly altered when assessed at a specified transaction time, we rewrite what was apparently "true" (or is to be true) at the specified transaction time, and can ensure data integrity in a far simpler manner in this way. It allows us to go beyond attribute and entity integrity and to ensure relational integrity of data entities.

Our core database engine deals with time and referential integrity (when applied to relational databases), rather than having to layer on extended query language software to handle such things. We can therefore use unextended Structured Query Language.

Said values for data entries may be provided in a relational database. The invention has advantages in simplifying relational rules in a relational database to enable the database to cope with certain data-modifying operations. The invention is not restricted to relational databases: it covers other database types as well.

According to a second aspect the invention provides a method of obtaining information from a database comprising providing entities in said database with time dependent values for attributes in accordance with the preceding aspect of the invention and querying said database for a value for selected data entity(s), said method further comprising having a Temporal Data Dictionary having a set of objects associating specific entities in said database with specific functionality-related parameters which are used in controlling how a processor handles a query relating to said entities, said Temporal Data Dictionary maintaining data integrity.

In some embodiments the Temporal Data Dictionary can be considered to be a "rule-book" specifying what happens to values for attributes if certain changes are made to the database.

The method may be practised on a database, and the Temporal Data Dictionary may also maintain attribute integrity rules for data entities.

Updateability is an Attribute Integrity rule, and is similar to the concept of updateability in prior art database technologies. Updateability is concerned with whether or not an attribute can have multiple values in X-Time. The Temporal Data Dictionary ensures that Non-Updateable attributes only have one value in X-Time between Insert Time and Delete Time.

Transferability is an Attribute Integrity rule, and is similar to the concept of transferability in prior art database technologies. Transferability only pertains to foreign key attributes and is concerned with whether or not a foreign key attribute can have multiple values in X-Time. The Temporal Data Dictionary ensures that Non-Transferable foreign key attributes, only have one value in X-Time between Insert Time and Delete Time.

Correctability is an Attribute Integrity rule, and is not known from the prior art. Correctability is concerned with whether or not an attribute can have multiple values in Y-Time and allows us to model attributes such as primary keys which typically do not change value over X-Time or Y-Time.

This rule is considered as a separate invention in its own right, divisible from the other inventions.

Optionality is an Attribute Integrity rule, and is similar to the concept of Optionality in prior art database technologies. Optionality is concerned with whether or not an attribute is allowed Null values in X-Time. The Temporal Data Dictionary ensures that Non-Optional attributes always have a Non-Null value in X-Time between Insert Time and Delete Time.

Non Existence is a concept not known from the prior art. All attributes, both mandatory and optional have the Non Existence value for the periods in X-Time that occur before Insert Time and after Delete Time. Note that the Non Existence value is only used outside the lifespan of an entity and differs from the traditional NULL value known in prior art. The NULL value is still used for periods of X-Time within the lifespan of an entity for optional attributes when required. This rule is considered as a separate invention in its own right, divisible from the other inventions.

Attribute Group Membership is an Attribute Integrity rule, and is not known from the prior art. Attribute Group Membership is concerned with linking two or more functionally related attributes e.g. Address lines, within in the same entity such that if the attribute value of one member of the group is altered then a corresponding alteration is required for the other members for the same X-Time period. This rule is considered as a separate invention in its own right, divisible from the other inventions.

The method may be practised on a database, and the Temporal Data Dictionary may also maintain entity integrity rules.

Co Terminacy is an Entity Integrity rule, and is not known from the prior art. Co Terminacy is concerned with ensuring that all attributes of an entity have the same lifespan in X-Time following any action that increases or reduces the overall lifespan of an entity in the system. This rule is considered as a separate invention in its own right, divisible from the other inventions.

Positive Lifespan is as an Entity Integrity rule, and is not known from the prior art. Positive Lifespan is concerned with ensuring that the chronology of the insert and delete time is correct i.e. the Insert Time of an entity is always before the Delete Time following any action that reduces the overall lifespan of an entity in X-Time. This rule is considered as a separate invention in its own right, divisible from the other inventions.

Attribution is an Entity Integrity rule, and is not known from the prior art. Attribution is concerned with providing a valid value for attributes when a system event occurs that causes a Referential Boundary Condition to be crossed. The Attribution rules declared in the Temporal Data Dictionary ensure that all attributes in the Focus Entity and the foreign key attributes of all affected related entities have valid values after an event is completed. The Attribution rule has three possible options i.e. Extend, Default and Nullify. This rule is considered as a separate invention in its own right, divisible from the other inventions.

i) The Extend option ensures that the attribute in the new part of X-Time will inherit the existing attribute values from the adjacent Summary Position.
ii) The Default option ensures that the attribute in the new part of X-Time will inherit the default value held in the Temporal Data Dictionary for that attribute.
iii) The Nullify option ensures that the attribute in the new part of X-Time will inherit the Null value.

The method may be practised on a database, and the Temporal Data Dictionary may also maintain referential integrity rules for data entities that are referentially related.

Cascade is a Referential Integrity rule, and is similar to the concept of Cascade in prior art database technologies but is extended in this invention. Cascade is concerned with determining the result of an action occurring on a Focus Entity when that action causes a Referential Boundary Condition to be crossed. The Cascade rule operates in conjunction with the value of the Attribution rule declared in the Temporal Data Dictionary against the foreign key attribute of the related entity. This rule is considered as a separate invention in its own right, divisible from the other inventions.

i) If the Attribution rule defined against the foreign key attribute is set to Extend i.e. cascade (extend) then the action on the Focus Entity is allowed and related lifespans of the downstream entities are redefined appropriately.
ii) If the Attribution rule defined against the foreign key attribute is set to Default i.e. cascade (default) then the action on the Focus Entity is allowed and related downstream entities are, where appropriate, reconnected to a default Focus Entity for the X-Time period that constitutes the Foreign Key Gap.
iii) If the Attribution rule defined against the foreign key attribute is set to Nullify i.e. cascade (nullify) then the action on the Focus Entity is allowed and related downstream entities are, where appropriate, disconnected from any Focus Entity for the X-Time period that constitutes the Foreign Key Gap.

Bounded is a Referential Integrity rule, and is not known from the prior art. Bounded is concerned with ensuring that the final point in X-Time for the Focus Entity is inherited by the downstream entities however the X-Time values of the Referential Boundary Conditions determine the upper and lower limits of the effect of the action. This rule is considered as a separate invention in its own right, divisible from the other inventions.

Restrict is a Referential Integrity rule, and is similar to the concept of Restrict in prior art database technologies but is extended in this invention. Restrict is concerned with ensuring that the action on the Focus Entity is not allowed if the Referential Boundary Conditions are crossed. This rule is considered as a separate invention in its own right, divisible from the other inventions.

Referential integrity for data entries during a response to queries of the database may be maintained by a temporal data dictionary, rather than by specific application—level routines running on a database server processor.

This may mean that embodiments of the present invention use more disk space to record the values of different attributes at different transaction times than prior art systems where "current" values are held, and changed, but it also means that layers of data integrity, concurrency and transactional control software in the prior art are unnecessary and that some things such as Attribute Level Locking, full support for all temporal events (i.e. Alter Insert Forward, Alter Insert Back, Alter Delete Forward, Alter Delete Back) and relational rules (e.g. Update Cascade) can be done that just cannot be done with prior art databases. The reader is directed to page 104 for more detailed description of the benefits of this invention.

Said Temporal Data Dictionary may maintain details of at least one of, or any combination of:
i) valid permissible users of the database;
ii) integrity constraints defined for data entities in the database;
iii) how much of a database's memory is allocated to each data entity, and how much of that allocated memory space for each data entity is actually used;
iv) the address in database memory of each of said data entries;
v) for each transaction time allowed, an associated period in valid time for which each said data entity exists.

Said Temporal Data Dictionary may be changed when structure of said database is altered. Once the Time Cube is used for the storage of both code and data schema then the actual code and data structure in use at a point in time are determined by valid time. All the advantages of modelling data in time also apply to the modelling of the structure of the data in time. The reader is directed to page 107 for a detailed description of the benefits in application lifecycle, maintenance and upgrade arising from this invention.

Said Temporal Data Dictionary may contain a set, preferably a complete set, of Attribute, Entity and Referential integrity rules to enable queries of the database to operate on data entities using the correct transaction time to extract correct values for attributes. All the Attribute, Entity and Referential rules are declared in the Temporal Data Dictionary. The advantages of declarative integrity constraints are already implemented in many prior art solutions. This invention also takes advantage of the benefits that are afforded from adopting this approach including improved performance; ease of declaration; centralised rules; ease of maintenance; immediate user feedback; flexibility; full data documentation in the Data Dictionary. The invention provides a declarative environment for a complete set of temporal rules and so a developer designing and building a system based upon this invention does not need to code temporal rules into the application layer of the system because the temporal integrity of a data is defined once in the Temporal Data Dictionary. The reader is directed to page 108 for a detailed description of the benefits in application development arising from this invention.

Data relating to each specific data entity may be held in corresponding data-entity associated Time Cubes that comprise valid and transaction time related values for different attributes in different attribute-slices of said Time Cube.

It will be appreciated that a Time Cube may have a varying scope. In one embodiment of the invention, a Time Cube may represent 3 dimensions—e.g. a possible example is data entity has dimension 1 (value of attribute), dimension 2 (valid time associated with value), dimension 3 (transaction time associated with value). However, the scope of a Time Cube may be increased to represent multiple instances of a single entity, or multiple entities, or groups of entities. As the scope increases, so another dimension is added to the Time Cube. Thus, it will be understood that when we refer to "Time Cube" no restriction to three dimensions is intended, and indeed "Time Cube" could be considered to be an "N-dimensional Object having at least X-Time and Y-Time and one Attribute as three of the dimensions". It will be appreciated that when a Time Cube is used to hold the structure and/or operational code of a system then one attribute could be the operational rules used to control the system for example the Entity-Relationship diagram. The reader is directed to page 53 and FIG. 2 for a more detailed description of the Scope of a Time Cube.

For each Time Cube there may be typically, a single primary key attribute having associated values over transaction and valid time and possibly multiple unique key attributes.

The Time Cubes may have another, or a plurality of other foreign key attributes having a value, or values, which are valid and/or transaction time dependent.

The Time Cubes may have another, or a plurality of other attributes having a value, or values, which are valid and/or transaction time dependent.

Said Referential Integrity rules may control how primary key and foreign key attributes are interrelated for a said data entity. Indeed, often they will.

Said Referential Integrity rules may control how different distinct data entities are interrelated and how values of their attributes are related.

According to another aspect the invention provides a database having a model of entities on said database in which each entity has an associated Time Cube; said Time Cubes comprising at least one attribute having allowable values in X-Time and an associated Y-Time, X-Time being the whole system time from start of system time to end of system time within which valid time will exist for said entity, and Y-Time being system—generated time representative of transaction time at which specific allowable values are true.

Said model preferably allows insert only events to achieve update and delete functions.

At least some entities may have a plurality of attributes each having allowable values in X-Time with an associated Y-Time for which these values are true.

According to another aspect the invention provides a method of providing database software comprising taking an existing database core code which has update and/or delete functions and replacing said update and/or delete functions with an insert-only core code model so as to provide different values of attributes associated with entities on the database, said different values being associated with respective transaction times at which they are true, said database being interrogatable in a manner to query what said values are at different transaction times.

The insert-only core code may in some embodiments provide a user-experienced pseudo update and/or delete function.

Thus, users may still think they are updating and deleting, and using the database will not seem alien to them, but in fact they will be inserting new positions of data in transaction time, and when a query is made it will inspect the correct position in transaction time for the query.

According to another aspect the invention provides a method of holding data in a database comprising using a data model to hold data concurrently and consistently represented over time, the method comprising including time as a characteristic associated with values of attributes of entities on said database, and achieving update and delete of values of attributes of entities by using inserts, adding to the database, to achieve logical update and logical delete, without any requirement for actual code-level update and actual code-level delete operations.

Logical delete update and insert may be achieved by physical insert. Logical delete, update and insert may be achieved by creating a new object in transaction time.

According to another aspect the invention provides a database having data entity entries for attributes of an entity, each time that data relating to a data entity is changed there being a transaction time created on the database indicative of from when to when each value of each attribute applies, and there being for each value of each attribute a start point in valid time and an end point in valid time between which specified values for said attribute apply: the database being such that a query to identify a value for an attribute specifies what transaction time will be selected, thereby specifying what start and end points in valid time for an associated value will apply.

There may be a default transaction time, which default transaction time is the current transaction time at which a query is made.

According to another aspect the invention provides a method of modifying the value of an entity in a database comprising for each entity having one or more attributes, each attribute having one or more values over valid time, and storing for each value a start time of valid time from which the value applies, an end time of valid time to which the value applies, and a transaction time at which said start and end times in valid time apply.

The step of an insert data event, or an update data event, or a delete data event, may all comprise an insert event in the database, update events and delete events being achieved by inserting an entry associated with said entity having a modified transaction time and/or value and/or start time in valid time and/or end time in valid time.

According to another aspect the invention provides a method of modelling changes in values of attributes in time in a database comprising for each attribute of an entity in the database having summary positions associated with corresponding transaction times, each summary position, specific to a transaction time, having for each attribute a value, a start time in valid time at which said value applies, and an end time in valid time at which said value applies; and wherein said transaction time represents a time at which associated values, and start times and end times for those values, are taken to be true; and wherein an additional summary position is generated wherever an insert, logical update, or logical operation is performed on the database.

Logical delete and logical update may be performed by inserting a new summary position with appropriate transaction time and start and end valid times for an associated value for an attribute.

According to another aspect the invention comprises one or more computer memory collectively containing a database data structure for resolving temporal queries, comprising a plurality of time planes associated respectively with a plurality of items; each time plane comprising one or more rows in Y time, each Y time row representing a summary position for a specific attribute of said item at a particular transaction time, and each Y time row having one or more different values for its said specific attributes in X-Time, X-Time being valid time at which values of said attribute are, when Y-Time is associated with that particular Y-Time row, valid.

At least some of said items may have more than one attribute associated with them and wherein each said time plane represents a respective attribute, a plurality of time planes for each said item comprising a Time Cube, with conceptually Y-Time as transactional time, X-Time as valid time, and Z axis as selected attributes of said item.

An additional Y-Time row of X-Time values may have been added to said time plane. Said additional row may logically update or delete values present in an earlier row, earlier in transaction time.

According to another aspect the invention provides a method in a computer system for resolving a temporal query in a database comprising:
  i) receiving a temporal query specifying a condition of a time variable attribute and an effective transaction time;
  ii) accessing the database, the database comprising a plurality of time planes associated respectively with a plurality of database items, each time plane comprising one or more rows in transactional time each representing a summary position for the value of a specific attribute of an associated item when assessed at a particular transaction time, and each summary position row having one or more values for its specific attributes and an associated valid time for which said values are applicable to said attributes;
  iii) using said temporal query to identify a particular attribute and thereby a particular time plane, and using said temporal query to identify a particular transactional time summary position row of said selected time plane, thereby to generate a response to said query which response uses a selected value or condition of said attribute, selected in transaction time and valid time.

According to another aspect the invention provides a computer readable medium whose contents cause a computer system to resolve a temporal query in a database by causing the system to:
  i) receive a temporal query specifying an effective transaction time and specifying a time variable condition or value to be obtained from said database;
  ii) access said database, the database comprising a plurality of time planes associated respectively with a plurality of database items, each time plane comprising one or more rows in transactional time each representing a summary position for the value of a specific attribute of an associated item when assessed at a particular transaction time, and each summary position row having one or more values for its specific attributes and an associated valid time for which said values are applicable to said attributes;
  iii) use said temporal query to identify a particular attribute and thereby a particular time plane, and using said temporal query to identify a particular transactional time summary position row of said selected time plane, thereby to generate a response to said query which response uses a selected value or condition of said attribute, selected in transaction time and valid time.

According to another aspect the invention provides a data processing system for satisfying a temporal query comprising:
  i) one or more storage devices collectively containing a database for resolving temporal queries, comprising: a plurality of time planes associated respectively with a plurality of data entities; each time plane comprising one or more rows in Y-Time, each Y-Time row representing a summary position for a specific attribute of said item at a particular transaction time, and each Y-Time row having one or more different values for its said specific attributes in X-Time, X-Time being valid time at which values of said attribute are, when Y-Time is associated with that particular Y-Time row, valid;
  ii) a query receiver that receives temporal queries each specifying an effective, transaction, time; and
  iii) a query processing subsystem that satisfies temporal queries received by the query receiver by using the database to identify a selected transaction time summary position and a selected valid time value for said attribute.

Said query receiver may be adapted to receive queries which also specify one of:
  i) a time variable attribute;
  ii) a condition of a time variable attribute.

A Temporal Data Dictionary may be provided accessible by said query processing subsystem, said Temporal Data Dictionary having a set of temporal rules that are used by said processing subsystem to ensure data integrity when processing said database in response to a query. Said database may comprise a relational database, and wherein said Temporal Data Dictionary comprises a set of relational rules which are used by said processing subsystems, in conjunction with said temporal rules, to ensure data integrity and relational integrity when processing said database in response to a query.

Data integrity and relational integrity rules are implemented at core programming level of said query processing subsystem, rather than at application-level software running in response to a query.

Attribute-altering operations on the database may be performed by insert-only functionality, creating a new summary position for a data entity response to said insert-only activity. The logical actions of at least one of:
  i) Delete;
  ii) Alter Delete Forward;
  iii) Alter Delete Back;
  iv) Update;
  v) Insert;

vi) Alter Insert Forward;
vii) Alter Insert Back;

are preferably performed by an insert of a new Summary Position.

A temporal referential tree may be provided accessible to said query processing subsystem, said temporal referential tree detailing which data entities are affected by an application action run on the system. Said Temporal Referential Tree may determine which of the Temporal Referential rules of the temporal database apply in given circumstances. Said Temporal Referential Tree may determine which entities are affected, the systems then interrogating the Temporal Data Dictionary to determine the integrity rules that apply to relationships between entities.

According to another aspect the invention provides a computer based temporal database management system including a plurality of Time Cubes associated with a respective one of a plurality of items or groups of items; each Time Cube having an effective transaction time dimension, a valid time dimension specifying a start and an end time for at least one value of a specific attribute, and an attribute dimension representative of one or more attributes.

According to another aspect the invention may provide a computer record keeping system comprising;
 i) a computer processor adapted to run software;
 ii) a computer-accessible memory accessible to said processor;
 iii) software runable on said processor;
 iv) data entities stored in said memory, said data entities comprising data records;

wherein said data entities each comprise at least one attribute, or a plurality of attributes, the or each attribute having an associated value which is potentially time dependent, a transaction element representative of a transaction time effective to specify a time at which said values of said attributes are to be assessed by said processor, and wherein said data entities also each comprise a valid time element representative of a time period, at any selected transaction time, for which respective associated values for attributes are associated with respective said attributes; and said software runable on said processor including a set of Temporal Data Dictionary rules which control attribute, entity and referential data integrity, and said software runable on said processor also including a Temporal Referential Tree adapted to manage computer-readable addresses of said data entities over time.

Said data records may be held in a relational database, and wherein said software may also run a relational dictionary which has a set of relational rules which control relationships between data entities and/or relationships between values allocated for attributes at different transactional and/or valid times. Said software may control user requests to modify values for attributes of a data entity in accordance with said temporal and/or relational rules.

The software may not allow deletion of a set of data of a data entity, instead changes to values of attributes may be effected by writing a new additional set of data for said entity, with appropriate values. Said software may write a transaction time for new values as being the real time, read from a computer system accessible clock, that the new values are entered. When new values for attributes are written to a data entity a user may have the ability to select and enter an associated time. Said software may automatically enter the system accessible clock time as the valid time when values are changed. The system may have the facility for a user to over-rule the automatic valid time and associate a user-controlled valid time with the new values. When a user enters a new data entity in said memory said software may require the association of valid time and transaction time entries associated with values of attributes of said entity, said software possibly not allowing said new data entity to be held in said memory without said valid and transaction time entries. Said software may automatically generate transaction time values and automatically generate values for valid time if no valid time value is input by a user for a data entity.

Said software may generate a message conveyed to a user that values for said valid time are needed and/or have been system-generated. This can enable a user to appreciate that what was user-input was not quite what was system-input.

Said software may generate a message conveyed to user that a requested change would, if allowed, cause referential inconsistency and therefore has not been allowed or that the request has been modified to an allowable request, preferably informing the user of the identity of the modified request.

Said software may comprise data record enquiry software runable on said processor, said data renewal enquiry software requiring a transaction time to be selected, said transaction time effectively setting a time in a transaction timeline at which said data records are to be interrogated. A user may select said transaction time. Software may select said transaction time in default of a user inputting a specified transaction time.

A user may be able to input a valid time that is in the future, beyond a current time indicated by a system accessible computer clock.

According to another aspect the invention provides a database management system with update and/or delete functionality achieved by insert only operations.

This has advantages that will be apparent from the whole-content reading of this patent application.

A user when using said database may be capable of using update and/or delete commands as inputs to the system, but said commands are, in use, converted to insert operations.

According to another aspect the invention provides a method of reducing computer processing power required to manage a database comprising providing update and/or delete functionality by using insert operations, adding to the database, and reading the database at an appropriate point in database creation time to read an appropriate inserted entry.

In prior art, one of the main tasks performed by database systems is the management of data as it is inserted, updated and deleted. Many memory structures, such as rollback segments and checkpoints, and processing and caching algorithms exist in the core code of prior art databases solely to ensure that data keeps it consistency and concurrency as multiple user processors act upon the data. Much of the processing power and memory of the system is taken up with these tasks, and the majority of that sophistication is concerned with managing the Update and Delete actions rather than the insert actions. The reader is directed to page 112 for a more detailed discussion of this topic, however we note here that this invention is based on an Insert Only model, where Summary Positions are only ever inserted as system events occur, even if those events represent logical Update or Delete actions. It follows therefore that the memory structures and core algorithms required to manage the Insert operations are simple and require much less memory and processing power than in prior art systems. The simplification of the core code allows for improvement in speed and use of system resources and at the same time inherently provides enhanced temporal application functionality According to another aspect the invention provides a computer processor having access to a database held in memory, and database creation software runable on the processor, the software allowing insert only operations on the database.

Insert-only, we have realised, in the context of handling time-varying values of attributes in a database, preferably relational database, is an elegant solution to problems that have been troubling temporal database designers for years. Insert-only approach simplifies things overall, despite being at first sight high on disk storage requirement. In one embodiment of the invention, each new Summary Position would be a complete re-write of the previous Summary Position comprising of both unchanged and changed attribute values according to the action requested. In another embodiment of the invention, each new Summary Position could be made up from references or pointers to previous Summary Positions that are unchanged due to the action combined with the changed attribute values. Each embodiment has varying disk storage requirements but provide the same overall functionality.

It will be appreciated that the fast access, processor related memory will have less burden placed upon it because the structures required to manage data in an Insert-Only model are less intensive than those required for the support of insert, update and delete operations. Disk storage requirements may be increased, however on-chip memory requirements are reduced.

Another benefit is that a processor having a certain number of cycles per second must, in the prior art, use a significant percentage of those cycles to operate update and delete algorithms, whereas in the invention that burden does not exist.

According to another aspect the invention provides a computer processor having access to a database held in memory, and database query software runable on the processor, the software comprising unextended structured query language software, insert and delete data handling functionality being handled by selecting an appropriate position in time in the database at which to query the database.

According to another aspect the invention provides a computer system comprising a computer processor, a temporal database held in memory, temporal database creation software runable on the processor, and temporal database query software runable on the processor; the temporal database creation software in use allowing insert-only operations in order to achieve delete and/or alter functionality, with each insert of data being associated with a system-generated transaction time, and wherein the query software comprises an unextended structured query language, without extensions to accommodate data integrity difficulties associated with alter and delete functionality of the database.

According to another aspect the invention provides a temporal database with update and/or delete functionality provided by insert-only operations.

According to another aspect the invention provides a database that allows attribute level locking. The reader is directed to page 54 for a more detailed discussion of Attribute level locking in both statefull and stateless architectures.

Values of attributes of entities in databases often need modifying/changing. At present it is known to lock a row whilst one user modifies one value of one column in that attribute row, locking out other users so they cannot read and/or write to value fields for columns in that row. If users could see the columns being changed they would get an out of date value. Having two users simultaneously trying to change the value of a column to two different things could cause problems. The prior art answer has been to lock the whole table or row whilst a user changes a value for a column in the table. Locking one row, and leaving other rows readable from/writeable to, is a development known in the prior art.

The present invention allows one attribute value to be locked (and modified/read by a first user) whilst other attribute values, even within the same attribute and/or row, are readable from and writeable to by other users. Similarly, if two users have locked out two attribute values, the other attribute values, even within the rows in which the attributes reside, are accessible to other users: each user only locks out one attribute value during the write operation.

Often it is desirable for different users to be able to access/maintain different data in the same row at the same time. A theoretical but in the prior art, highly impractical way of avoiding row locking in prior art would be to build a database in which each table represents only one column. In this way, one could maintain, say the Surname and the Salary for the same employee independently without having a locking problem. This is simply not done in practice and so systems do indeed have concurrency issues in this respect. In some aspects of this invention each attribute value is managed independently in the Time Cube and consequently provides inherent Attribute level locking.

At least some database entries preferably have a row having a plurality of attributes including a first attribute lockable by a first user, and a second attribute accessible by a second user whilst said first attribute is locked.

Said first and second attributes may be held as separate objects, thereby providing attribute level granularity within a row.

Different summary positions of the values of the attributes may be created at different transaction times in database transaction time, and wherein a user can access an attribute at an appropriate transaction time point.

According to another aspect the invention provides the benefit of a method for improving concurrency in a multi-user temporal database system by permitting different access agents to act on the same row at the same time, but on different attributes in that row. The reader is directed to page 105 for a more detailed discussion of Concurrency and the advantages that arise from this invention.

Concurrency, multiple users using the same database, causes problems in refresh/cache memory usage, If one user refreshes the data in their cache memory (from the main database) at one point in time and the value of an attribute is then changed that user will be working on the wrong value. Previously, database management systems have, following a change in value for an attribute in a row either (1) positively sent out to users connected to the database an update for the whole database table, or for the row in which the modified attribute value is found; or (2) not positively done anything and individual users computers have called up a refresh whenever they do so (i.e. different users see different values for the same attribute at the same time).

An aspect of the present invention allows the database management system positively to send out an update for value of a modified attribute to connected users at an attribute level, rather than a whole row or whole table. This requires less telecommunications bandwidth, takes less time, and uses less processing power at the users computer: it sends less data, possibly an order of magnitude less, or more which could be significant in stateless architectures such as the internet.

Users may be able to perform insert operations to insert new values for attributes, at new transaction times, and wherein alter and/or delete of existing values of attributes may not be allowed, instead alter and/or delete functionality for attribute values may be achieved by inserting an additional value entry for the attributes concerned and causing an user enquiry of the temporal database to enquire of the value of an attribute at a particular transaction time.

The enquiry transaction time may be automatically selected to be the latest transaction time for an attribute selected for enquiry. A user may select a transaction time for the enquiry.

According to another aspect the invention provides a method of attribute level locking a value of an attribute of a database, the method comprising having a data entry having a plurality of entry attributes tuples and having a plurality of users capable of accessing attributes in the same tuple and allowing different users to modify different attributes of the same tuple without locking each other out of said different attributes.

Successive summary position of values of said attributes may be created in transaction time.

According to another aspect the invention provides, in a temporal database system having a temporal database storing a database table comprising a plurality of data rows, said rows relating to attributes of a database entity and storing values for said attributes organised into particular respective database fields, an improved method for granting access during the modification of the information in a database fields comprising locking the field being accessed for modification and not locking other fields in the row that contains the field being accessed for modification, this being achieved by associating a transaction time with the information in each field, said transaction time being related to the system time at which the information was inserted into the database, permitting insert only operations on the database, with alter and/or delete functionality performed by insert-only addition of another value of an attribute held in a certain field in an additional field differentiated from other fields for the same attribute by its associated transaction time, and selecting an appropriate field for access by selecting an appropriate transaction time, as well as selecting said attribute to be queried or modified.

According to another aspect the invention provides in a database system having a temporal database storing a temporal database table comprising a plurality of data rows associated with a plurality of database entities, said rows storing attribute values for a plurality of attributes organised into respective attribute database fields, performing the method of any preceding claim.

It will be appreciated that in the information technology field there are difficulties in claim drafting for patent applications due to the national territorial nature of patents, and the ability of parts of systems to be based in different countries. This factor, and others, means that it is desirable to claim less than an entire system, and to look at a process from the point of view of what is happening at a user-input terminal, separately at what is happening as data is input to a server/processor, and separately at the processing of data by the server and outputting a response to a query. The reader will also notice that there are several different, and important, ways to define the inventive concept (or perhaps different inventions). Rather than, for each concept, recite statements of invention for each "species" of claim type—which would be laborious and render the document less easy to read—it is to be understood that protection is sought for each claim type, or species, for each concept, and that the fact that for some inventions only one, or a few, species of claim types have been written out does not mean that protection is not sought for other types: it is.

As a non-limiting list of claim types for which protection is sought, there is:
   i) method of entering data into a database;
   ii) method of storing data (overall method);
   iii) method of querying data (user-input);
   iv) method of processing a query (processor performed);
   v) processor itself;
   vi) system for inputting data into a database;
   vii) system for querying a database;
   viii) system for storing data (overall system);
   ix) network (database memory, query processing server, and possibly users to input and/or query data);
   x) database;
   xi) data carrier having database, or software, or both; and
   xii) methods of doing business (for the various applications of the database/invention proposed).

By "data" is also meant the rules which control the operation of a system—i.e. the software that operates on a processor may be considered to be "data" that is time dependent (if the rules are to change with time)

SUMMARY OF FIGURES

The invention will now be described by way of example only, with reference to the accompanying drawings, of which:

It will be helpful to list the Figures in groups, and then list each Figure in sequence.

FIGS. 1 to 7, 17 to 19, 25 to 33 show the principles and concepts of the invention;

FIGS. 34-49 do not exist;

FIG. 58 shows the psuedo code for the Referential Integrity Rules;

FIG. 59 shows the psuedo code for the Core Algorithm;

FIGS. 61-65 show the codes used to annotate the Action-Result cases in FIGS. 66 to 87; and FIGS. 66-87 show a complete set of all the Action-Result cases to be considered for all actions on all relation types;

INDEX OF FIGURES

Figure 1:
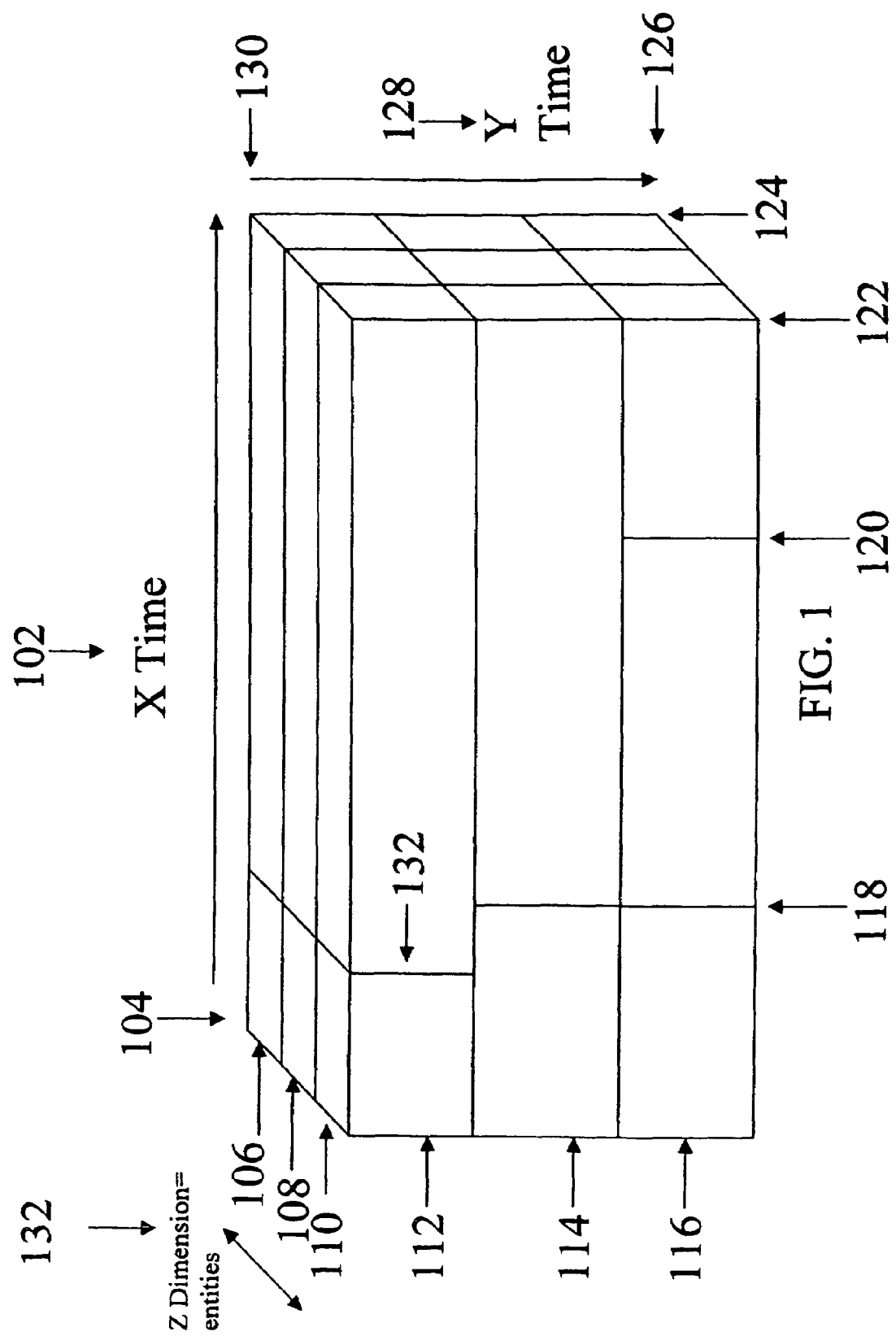

FIG. 1 Tho Time Cube, showing schematically a Time cube with the X-axis being valid time, the time at which values of attributes ate valid, the Yaxis being transaction time at which data is queried, and different posttions on the Z-axis representing different attlbutes of an entity.

Figure 2:
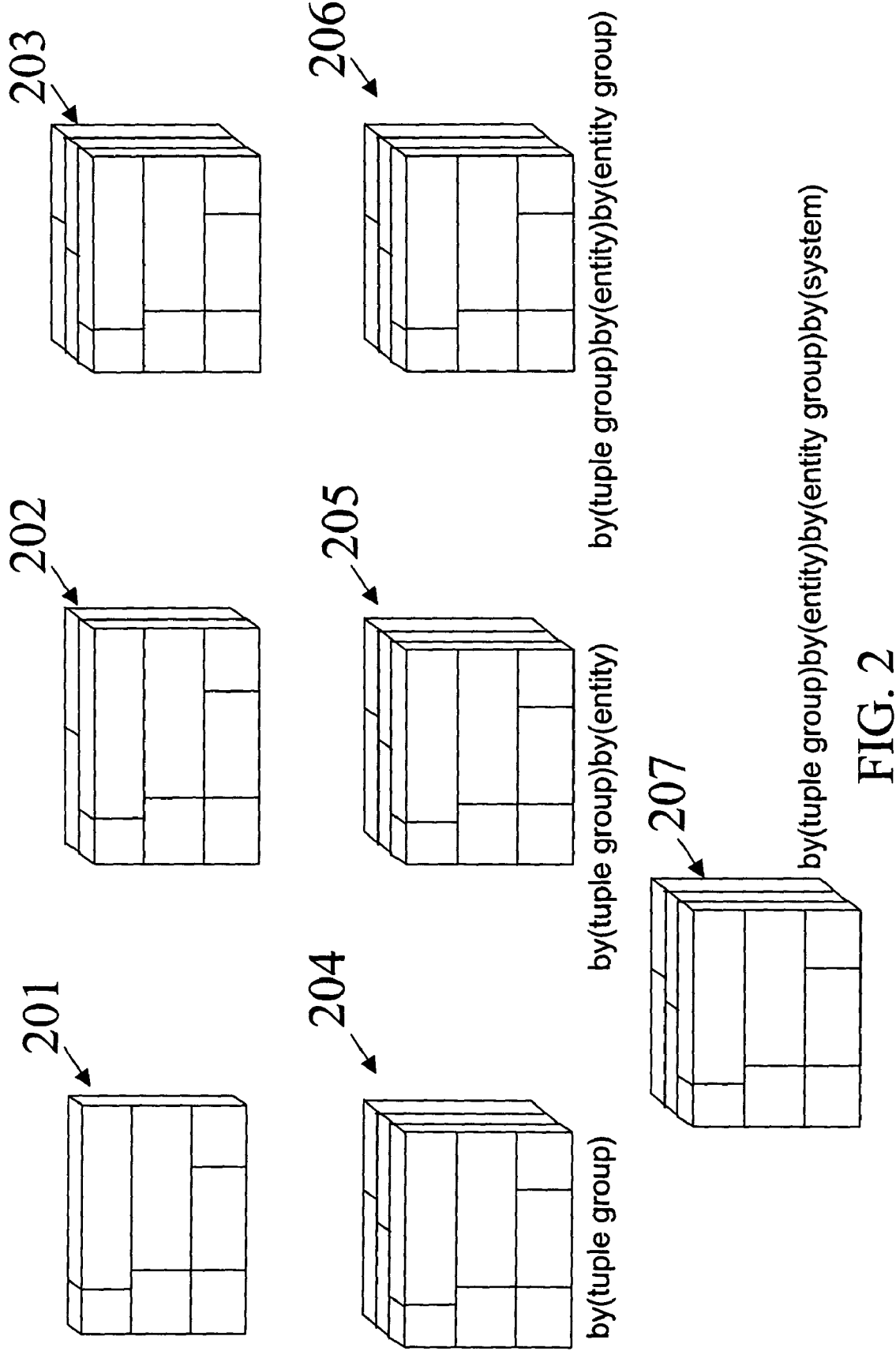
Figure 3:
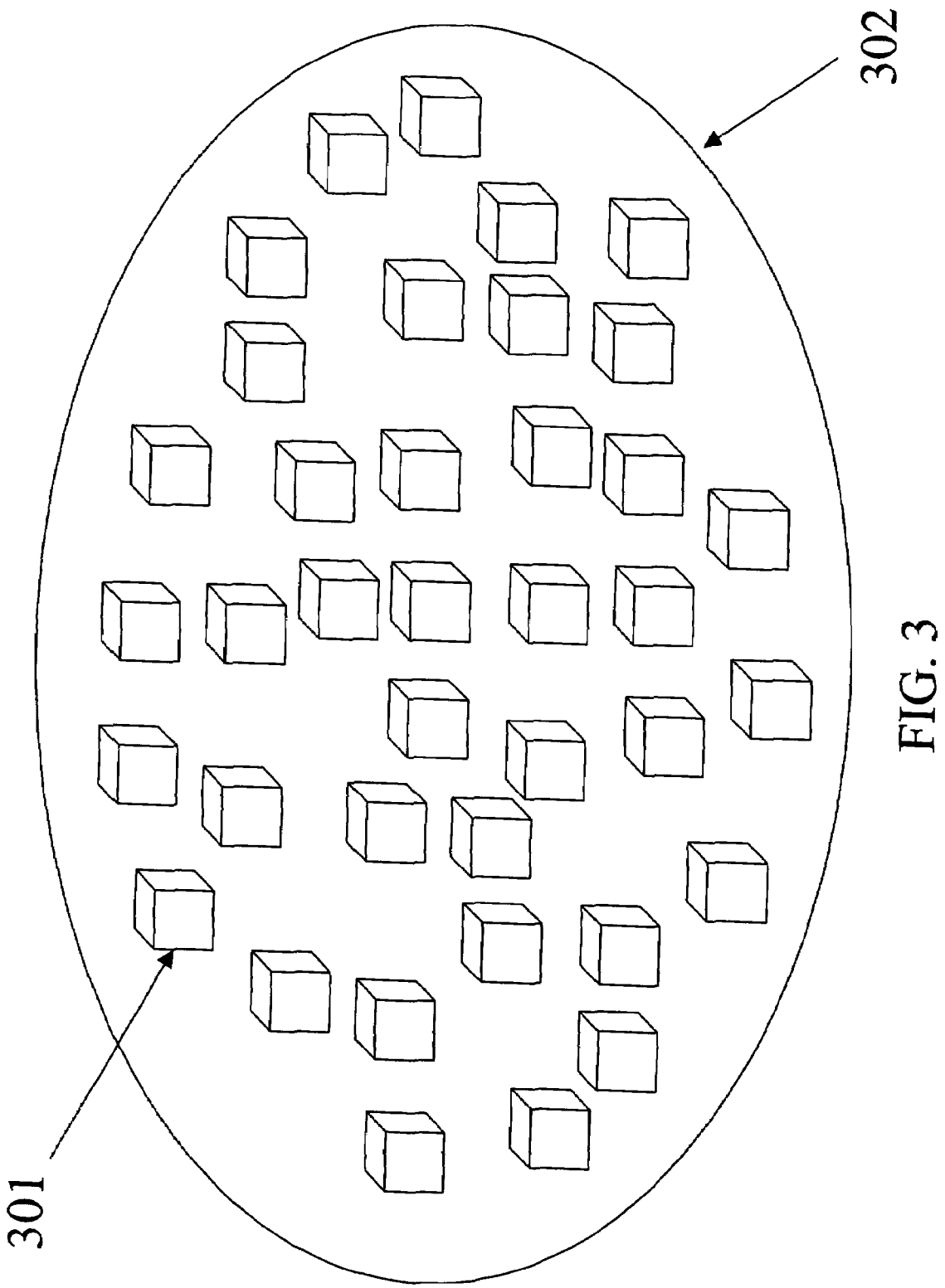
Figure 4:
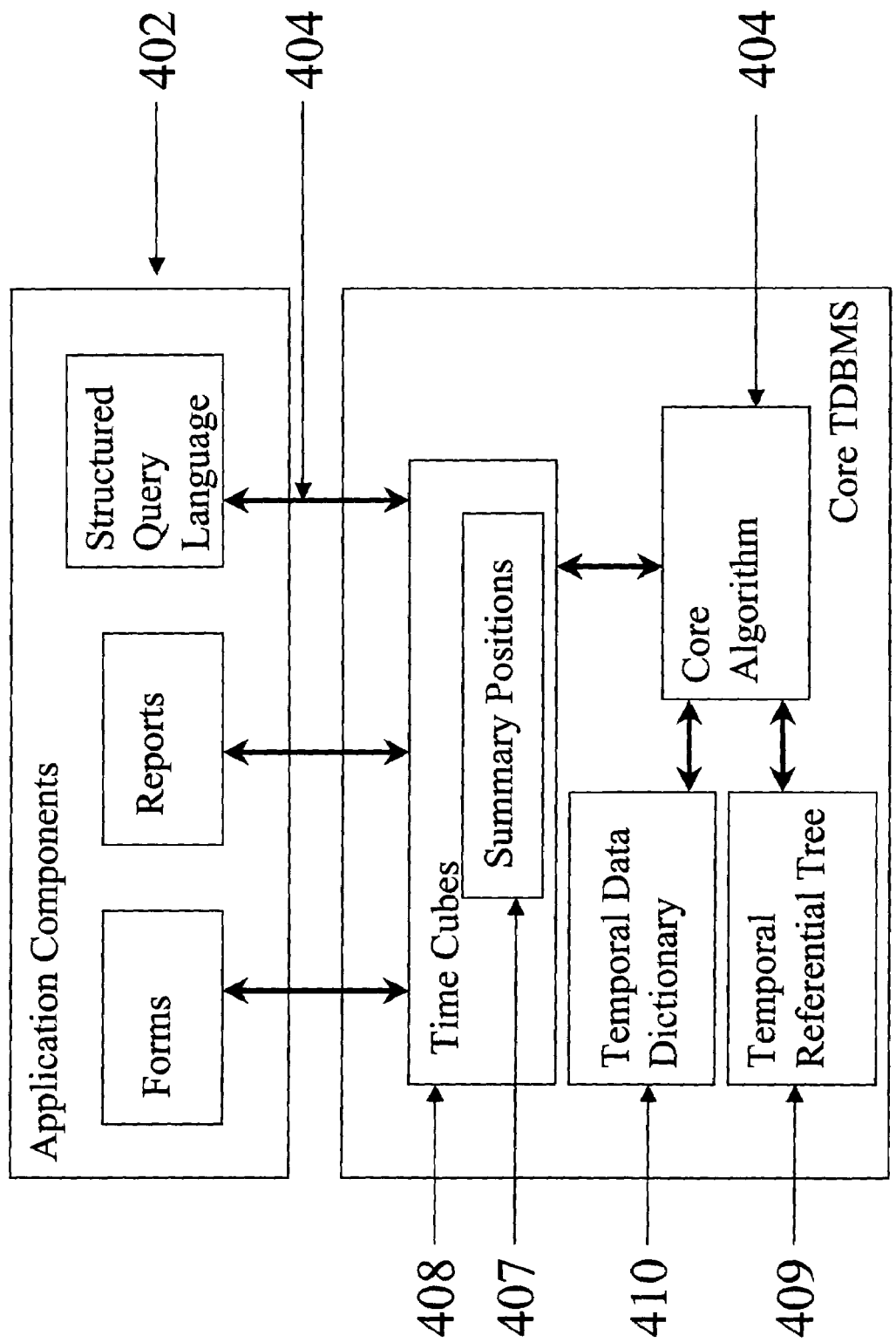
Figure 5:
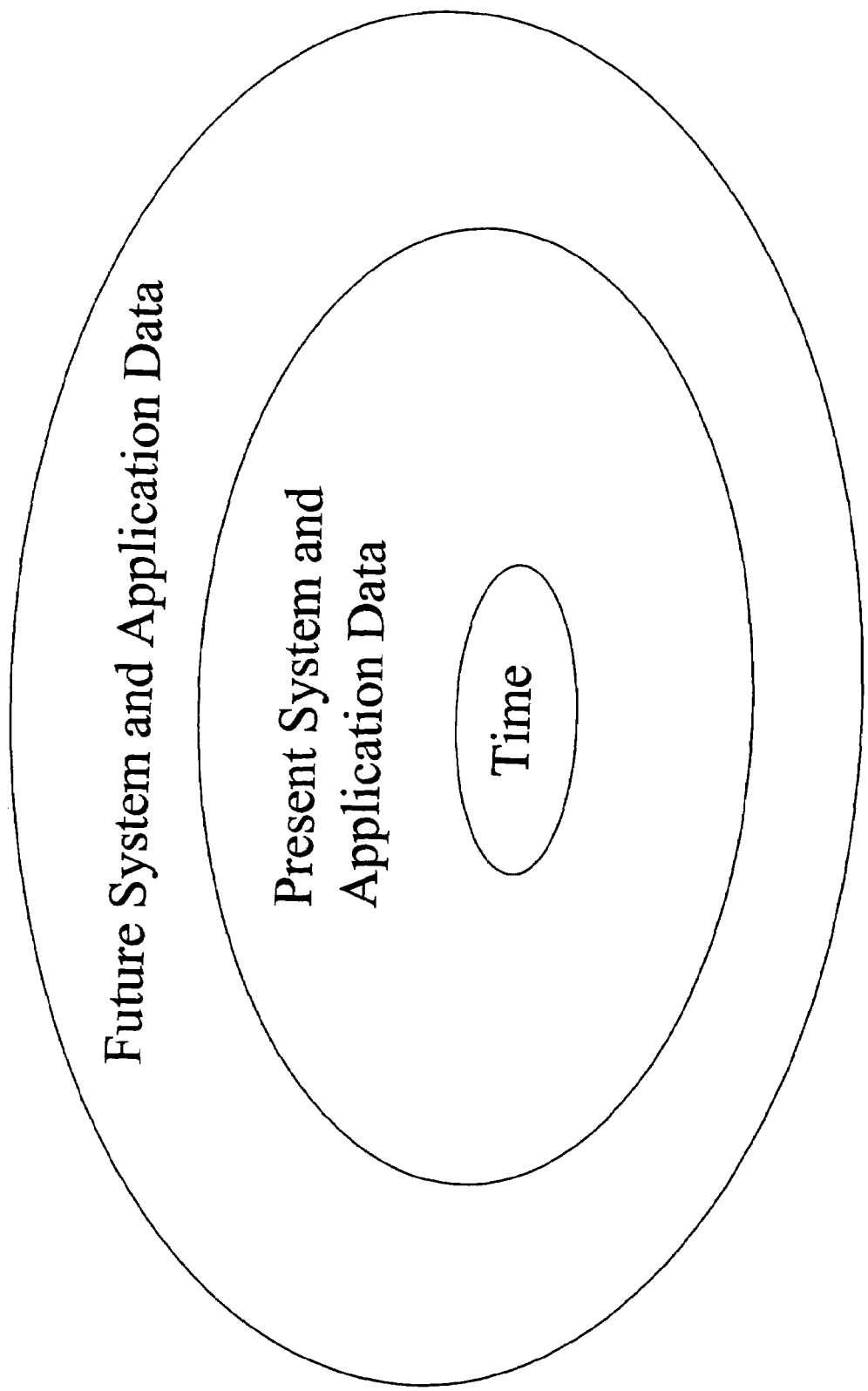
Figure 6:
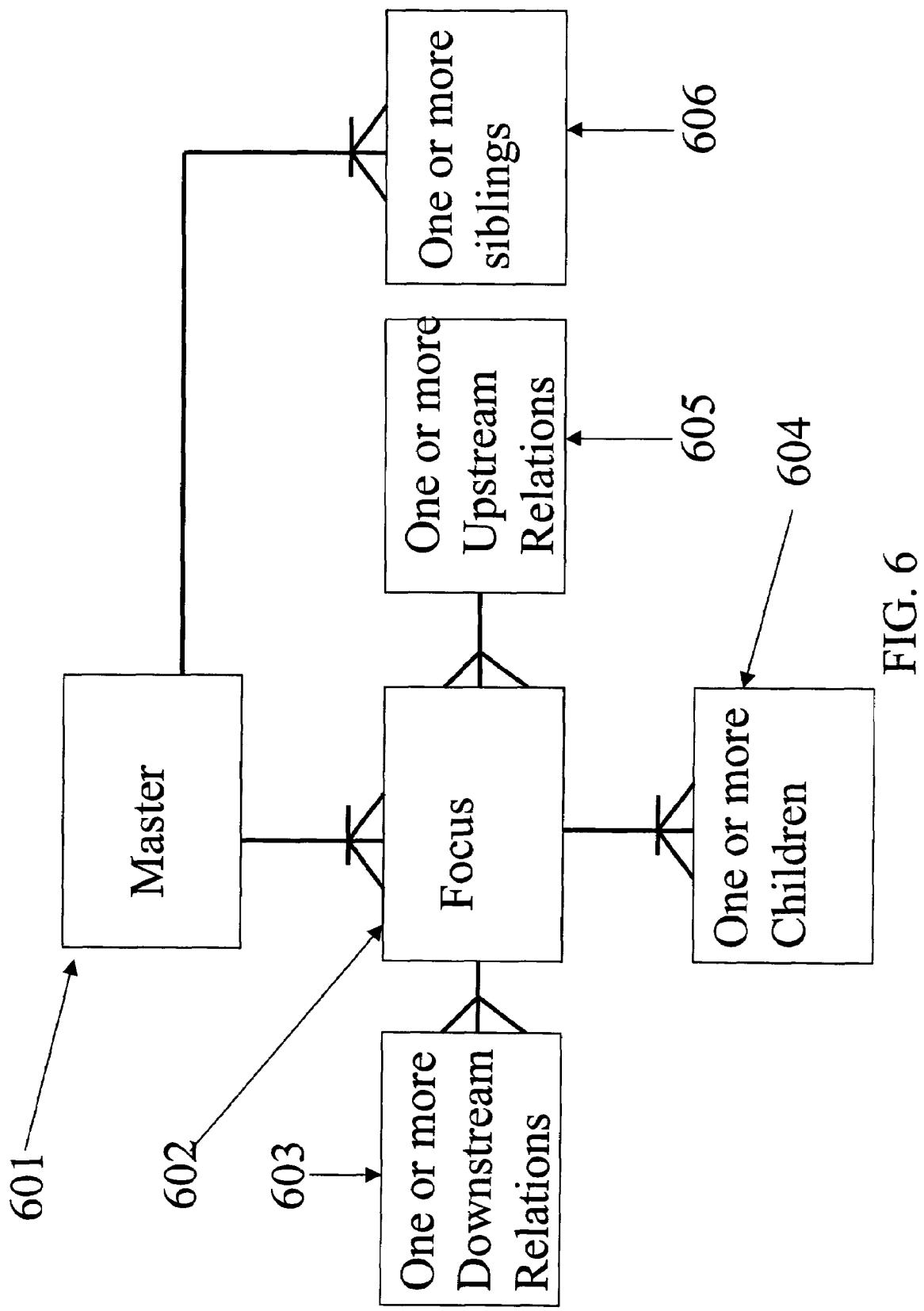
Figure 7A:
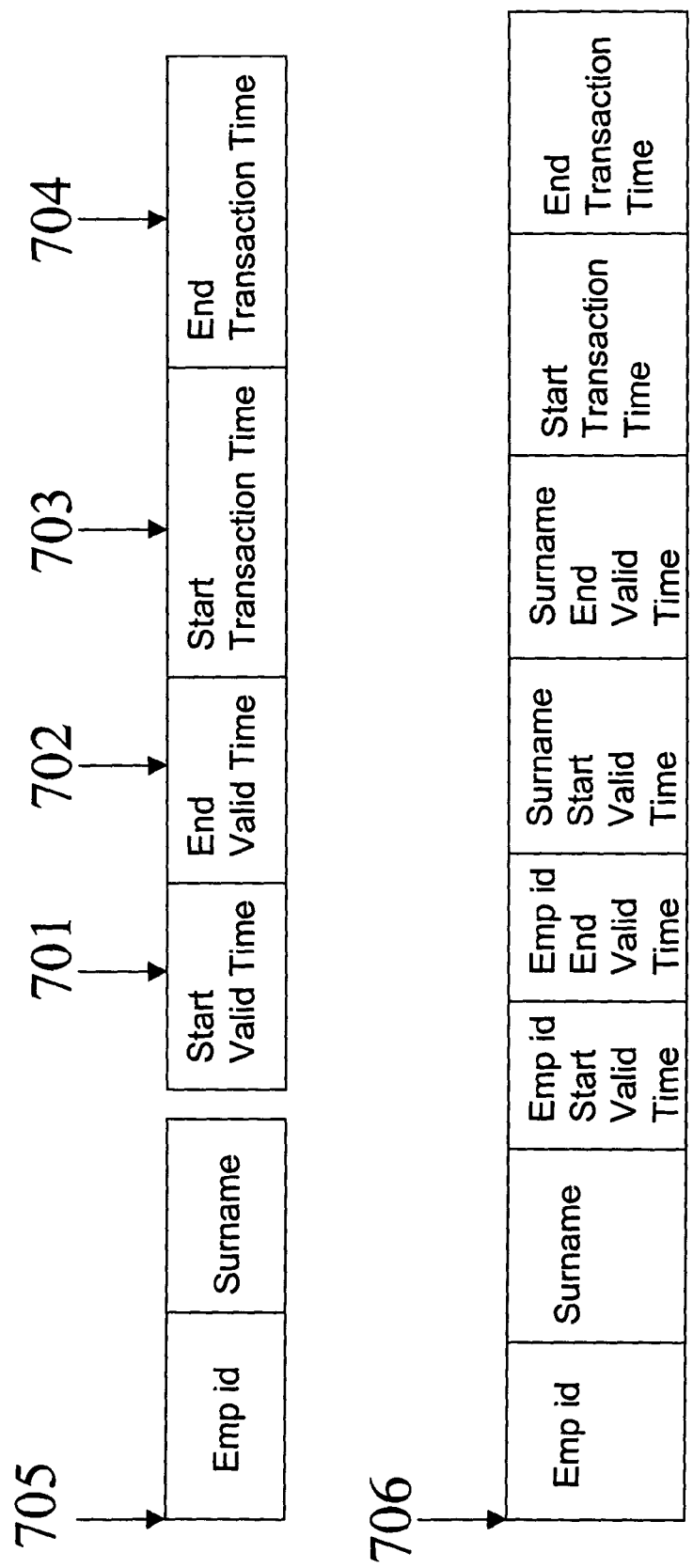
Figure 7B:
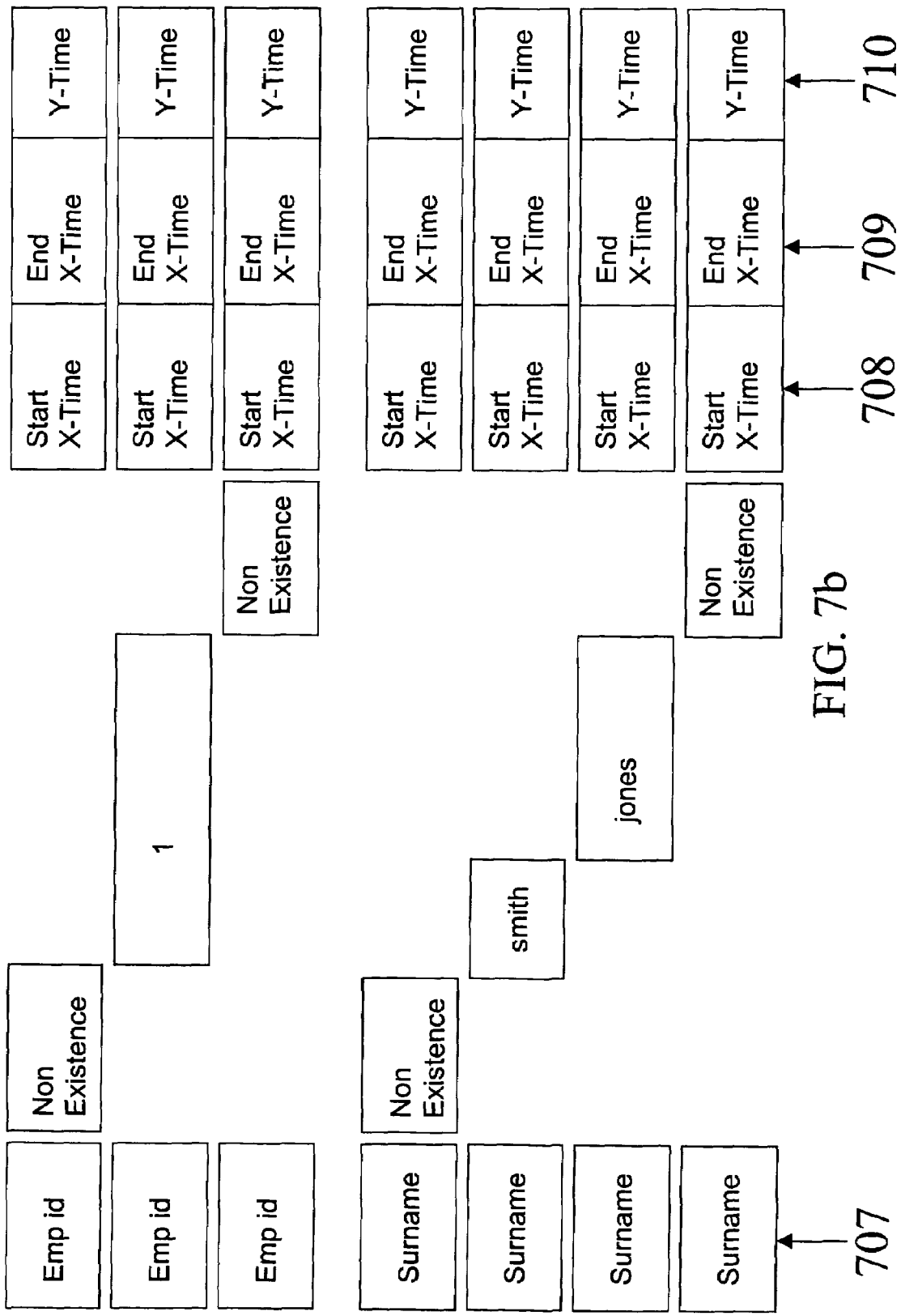
Figure 7C:
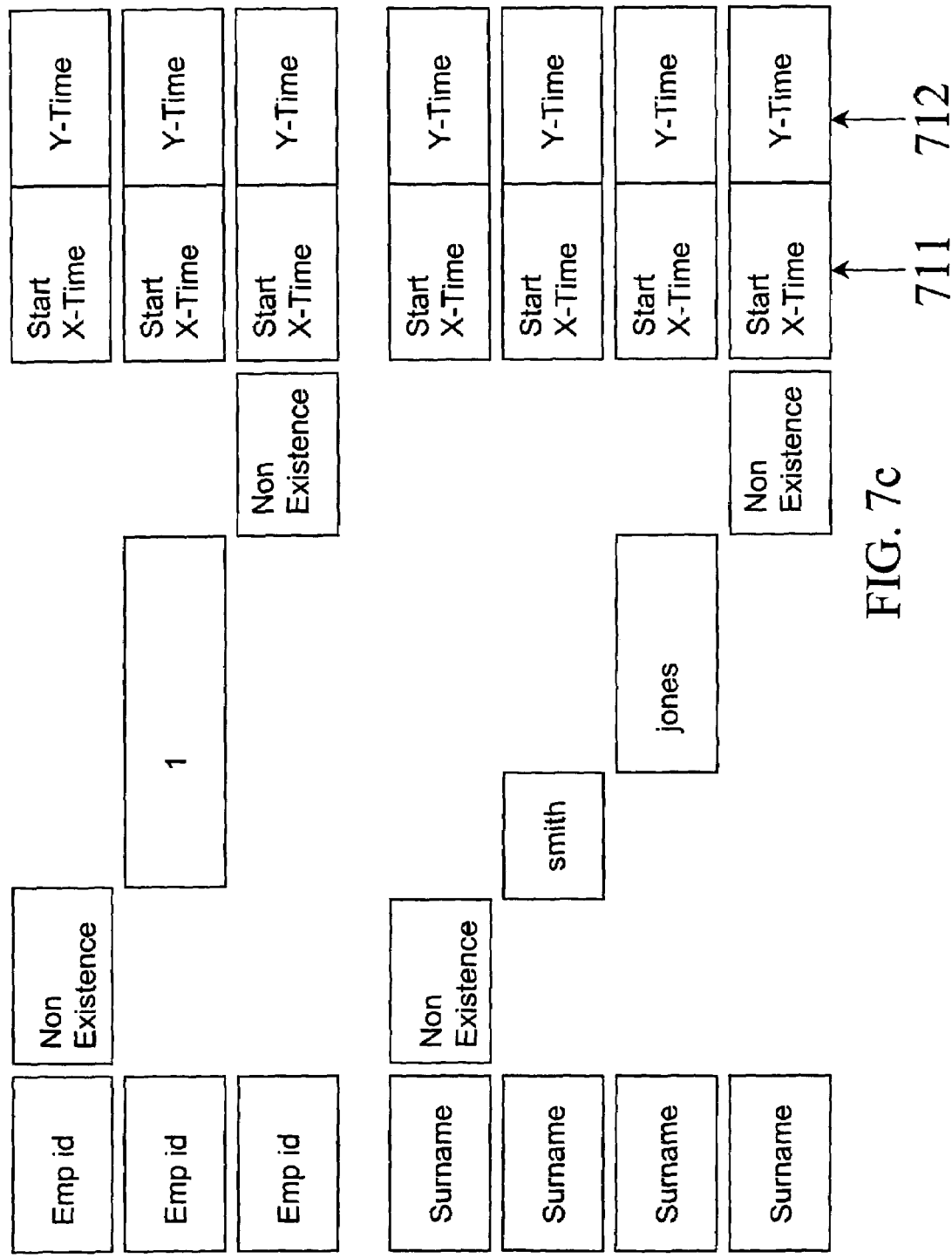
Figure 7D:
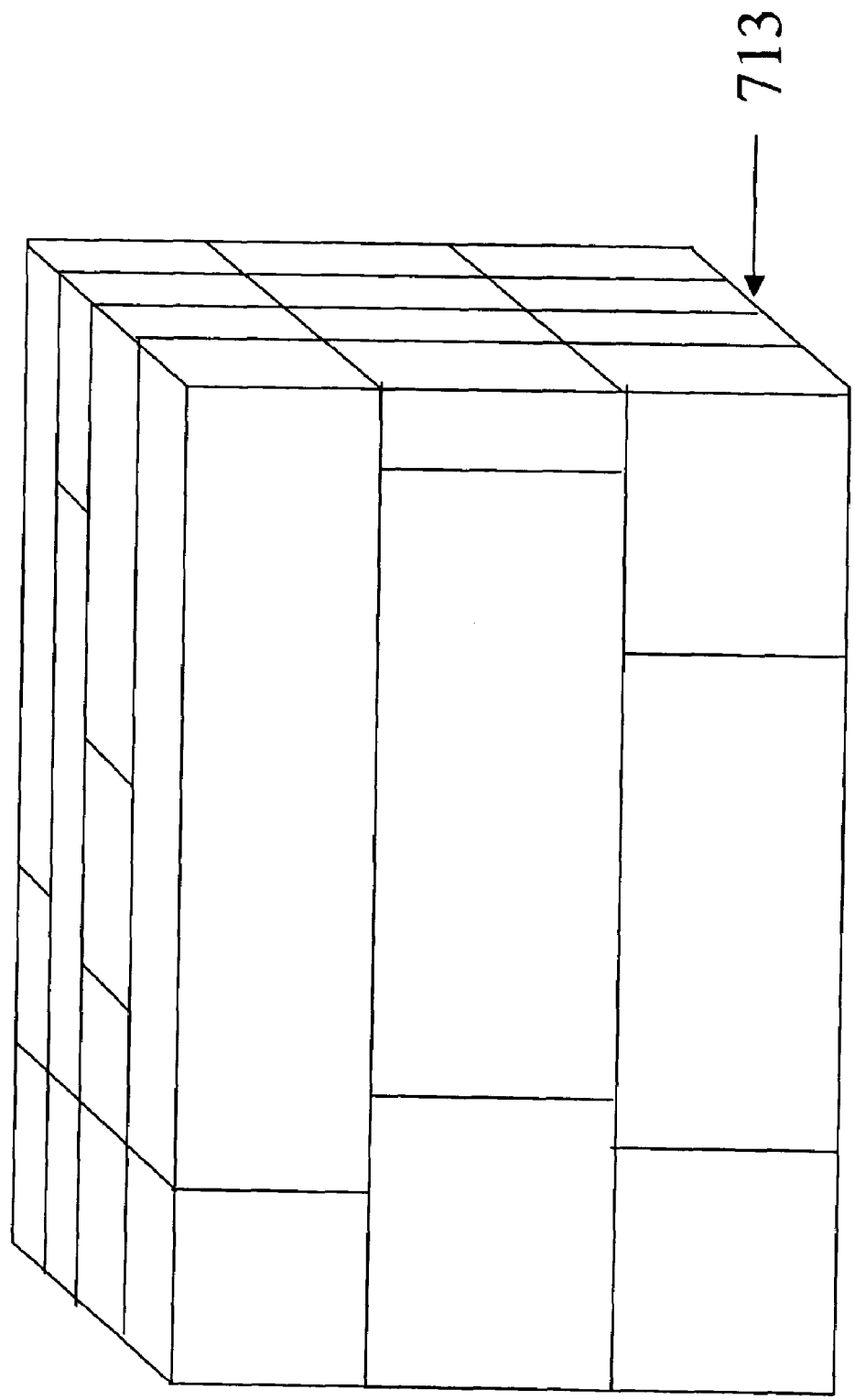
Figure 7E:
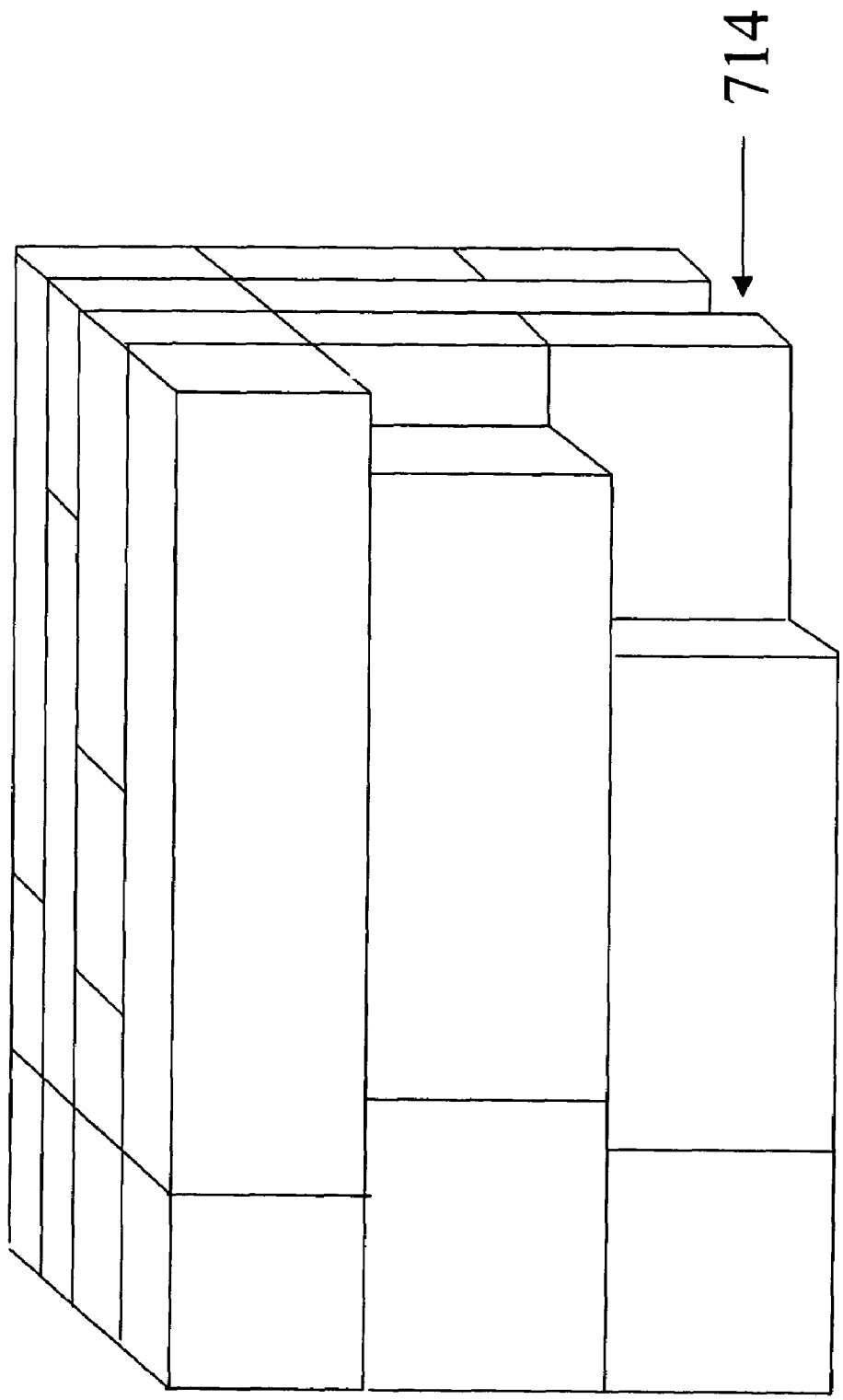
Figure 7F:
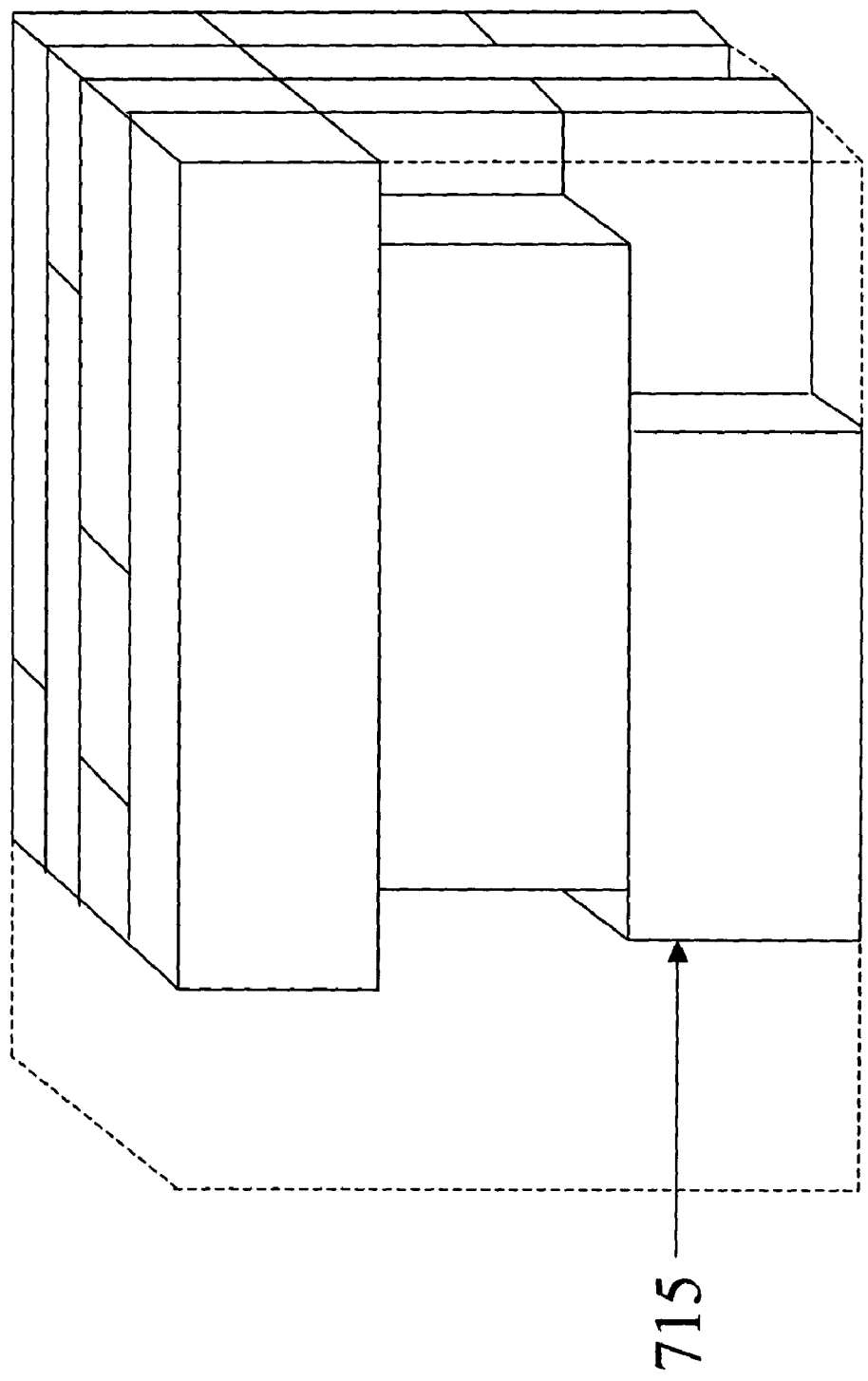
Figure 7G:
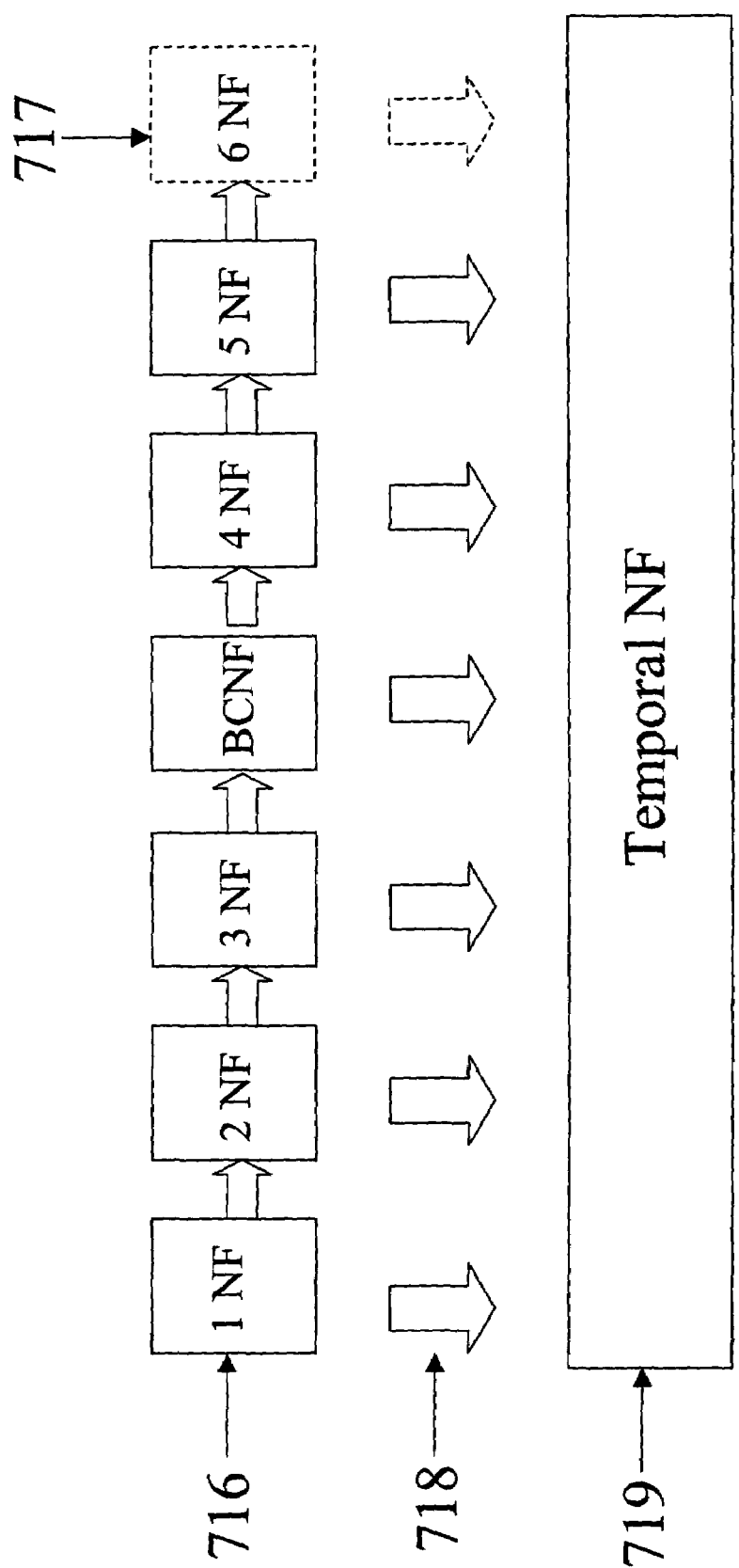
Figure 8:
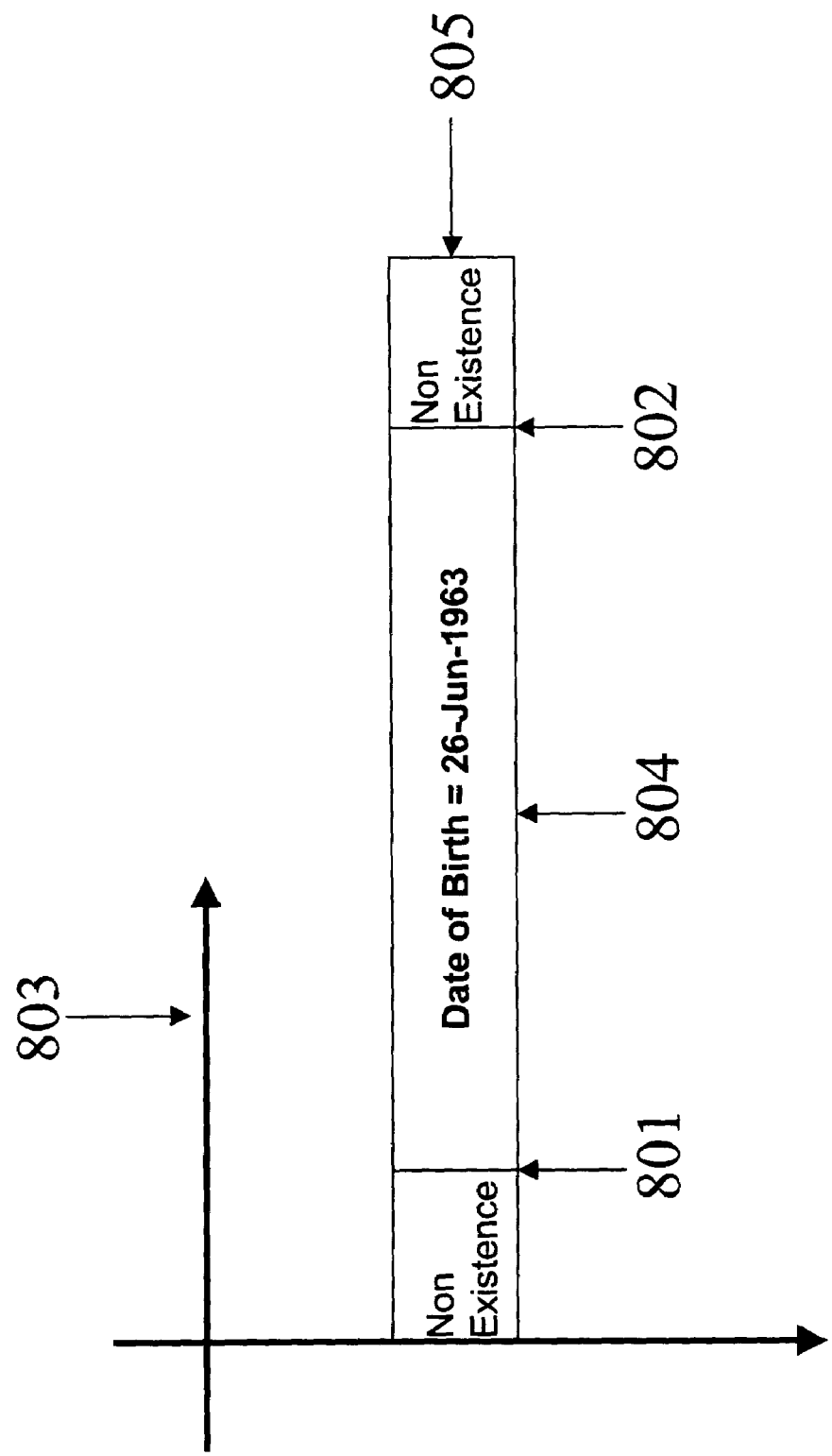
FIGS. 8-13 show Attribute Integrity Rules.
Figure 9:
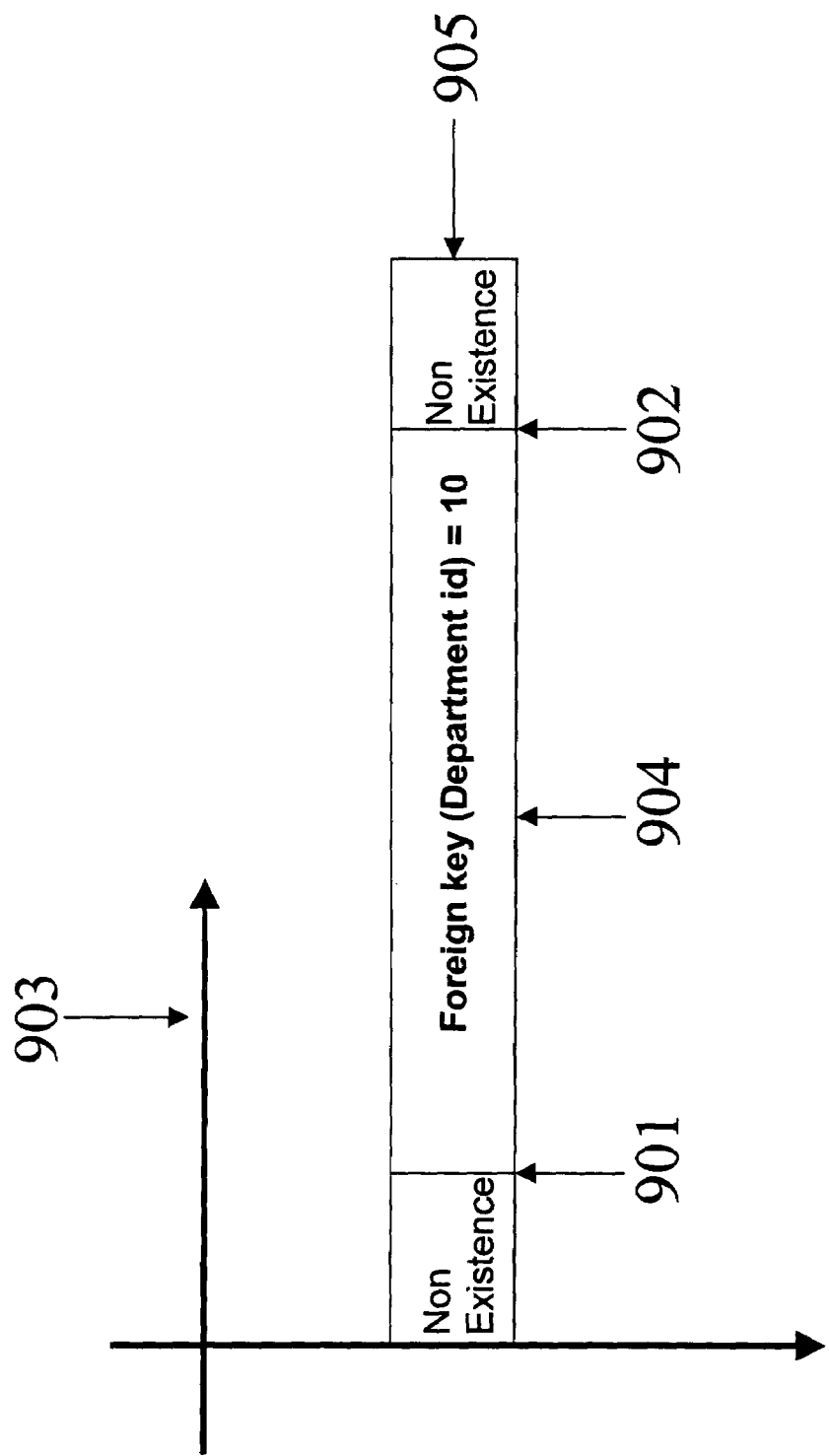
Figure 10:
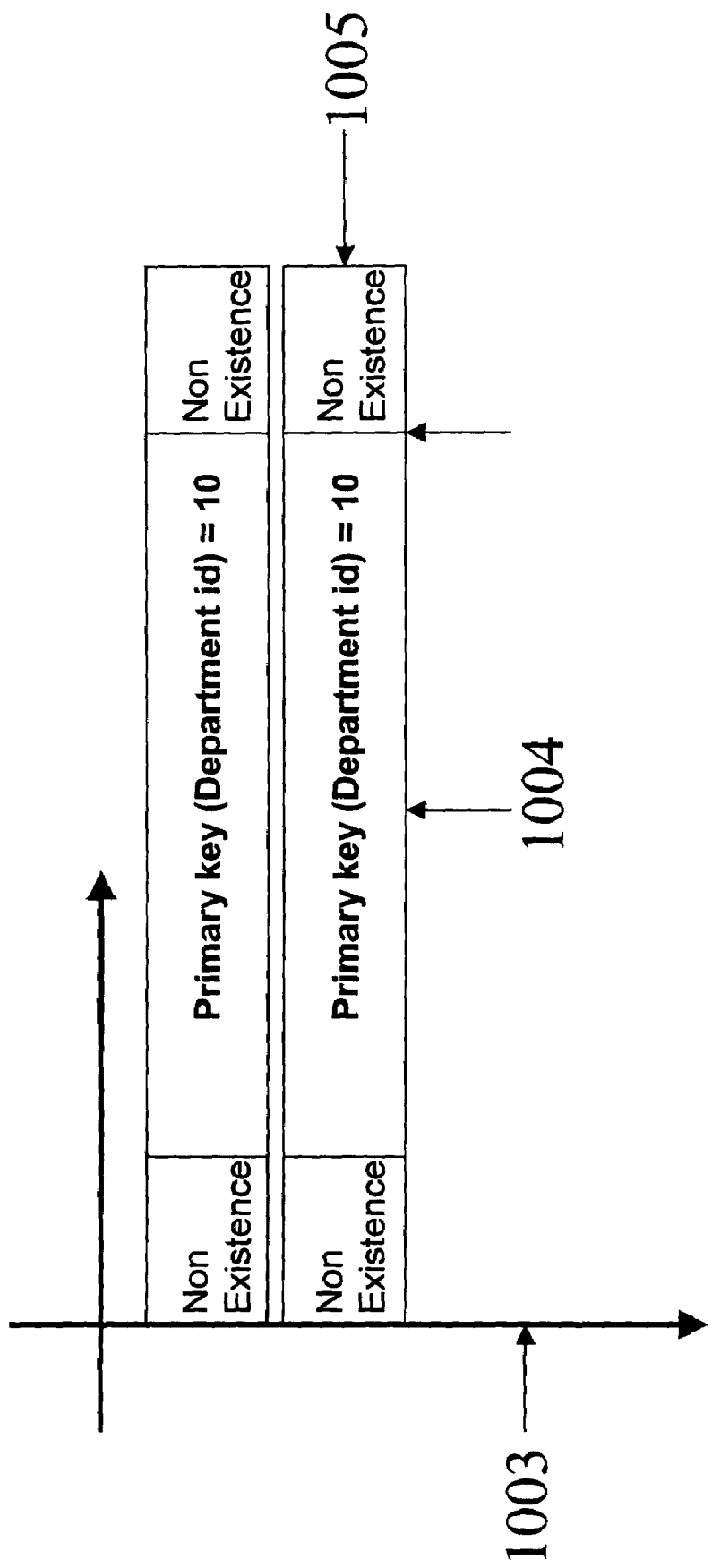
Figure 11:
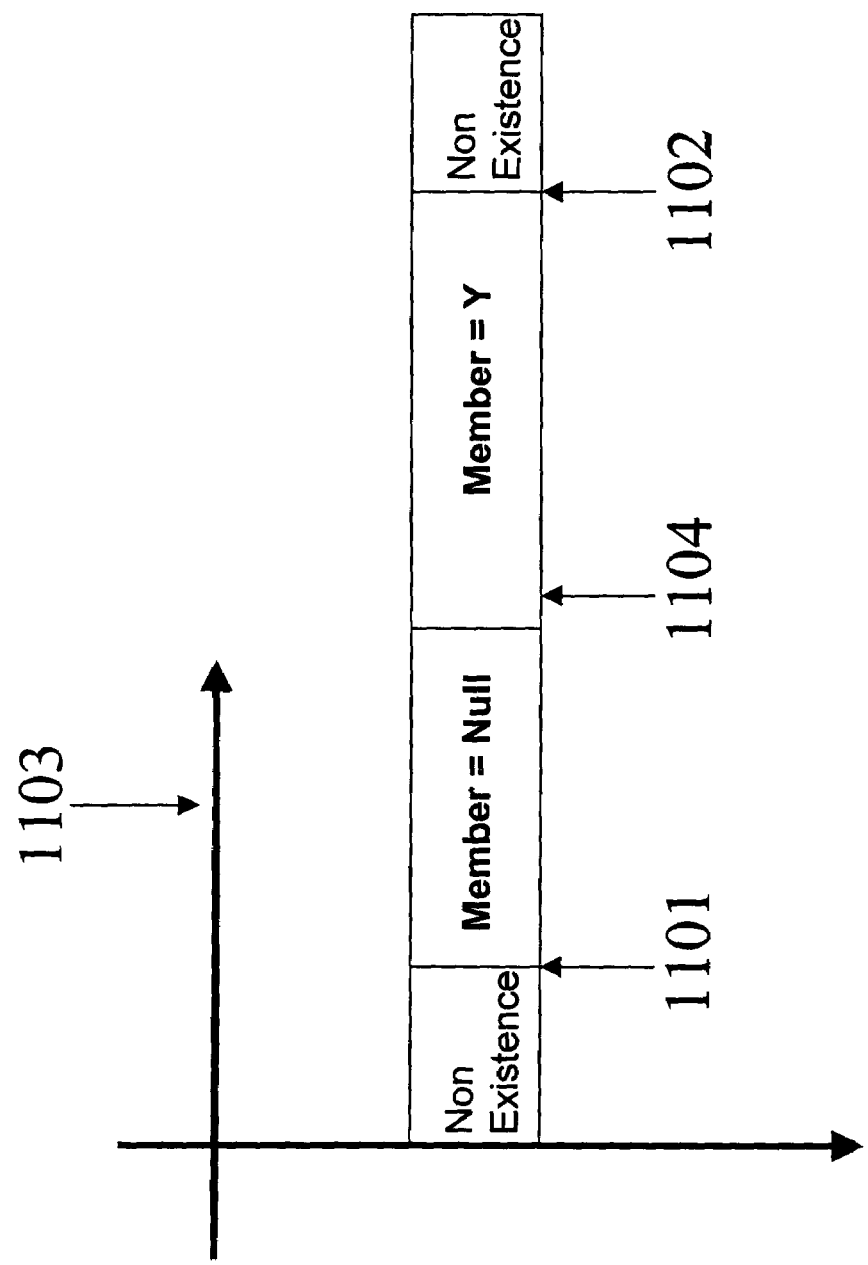
Figure 12:
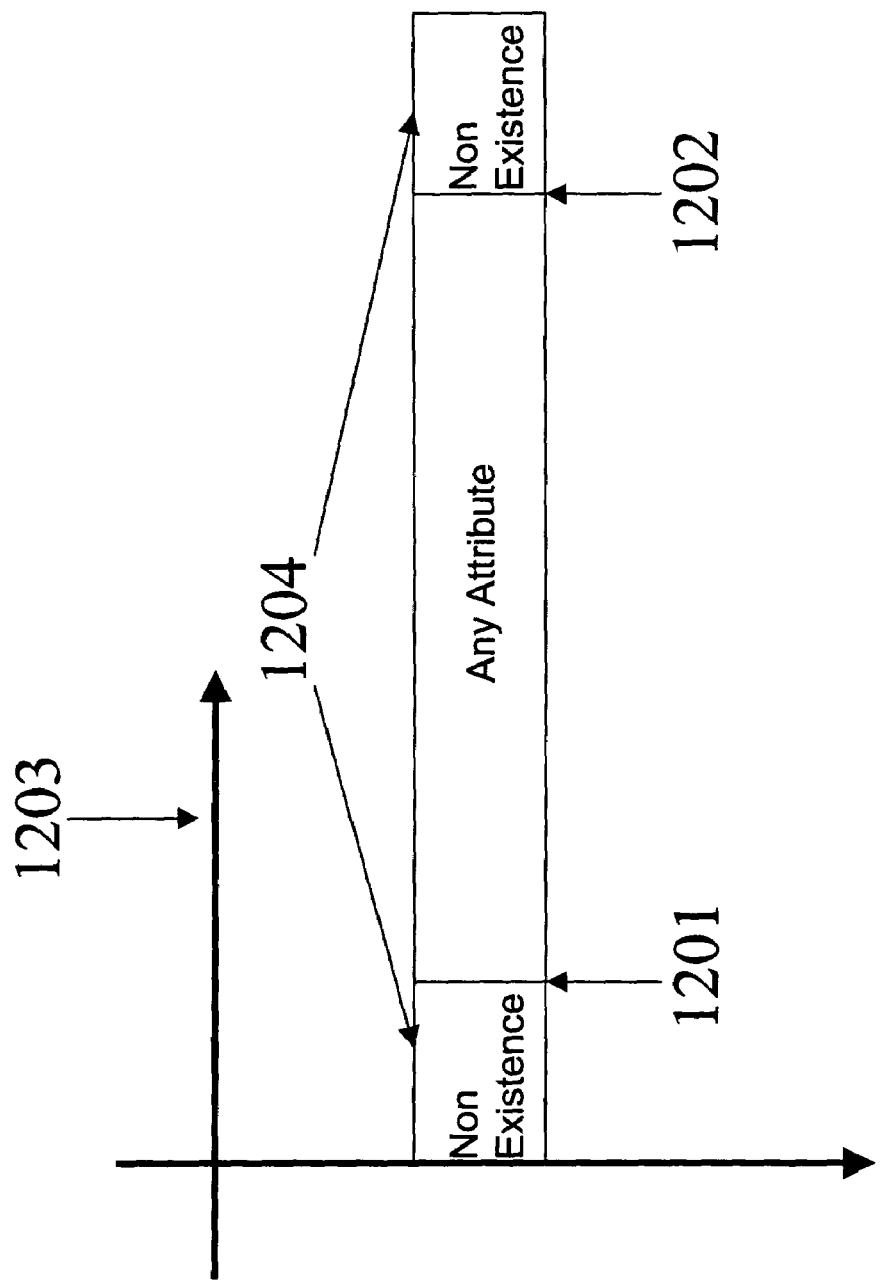
Figure 13:
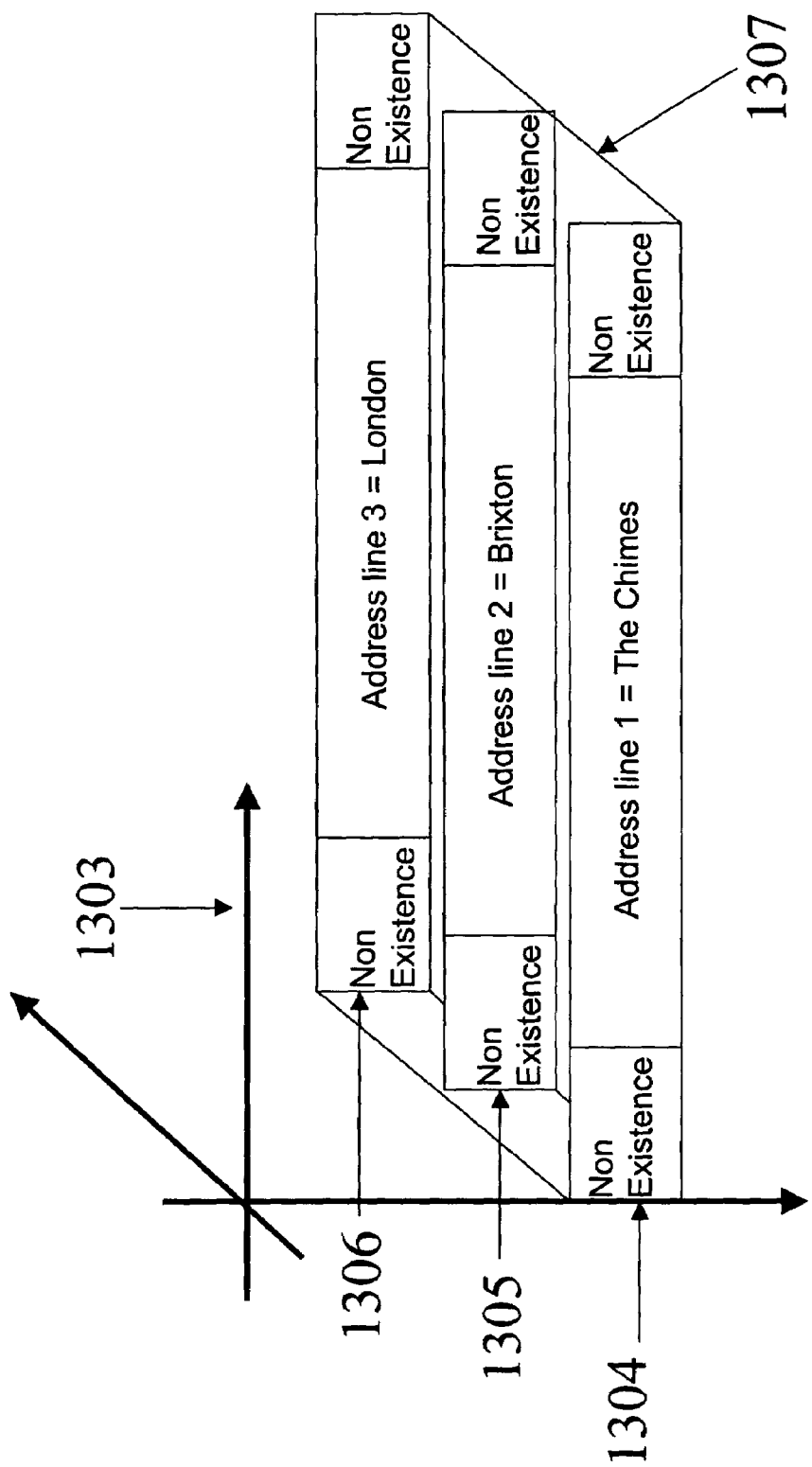
Figure 14:
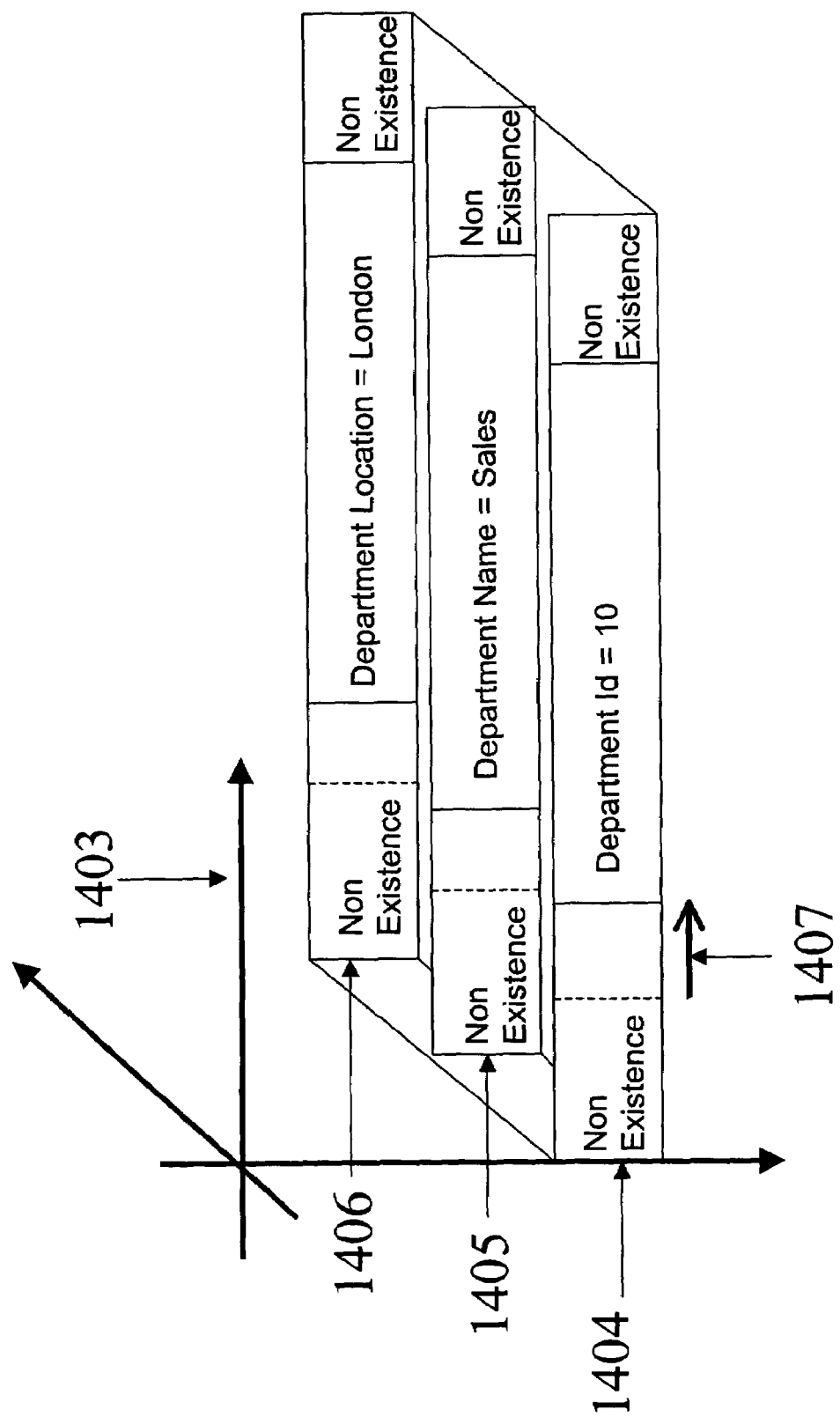
FIGS. 14-16 show Entity Integrity Rules.
Figure 15:
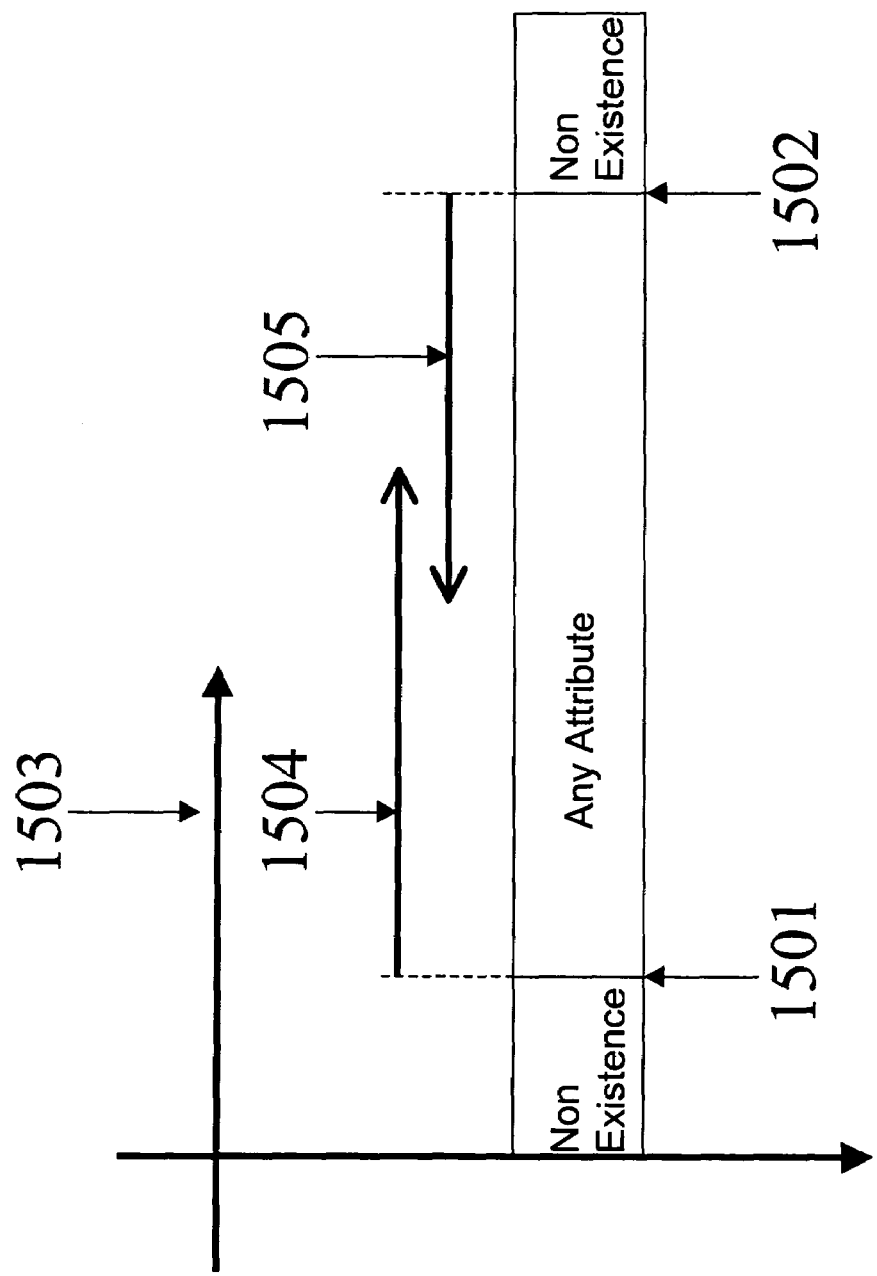
Figure 16A:
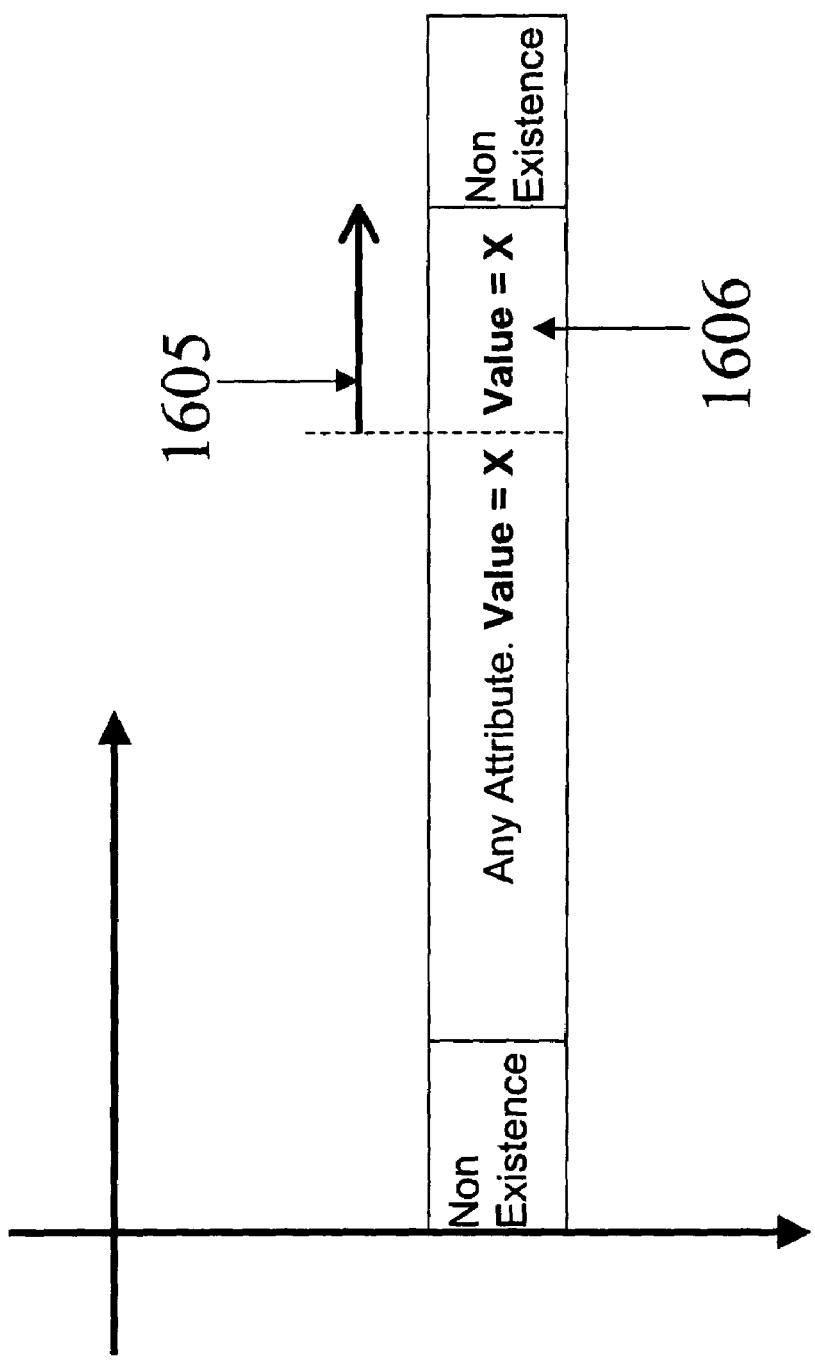
Figure 16B:
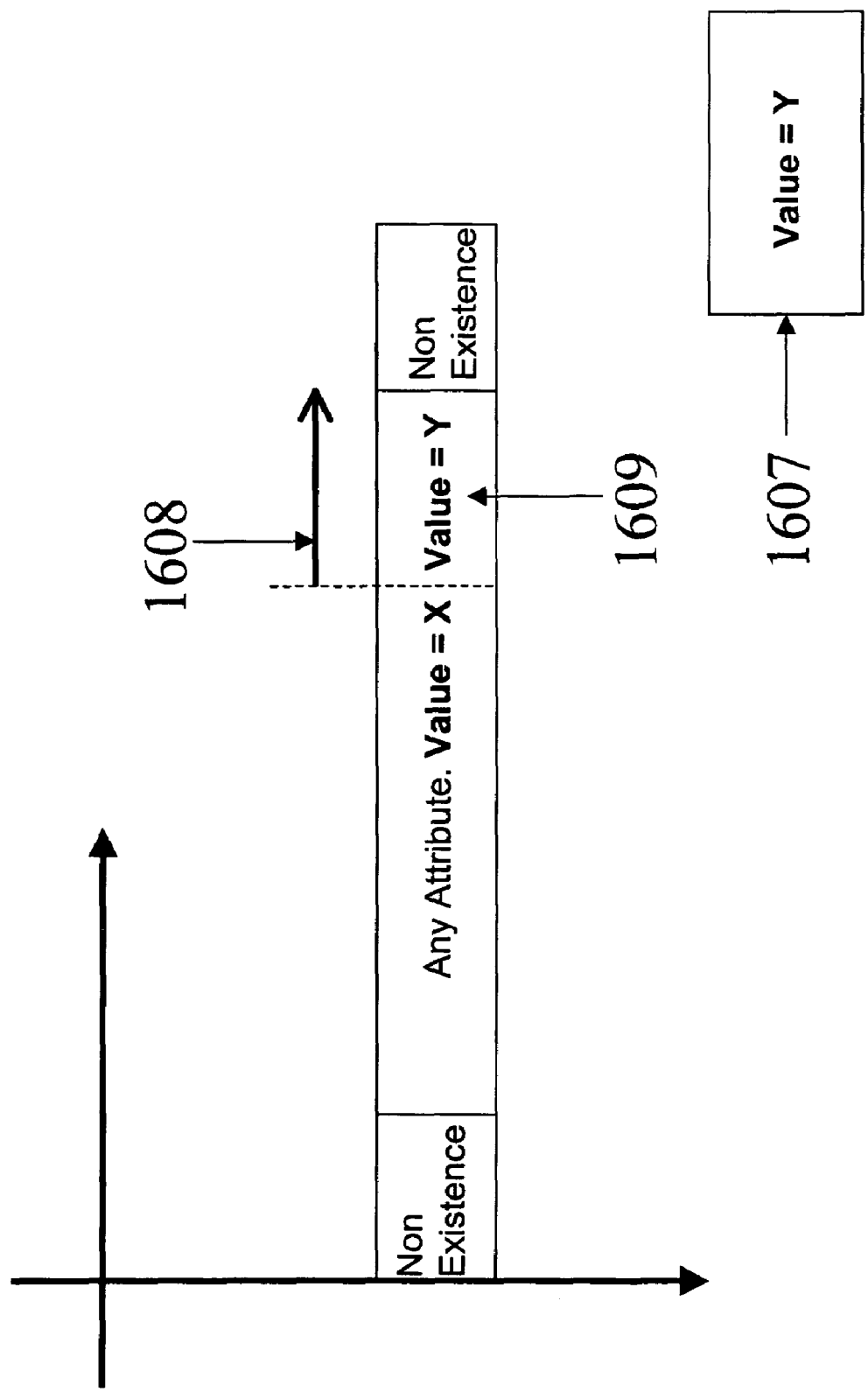
Figure 16C:
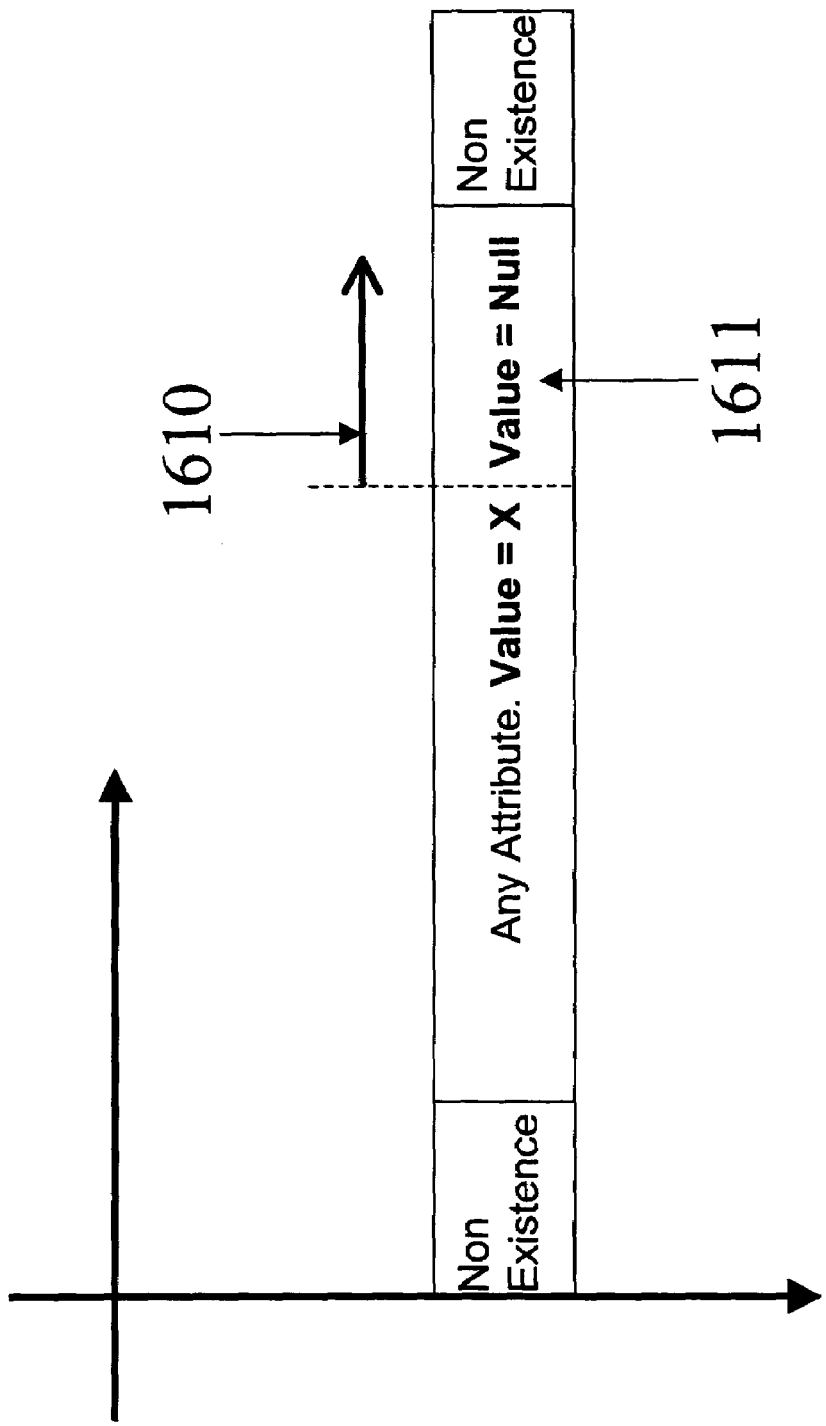
Figure 17:
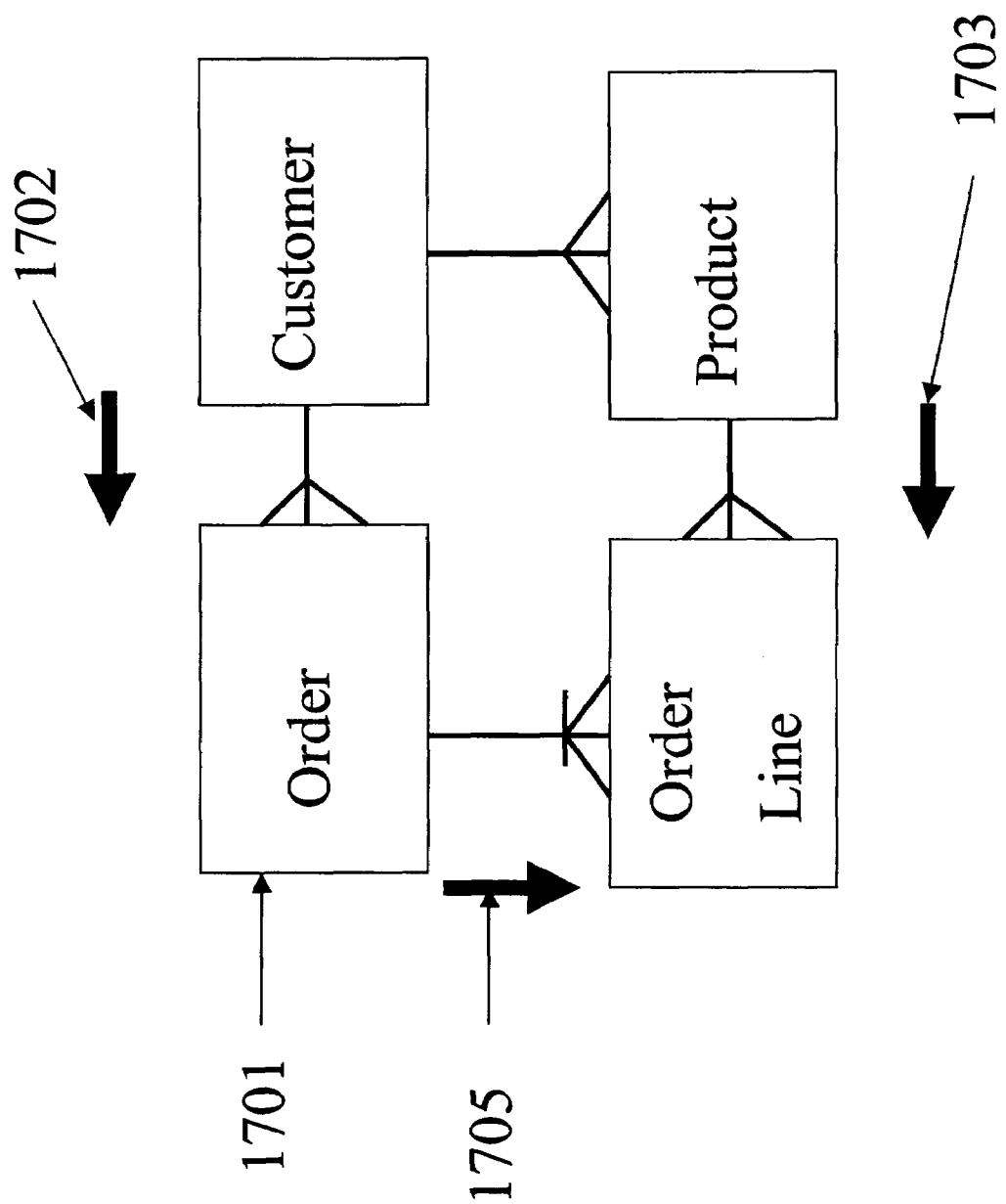
Figure 19:
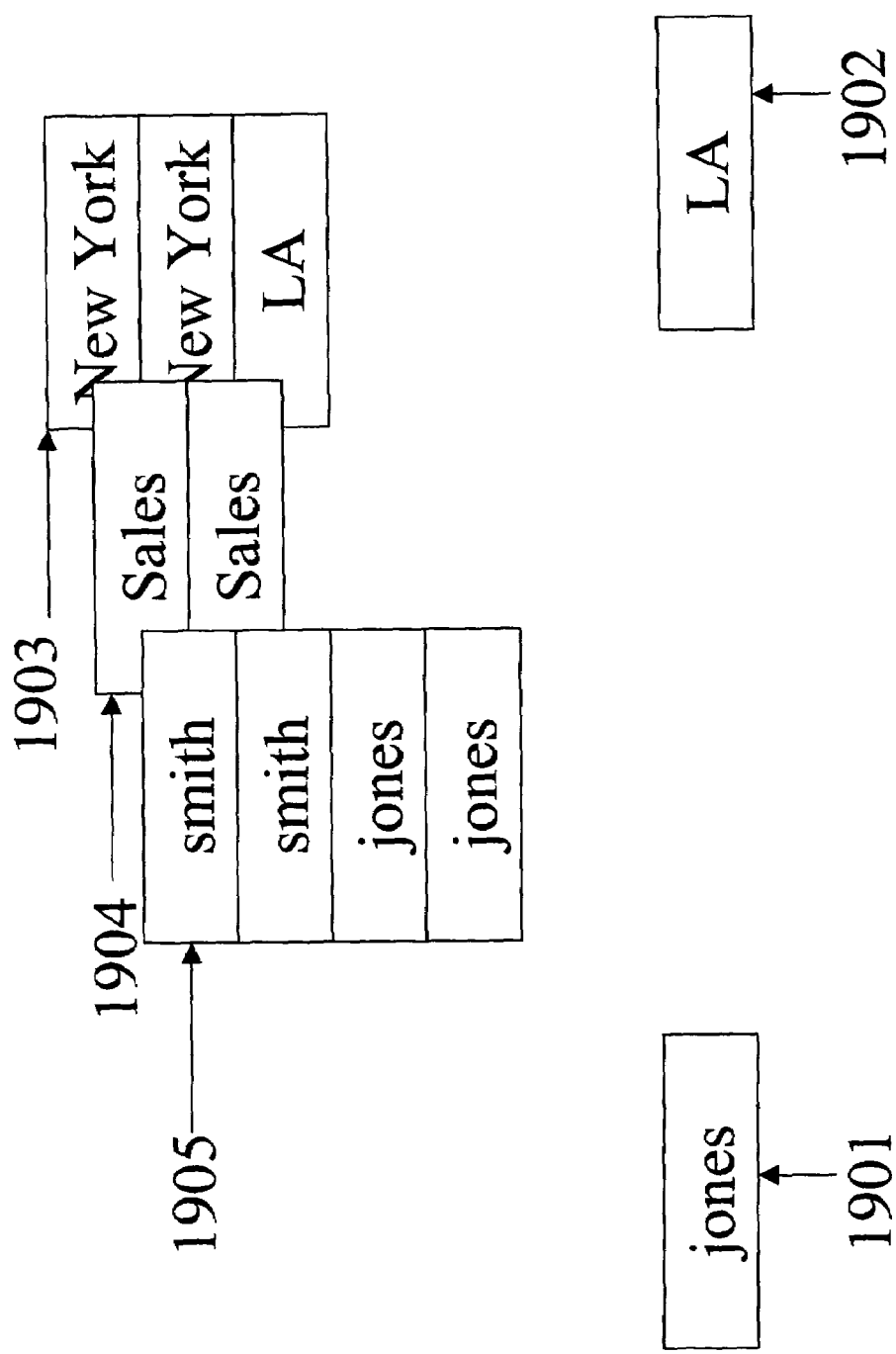
Figure 20:
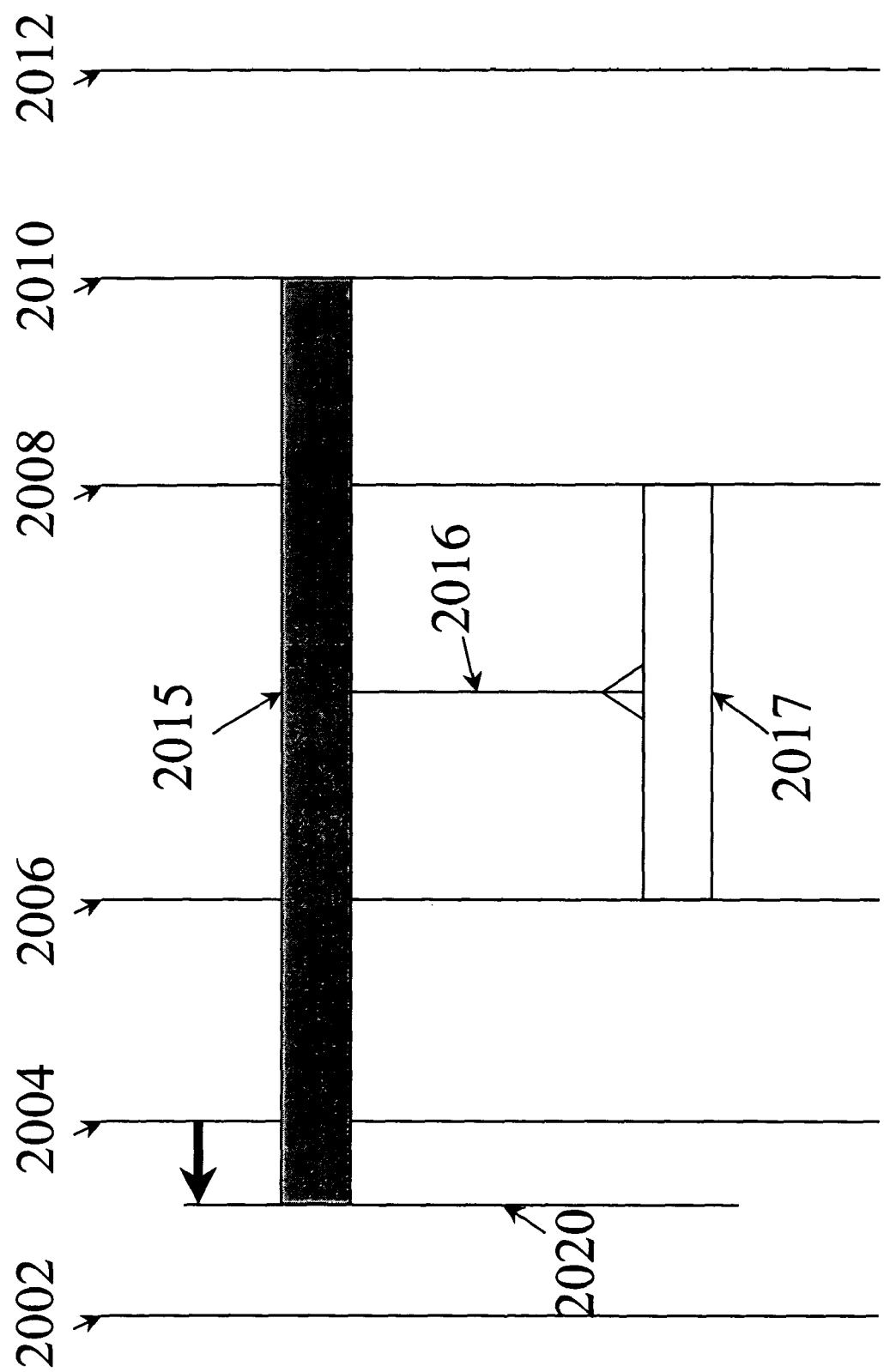
FIGS. 20-24 show some worked examples for the case of Alter Insert on a Focus Entity with Downstream relations.
Figure 21:
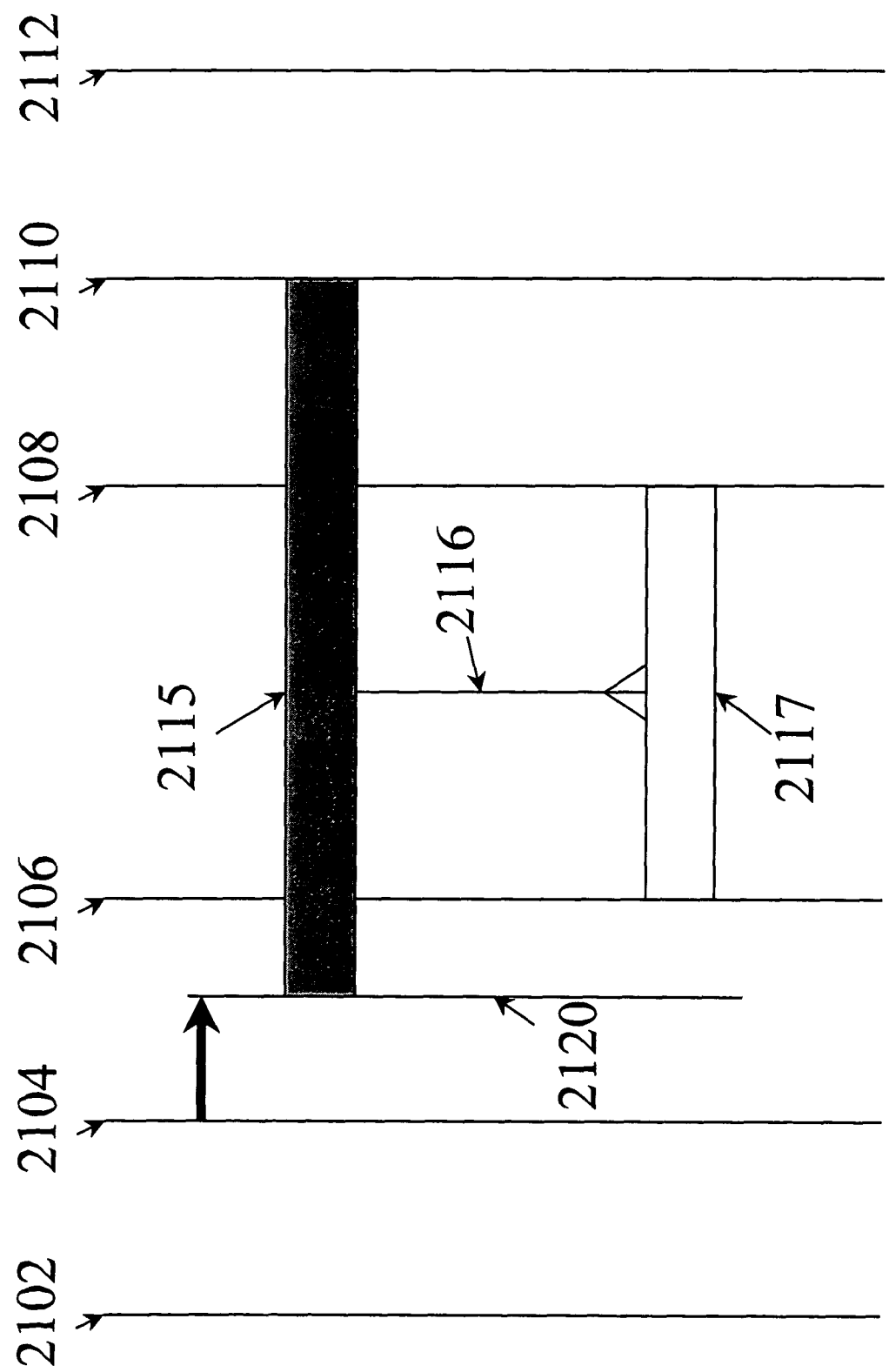
Figure 22A:
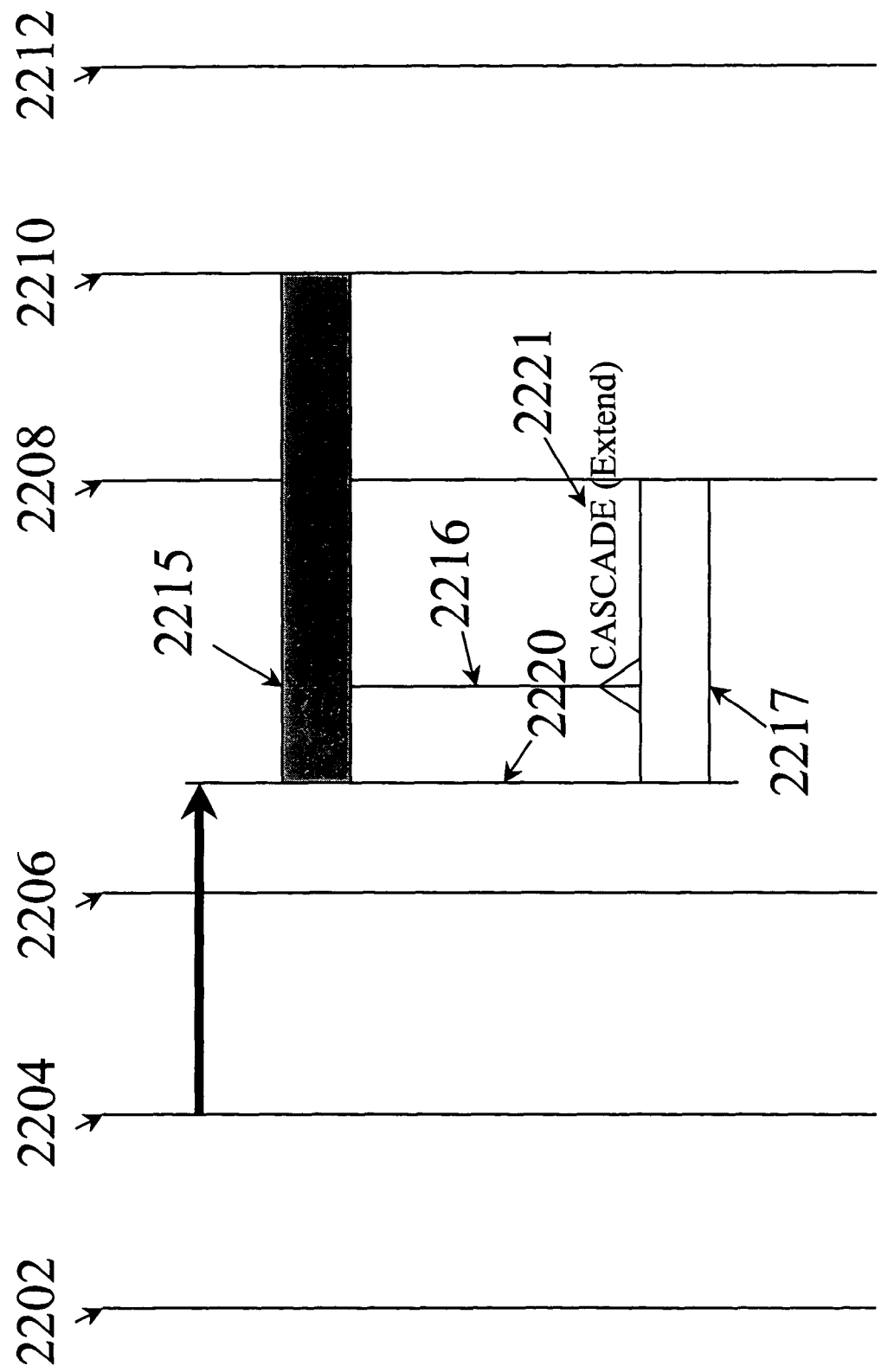
Figure 22B:
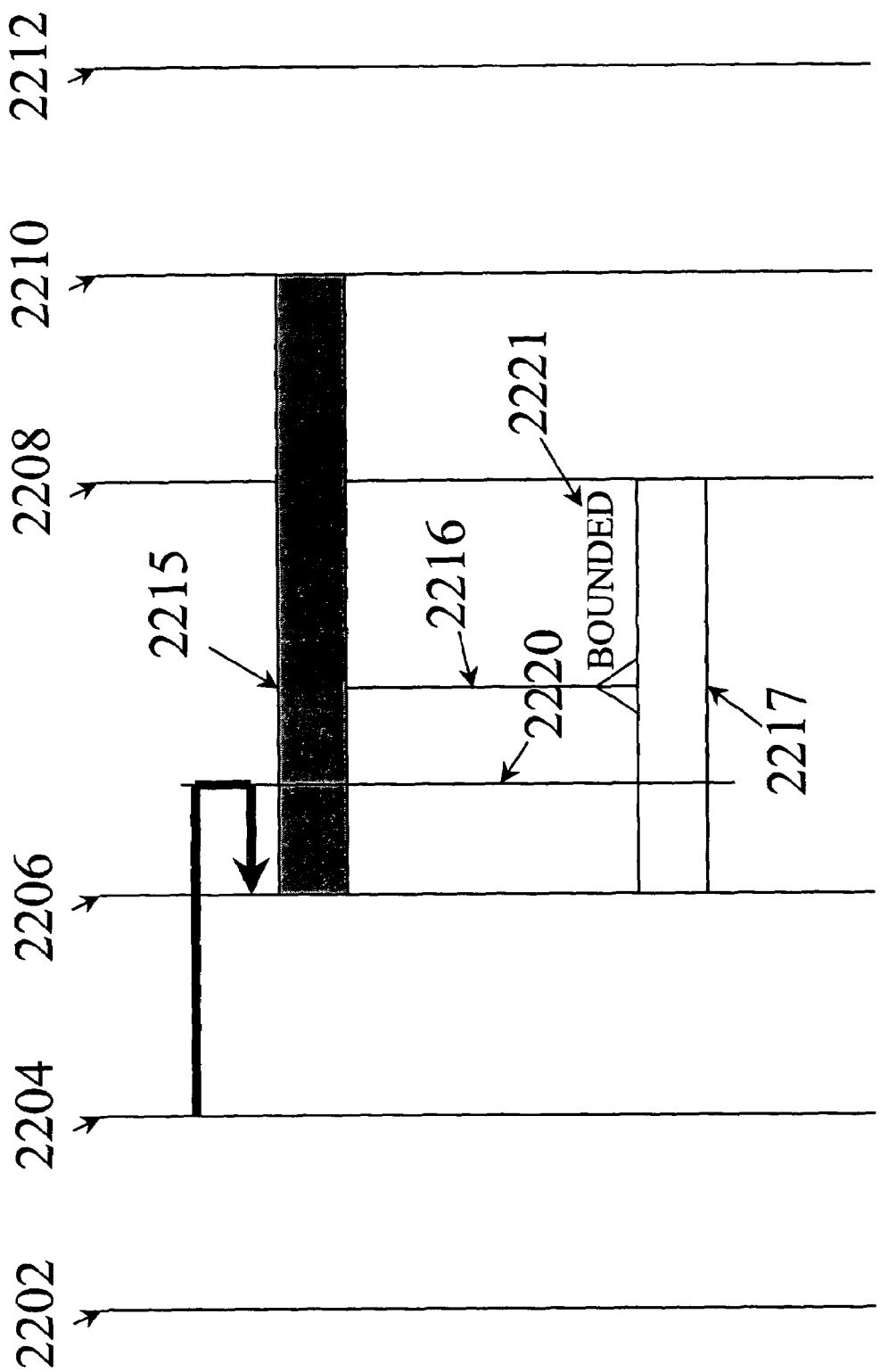
Figure 22C:
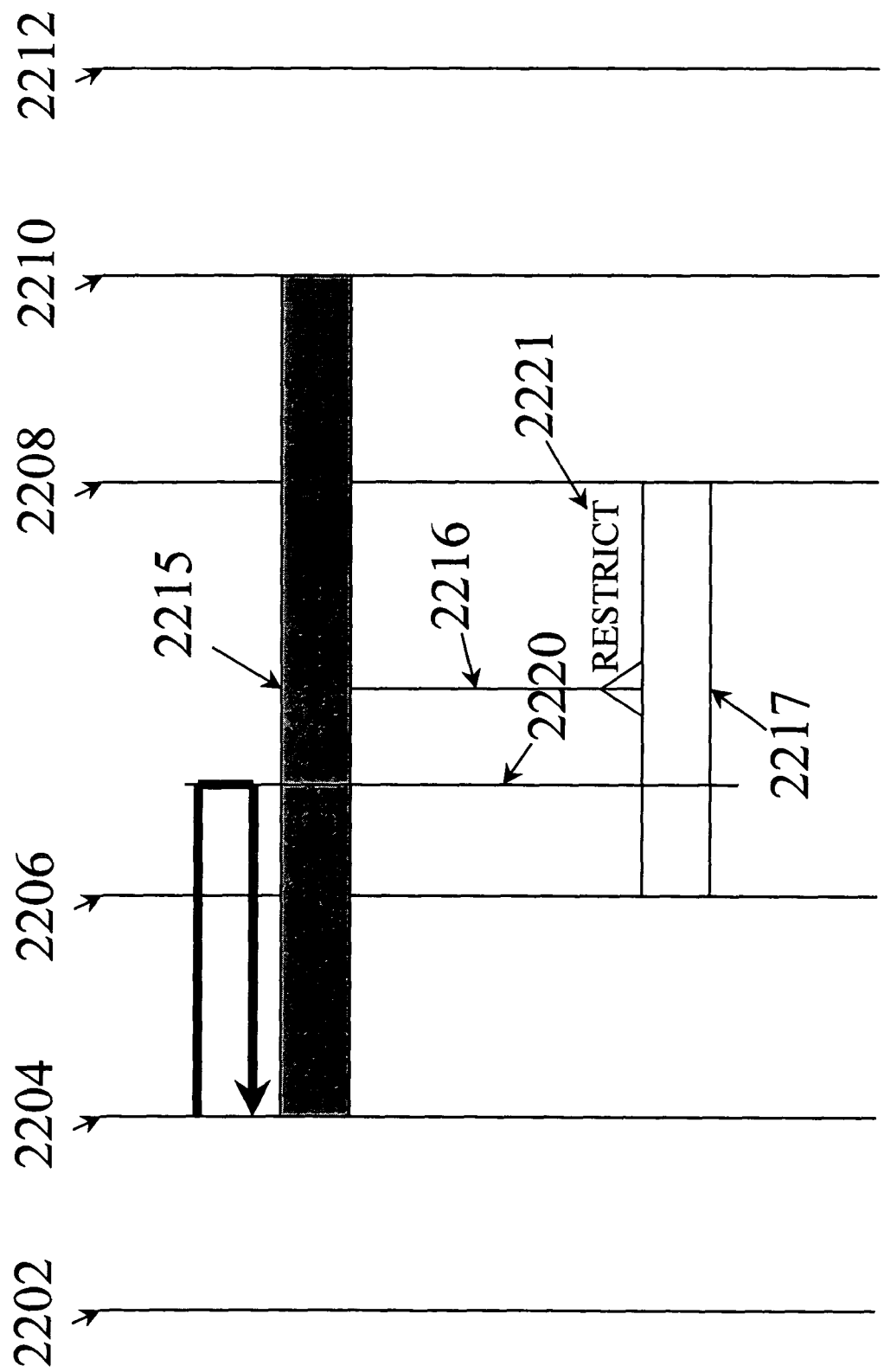
Figure 22D:
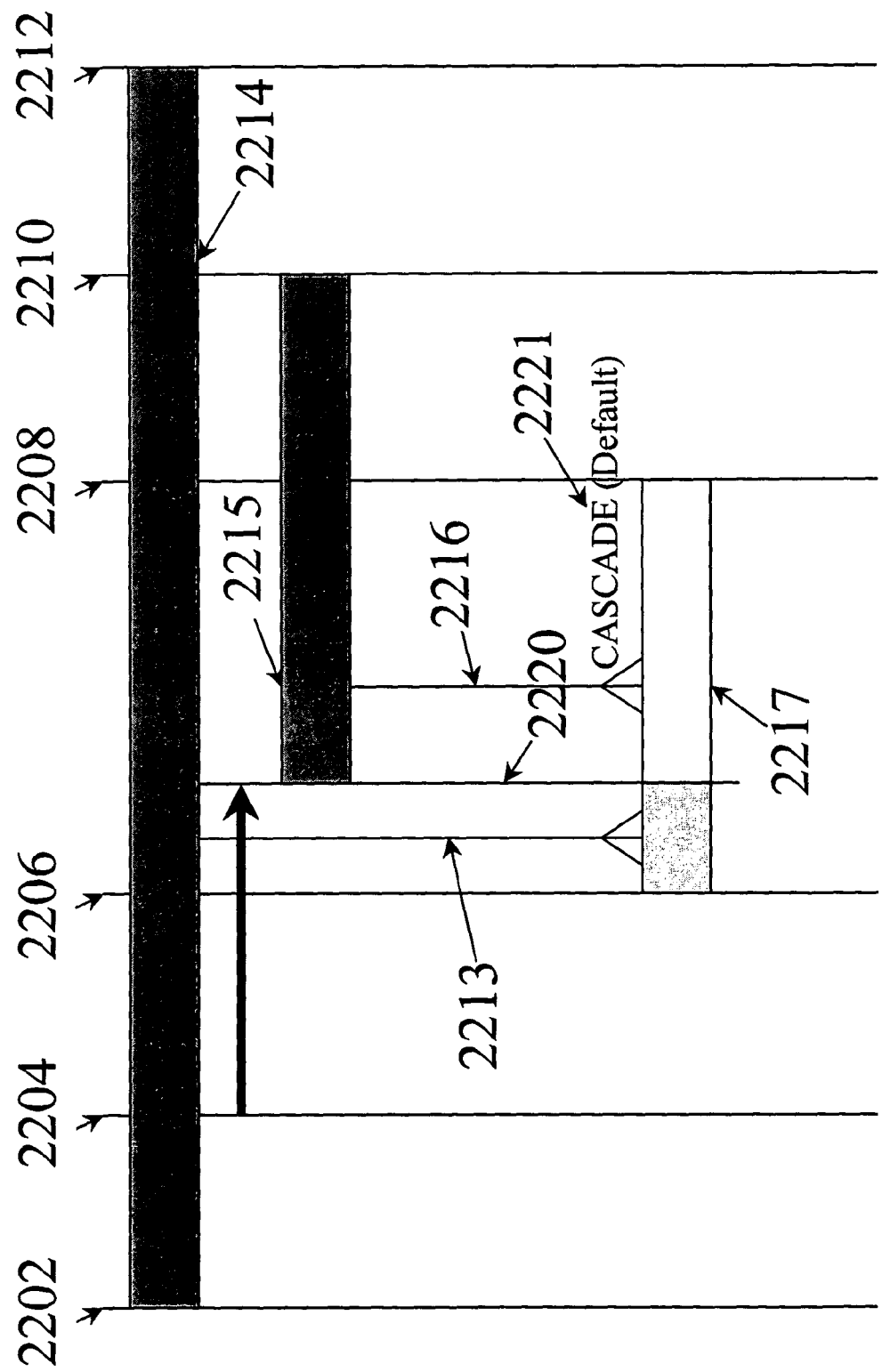
Figure 22E:
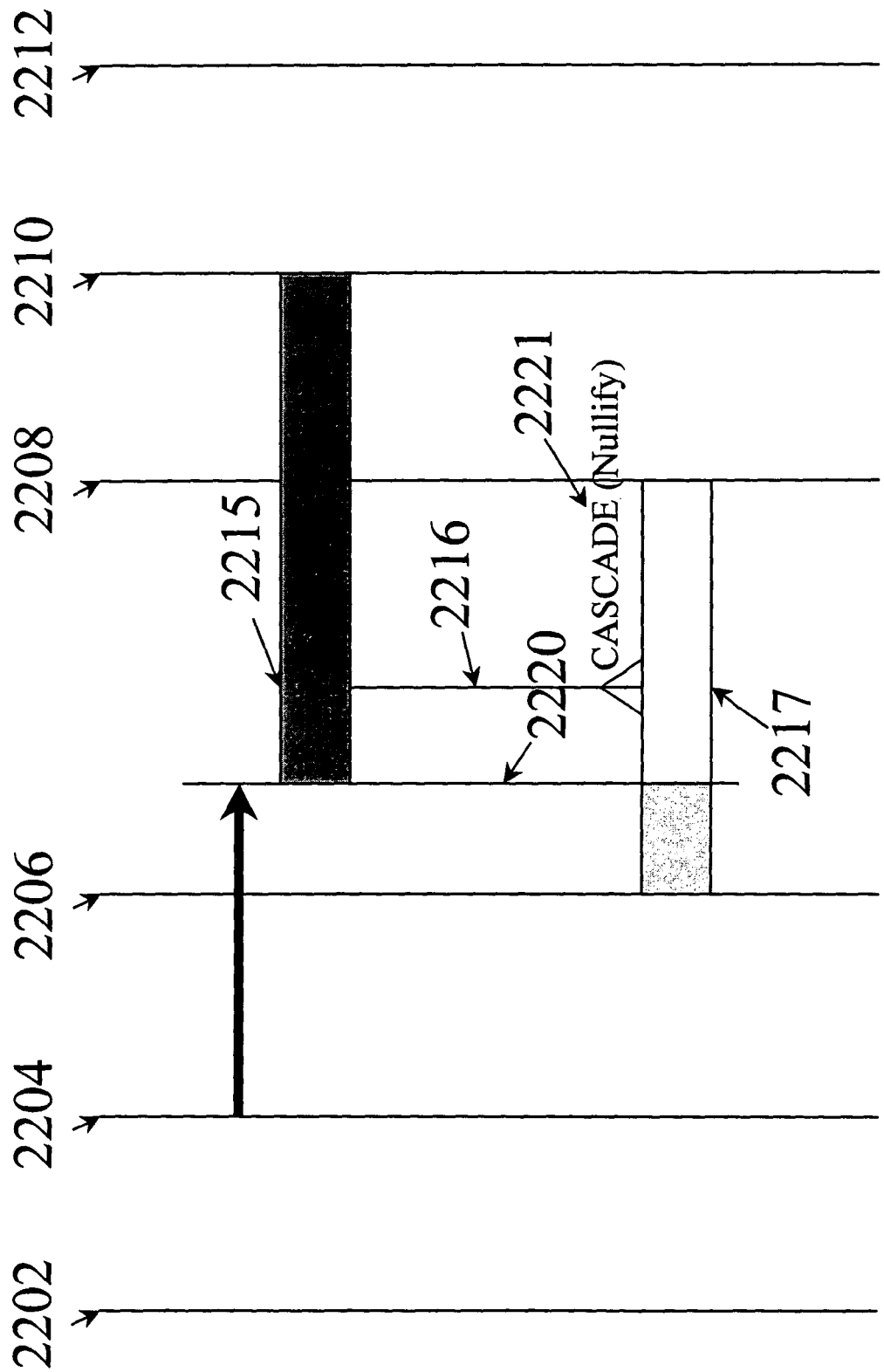
Figure 23A:
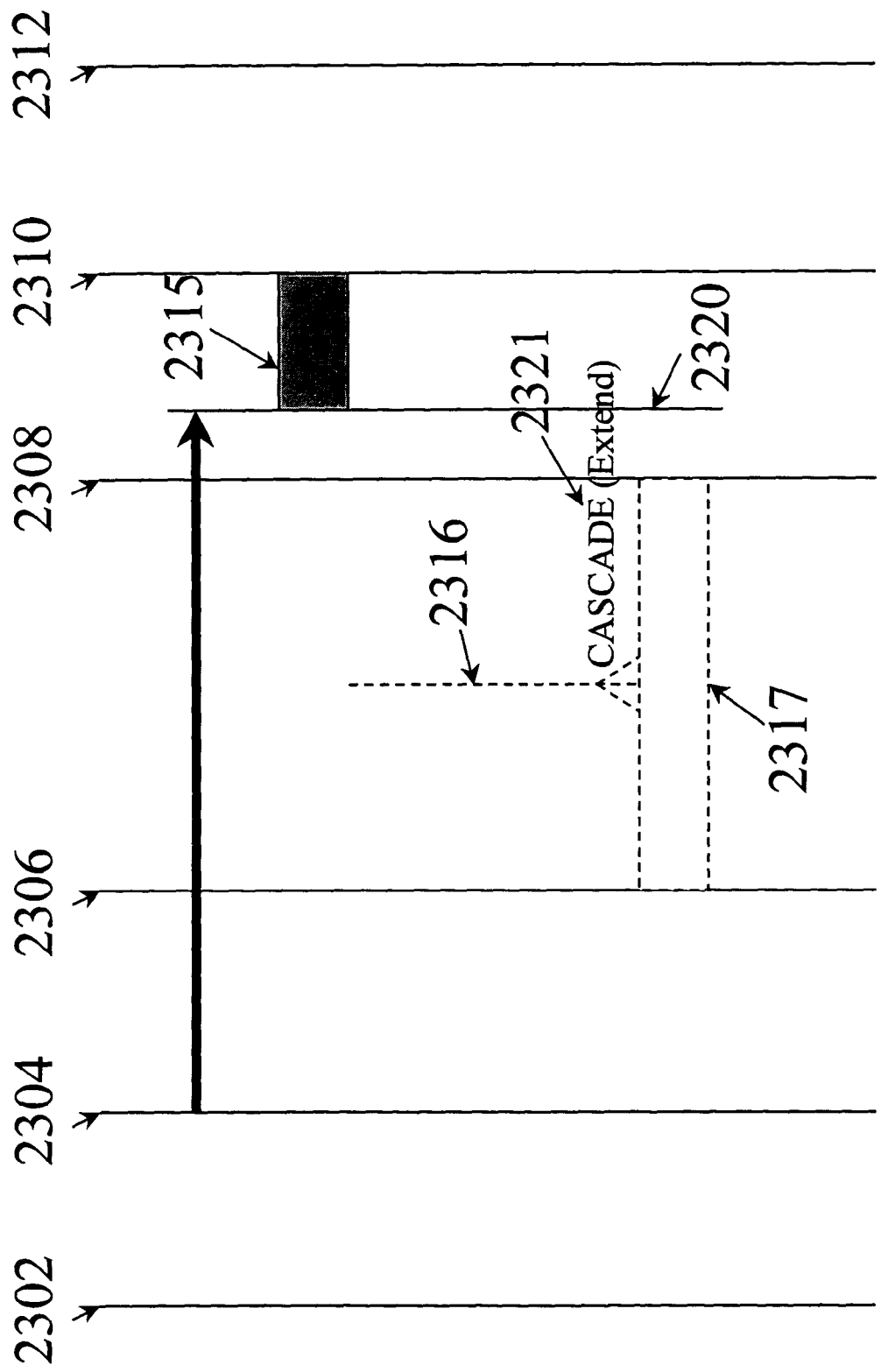
Figure 23B:
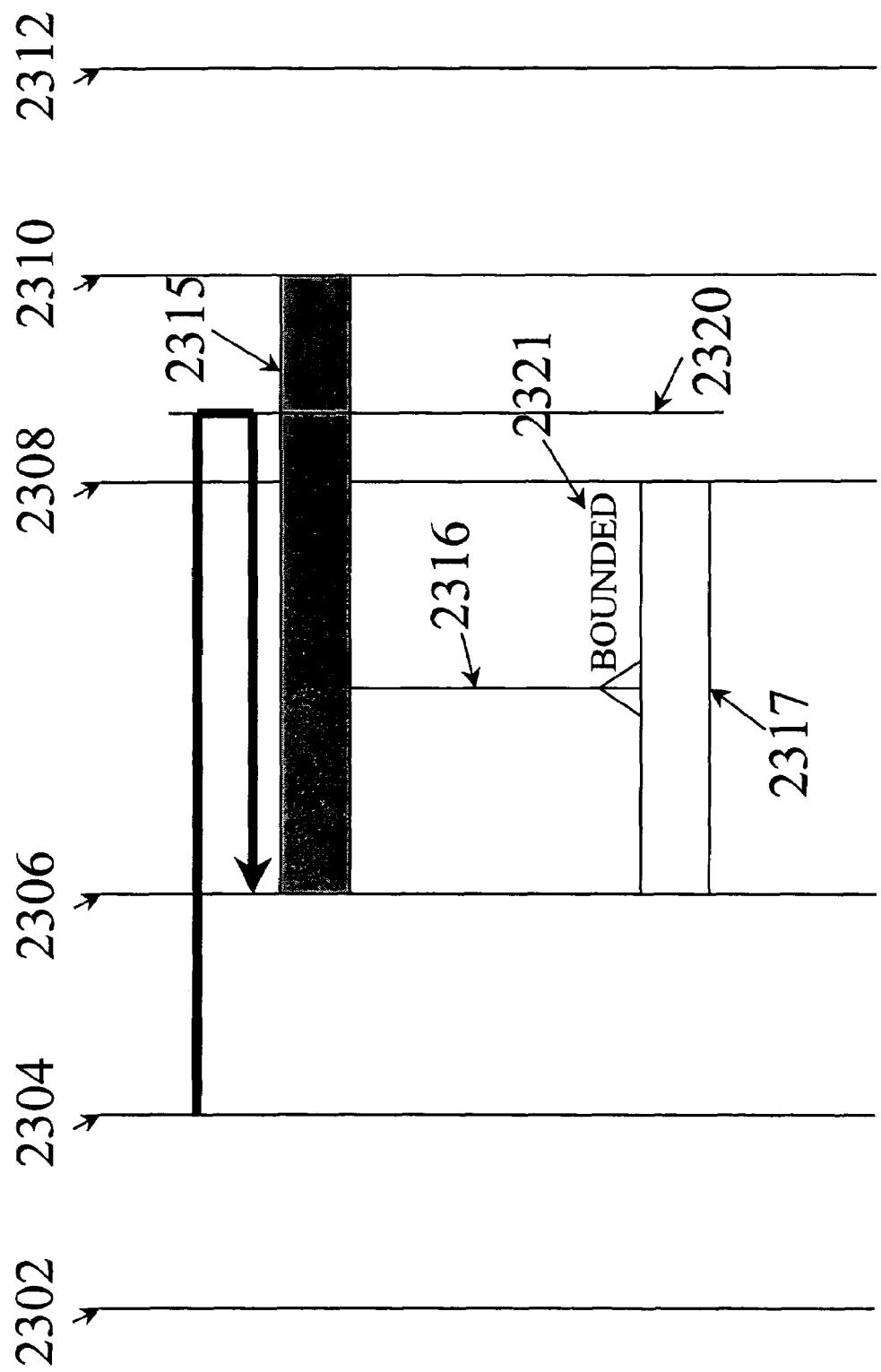
Figure 23C:
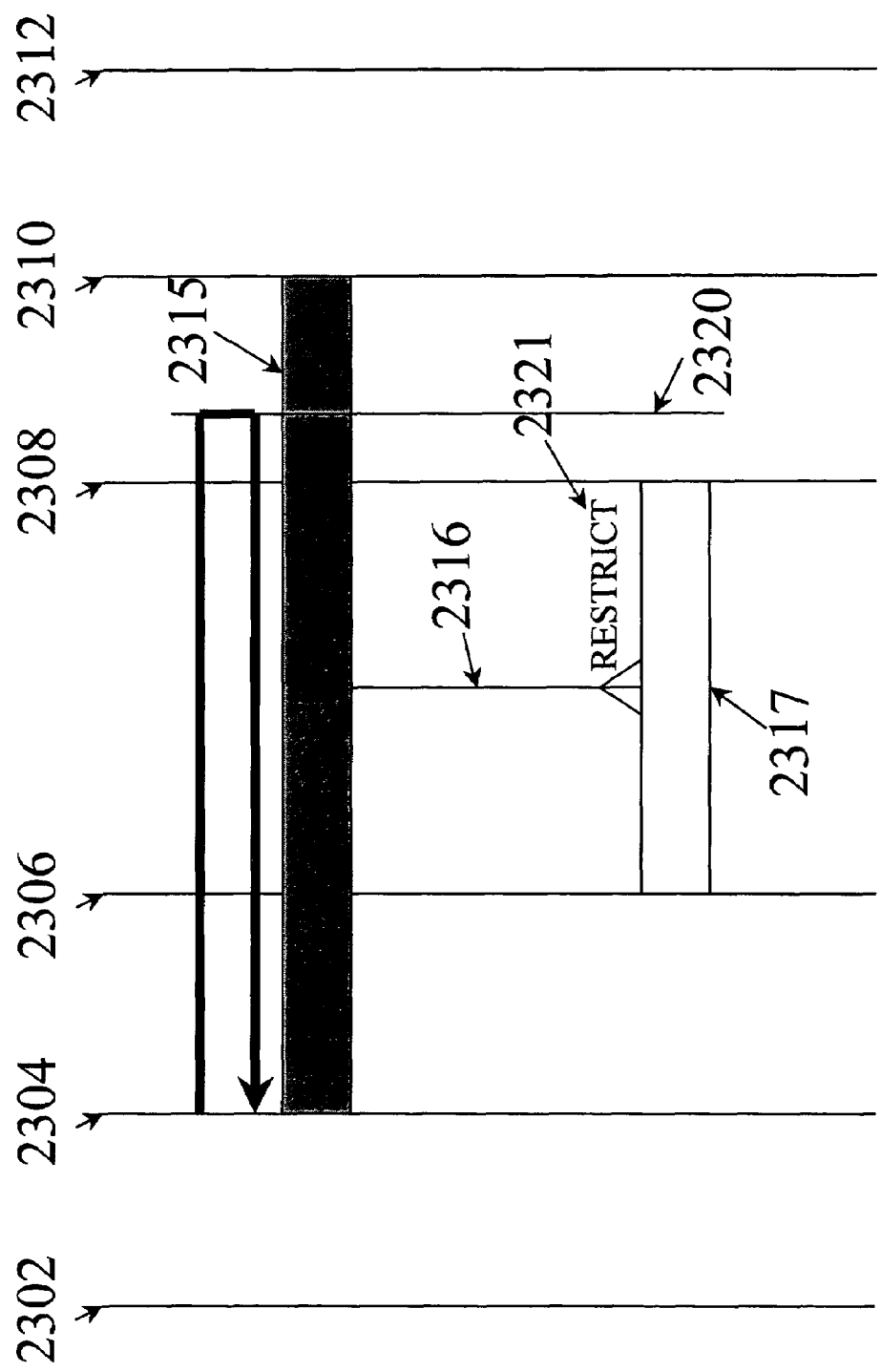
Figure 23D:
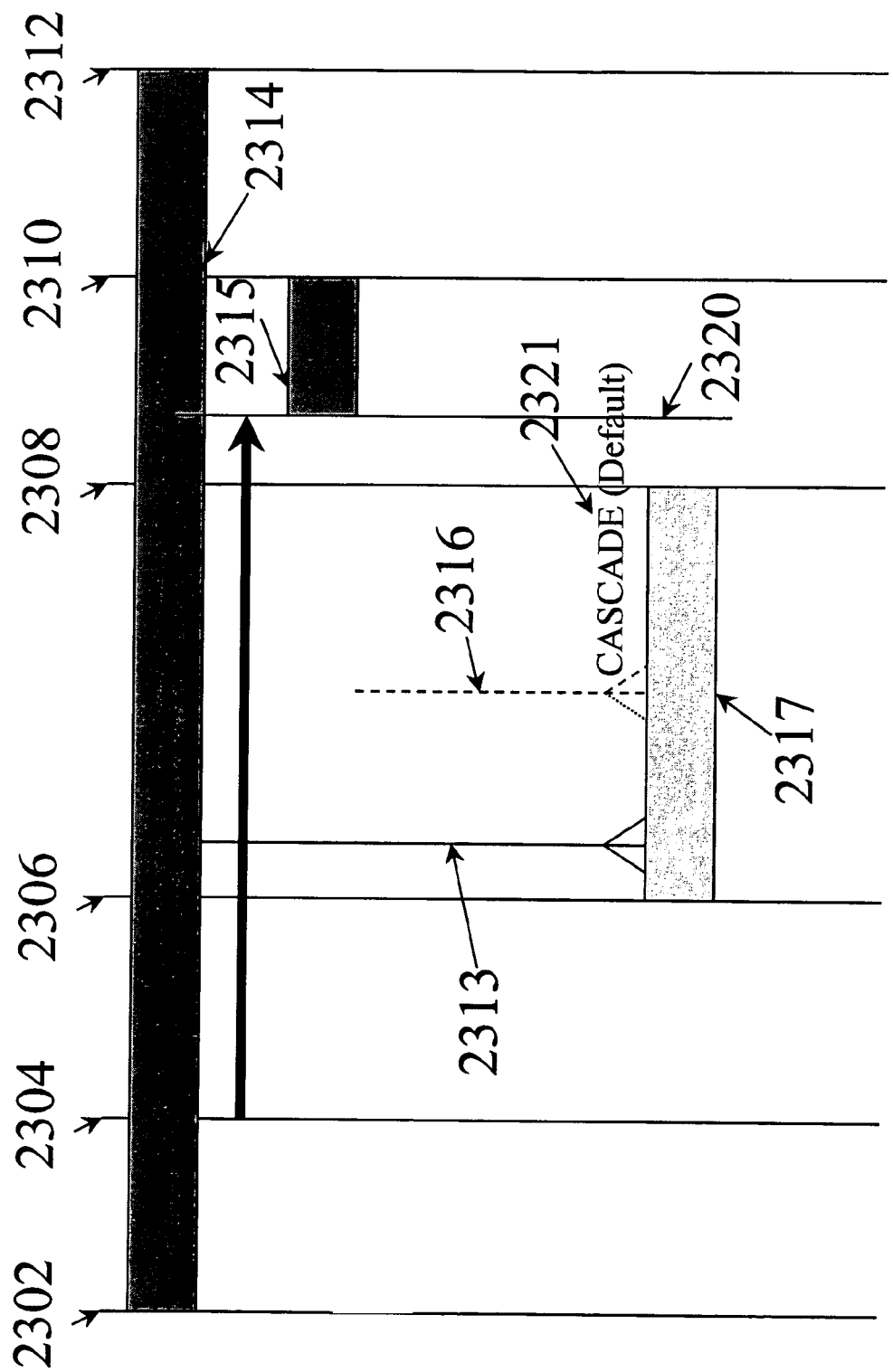
Figure 23E:
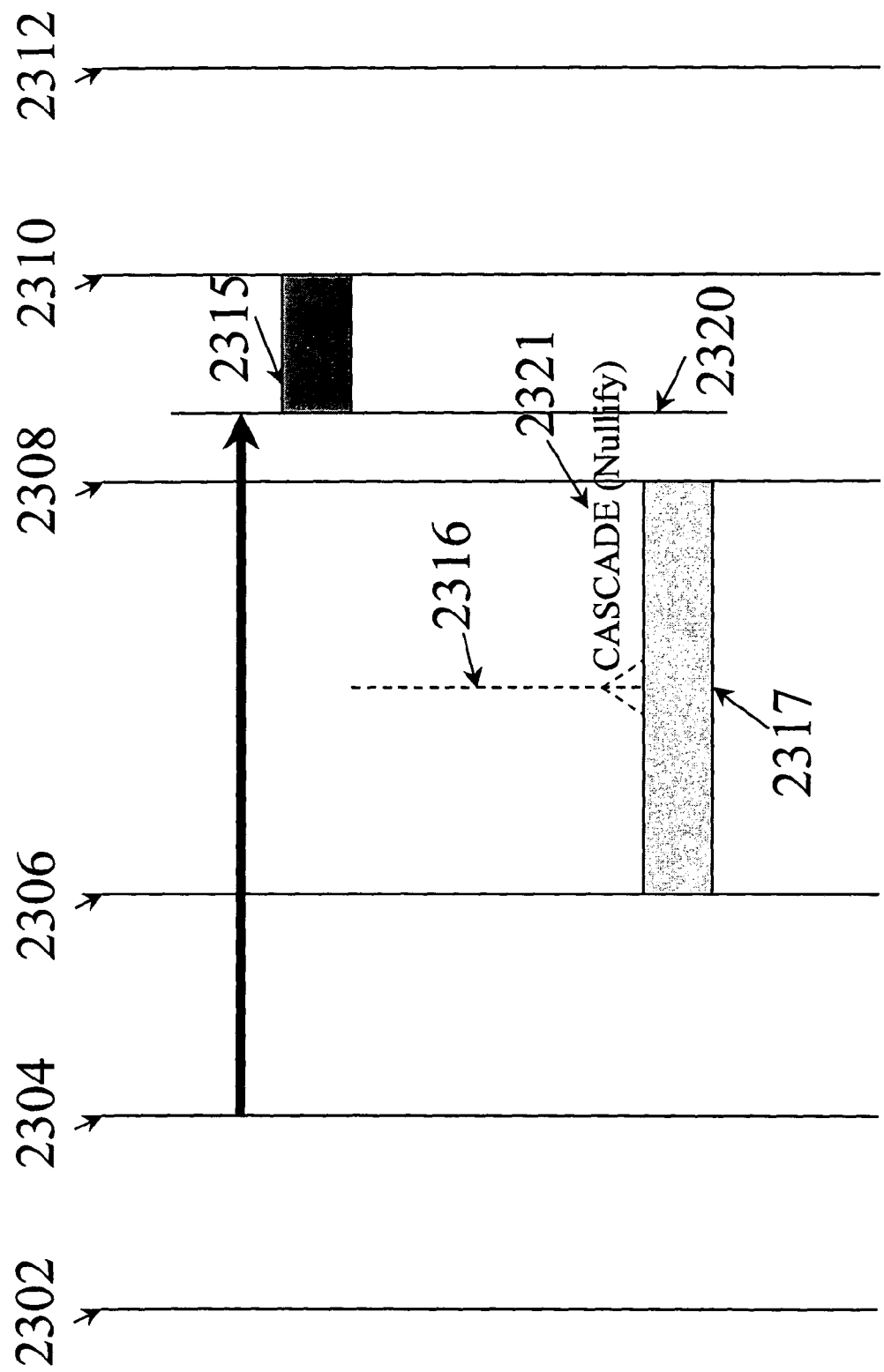
Figure 24:
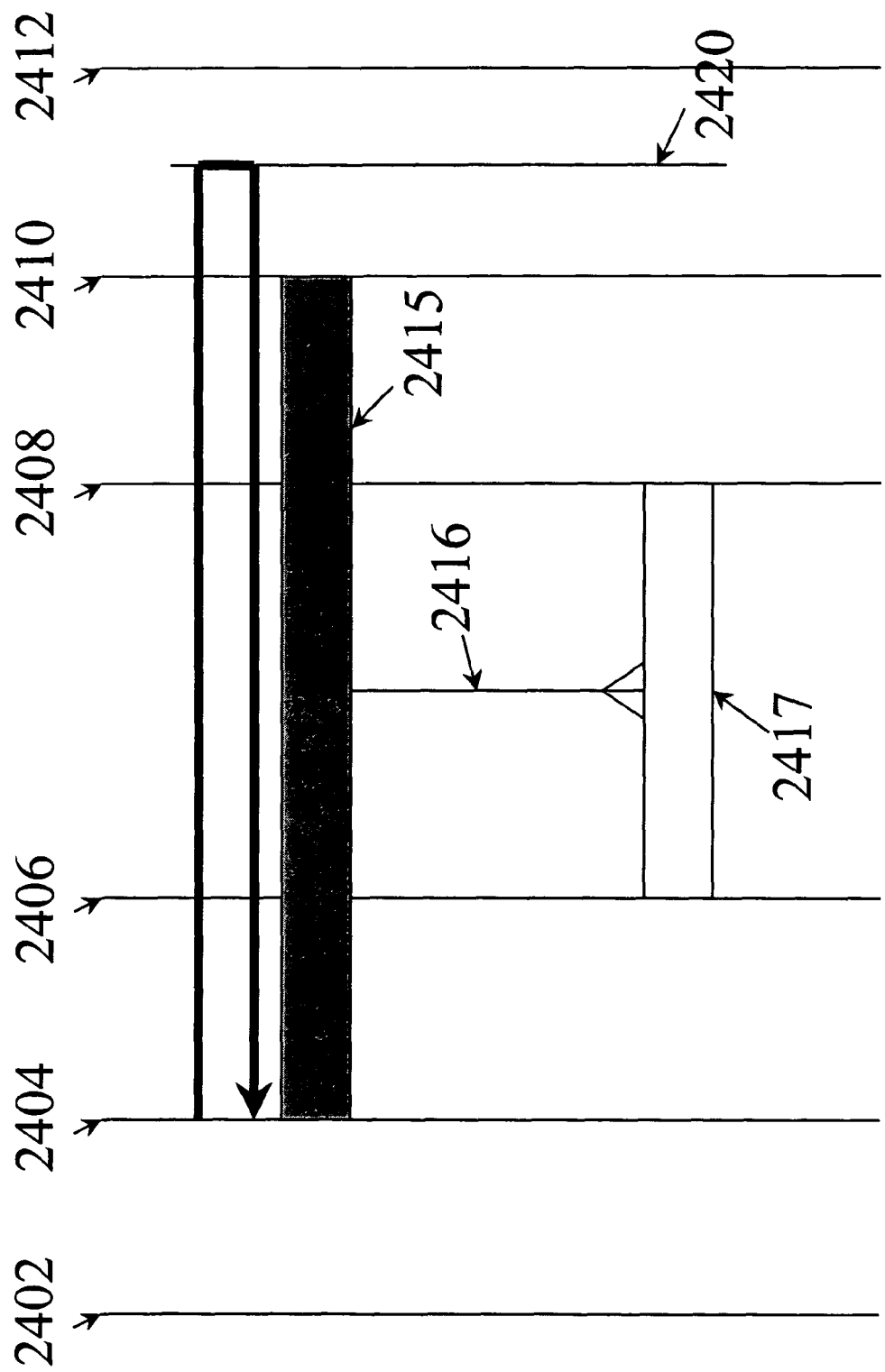
Figure 27:
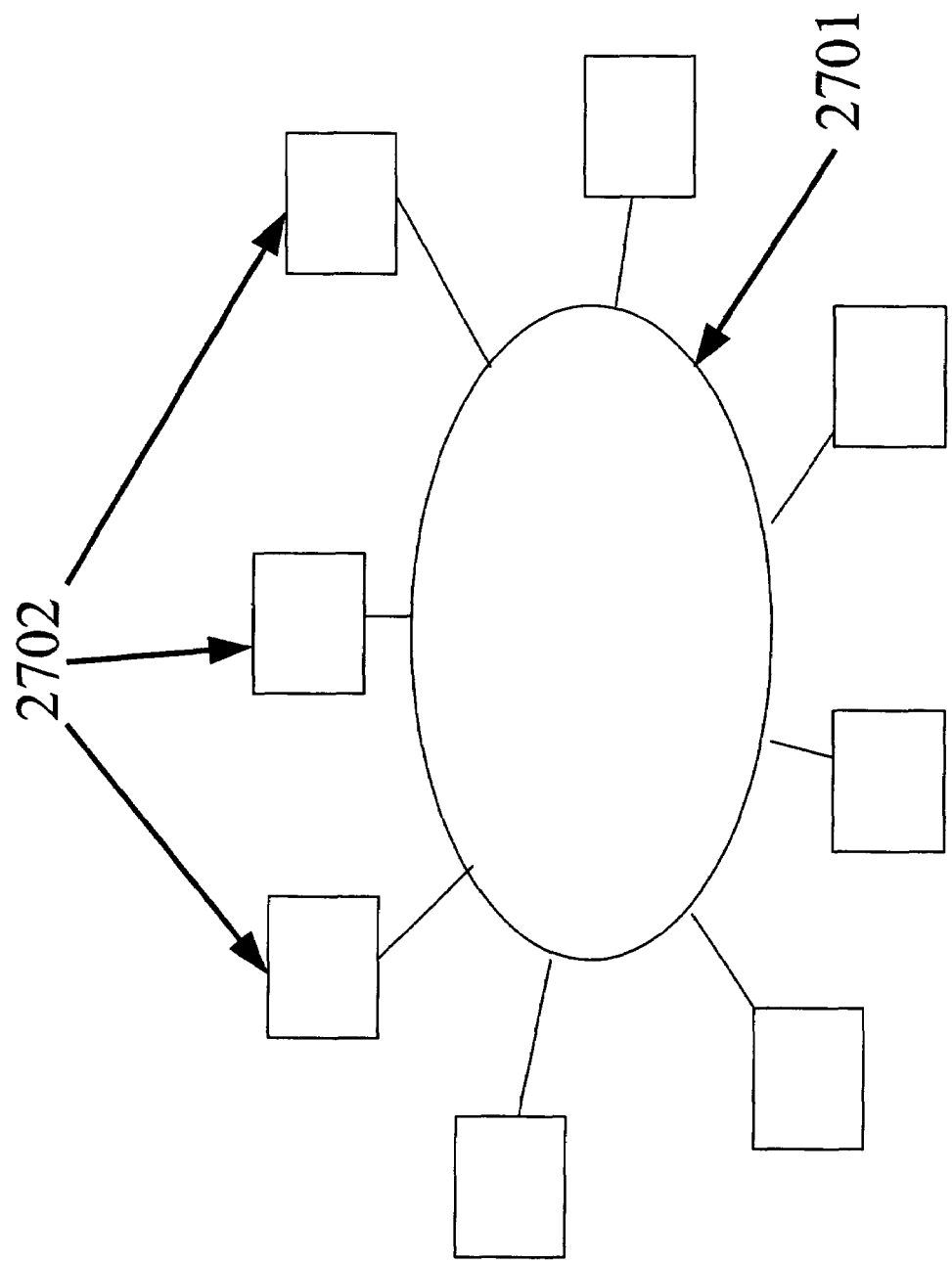
Figure 28:
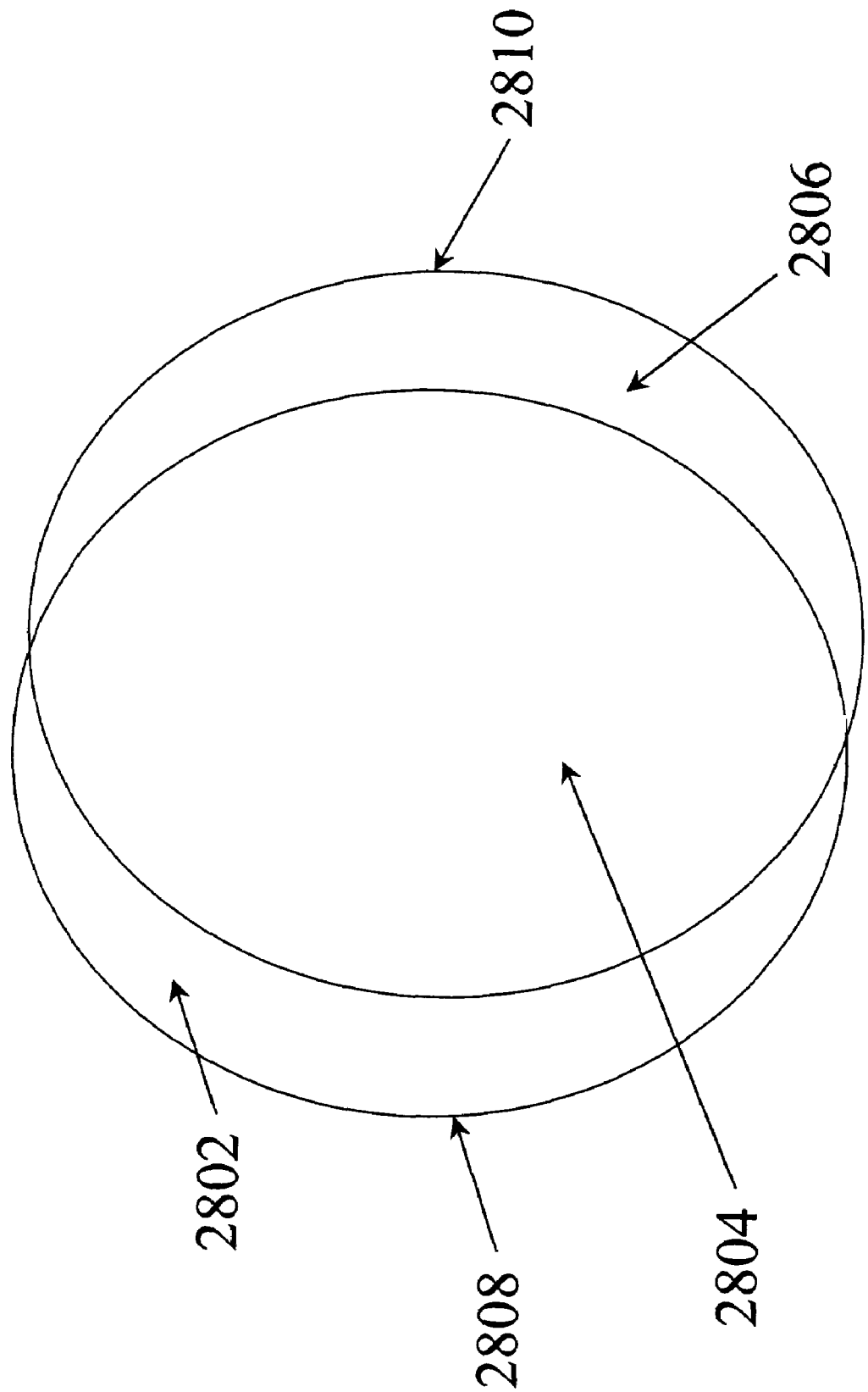
Figure 29:
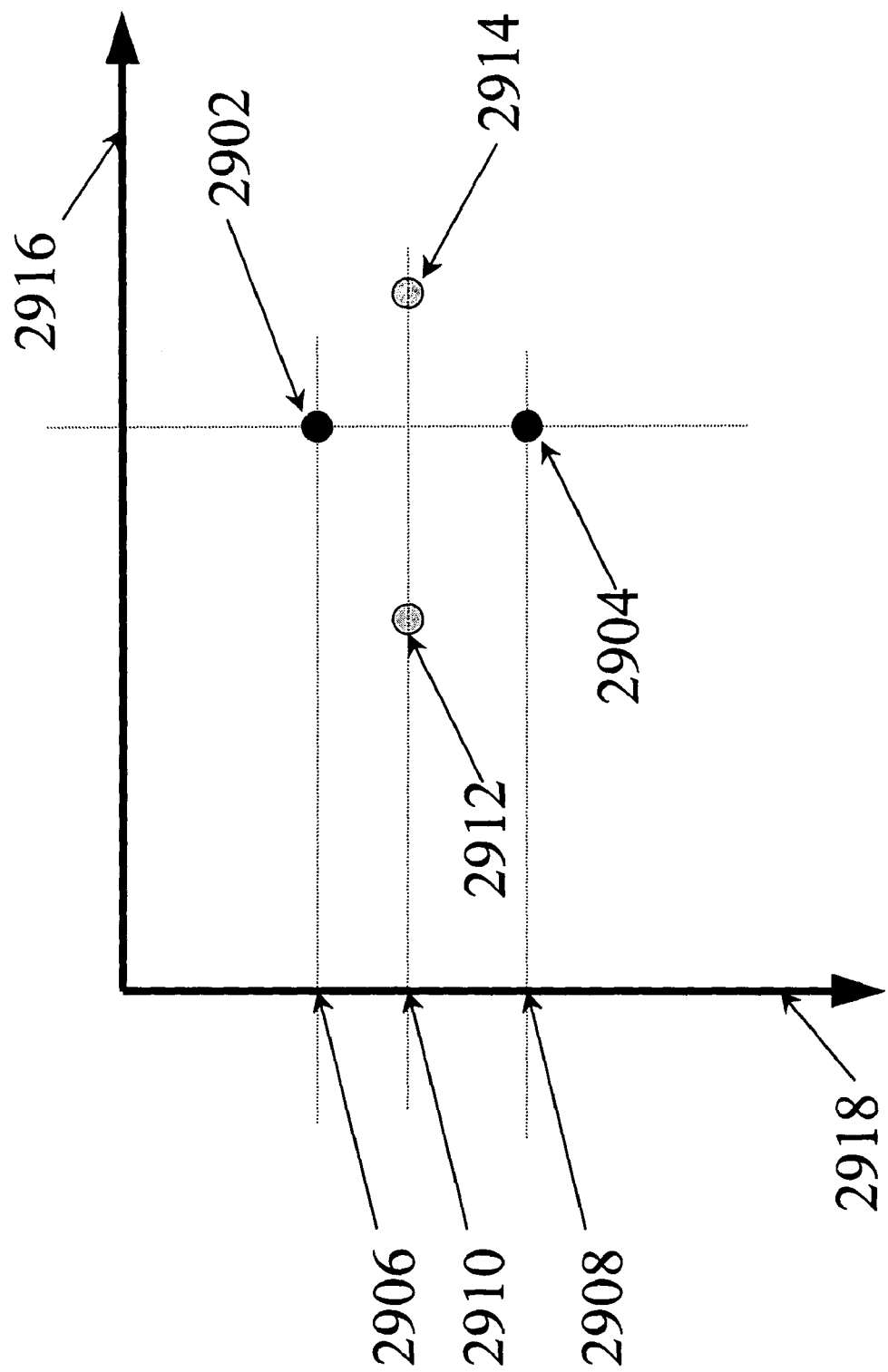
Figure 30:
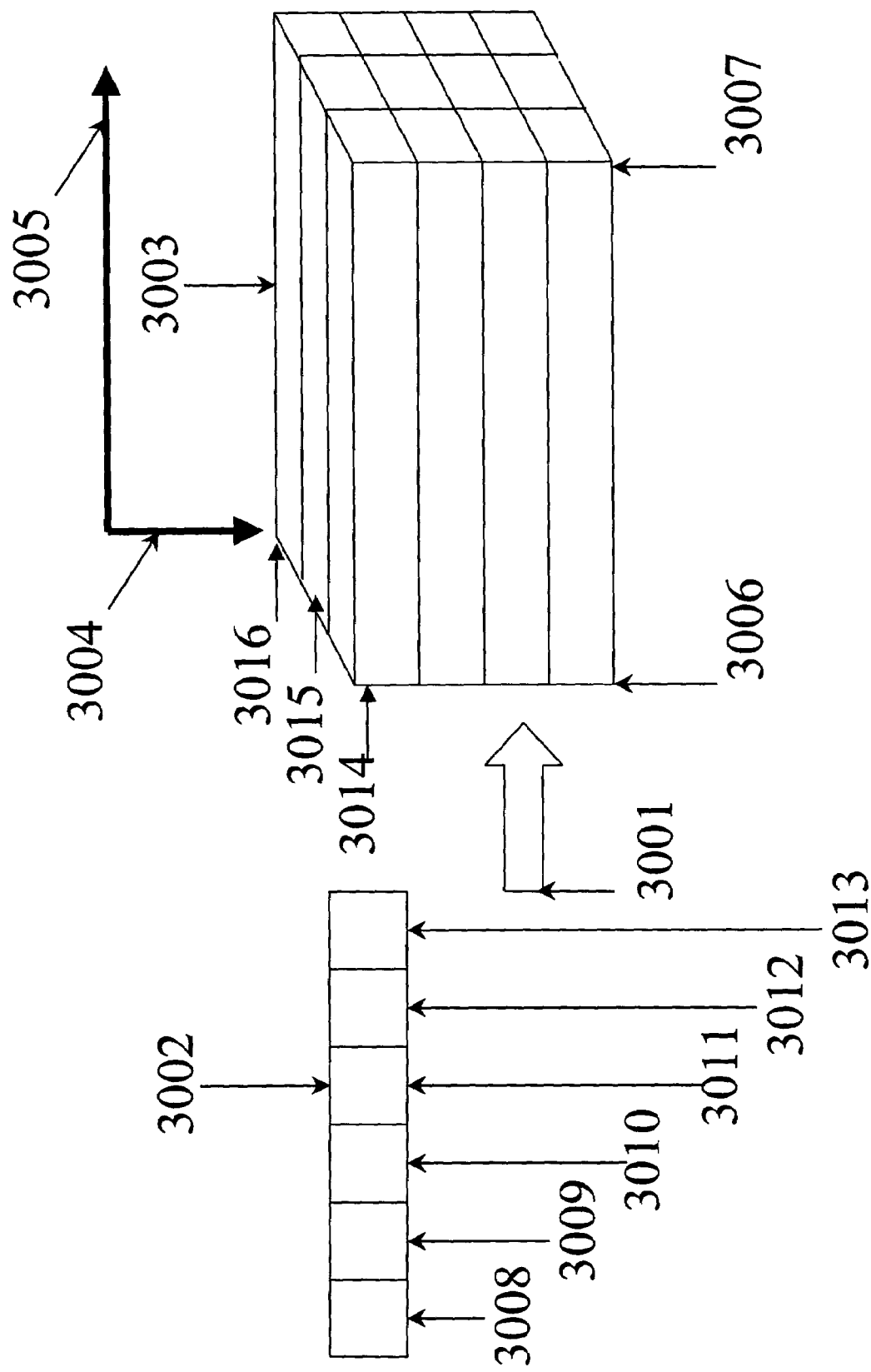
Figure 31:
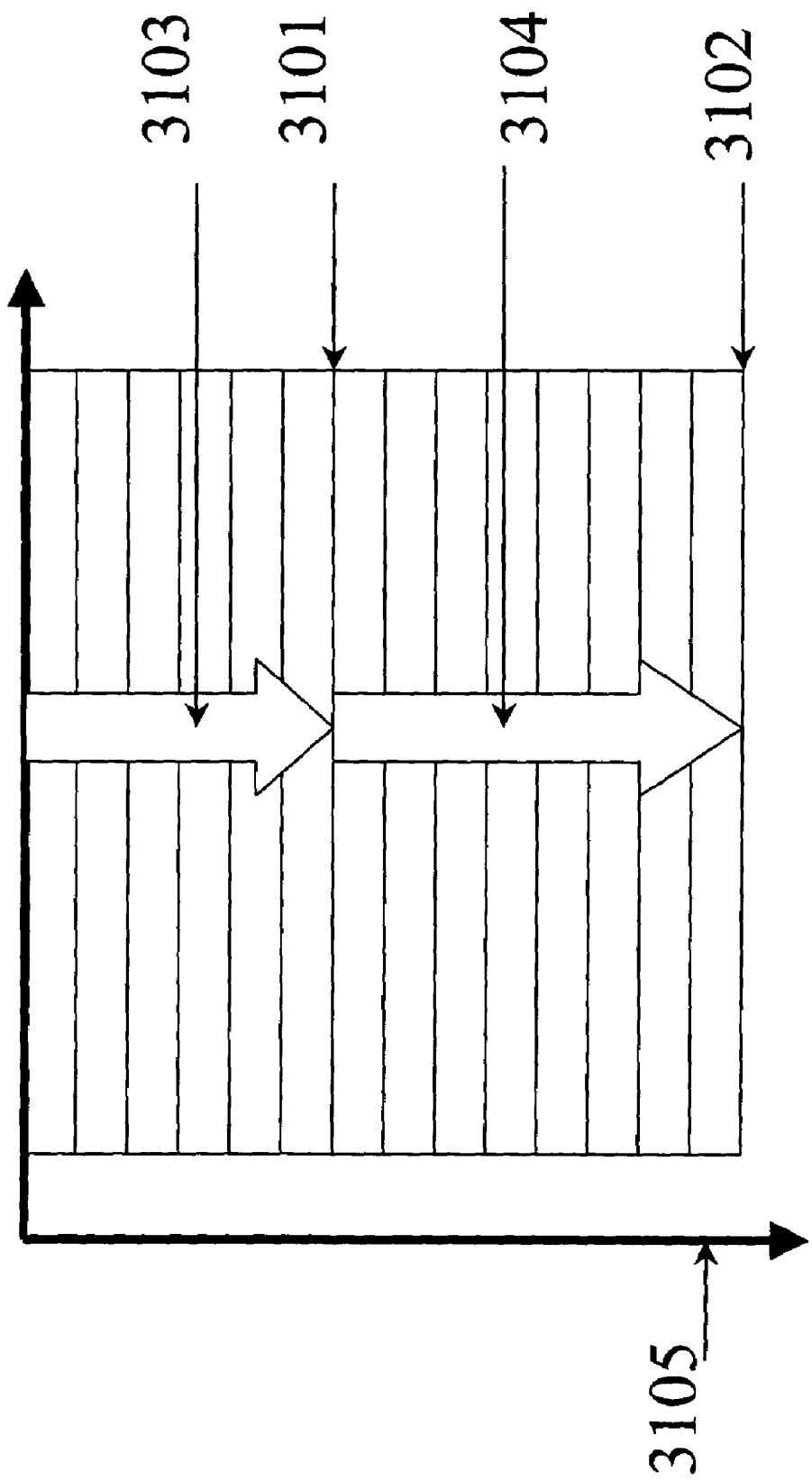
Figure 32:
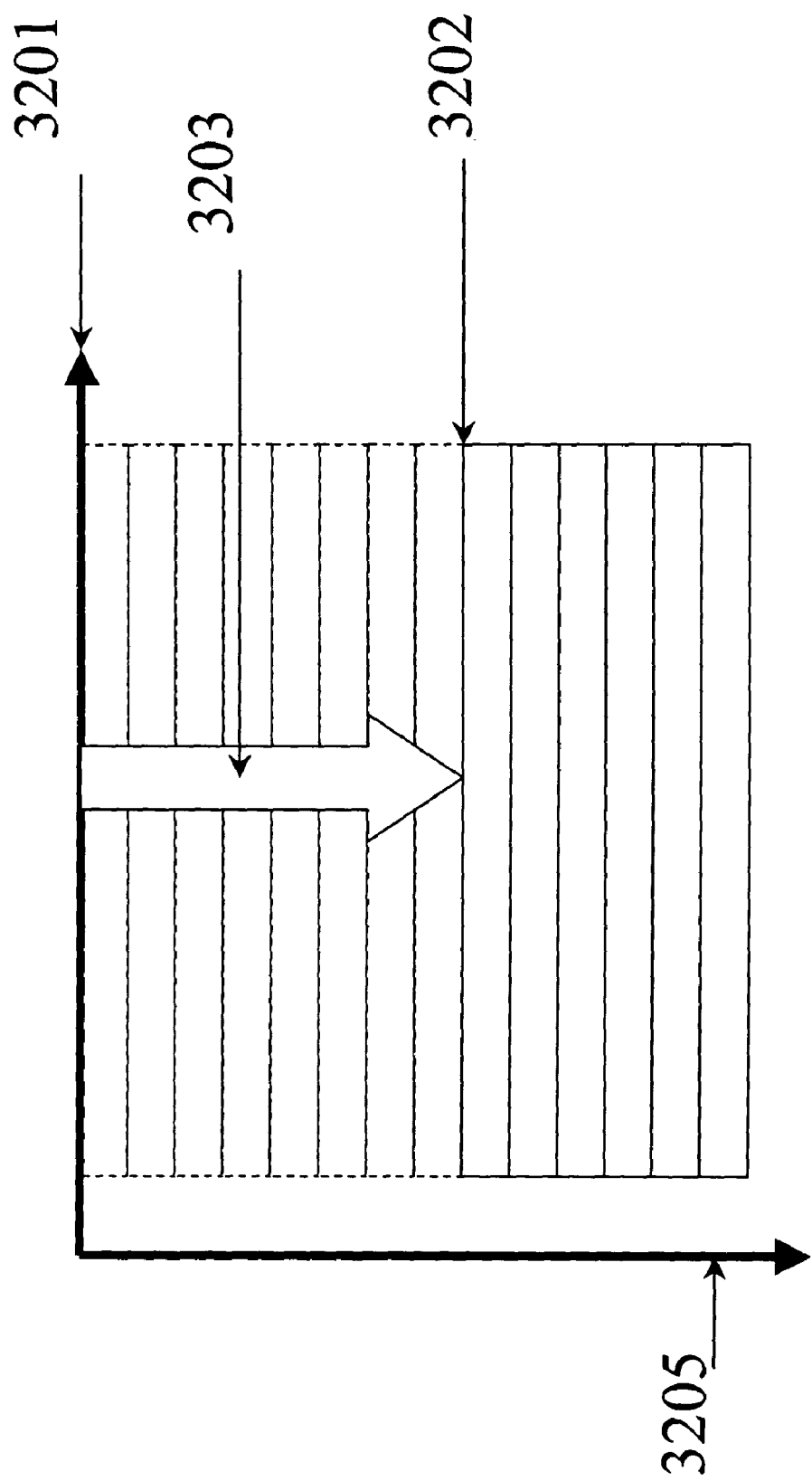
Figure 33:
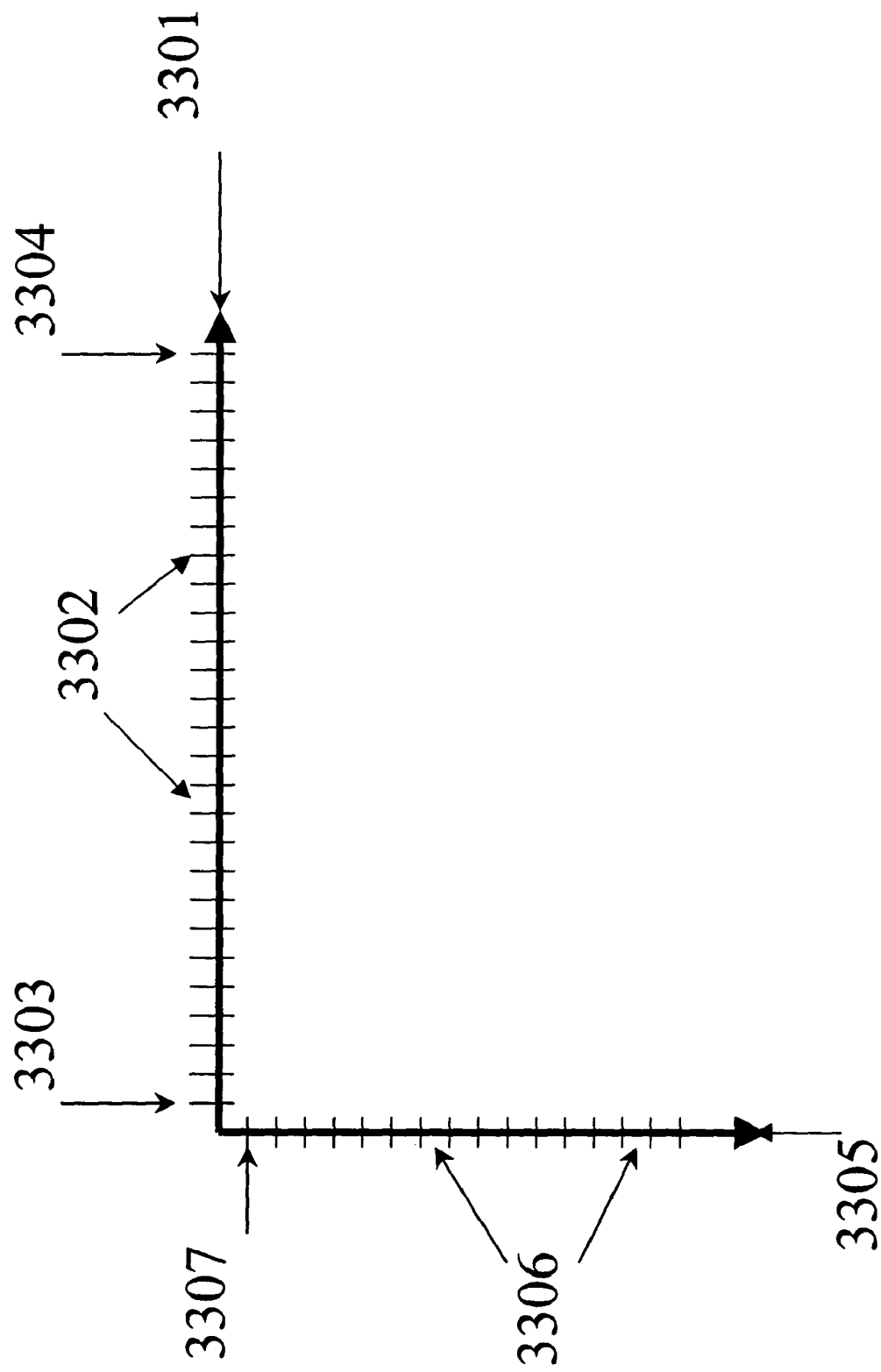
Figure 50:
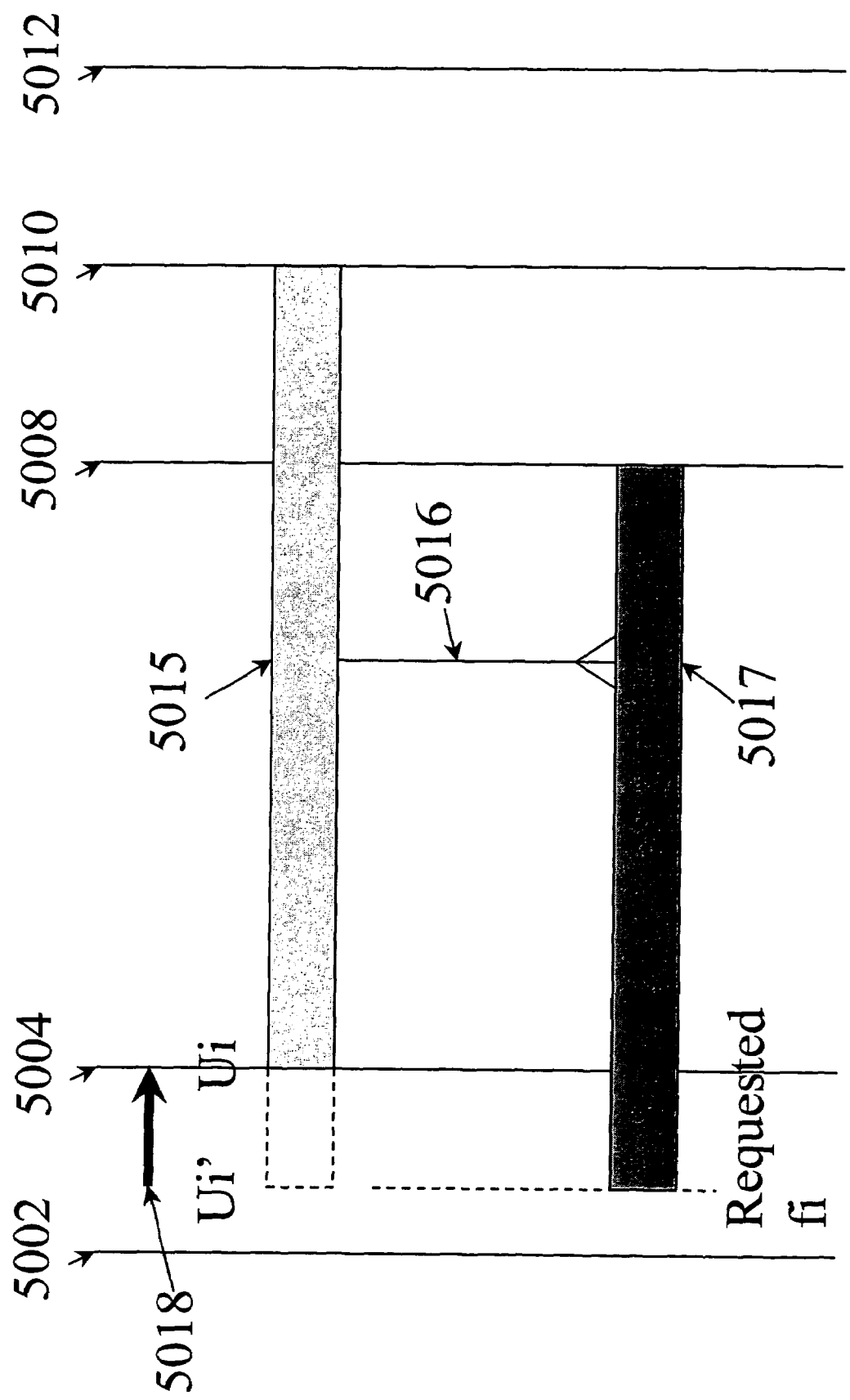
FIGS. 50-55 shows how the Core Algorithm resolves Upstream Temporal Splashes.
Figure 51:
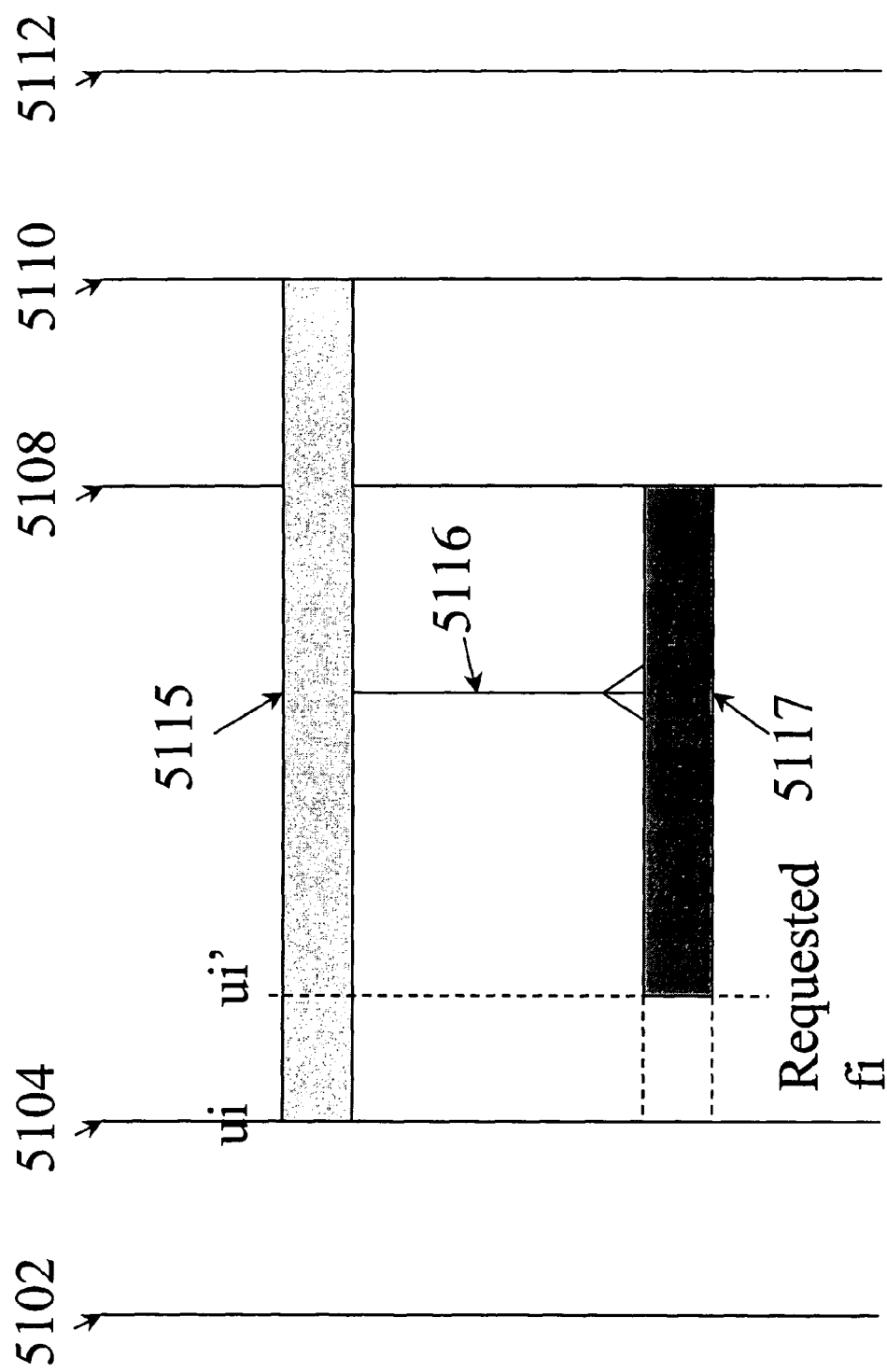
Figure 52:
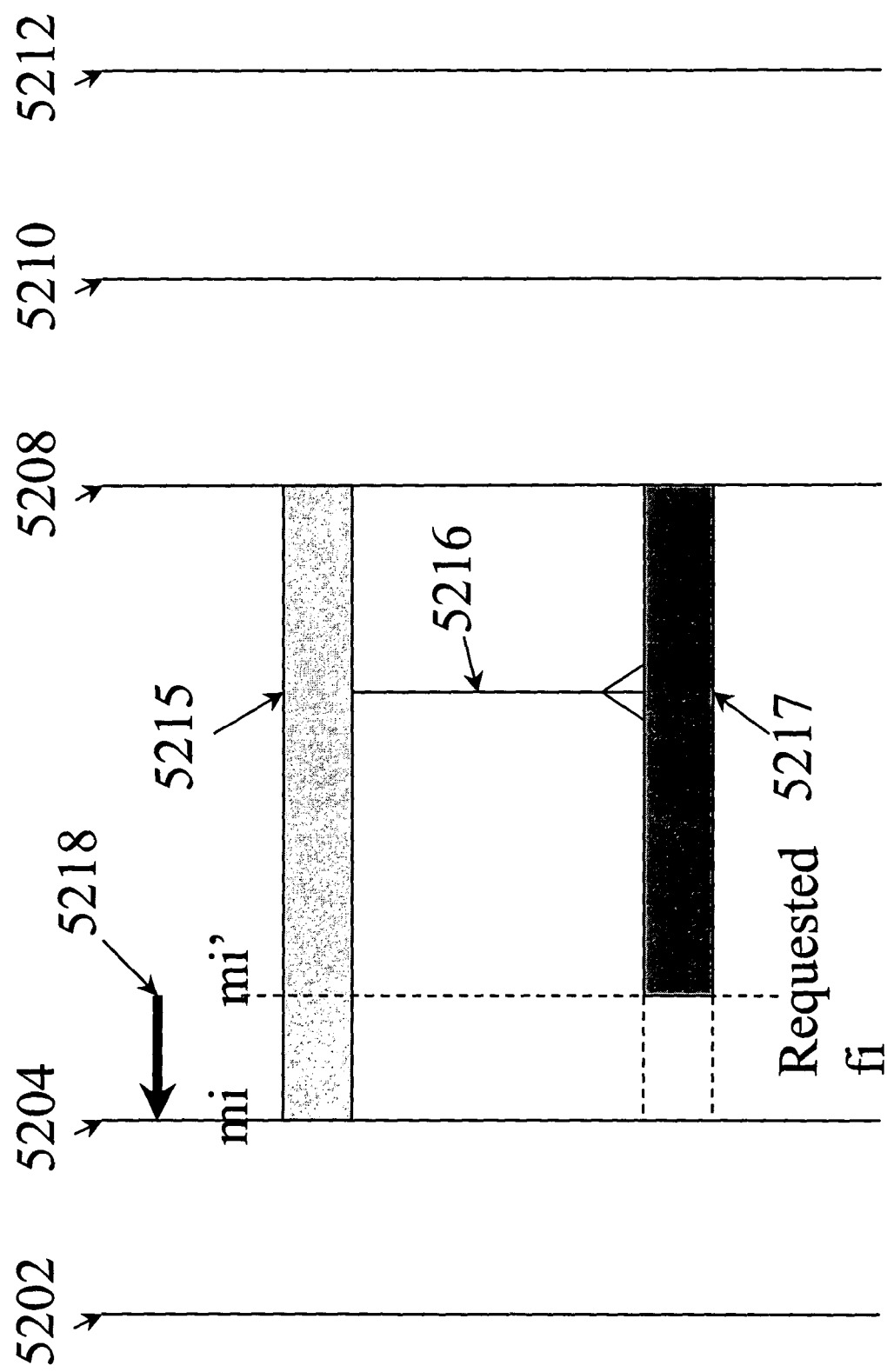
Figure 53:
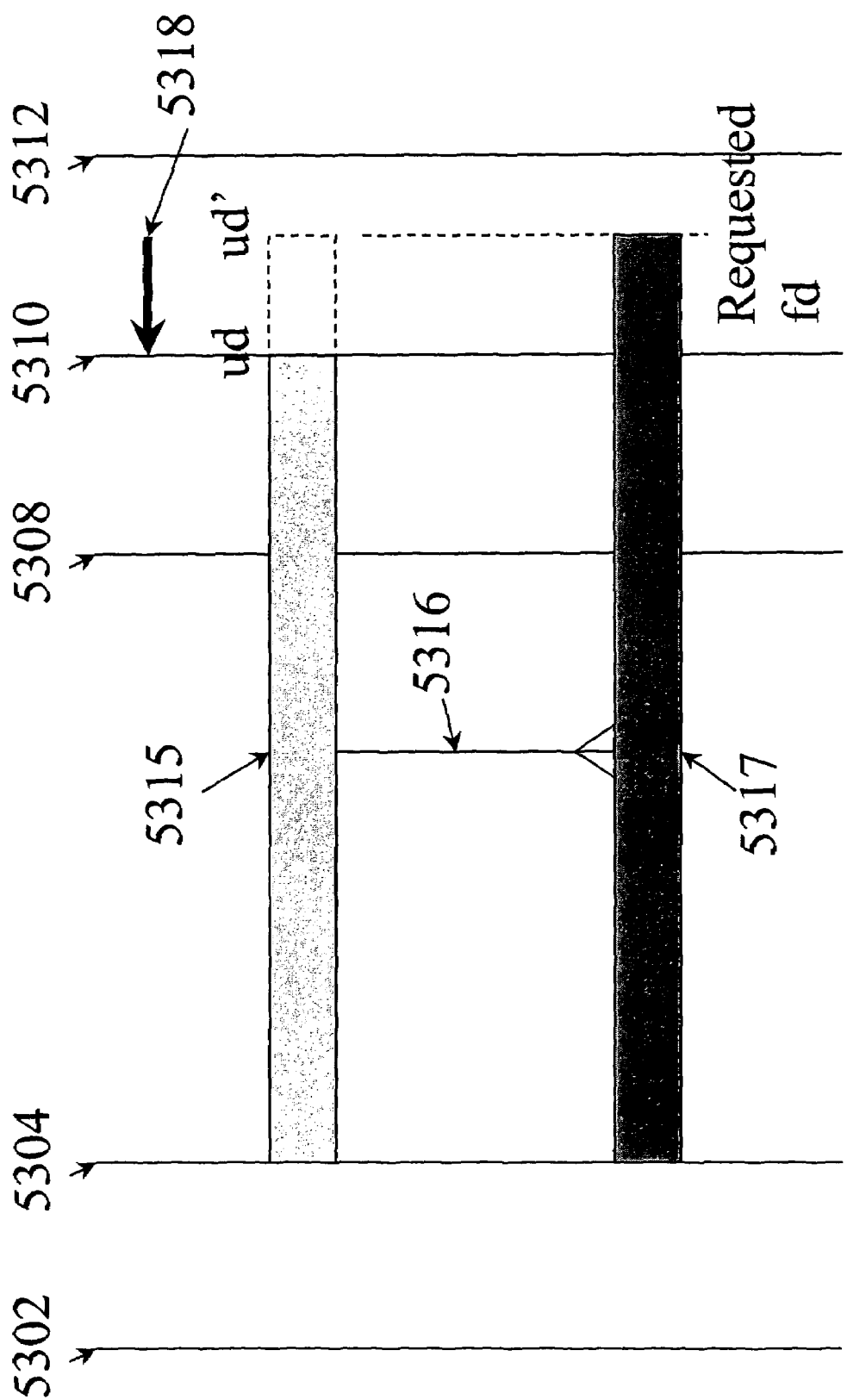
Figure 54:
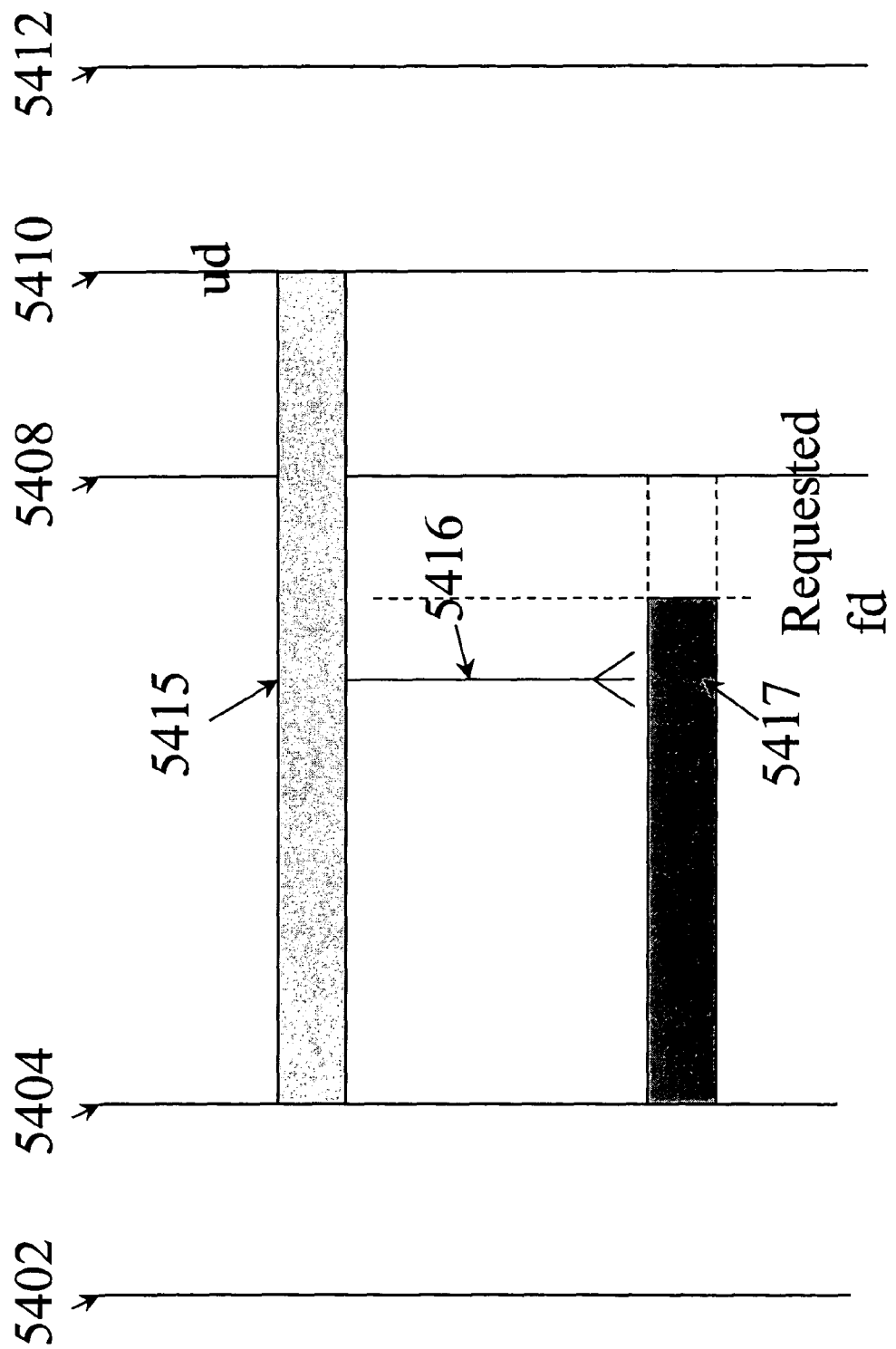
Figure 55:
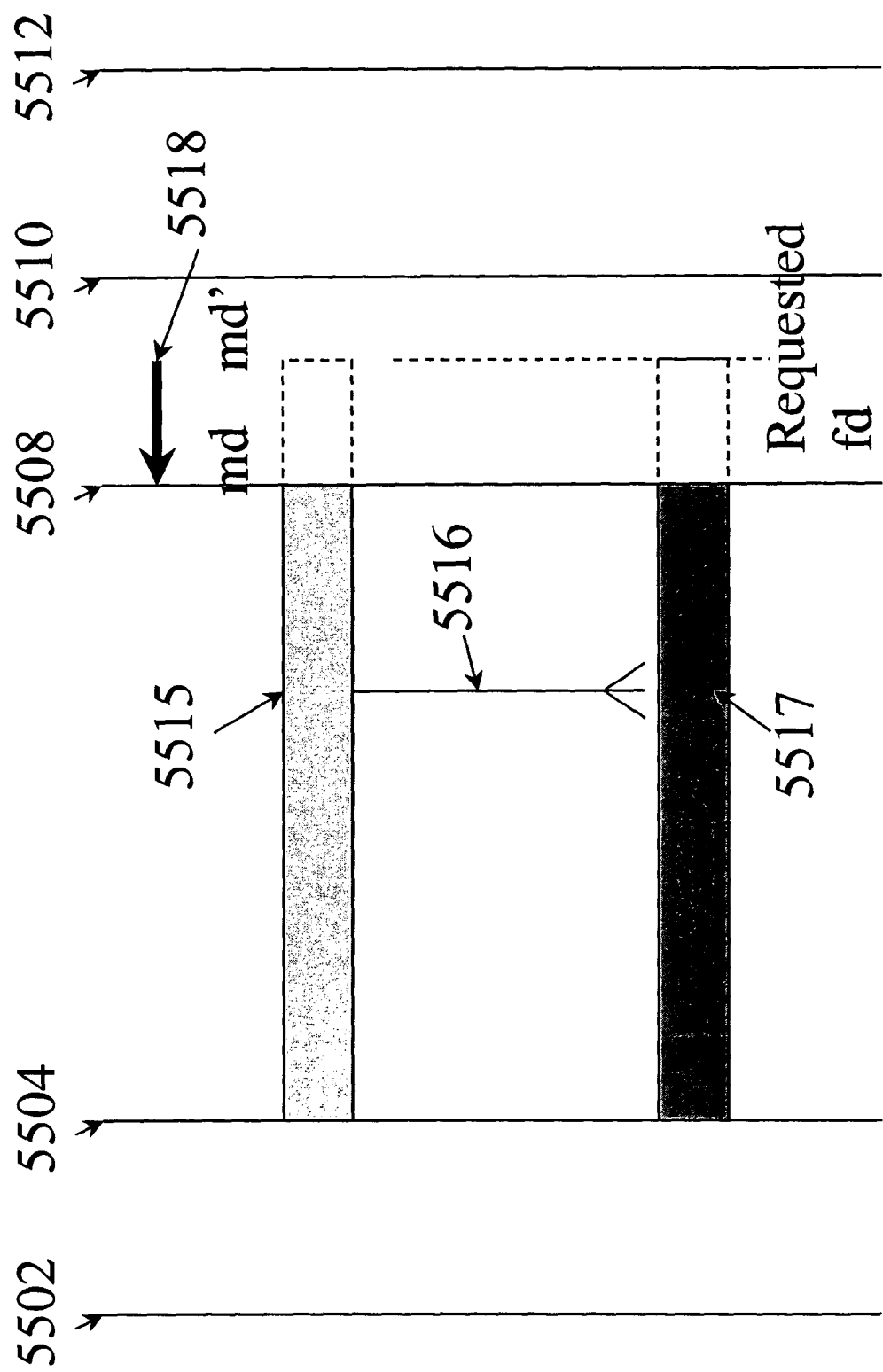
Figure 56:
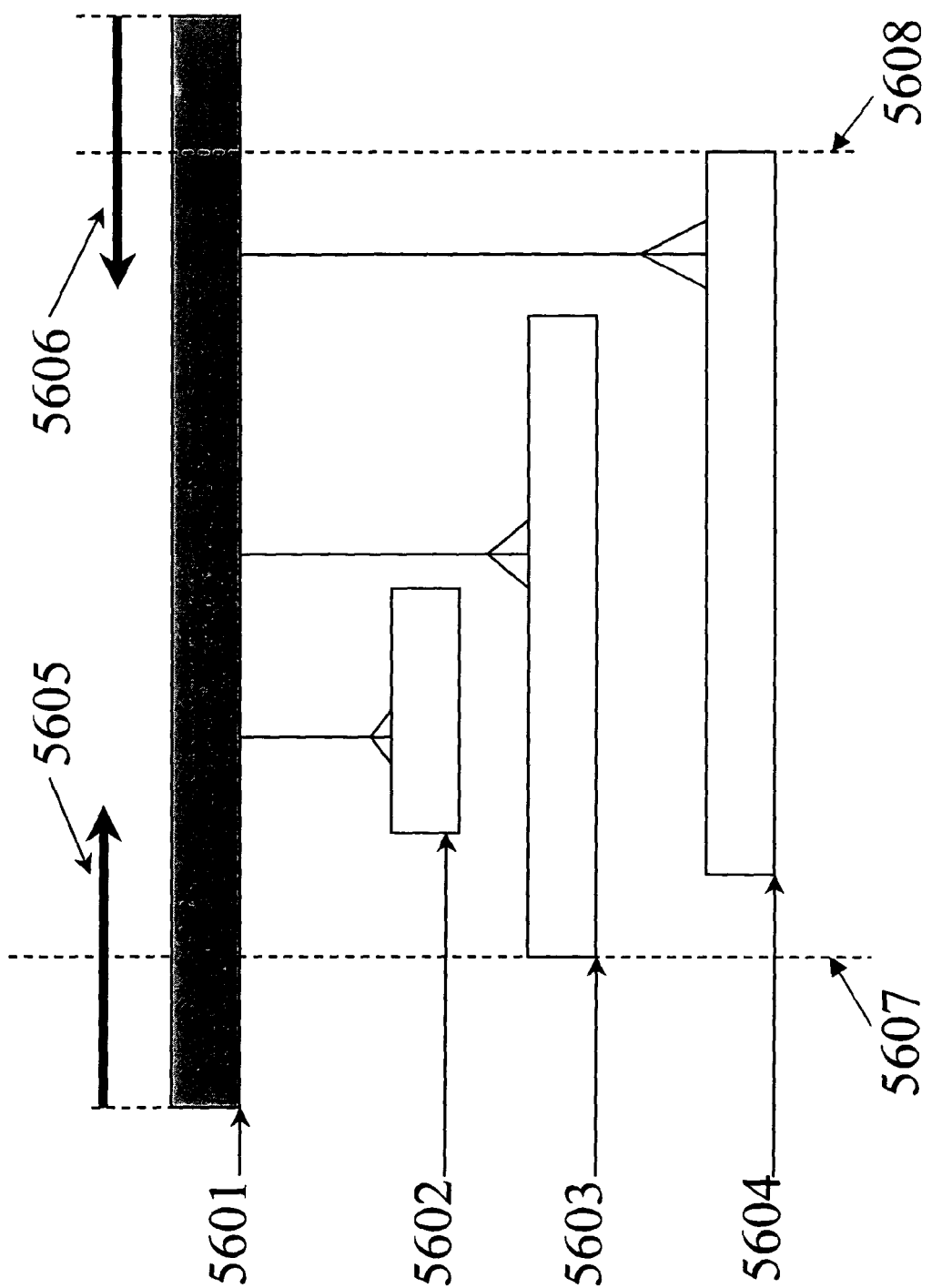
FIG. 56 shows how the Core Algorithm determines Referential Boundaries.
Figure 57:
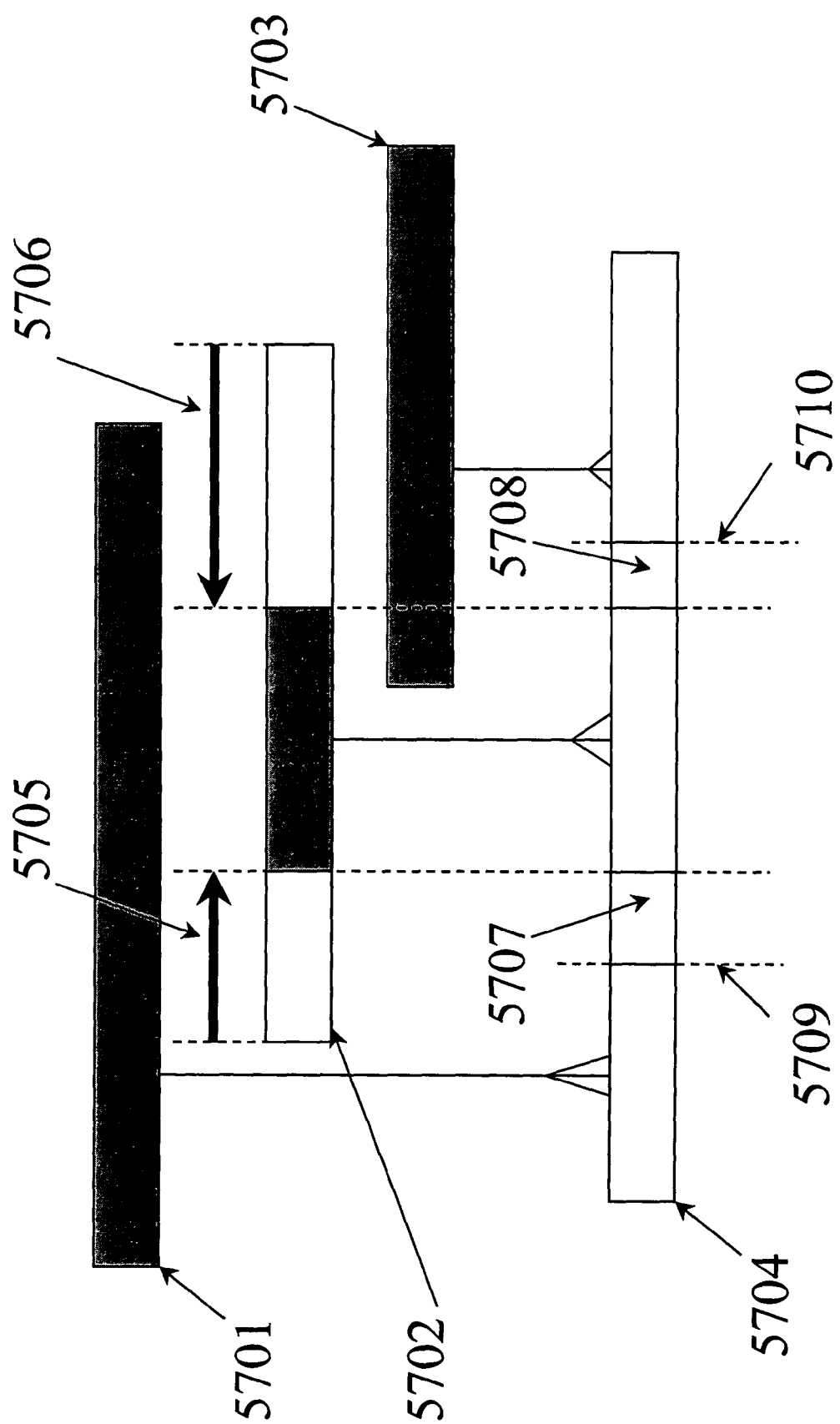
FIG. 57 shows how the Core Algorithm resolves Foreign Key gaps.
Figure 60:
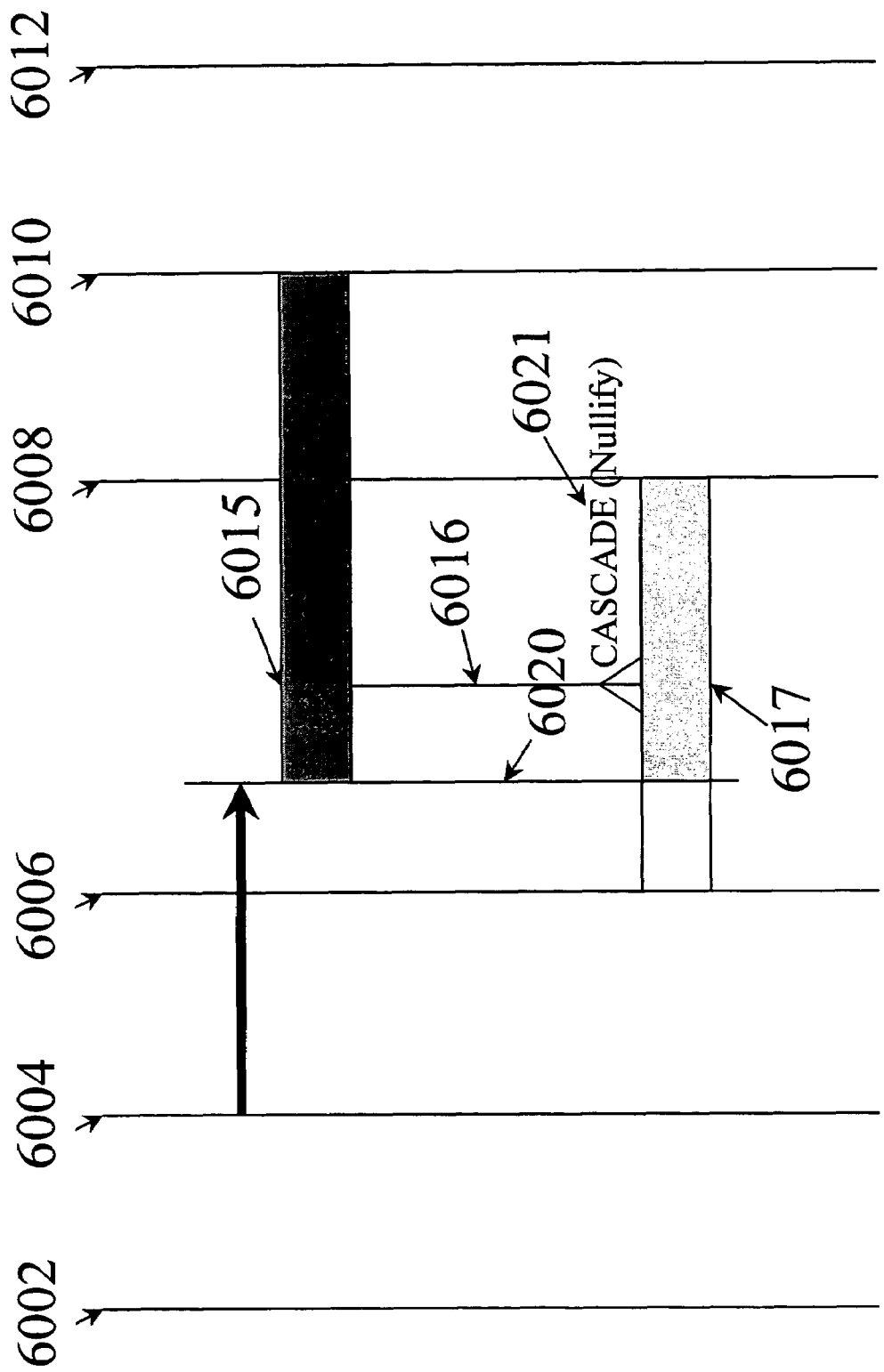
FIG. 60 shows the build instructions that can be followed to translate all rule cases described in FIGS. 61-87 into worked examples.
Figure 66:
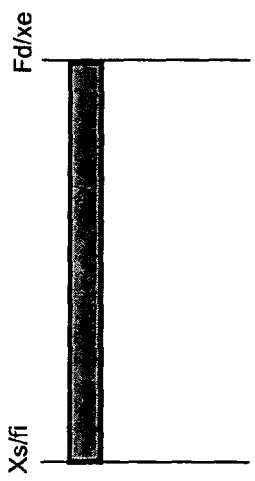
Figure 67:
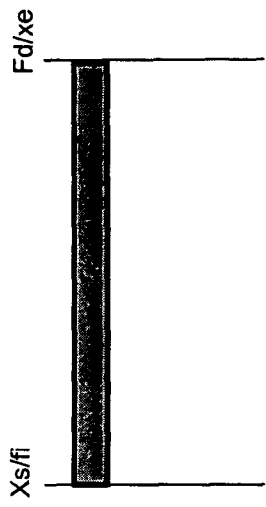
Figure 68A:
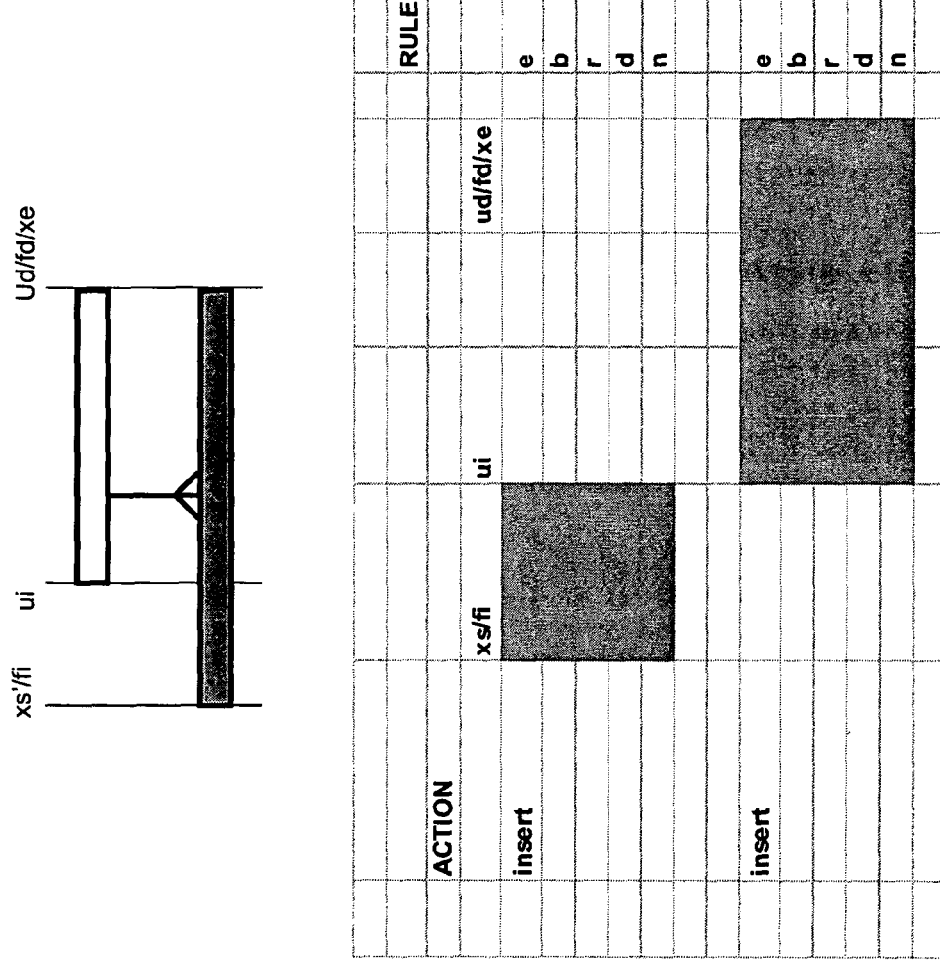
Figure 69:
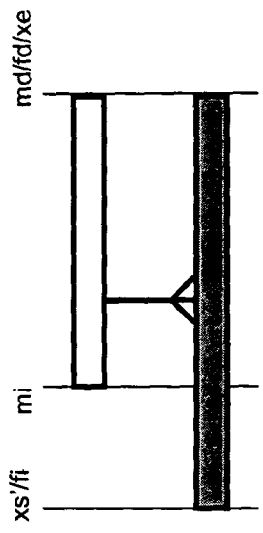
Figure 70A:
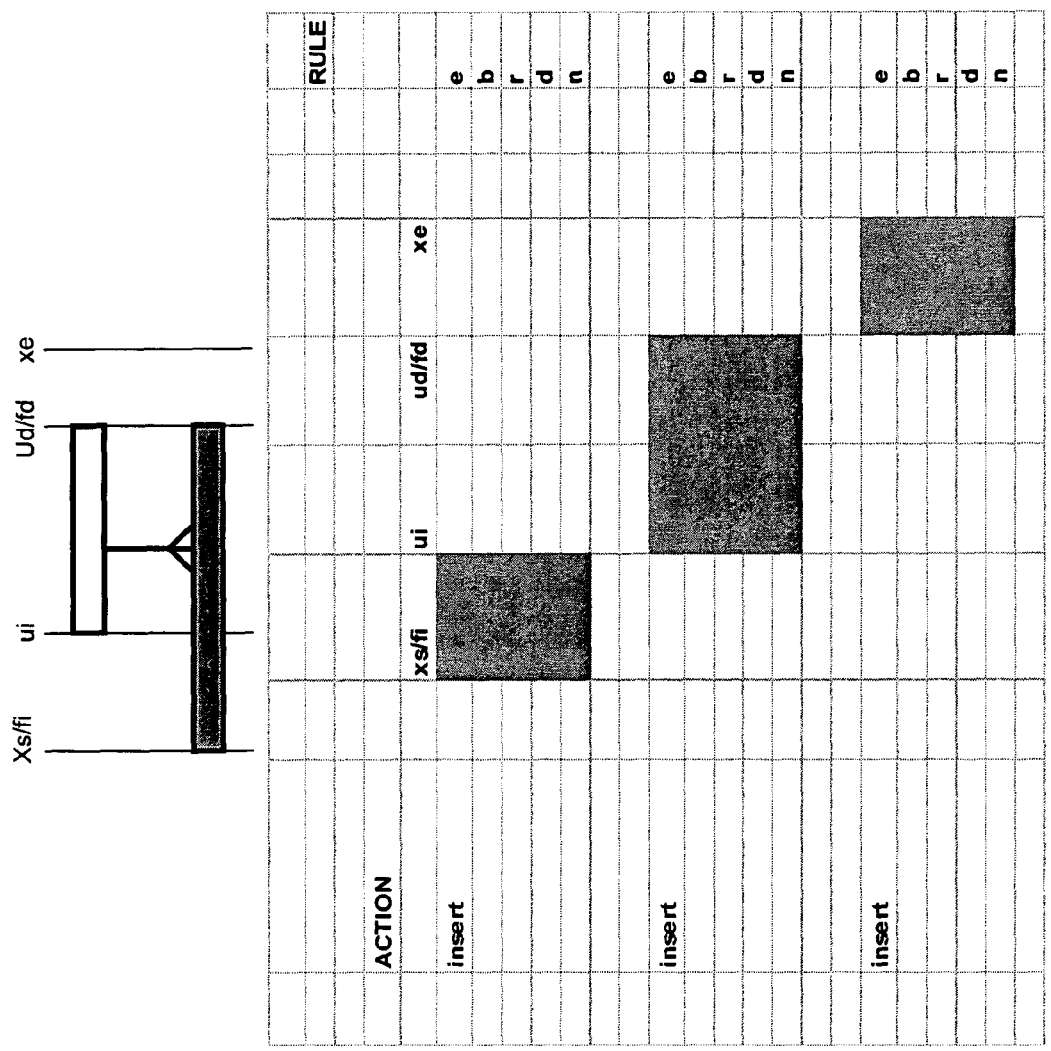
Figure 71:
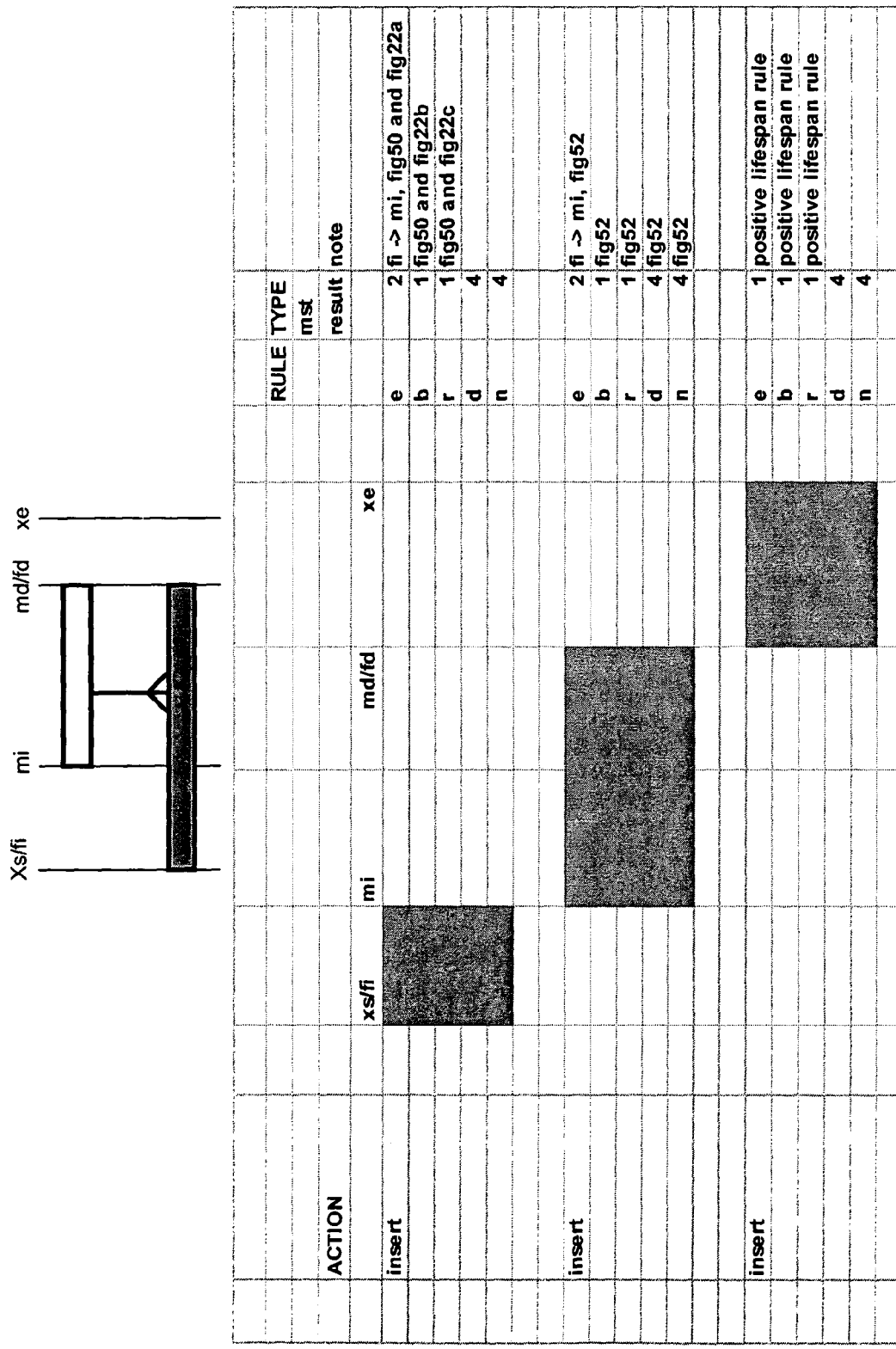
Figure 72A:
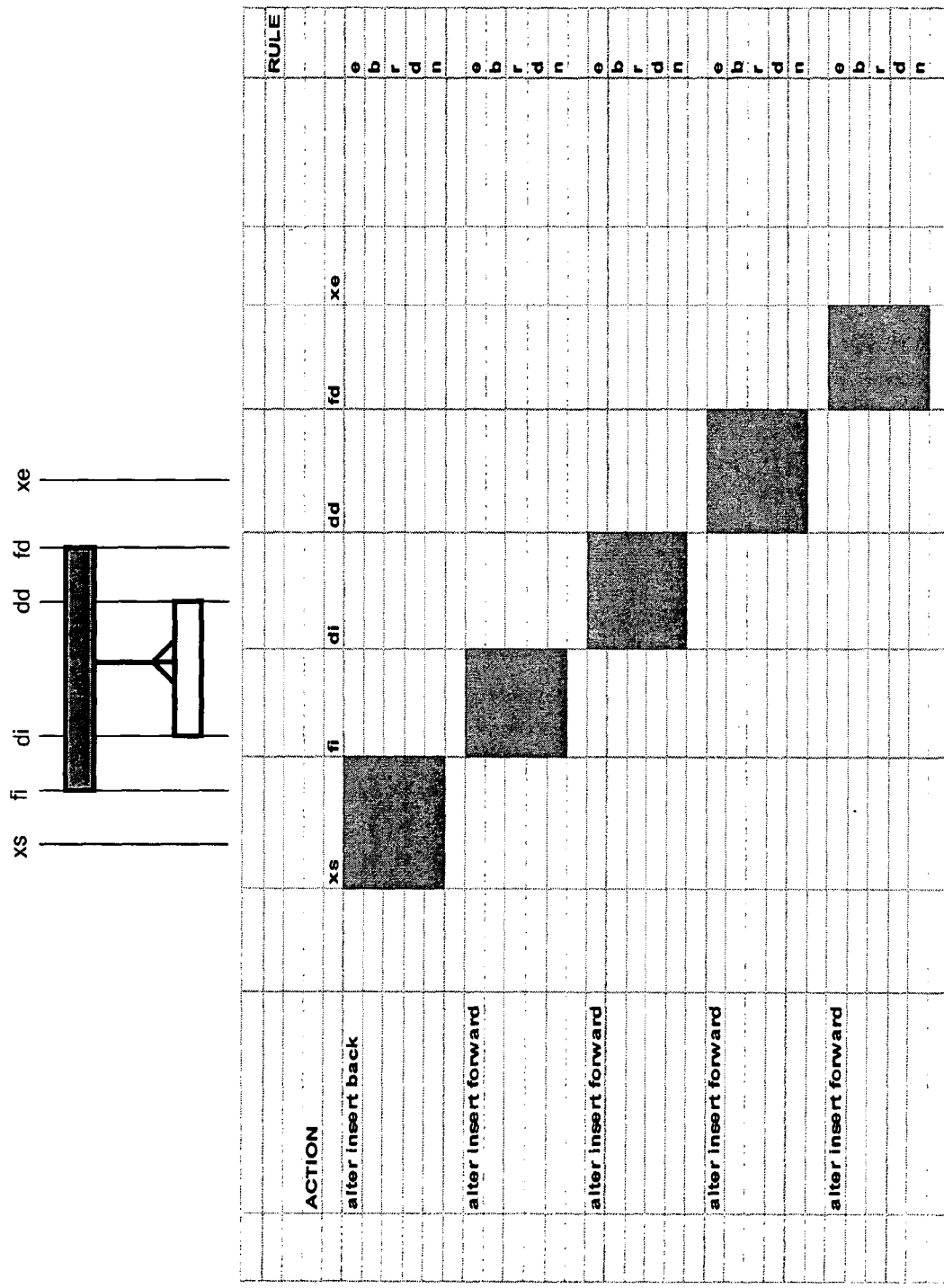
Figure 73:
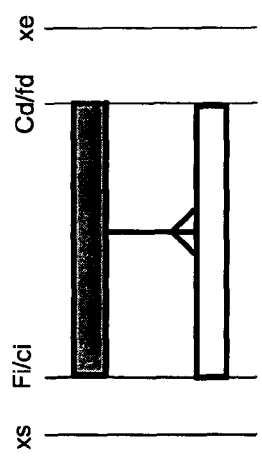
Figure 75:
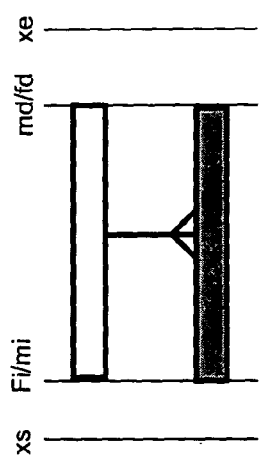
Figure 76A:
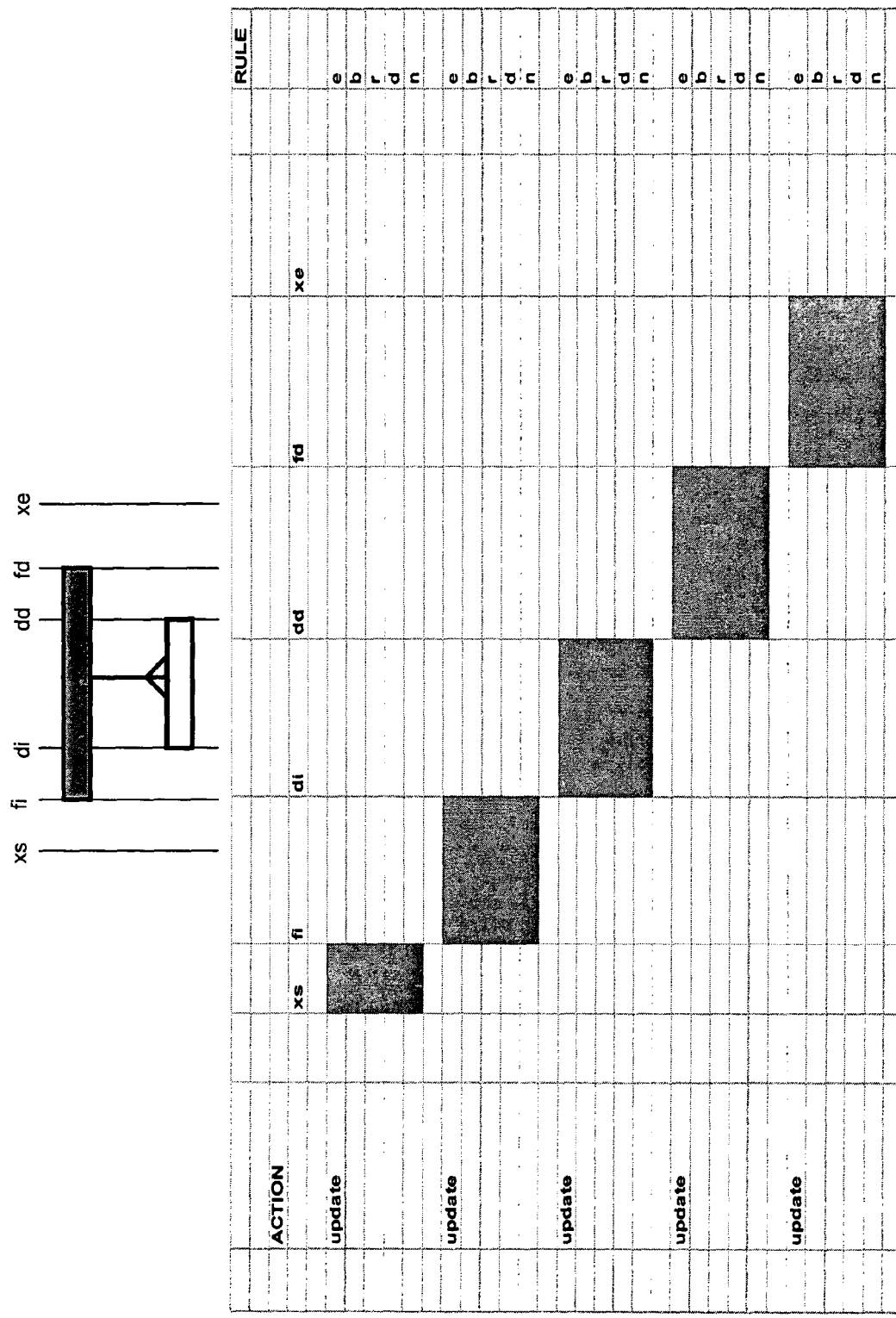
Figure 77A:
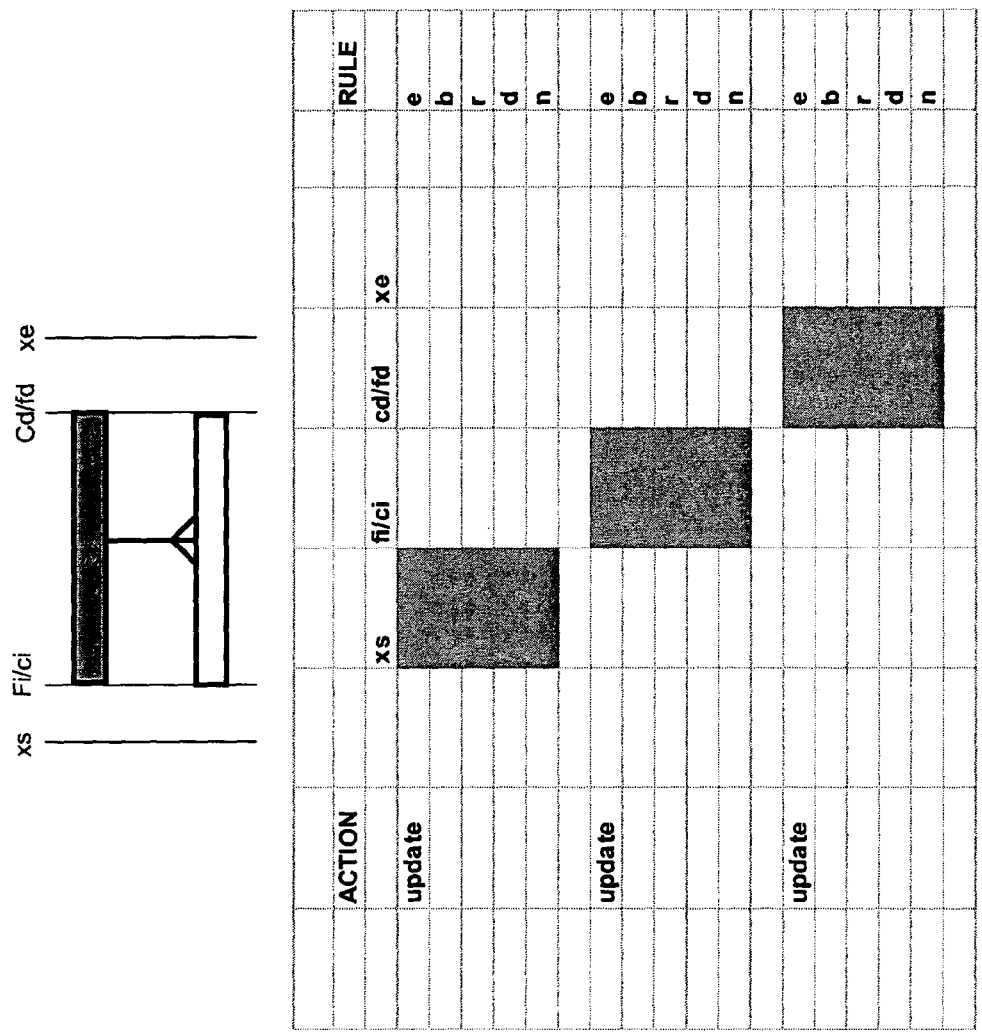
Figure 78A:
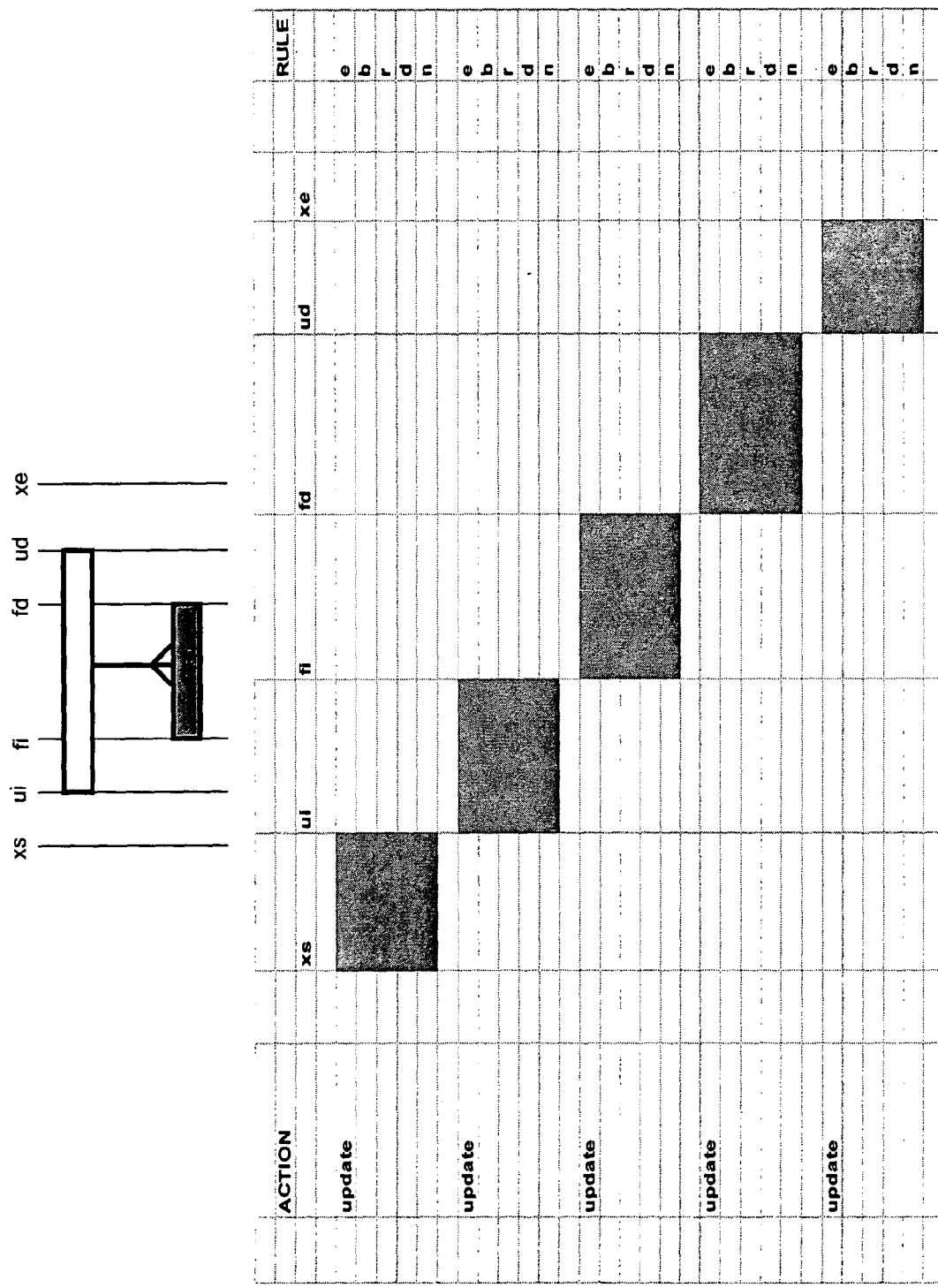
Figure 79:
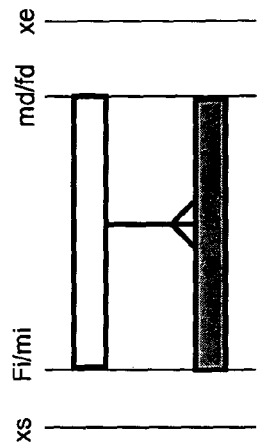
Figure 80:
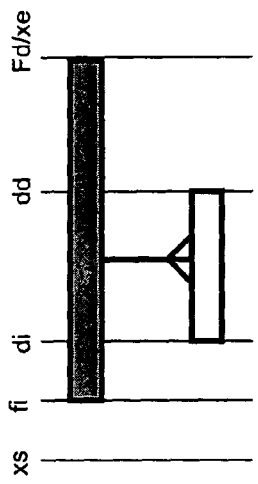
Figure 81:
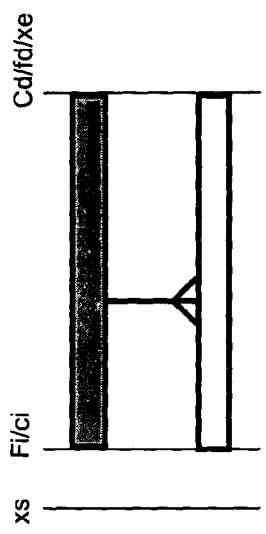
Figure 82:
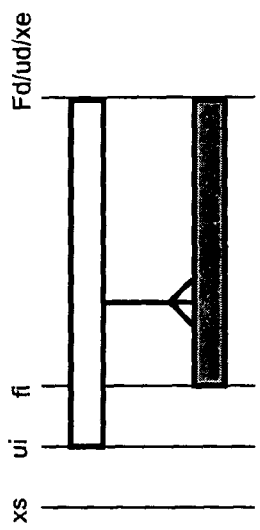
Figure 83:
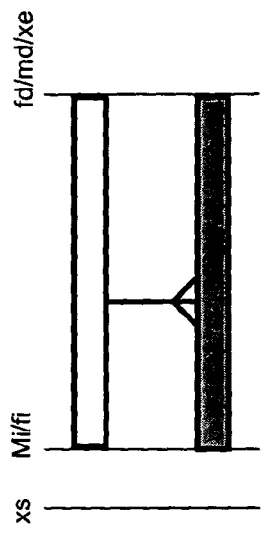
Figure 84A:
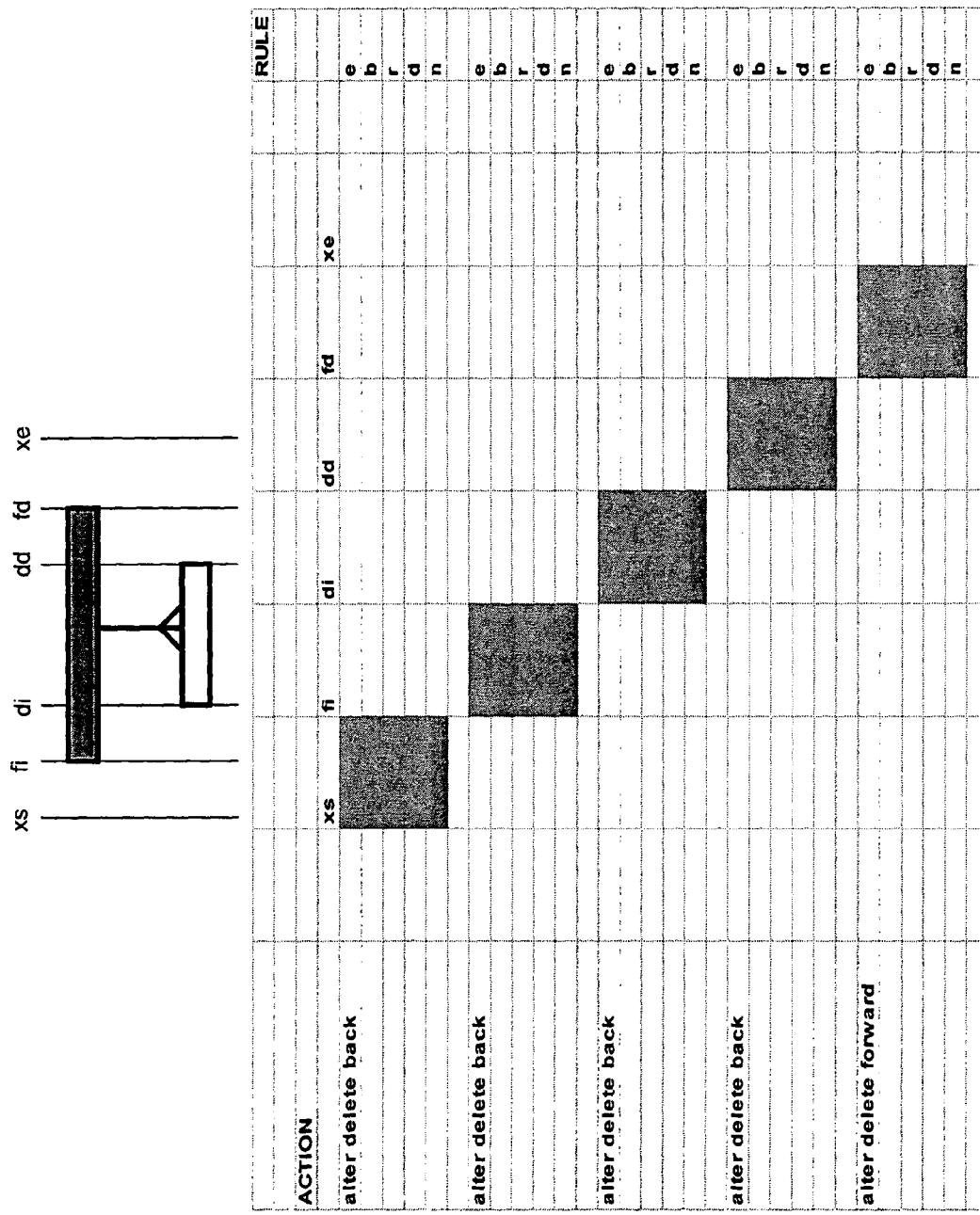
Figure 85:
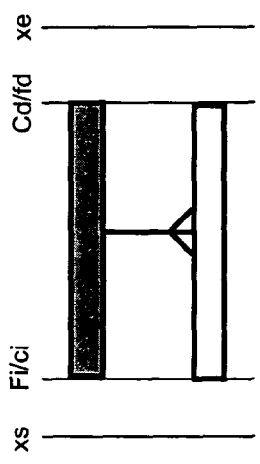
Figure 86A:
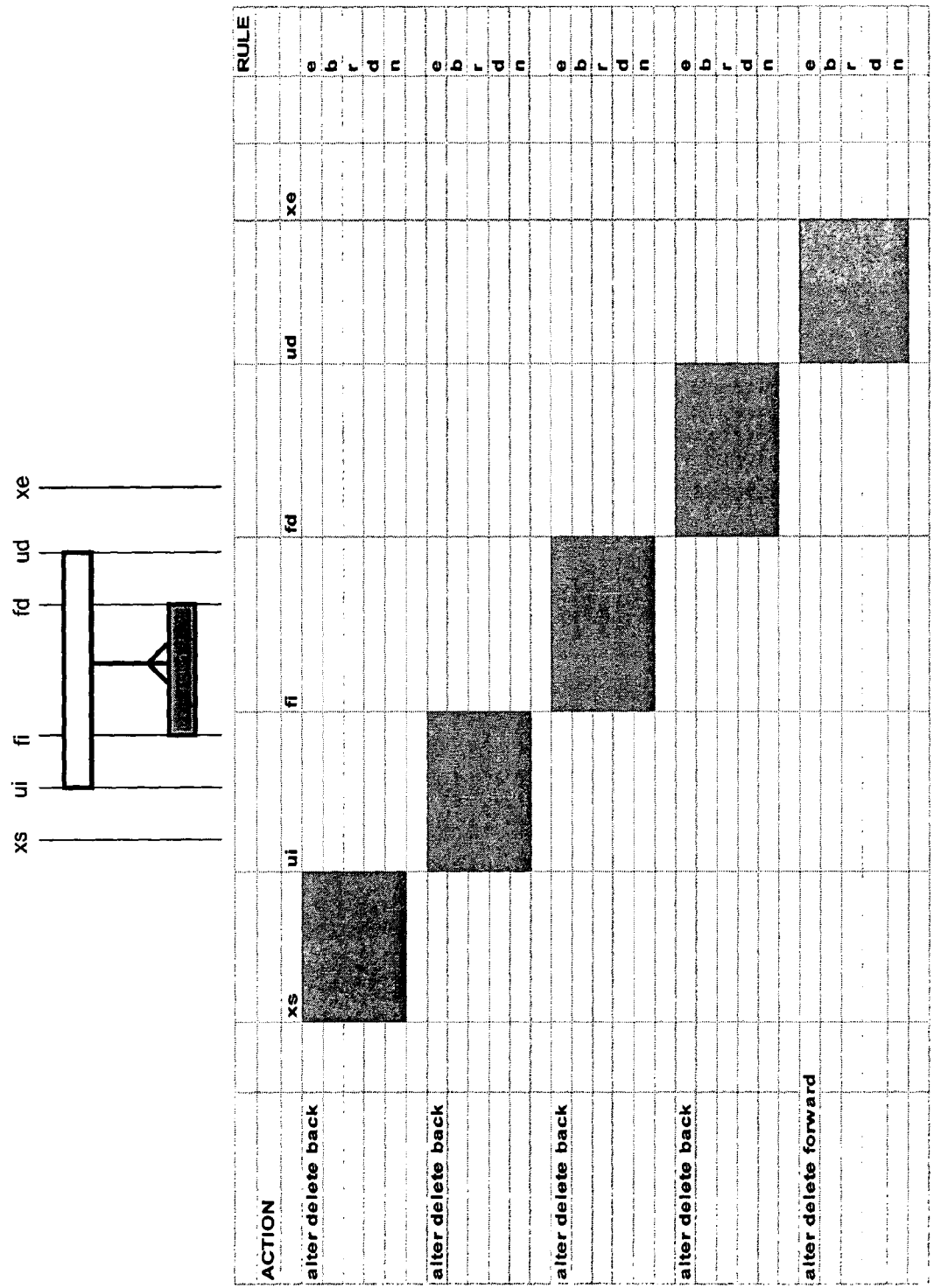

FIG. 2—The Scope of Time Cubes;

FIG. 3—All data in a Database is held in Time Cubes;

FIG. 4—Invention Components;

FIG. 5—Time is at the Core;

FIG. 6—The Focus Entity and its related entities;

FIG. 7a—Prior Art Time Related Data;

FIG. 7b—Time Related Data for this invention (with Start X-Time and End X-Time timestamps);

FIG. 7c—Time Related Data for this invention (with Start X-Time timestamp);

FIG. 7d—Time Cube with a 'flat' base;

FIG. 7e—Time Cube with a 'jagged' base;

FIG. 7f—Time Cube with a 'jagged' side;

FIG. 7g—Normalisation and the Temporal Normal Form;

FIG. 7h—Accessing data in the Temporal Database;

FIG. 8—Attribute Integrity Rules for Updateability;

FIG. 9—Attribute Integrity Rules for Transferability;

FIG. 10—Attribute Integrity Rules for Correctability;

FIG. 11—Attribute Integrity Rules for Optionality;

FIG. 12—Attribute Integrity Rules for Non Existence;

FIG. 13—Attribute Integrity Rules for Attribute Group Membership;

FIG. 14—Entity Integrity Rules for Co Terminacy;

FIG. 15—Entity Integrity Rules for Positive Lifespan;

FIG. 16a—Entity Integrity Rules for Attribution (Extend);

FIG. 16b—Entity Integrity Rules for Attribution (Default);

FIG. 16c—Entity Integrity Rules for Attribution (Nullify);

FIG. 17—The Temporal Splash;

FIGS. 18a to 18g—Attribute Level Locking in a statefull architecture;

FIGS. 18h to 18q—Attribute Level Locking in a stateless architecture;

FIG. 19—Enhanced concurrency though Attribute Level Locking;

FIG. 20—Worked Example of Alter Insert Back of focus entity with Downstream Relations (xs<requested fi<fi);

FIG. 21—Worked Example of Alter Insert Forward of focus entity with Downstream Relations (fi<requested fi<di);

FIG. 22a—Worked Example of Alter Insert Forward of focus entity with Downstream Relations resulting in a cascade (extend) rule (di<requested fi<dd);

FIG. 22b—Worked Example of Alter Insert Forward of focus entity with Downstream Relations resulting in a bounded rule (di<requested fi<dd);

FIG. 22c—Worked Example of Alter Insert Forward of focus entity with Downstream Relations resulting in a restrict rule (di<requested fi<dd);

FIG. 22d—Worked Example of Alter Insert Forward of focus entity with Downstream Relations resulting in a cascade (default) rule (di<requested fi<dd);

FIG. 22e—Worked Example of Alter Insert Forward of focus entity with Downstream Relations resulting in a cascade (nullify) rule (di<requested fi<dd);

FIG. 23a—Worked Example of Alter Insert Forward of focus entity with Downstream Relations resulting in a cascade rule (dd<requested fi<fd);

FIG. 23b—Worked Example of Alter Insert Forward of focus entity with Downstream Relations resulting in a bounded rule (dd<requested fi<fd);

FIG. 23c—Worked Example of Alter Insert Forward of focus entity with Downstream Relations resulting in a restrict rule (dd<requested fi<fd);

FIG. 23d—Worked Example of Alter Insert Forward of focus entity with Downstream Relations resulting in a cascade (default) rule (dd<requested fi<fd);

FIG. 23e—Worked Example of Alter Insert Forward of focus entity with Downstream Relations resulting in a cascade (nullify) rule (dd<requested fi<fd);

FIG. 24—Worked Example of Alter Insert Forward of focus entity with Downstream Relations (fd<requested fi<xe);

FIG. 25—A comprehensive set of Actions and Rules defined and implemented;

FIG. 26—A common computer database arrangement;

FIG. 27—A common computer network;

FIG. 28—Comparison of two data sets;

FIG. 29—Reporting in X-Time and Y-Time;

FIG. 30—Reporting in X-Time and Y-Time;

FIG. 31—Backup and Recovery;

FIG. 32—Application migration from existing applications;

FIG. 33—System Parameters;

There are no FIGS. 34-49;

FIG. 50—Resolving Upstream Temporal Splash for Insert or Alter Insert of Upstream or Master Relation where requested Focus Insert time<Upstream or Master Insert time;

FIG. 51—Resolving Upstream Temporal Splash for Insert or Alter Insert of Upstream Relation where requested Focus Insert time>=Upstream Insert time;

FIG. 52—Resolving Upstream Temporal Splash for Insert or Alter Insert of Master Relation where requested Focus Insert time>=Master Insert time;

FIG. 53—Resolving Upstream Temporal Splash for Delete or Alter Delete of Upstream or Master Relation where requested Focus Delete time>Upstream or Master Delete time;

FIG. 54—Resolving Upstream Temporal Splash for Delete or Alter Delete of Upstream Relation where requested Focus Delete time>=Upstream Delete time;

FIG. 55—Resolving Upstream Temporal Splash for Delete or Alter Delete of Master Relation where requested Focus Delete time<=Master Delete time;

FIG. 56—Determining Referential Boundaries;

FIG. 57—Resolving Foreign key gaps;

FIG. 58—Psuedo code for the Referential Integrity Rules;

FIG. 59—Psuedo code for the Core Algorithm;

FIG. 60—Build Instructions for Action-Result diagrams;

FIG. 61—Types of Relations;

FIG. 62—Relational Rules;

FIG. 63—Time Point Descriptions;

FIG. 64—Types of Relational Actions;

FIG. 65—Types of Relational Results;

FIG. 66—Insert of a Focus Entity with Downstream Relations;

FIG. 67—Insert of a Focus Entity with Child Relations;

FIG. 68A and FIG. 68B—Insert of a Focus Entity with a non deleted Upstream Relation;

FIG. 69—Insert of a Focus Entity with a non deleted Master Relation;

FIG. 70A and FIG. 70B—Insert of a Focus Entity with a deleted Upstream Relation;

FIG. 71—Insert of a Focus Entity with a deleted Master Relation;

FIGS. 72a and 72b—Alter Insert of a Focus Entity with Downstream Relations;

FIG. 73—Alter Insert of a Focus Entity with Child Relations;

Figure 74A:
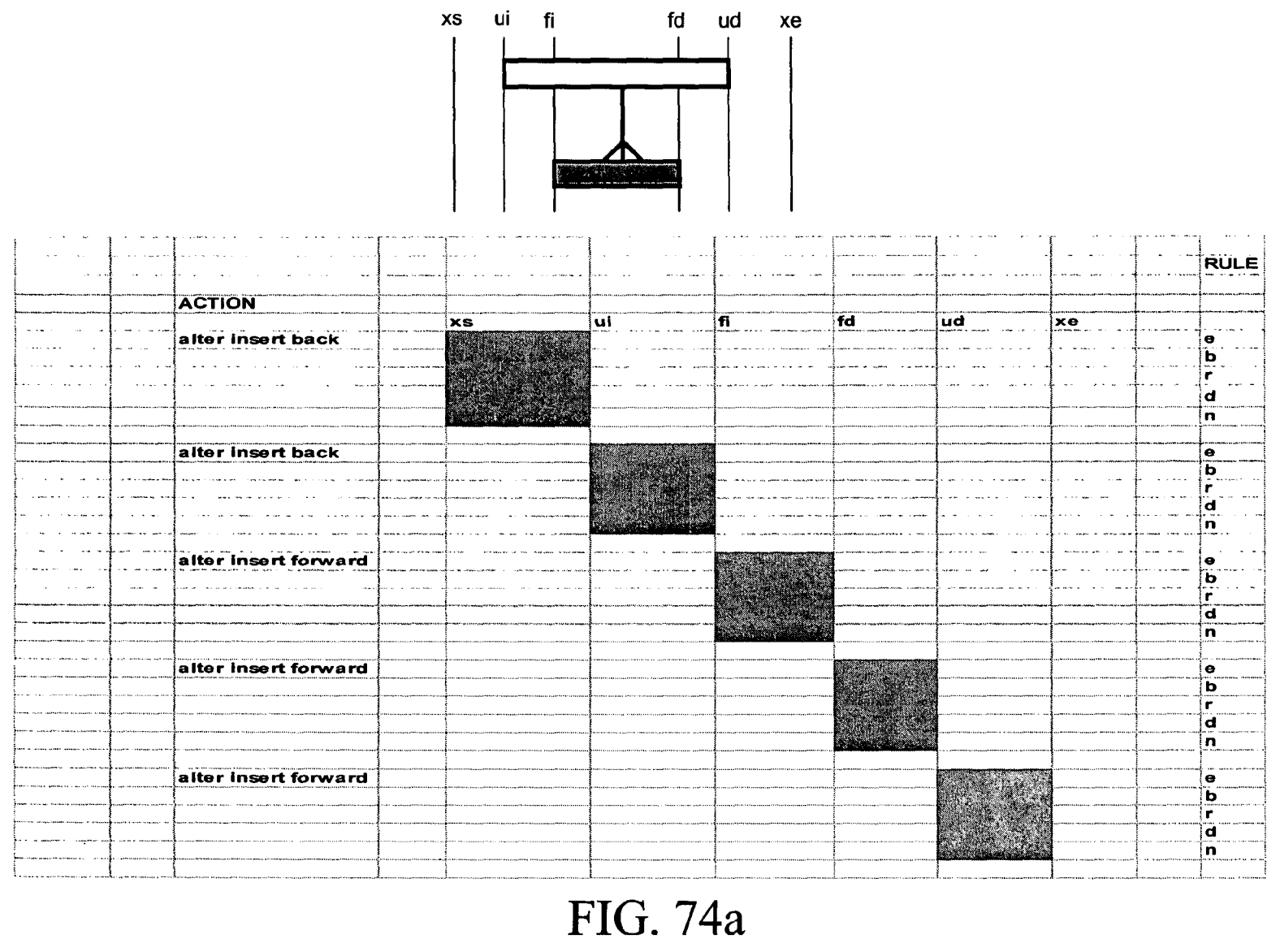

FIGS. 74a and 74b—Alter Insert of a Focus Entity with Upstream Relations;

FIG. 75—Alter Insert of a Focus Entity with a Master Relation;

Figure 76B:
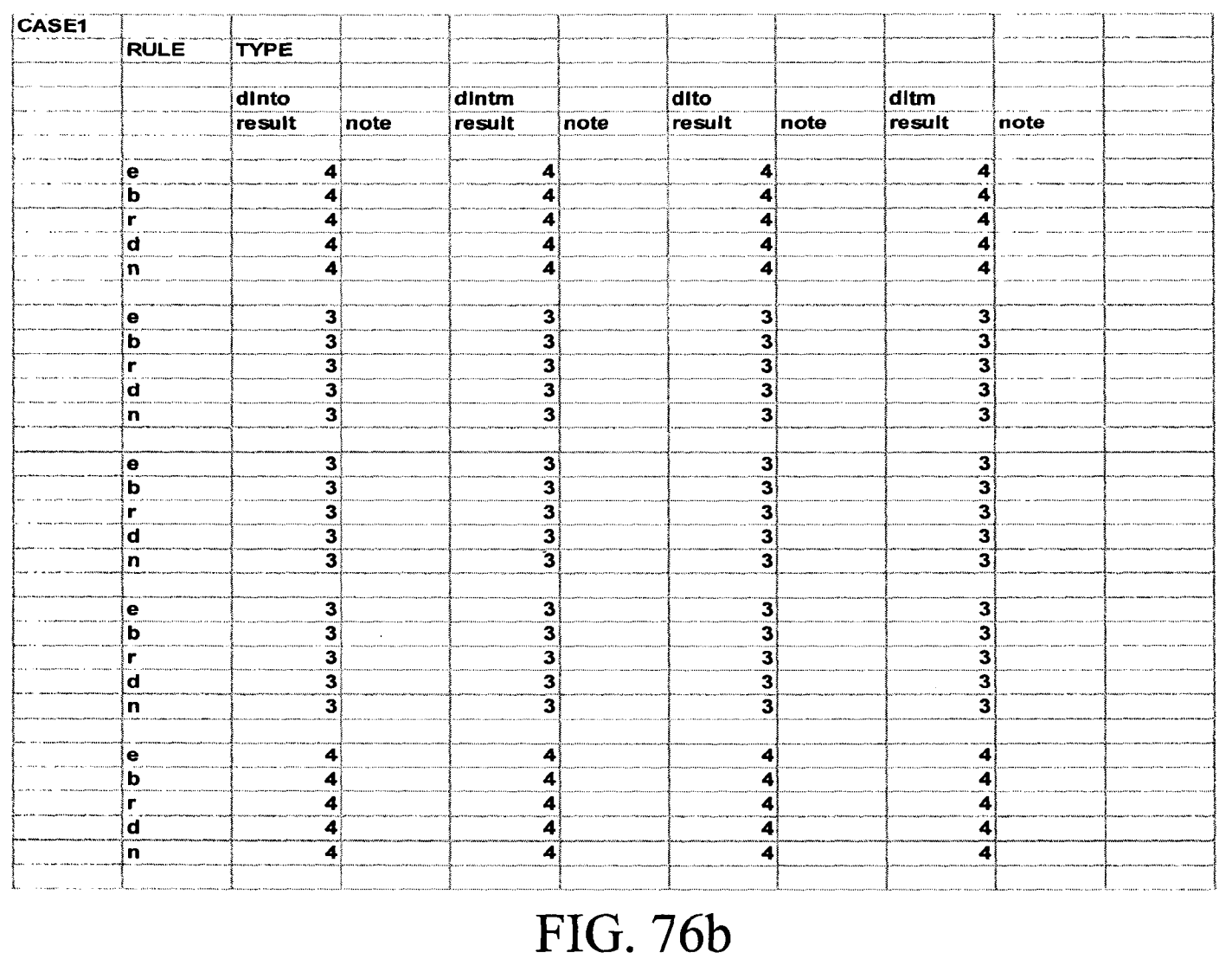
Figure 76C:
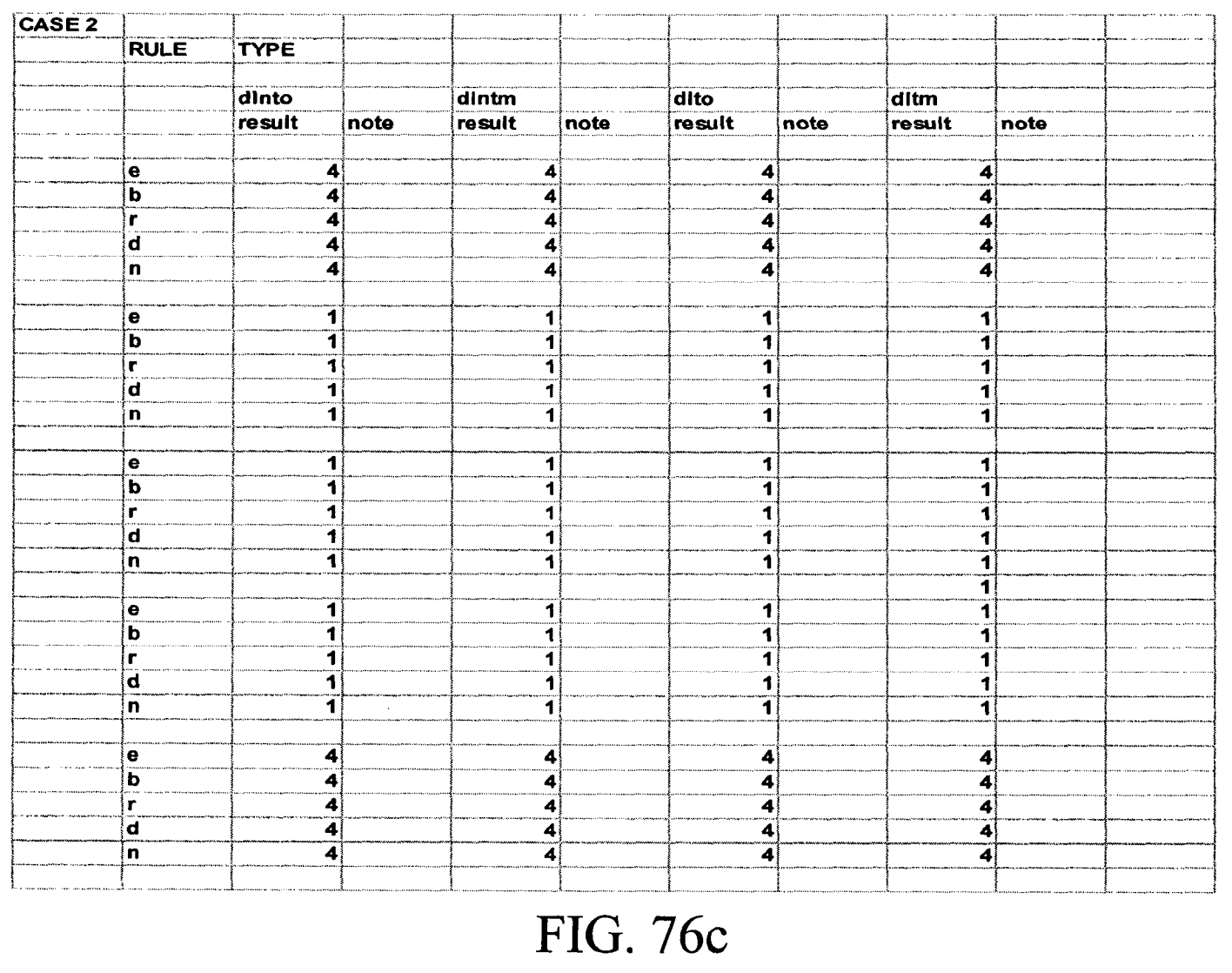

FIGS. 76a, 76b and 76c—Update of a Focus Entity with Downstream Relations;

FIG. 76b represents the result actions for Case 1;

FIG. 76c represents the result actions for Case 2;

FIGS. 77a, 77b and 77c—Update of a Focus Entity with Child Relations;

FIG. 77b represents the result actions for Case 1;

FIG. 77c represents the result actions for Case 2;

FIGS. 78a and 78b—Update of a Focus Entity with Upstream Relation;

FIG. 79—Update of a Focus Entity with a Master Relation;

FIG. 80—Delete of a Focus Entity with Downstream Relations;

FIG. 81—Delete of a Focus Entity with Child Relations;

FIG. 82—Delete of a Focus Entity with Upstream Relations;

FIG. 83—Delete of a Focus Entity a Master Relation;

FIGS. 84a and 84b—Alter Delete of a Focus Entity with Downstream Relations;

FIG. 85—Alter Delete of a Focus Entity with Child Relations;

FIGS. 86a and 86b—Alter Delete of a Focus Entity with Upstream Relation; and

Figure 87:
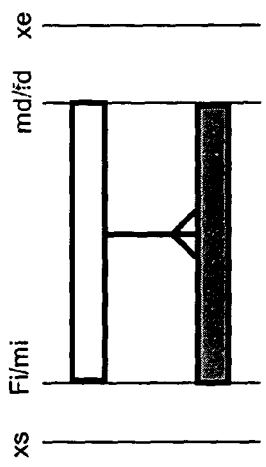

FIG. 87—Alter Delete of a Focus Entity with a Master Relation.

NEW APPROACH

The new approach described in this invention avoids the complexities of existing research and, unlike existing research, is able to provide a framework for a complete implementation of a multi entity system i.e. a relationally consistent, time based system. It is to be noted that this invention is relevant to all database systems, such as hierarchical and object-oriented systems, and that the invention is not restricted solely to relational database systems.

Prior art attempts to address the problems that arise when temporal facility is introduced into existing data models through a combination of query language extensions, modifications to data models and/or additional application code. The prior art does not comprehensively address the issues of Attribute integrity, Entity integrity and Relational integrity from a temporal perspective. This invention comprehensively addresses these issues with its unique approach to temporal modelling.

Referring now to FIG. 1, the key to achieving this breakthrough is the realisation that existing theories are struggling because they allow update and delete actions to be performed on data. This invention avoids such complexities since updates and deletes are implemented as inserts into a Summary Position 112, 114, 116 held in a Time Cube i.e. an Insert-only model. This invention defines a Core Algorithm used by the system to build the next Summary Position as each event (insert, update, delete) occurs. A Summary Position is a collection of objects that defines all the attribute values of an entity over X-Time. The Time Cube is structure for holding all Summary Positions for an entity. The Core Algorithm makes reference to rules defined in a Temporal Data Dictionary to ascertain how the objects in the Summary Position are created. This invention ensures that the integrity of the system data at attribute, entity and referential levels is maintained as each event occurs. Once this approach is adopted the complexity that is holding back progress in the current research is greatly simplified.

Referring now to FIGS. 7a, 7b and 7c whereas other research holds a time related data for each TUPLE 705 or each ATTRIBUTE 706, this invention, depicted in FIG. 7b and FIG. 7c, holds a time related data for each ATTRIBUTE VALUE 707 over the lifespan of the entity. One option in this invention is that the time related data held for each ATTRIBUTE VALUE 707 are START X-Time 708, END X-Time 709 and Y-Time 710 as depicted in FIG. 7b. Another option in this invention is that the time related data held for each ATTRIBUTE VALUE 707 are START X-Time 711 and Y-Time 712 as depicted in FIG. 7b. Referring now to FIG. 7h, as application events 720 (insert, update, delete or select) occur on the application data 721 (columns and rows in Tables and/or Views) the Time Cube 722 is populated with a new Summary Position for each affected attribute of an entity. The conceptual model of the Time Cube is implemented in underlying the Physical data model as a set of 2 dimensional objects 723 which are manipulated only by insert and select events 724. Referring now to FIG. 4, the current state of an entity at any point in, or over, a period of X-Time is completely defined by a set of objects in a Summary Position 407 held in a Time Cube 408. The Core Algorithm 406, with reference to rules in the Temporal Data Dictionary 410, is responsible for the creation of the next Summary Position 407 thereby ensuring that the integrity of data in the system is intact after each event has occurred.

Inserting new Summary Positions as events occur means that the all complexities in prior art research caused by update and delete actions do not affect this invention. The key to implementing a practical and comprehensive time-relational system is to adopt this unique Insert Only approach in combination with the Core Algorithm to create a Summary Position held in a Time Cube. Naturally, the logical update and delete actions are still needed, however they are implemented with physical inserts into the database.

The invention considers the first principles of database theory and incorporates time as a fundamental element. This allows us to take the theory of temporal database design research in a new direction that ultimately avoids the theoretical and practical problems associated with current research.

We note that some concepts are common between the new approach in this invention and existing research. For example the concepts of a BiTemporal Conceptual Data Model (BCDM), temporal relations, valid time, and transaction time are found in both approaches.

Additionally, referring now to FIGS. 1 and 4, the invention has developed new concepts including X-Time 102, Y-Time 128, Temporal Referential Tree 409, Temporal Data Dictionary 410, Summary Positions 407, the Core Algorithm 406 and the Time Cube 408. This invention includes a complete set of integrity rules on which to build a temporal database management system and is supported by a comprehensive analysis of all events and their potential outcomes at attribute, entity and relational levels.

ASPECTS OF THE INVENTION

There now follows a description of aspects of this invention.

Computer Database Arrangement

FIG. 26 shows a common computer database arrangement of the type generally contemplated for practice of the present invention. The Figure shows 2602 as the Central Processing Unit, 2606 as the unit providing input and output facilities, 2604 as computer memory, 2608 as the computer database and 2603 as the communication facility which enables interaction between the different units comprising the computer system.

Computer Network

FIG. 27 shows a common computer network 2701 such as a Wide Area Network, Metropolitan Area Network, Local Area Network, the Internet etc across which data is transmitted between geographically dispersed, network connected computer units 2702. These units comprise, but are not limited to, terminal units, PC workstations, mainframes, file servers, data warehouses, other networks, and web servers. The network may be delivered over a variety of different communication media such as physical cables and wireless or satellite communications. Additionally, the concept of the network can incorporate both terrestrial and satellite communications to digital audio and video units such as radio and television units. The invention is designed to be applicable in all such environments.

Insert Only Model

One feature of many aspects of this invention is the premise that using an Insert Only model allows us to introduce Time as a fundamental element of a system. Application events i.e. Inserts, Updates and Deletes are implemented as Insert actions into a Summary Position held within a Time Cube.

Compared to an update or delete action, the insert action is far less memory and processor intensive. There are many constructs found in the core code of existing database systems that are required because of the update and deletion of data. A key feature of this aspect of the invention is that the only action performed on the data is an Insert and therefore the traditional core code constructs e.g. database buffer cache, redo log files, rollback segments, required to support concepts such as concurrency, locking and multi version read consistency are greatly simplified or not required.

The granularity at which this invention holds objects and the associated time related data is at the Attribute Value level therefore prior art methodologies that exist to provide row level locking can now be reused to provide attribute level locking in some aspects of the invention. This invention describes a methodology for attribute level locking for both statefull architectures (e.g. client/server) and stateless architectures (e.g. internet).

Time is at the Core

FIG. 5 depicts how according to at least one aspect the invention uses time as the core reference driver for all information within the system. Additionally, FIG. 5 supports the idea that all changes in information i.e. the logical update, deletion or insertion data is accommodated through the insert only model.

Temporal Splash

One feature of many aspects of this invention is the Temporal Splash depicted in FIG. 17. The Temporal Splash is a term used to describe the how events acting on a focus entity effect all related entities. This ripple down effect through child and downstream relations is called the Temporal Splash.

When a system event occurs (i.e. Insert, Alter Insert Forward, Alter Insert Back, Update, Delete, Alter Delete Forward or Alter Delete Back) on a focus entity 1701 the referential effects of that event are determined by the core algorithm. If the effects of an event were allowed to travel both upstream and downstream of the focus entity then the consequences would ripple through the system resulting in either a never ending loop of actions or disallowed action.

In order to prevent such a situation occurring, the Core Algorithm does not allow the effects of an event to travel Upstream of the Focus Entity. The Core Algorithm translates any Upstream effects into an equivalent Downstream effect 1702, 1703 according to rules declared in the Temporal Data Dictionary. The details of how the Upstream effect is translated to the equivalent Downstream effect is depicted in FIGS. 50, 51, 52, 53, 54 and 55 and described in the associated text later in this document.

Invention Components

FIG. 4 shows the components of the invention and how application components 402 can be used to access the temporal data. Application components 402 including, but not limited to Forms, Reports and Structured Query Language interact with data 404 in Time Cubes 408 and Summary Positions 407 via the Core Algorithm 406, Temporal Data Dictionary 410 and the Temporal Referential Tree 409.

The Core Algorithm 406 is called by the system when an application event occurs i.e. insert, update, delete. The Core Algorithm 406 determines which objects are affected by the event and proceeds to insert a set of new Summary Positions 407 in a Time Cube 408. This is done by reference to previously created Summary Positions 407, the Temporal Data Dictionary 410 and the Temporal Relational Tree 409. After the Core Algorithm 406 has completed its cycle the integrity of the system data at attribute, entity and relational levels is complete and intact. All events (insert, update and delete) are implemented using an Insert into a Summary Position 407 in a Time Cube 408.

Core Algorithm

One feature of many aspects of this invention is the Core Algorithm. When a system event occurs (i.e. Insert, Alter Insert Forward, Alter Insert Back, Update, Delete, Alter Delete Forward or Alter Delete Back) the Core Algorithm creates a new Summary Position. The Core Algorithm ensures that the integrity of the system data is maintained at the attribute, entity and referential level. The Core Algorithm references the declarative rules held in the Temporal Data Dictionary to determine how to build the next Summary Position.

FIG. 59 depicts the psuedo code model of the Core Algorithm activated when a system event (i.e. Insert, Alter Insert Forward, Alter Insert Back, Update, Delete, Alter Delete Forward or Alter Delete Back) occurs on a Focus entity.

One aspect of the Core Algorithm is that it resolves special cases of potential Upstream effects into equivalent Downstream effects as dictated by the concept of Temporal Splash described in this document. The details of how the potential Upstream effect is translated to the equivalent Downstream effect is depicted in FIGS. 50, 51, 52, 53, 54 and 55 and described in the associated text later in this document.

One aspect of the Core Algorithm is that it determines Referential Boundaries. This is shown in FIG. 56 and described in the associated text later in this document.

One aspect of the Core Algorithm is that it resolves of Foreign Key gaps. This is shown in FIG. 57 and described in the associated text later in this document.

Temporal Data Dictionary

One feature of many aspects of this invention is, referring to FIG. 4, the Temporal Data Dictionary 410. Most database technologies include a metadata model within which is stored information about the structure of the system objects.

Typically, a data dictionary is a set of objects that are used as a read-only reference about the database. For example, a data dictionary stores information about both the logical and physical structure of the database. Information such as the valid users of a database; Information about integrity constraints for objects in the database; how much space is allocated for an object and how much of it is in use is also stored.

A Temporal Data Dictionary is similar to that found in a standard relational database and is used for the same purpose, however it contains an extended syntax to cater for the additional Attribute, Entity and Relational rules as defined in this invention.

The Focus Entity and its Related Entities

FIG. 6 describes how each Focus Entity 602 can potentially have many relationships to other entities in the application e.g. Master 601, Downstream relation 603, Upstream relation 605, Sibling 606, Child 604.

Temporal Referential Tree

One feature of many aspects of this invention, referring now to FIG. 4, is the Temporal Referential Tree 409. The Temporal Referential Tree is maintained by the system as and when new entities and their relations are defined in the Temporal Data Dictionary. The relationships between entities are stored in the Temporal Referential tree and are used to determine the number and order in which the Temporal Referential rules are applied.

At run time, the Core Algorithm references the Temporal Referential Tree as system events (i.e. Insert, Alter Insert Forward, Alter Insert Back, Update, Delete, Alter Delete Forward, Alter Delete Back) occur to determine the entities affected by the actions performed on a Focus entity.

For example, if the focus is Order and the action is 'Alter Delete Forward' then the appropriate rules as defined in the Temporal Data Dictionary are applied to the Order Line and any Upstream Relation coming from the Order entity.

Time Cubes and Summary Positions

One feature of many aspects of this invention, referring now to FIGS. 1, 2 and 3 is the use of Summary Positions held in Time Cubes. This invention incorporates time as a fundamental element of the system by creating an object that models X-Time 102 (database values in respect to valid time) and Y-Time 128 (database values in respect to transaction time). This object is known as the Time Cube and is the container for all system data. The results of all actions applied to an application schema are represented in the underlying Time Cube as Summary Positions 112, 114, 116.

An example of a Time Cube is shown in FIG. 1. The Time Cube is the structure within which all data is stored in a system. All data in a system may be stored in one or multiple instances of a Time Cube. The horizontal axis of the Time Cube is referenced as the X-Time axis 102. The X-Time dimension of the Time Cube stores the values or states of data in relation to Valid Time. The direction of time flows from left to right where 104 is the start of system time and 124 is the end of system time.

The vertical axis of the Time Cube is referenced as the Y-Time axis 128. The Y-Time dimension of the Time Cube stores the values or states of data in relation to Transaction Time. The direction of time flows from top to bottom where 130 is the point in time when the first transaction affecting this data set occurred.

The layers of the Time Cube going back into the page represent different attributes of an entity. A Time Cube may have one layer or multiple layers. For example, the layer 110 could be a primary key data item such as an Employee ID. The second layer 108 could be a foreign key data item such as Department ID. The third layer 106 could be an other attribute such as Salary. Thus, using this example, the Time Cube would hold the state or value of data in relation to an Employee ID, the department the employee worked in and the salary earned by the employee in the context of both Valid Time 102 and Transaction Time 128.

In FIG. 1, each row 112, 114, 116 represents the Summary Position of attributes in relation to Valid Time. The Summary Position being the cumulative effect of all transactions affecting the attributes. Thus a new Summary Position is created when a transaction occurs which affects an attribute in an Entity. Row 112 reflects the Summary Position of an attribute after the initial transaction. Row 114 reflects the Summary Position of an attribute after the second transaction. Row 116 reflects the Summary Position after the third transaction. A transaction typically takes place at a specific point in time. The Time Cube model can accommodate both the effect of a transaction at a point in time or the effect of a transaction over a period of X-Time.

To represent the effect of transactions and the creation of Summary Positions in the Time Cube model, row 112 shows the effect in X Time 102 (Valid Time) of the initial transaction that created an employee record. At 132 the employee record came into being thus a Summary Position is created where prior to 132 (i.e. to the left of 132), the employee record did not exist and therefore attributes items have, referring to FIG. 12, a Non Existence value 1204. To the right of 132 the employee record is deemed to exist to the end of system time 122 and therefore from this point attributes may have values. The second transaction has the effect of altering the insert time for the employee from 132 to 118. Thus row 114 shows the Summary Position reflecting the effect of the second transaction. The third transaction has the effect of deleting the employee at 120. Thus row 116 reflects the Summary Position of the effect of the third transaction. To the right of 120 the employee is now deemed deleted until the end of system time 122.

One unique feature of this invention is that all actions that logically create, update or delete attribute values within a Time Cube structure are achieved through a physical insert into the database. Additionally, the invention provides support for new actions previously unavailable in prior art i.e. Alter Insert Forward, Alter Insert Back, Alter Delete Forward and Alter Delete Back. In FIG. 1, for example, row 112 reflects the insert of an entity. Row 114 reflects an Alter Insert of an entity and row 116 reflects the deletion of an entity at a point in time. In each case the effect of the actions is achieved through the insertion of data into a Time Cube. This approach allows all data to be uniquely captured in respect to Transaction Time and Valid Time. This Insert Only aspect of the invention is unique when compared with other temporal database systems.

The Scope of Time Cubes

The implementation of the scope of Times Cubes is dependent upon the requirements of the system and how entities relate to each other. For systems where entities are loosely coupled it may be appropriate to implement the data in many Time Cubes each with a small scope whereas for highly integrated system it may be more efficient to use fewer Time Cubes each with a larger scope.

FIG. 2 shows the increase in scope of Time Cubes as the dimensions of data increases. Time Cubes can be implemented as one or more of the following scopes:

i) A three dimensional Time Cube 201 for each attribute of each tuple in each entity (e.g. surname of employee);

ii) A three dimensional Time Cube 202 for each group of attributes of each tuple in each entity (e.g. address lines1 of employee);

iii) A three dimensional Time Cube 203 for each tuple in each entity (e.g. employee number 1);

iv) A four dimensional Time Cube 204 for each group of tuples in each entity (e.g. orderlines for order number 1);

v) A five dimensional Time Cube 205 for each entity (e.g. all orders);

vi) A six dimensional Time Cube 206 for each group of entities (e.g. all order and orderlines);

vii) A seven dimensional Time Cube Time Cube 207 for all entities;

viii) Higher dimensional Time Cubes.

Note that after the first three dimensions (X-Time, Y-Time and attribute) it is not practical to attempt to draw further dimensions on paper, therefore for illustrative purposes only the dimensions 4 to 7 are depicted using the notation 'by(dimension)'.

All Data in a Database is Held in Time Cubes

In FIG. 3, a way of conceptualising one part of the invention is that all information contained within a database 302 is held in multiple Time Cube structures 301. The Time Cubes 301 within the database 302 shows that all information is held in Time Cube structures with each Time Cube 301 having the dimensions as described in FIGS. 1 and 2.

Attribute Level Locking in a Statefull Architecture

One feature of many aspects of this invention, referring now to FIGS. 18a-18g, is the ability to provide enhanced concurrency though Attribute Level Locking in a statefull architecture e.g. client/server.

In a statefull architecture e.g. client/server, where a session exists between the client process and the server process it is possible to set locks on attributes as and when data is modified. Also, client processes 1803, 1804 and server processes 1805 can share the same Y-Time clock because a session exists.

Figure 18A:
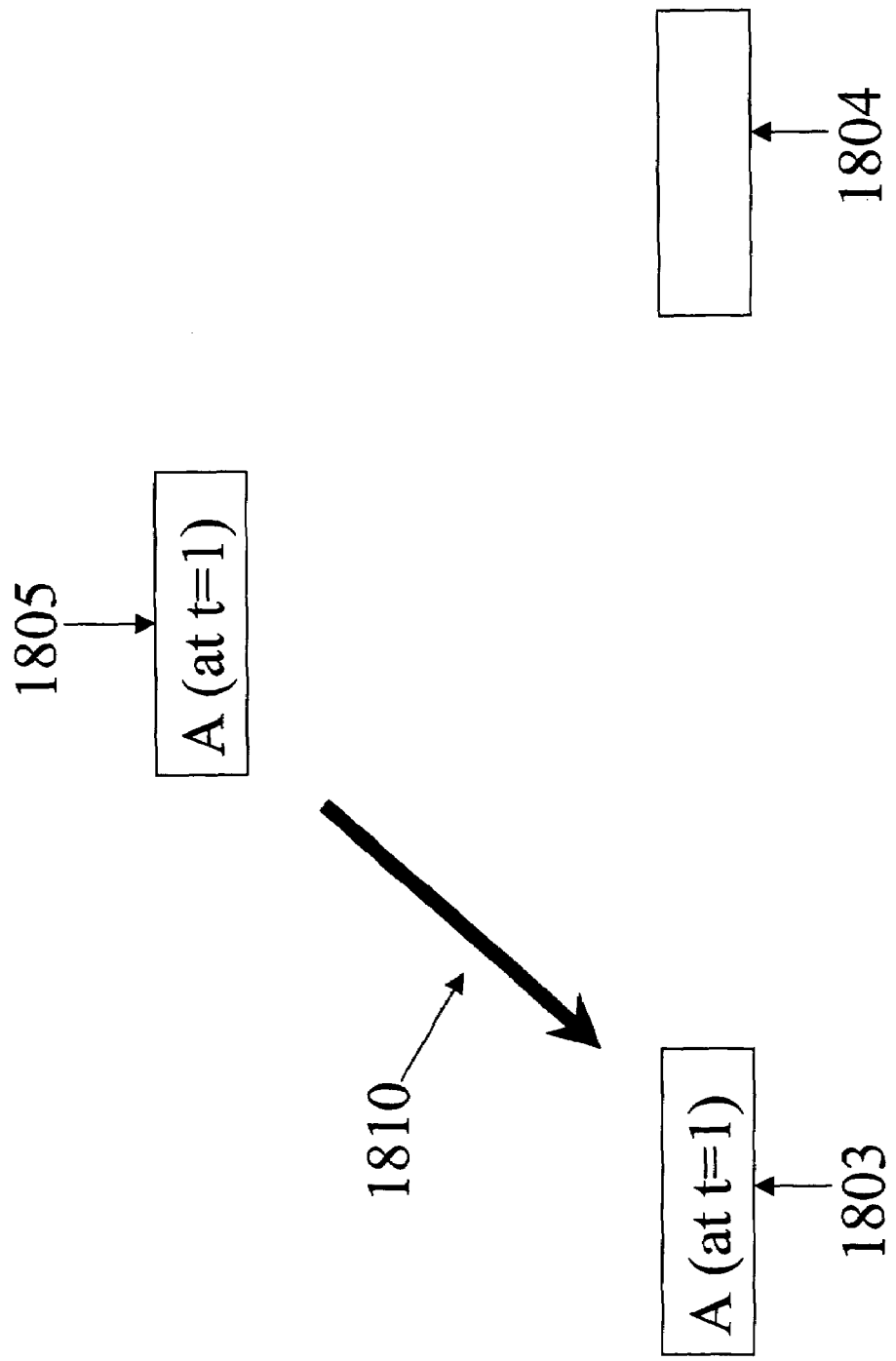
Figure 18B:
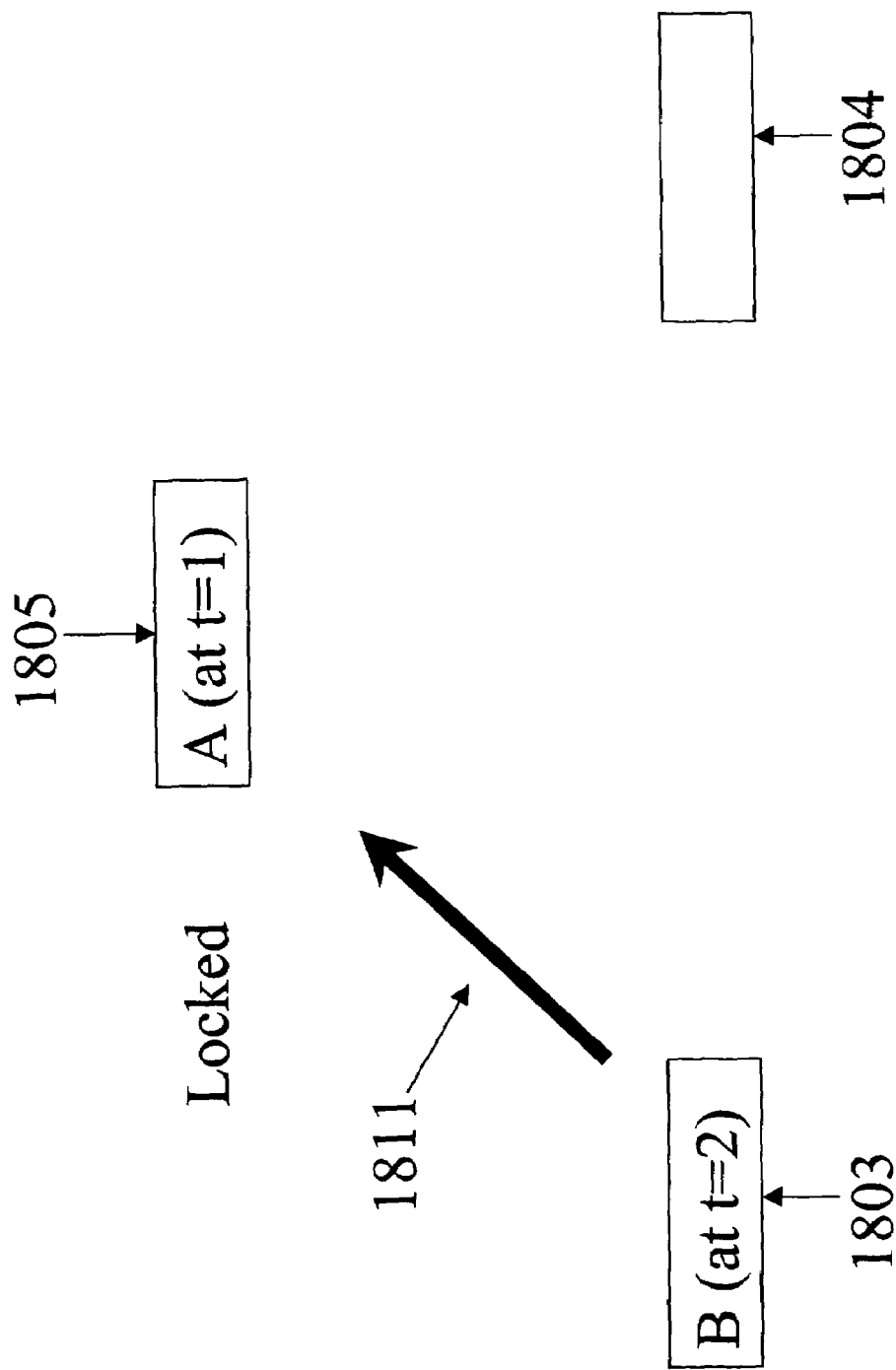

In FIG. 18a an attribute 1805 has a value A at Y-Time t=1 in a Summary Position in a Time Cube in the system. User1 reads 1810 data from attribute 1805 into its memory store 1803. In FIG. 18b, user1 then changes the attribute to value B at Y-Time t=2. A lock is now set 1811 on the attribute 1805 that prevents changes by other user processes on the system. Note that at this point the changed value in 1803 has not been committed to the attribute 1805.

Figure 18C:
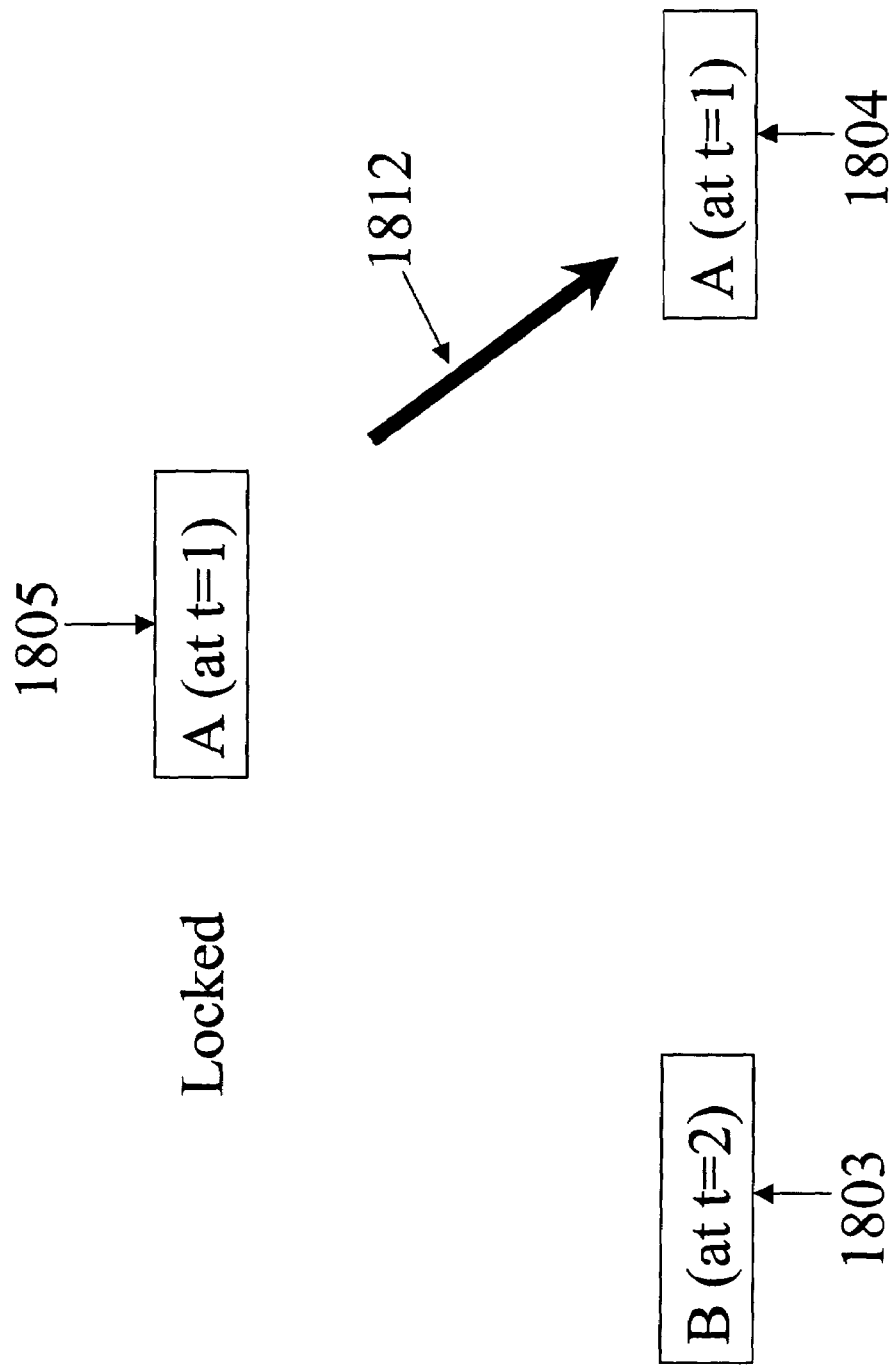
Figure 18D:
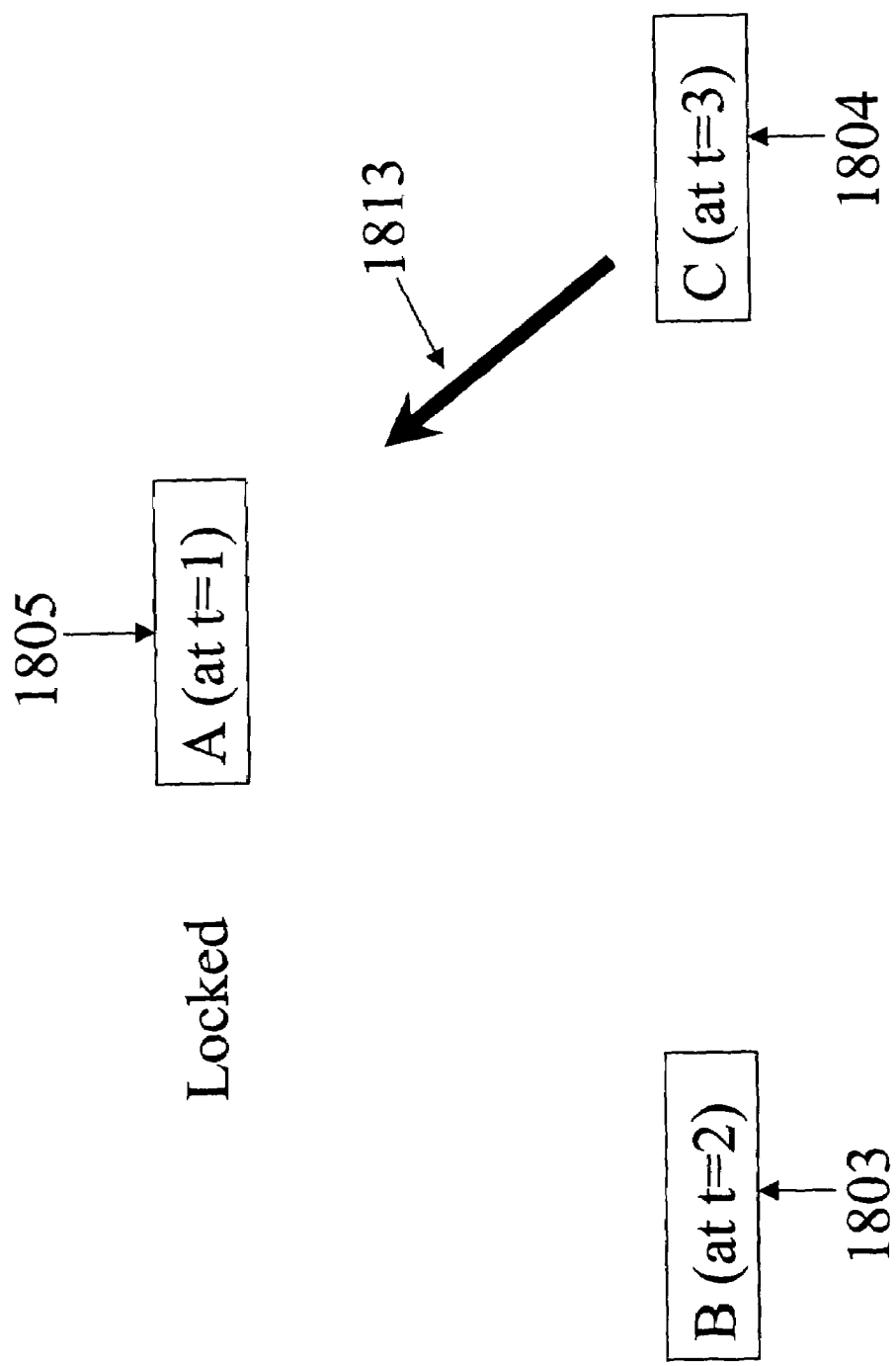

At this stage, in FIG. 18c, user2 can still read 1812 the attribute 1805 value A at t=1 into its memory store 1804. In FIG. 18d, attempts of user2 to change 1813 the attribute 1804 to value C at Y-Time t=3 fail because the user2 process cannot lock the attribute 1805 as it is already locked by user1.

Figure 18E:
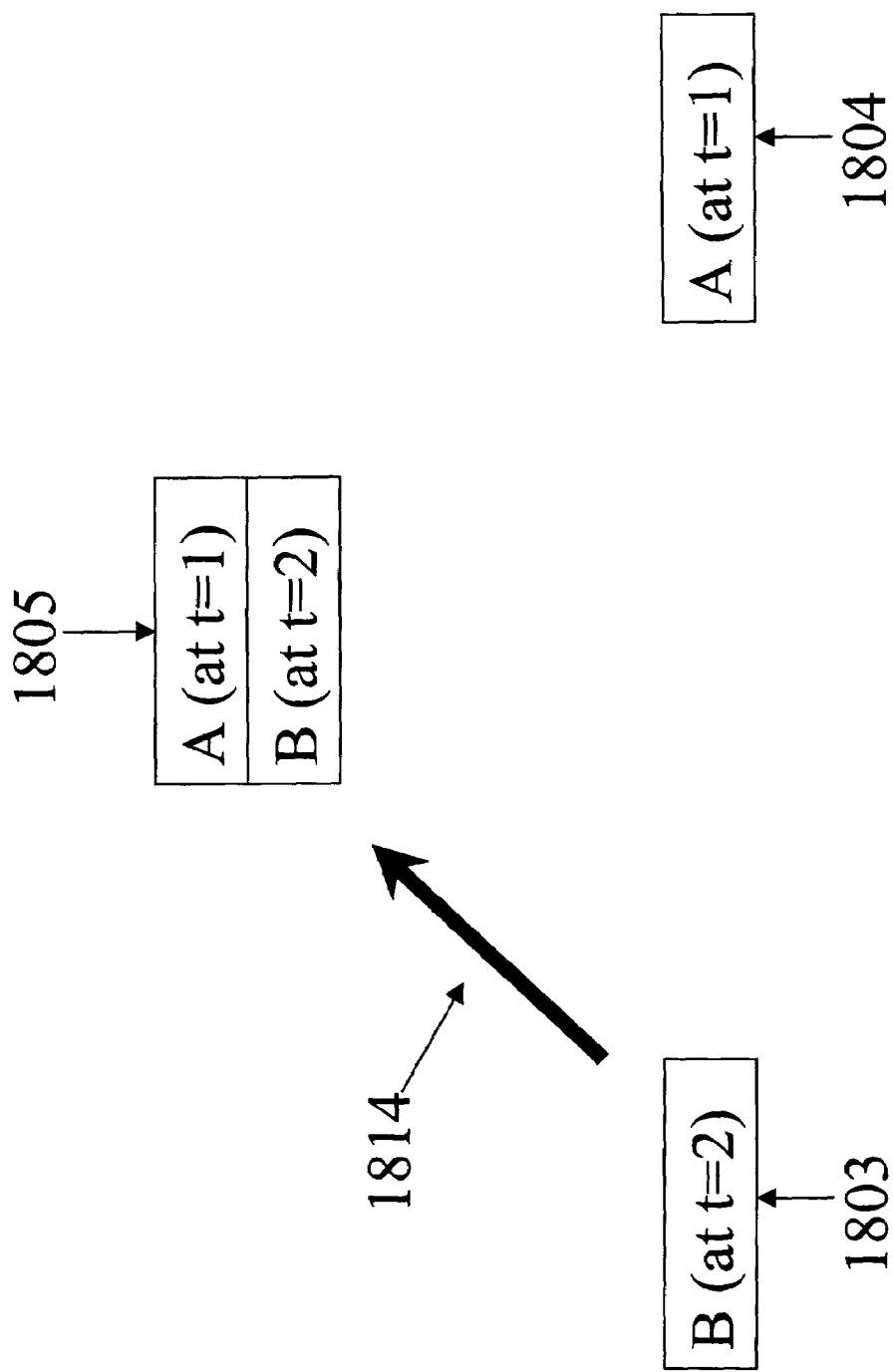

Then, in FIG. 18e, user1 commits 1814 the changes made to attribute 1803 value B at t=2 into the server creating a new Summary position for that attribute 1805.

Figure 18F:
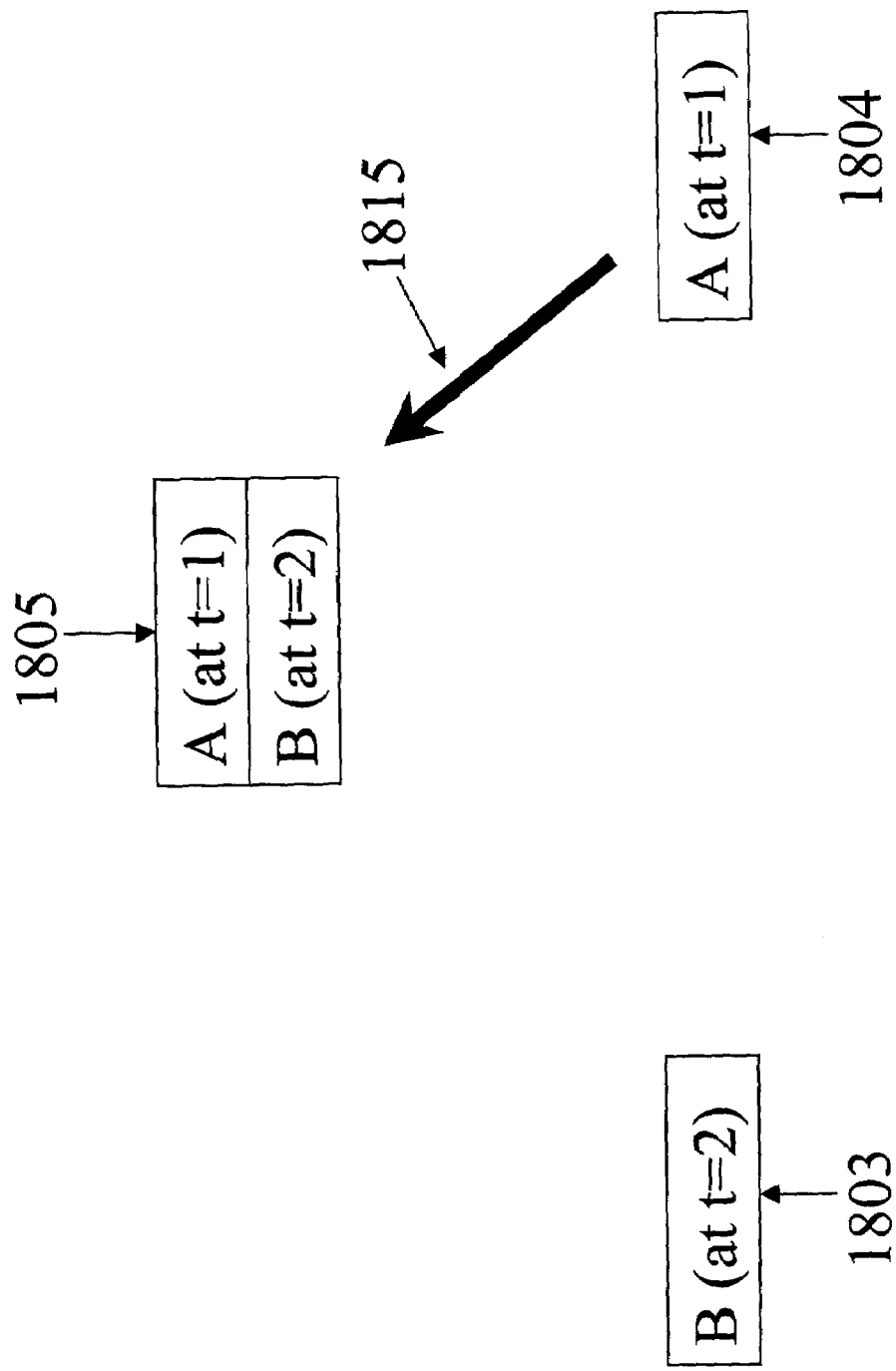

In FIG. 18f, attempts to change 1815 the attribute 1804 to value C at Y-Time t=3 fail because the user2 process still holds data that was selected from attribute 1805 prior to the commit 1814 issued by user1. This data is inconsistent with the data now in attribute 1805. The system compares Y-Time values of attribute values 1805 and 1804 to determine if the data is consistent.

In FIG. 18f, user2 must reselect 1816 the attribute value B at t=2 stored 1805 before changes made by user2 are allowed. Note that user1 does not need to reselect because this process was responsible for the commit and so the data in attribute values 1805 and 1803 is consistent.

Finally, the attribute 1805 value B at t=2 is available for locking by any user and so the cycle that started in FIG. 18a, can begin again.

Attribute Level Locking in a Stateless Architecture

One feature of many aspects of this invention, referring now to FIGS. 18h-18q, is the ability to enhanced concurrency though Attribute Level Locking in a stateless architecture e.g. the internet.

In a stateless architecture e.g. the internet 1821, a session does not exist between the client and server process and so locks are not set on attributes data when client data is modified. Also, client processes 1803, 1804 and server processes 1805 cannot share the same Y-Time clock because a session does not exist.

However even with such a limitation, this invention still delivers a methodology for providing multi user concurrency at the attribute level, This is done by retaining the Y-Time value of data read from the server and then using the retained Y-Time value for comparison purposes at commit time such that if the retained value agrees with the server side value then the commit is allowed, otherwise the commit is disallowed and a reselect is required.

Figure 18G:
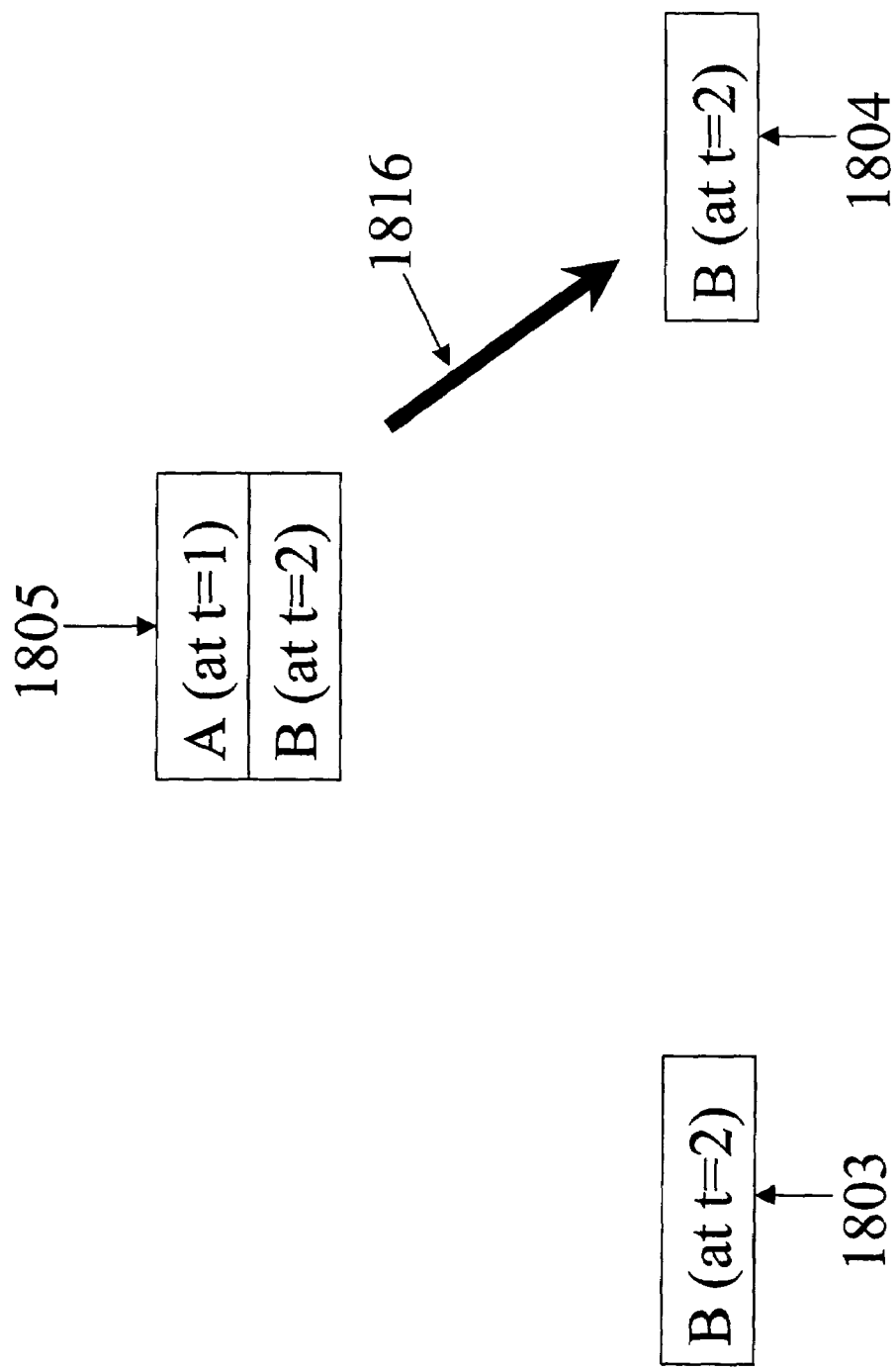
Figure 18H:
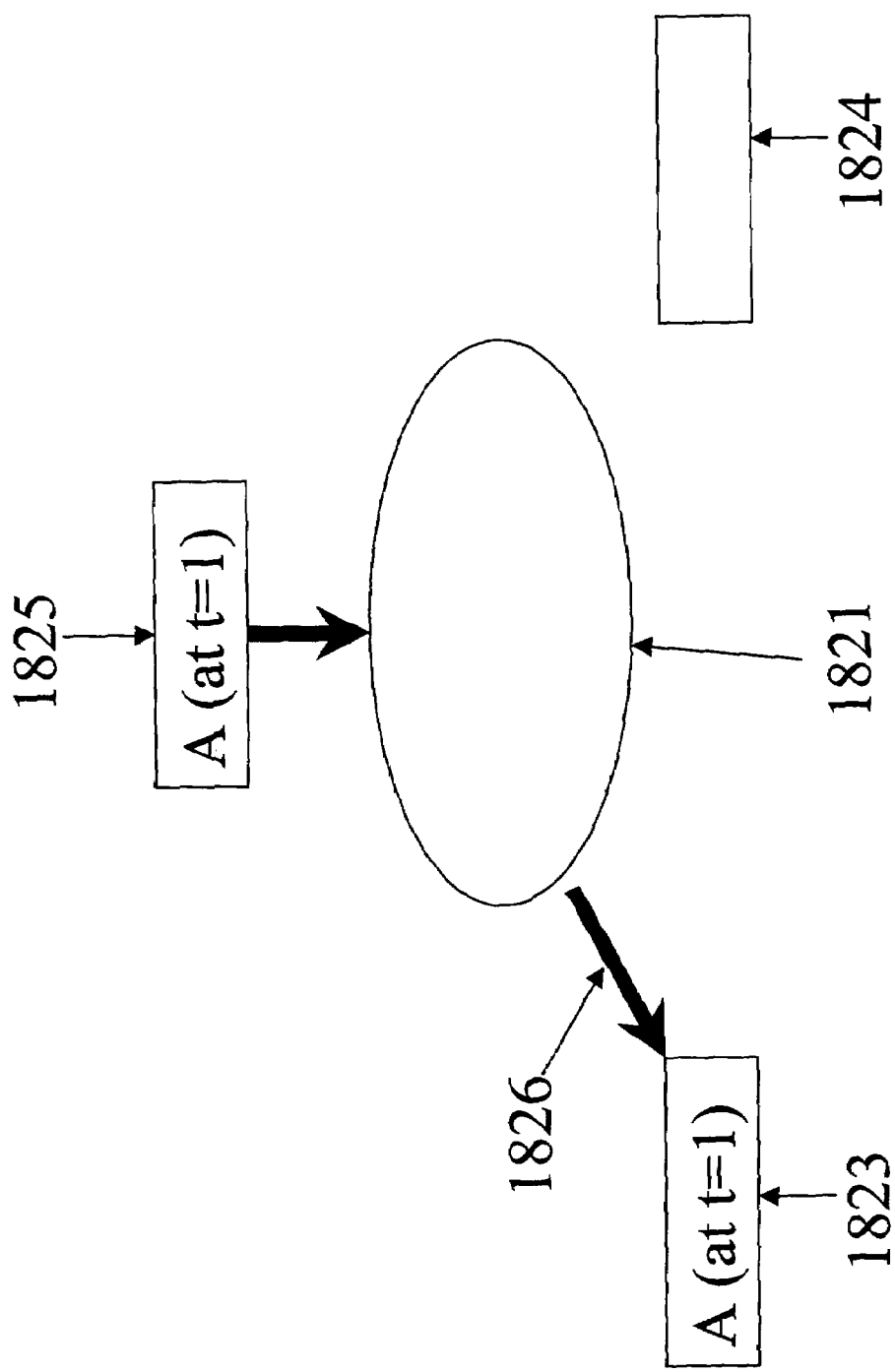
Figure 18I:
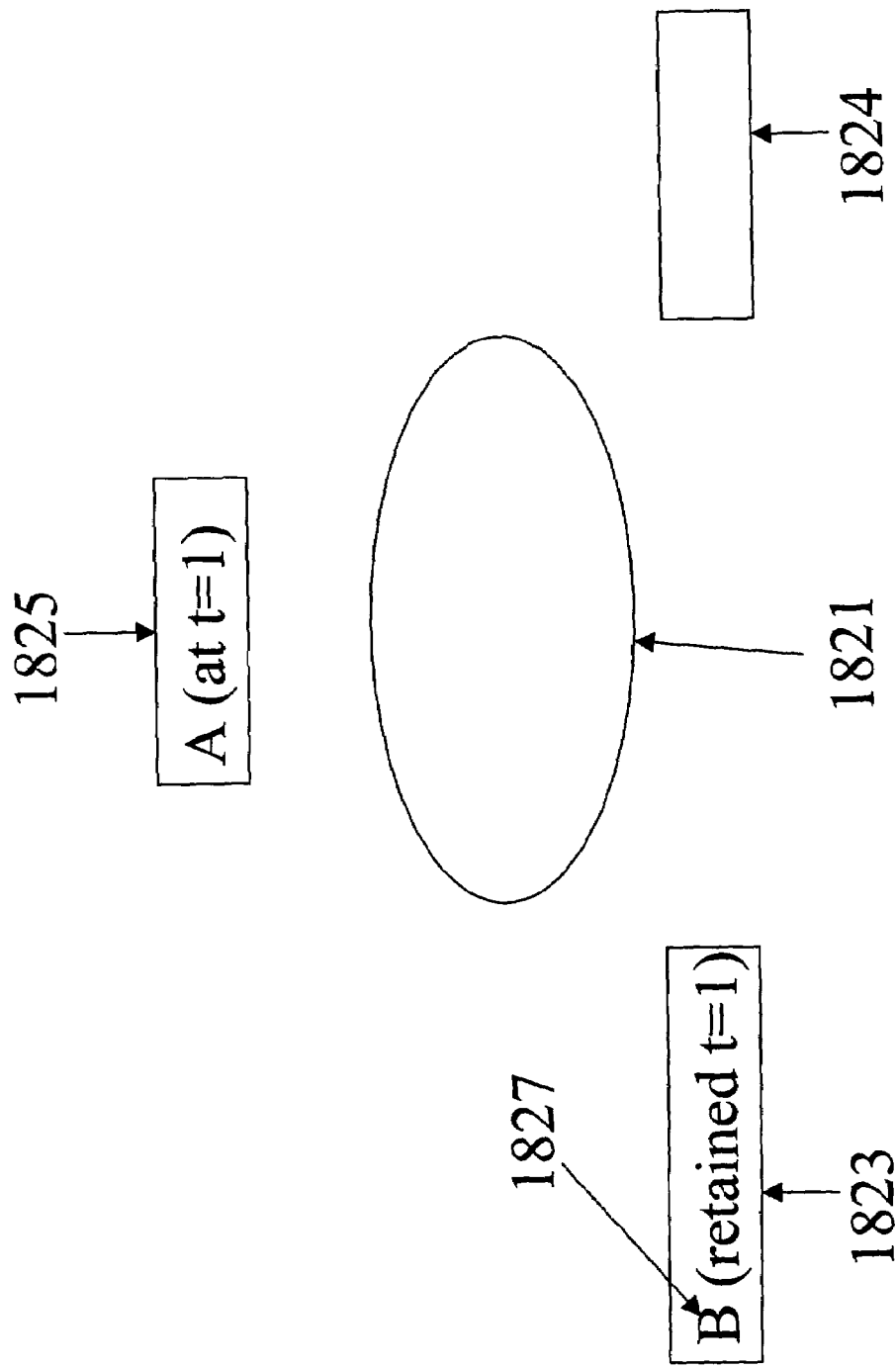

In FIG. 18h, an attribute 1825 has a value A at Y-Time t=1 in a Summary Position in a Time Cube in the system. User1 reads 1826 data from attribute 1825 into its memory store 1823. In FIG. 18g, user 1 then changes 1827 the attribute to value B retained Y-Time t=1. Note that a lock cannot be set on the attribute 1825. Note that at this point the changed value in 1823 has not been committed to the attribute 1825.

Figure 18J:
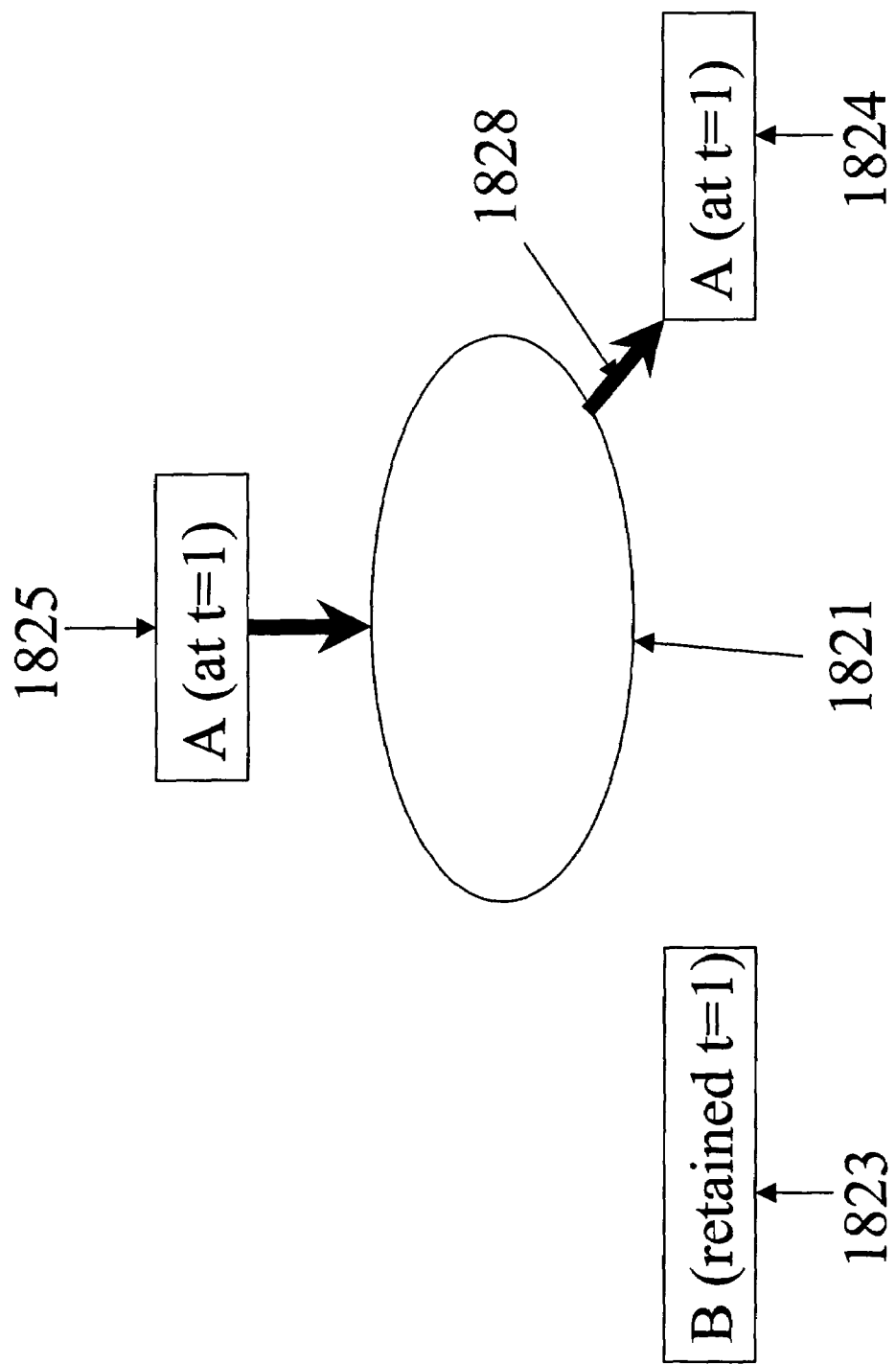
Figure 18K:
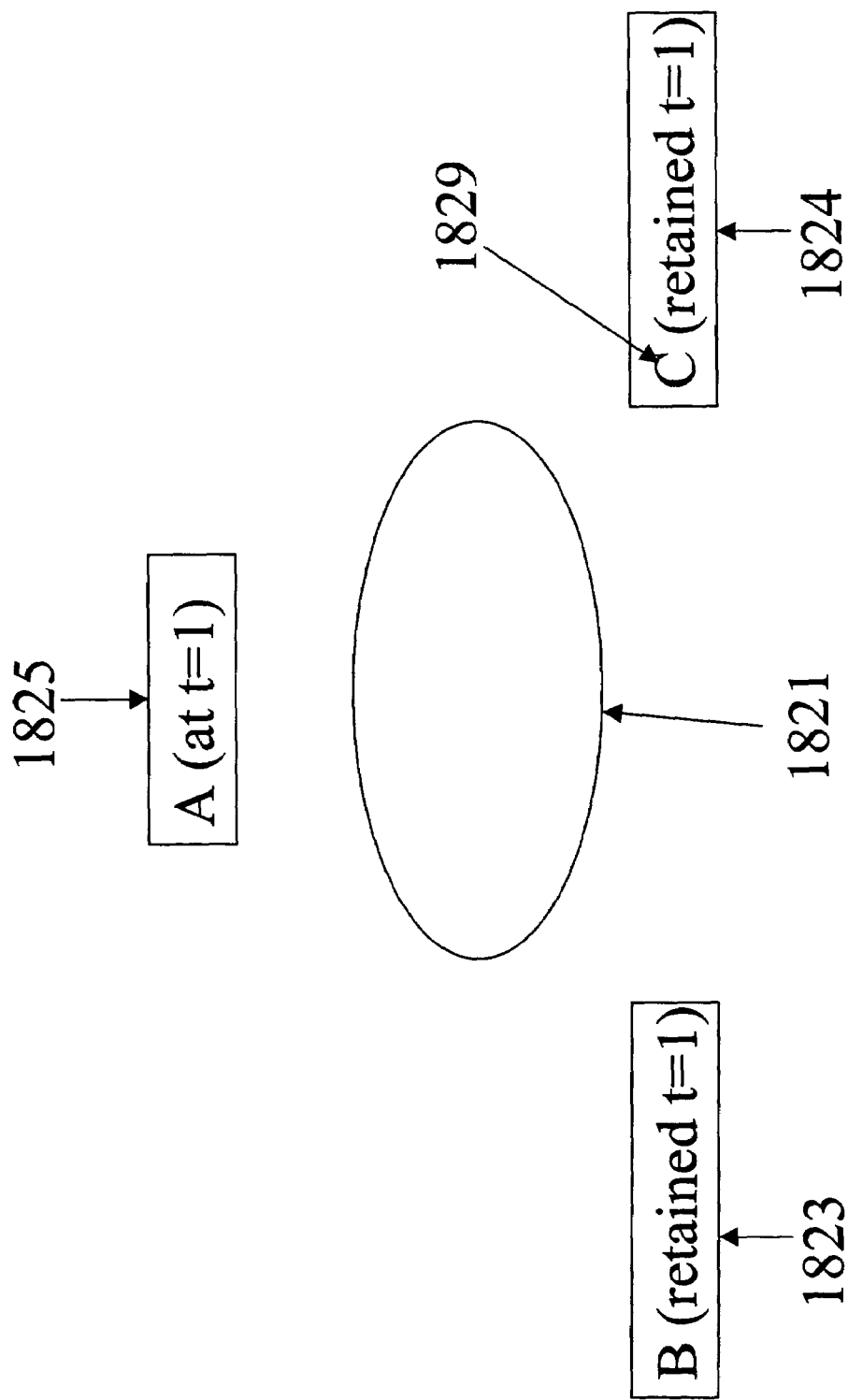
Figure 181:
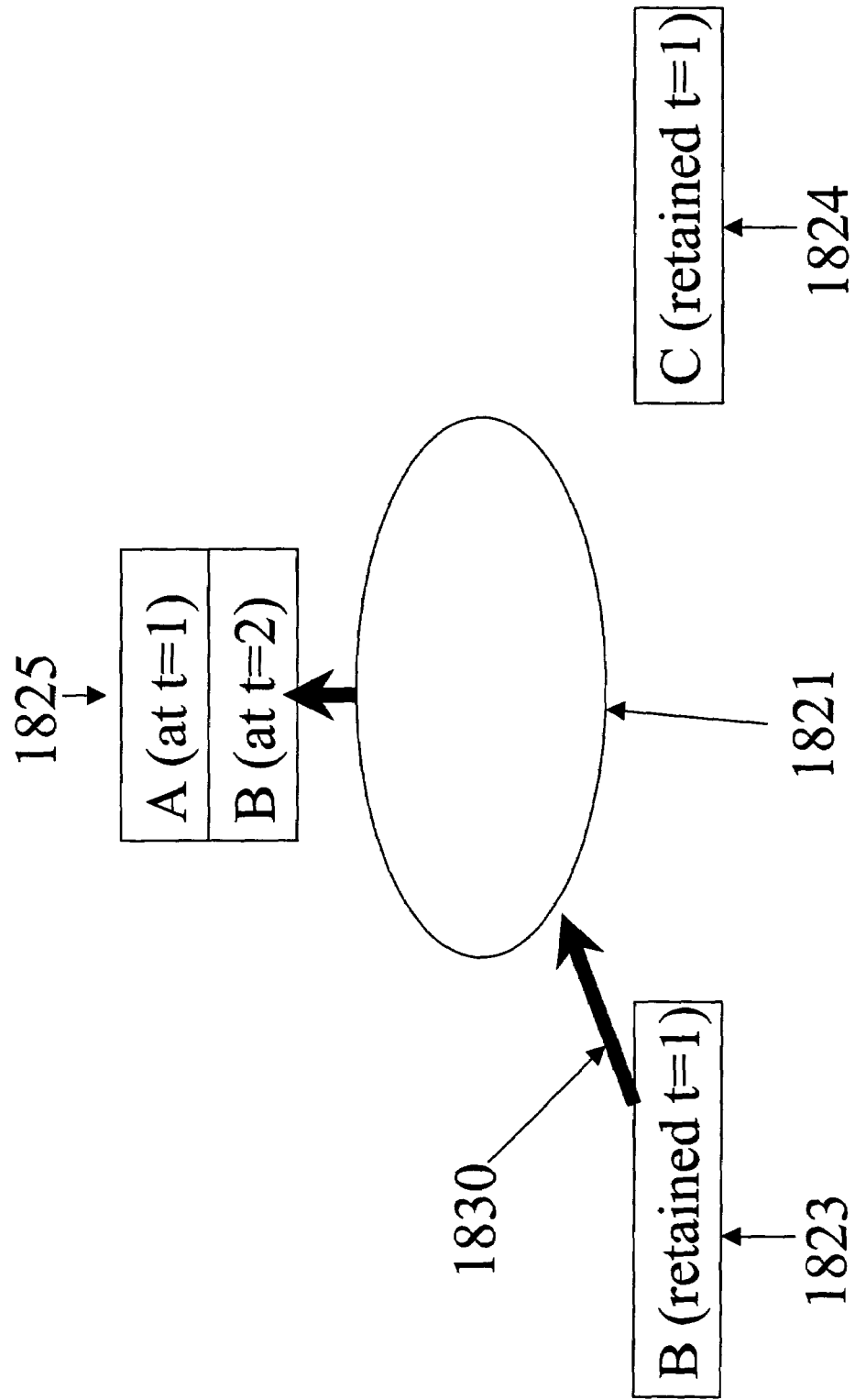

At this stage, in FIG. 18j, user2 can still read 1828 the attribute 1825 value A at t=1 into its memory store 1824. In FIG. 18k, user2 is allowed to change 1829 the attribute 1824 to value C at retained Y-Time t=1 because there are no locks on the attribute 1825.

Then, in FIG. 18l, user1 commits 1830 the changes made to attribute 1823 value B at retained Y-Time t=1 into the server 1825 creating a new Summary position B at t=2 for that attribute 1825. Note that this is allowed because retained Y-Time t=1 is the same as old server Y-Time t=1.

Figure 18M:
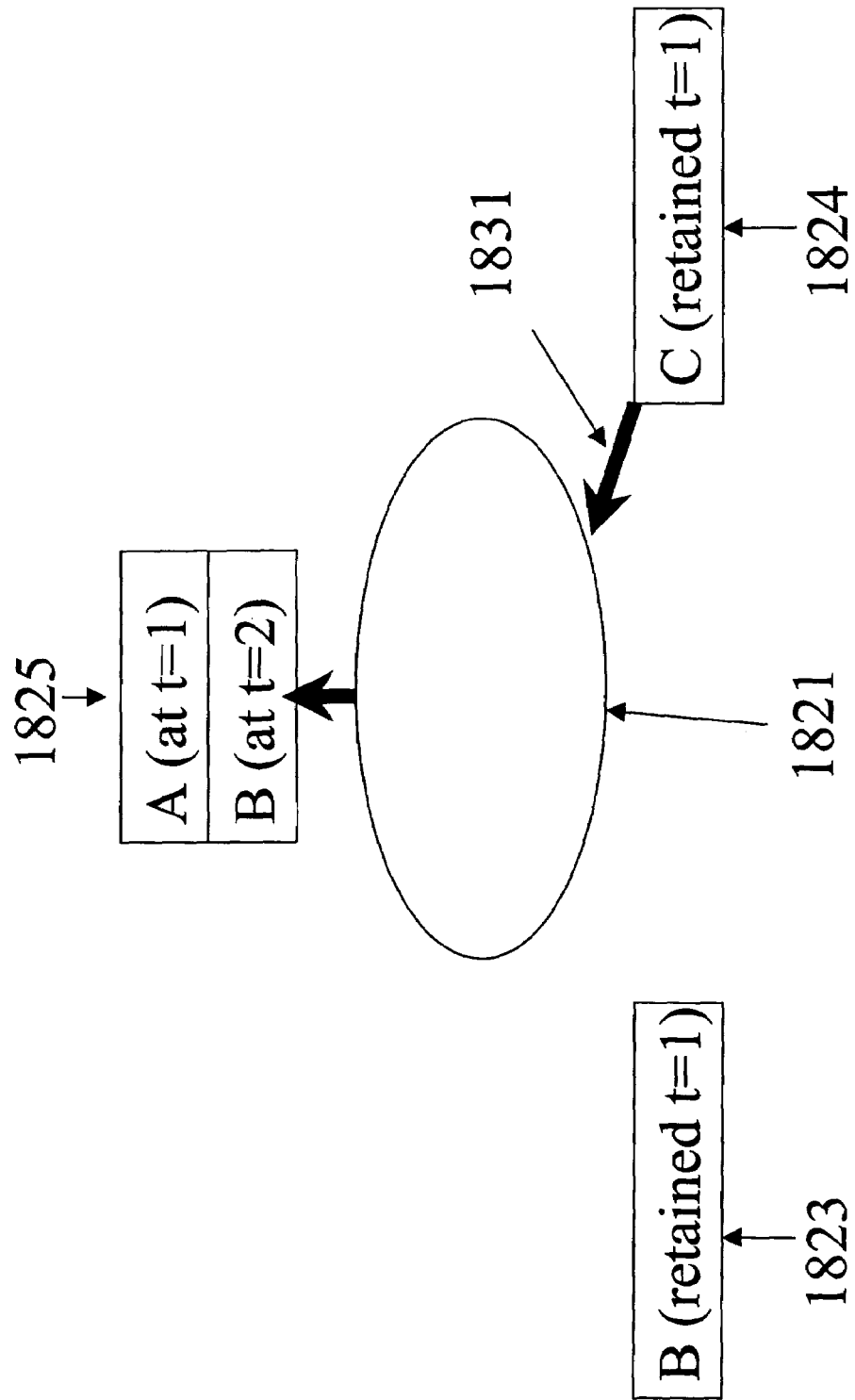

In FIG. 18m, attempts by user2 to commit 1831 changes made to attribute 1824 value C at retained Y-Time t=1 fail. This is because user2 changes are based on data selected from attribute 1825 prior to the commit 1830 issued by user1. The system compares Y-Time values of attribute values 1825 and 1824 to determine if the data is consistent an d in this case server Y-Time t=2 does not equal retained Y-Time t=1.

Figure 18N:
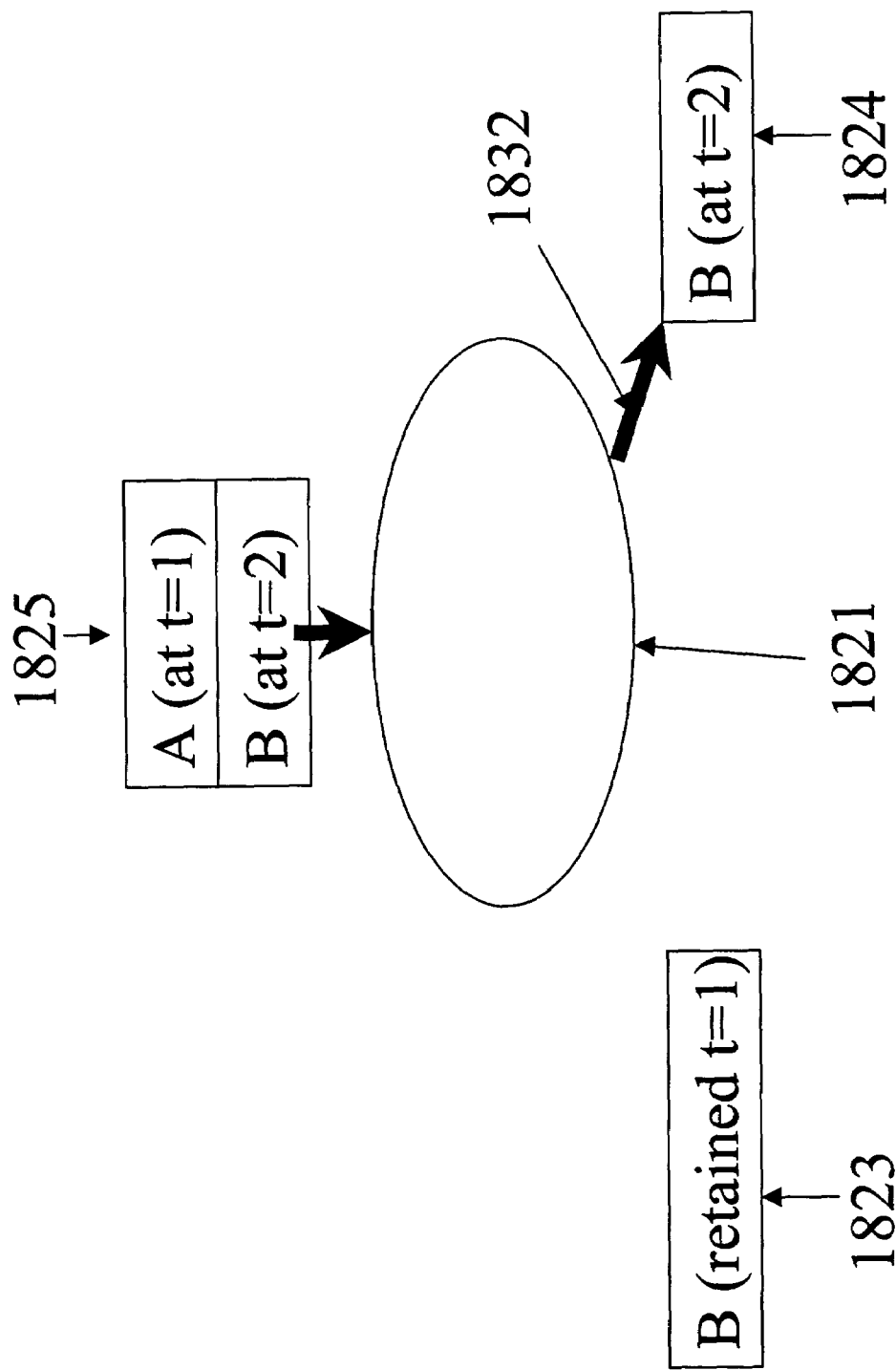

In FIG. 18n, user2 must reselect 1832 the attribute value B at t=2 stored 1825 in order to proceed.

Note, that compared to the statefull architecture, the stateless architecture requires more processing in order to provide concurrent, multi user access to data. Also note that because locking is not done over a stateless protocol, the user processes are allowed to change (FIG. 18i, 1829) data that is potentially not committable (FIG. 18m 1831) without a reselect (FIG. 18n, 1832) at a later time.

Figure 18O:
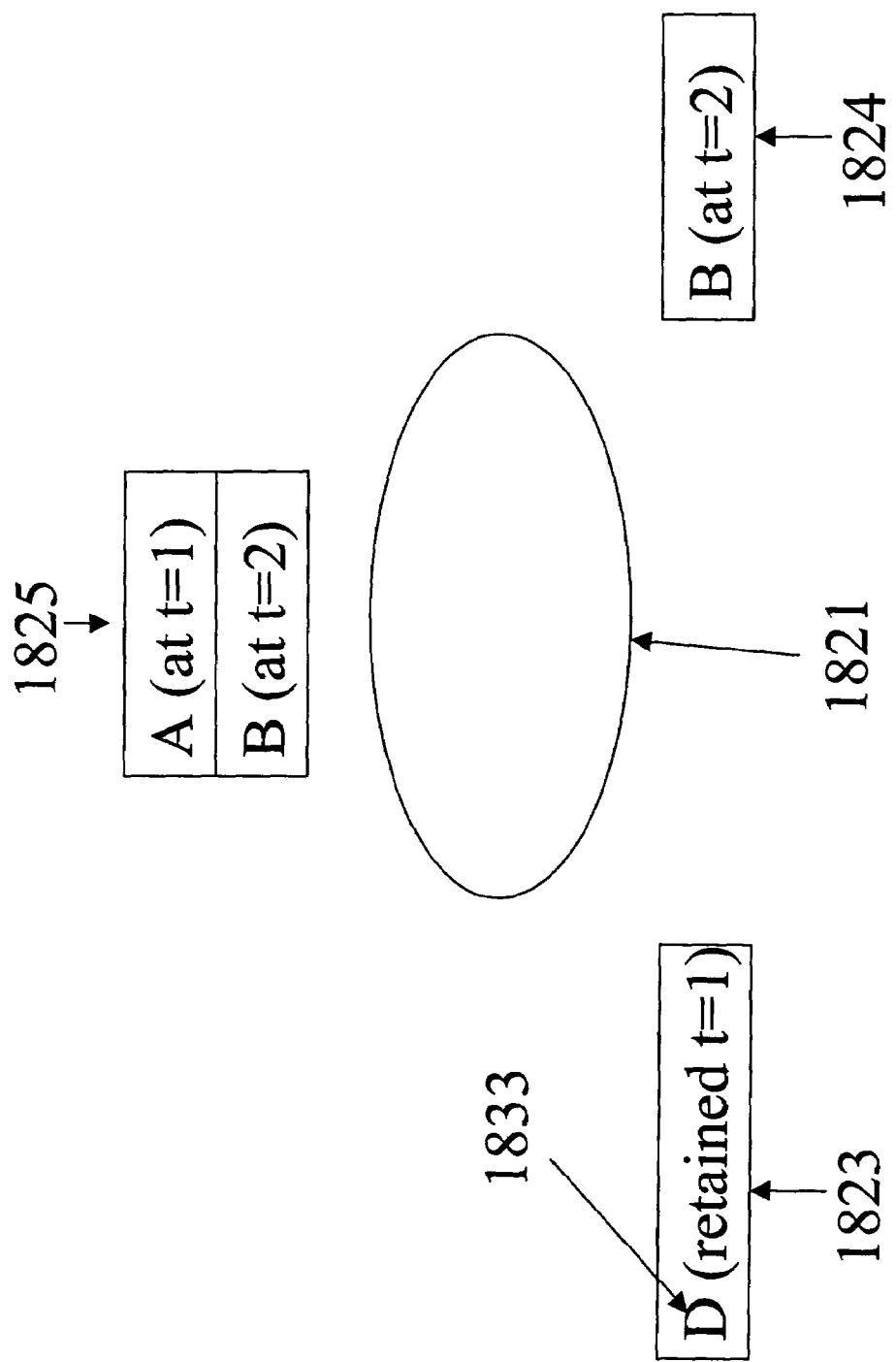
Figure 18P:
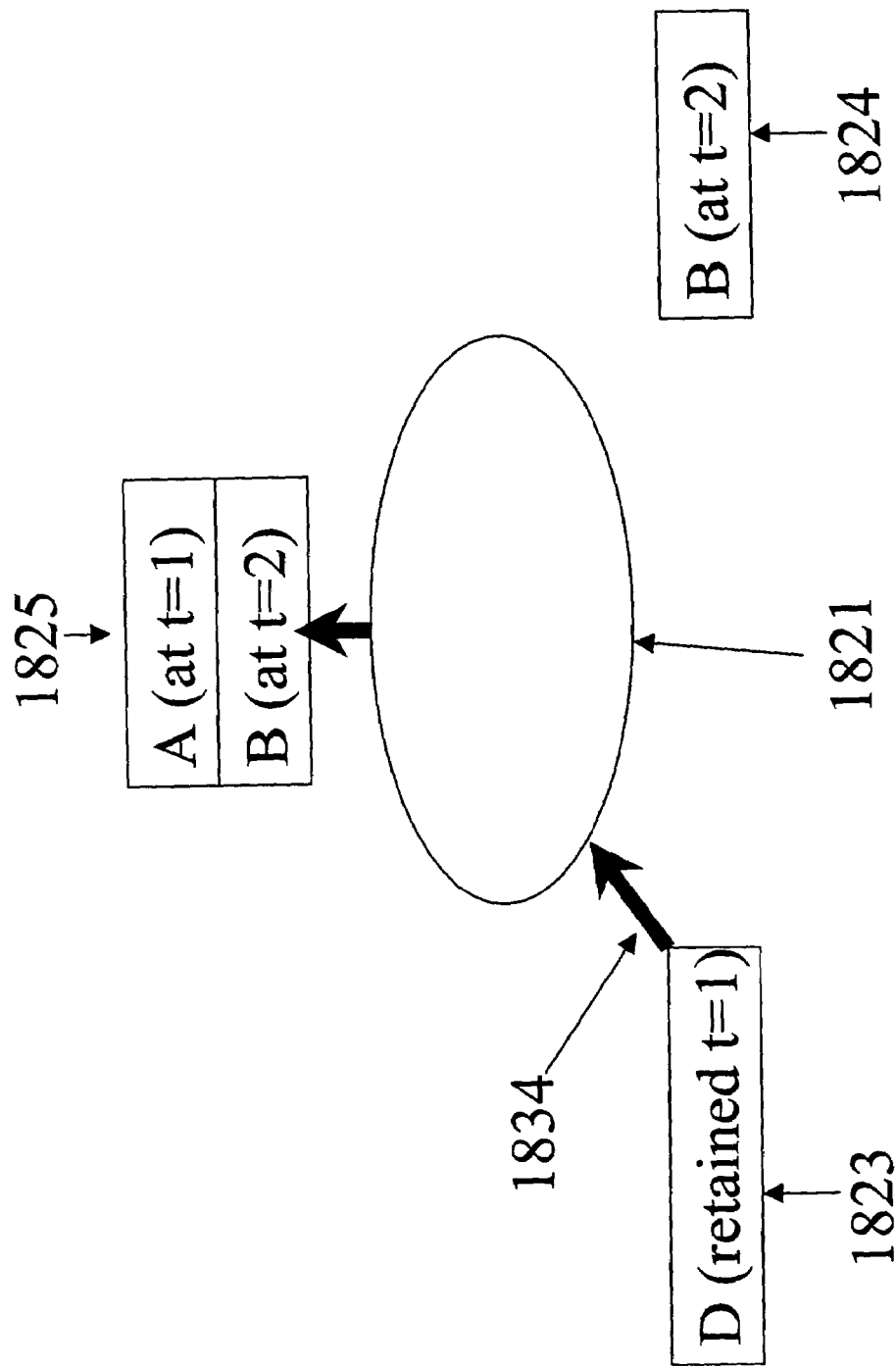
Figure 18Q:
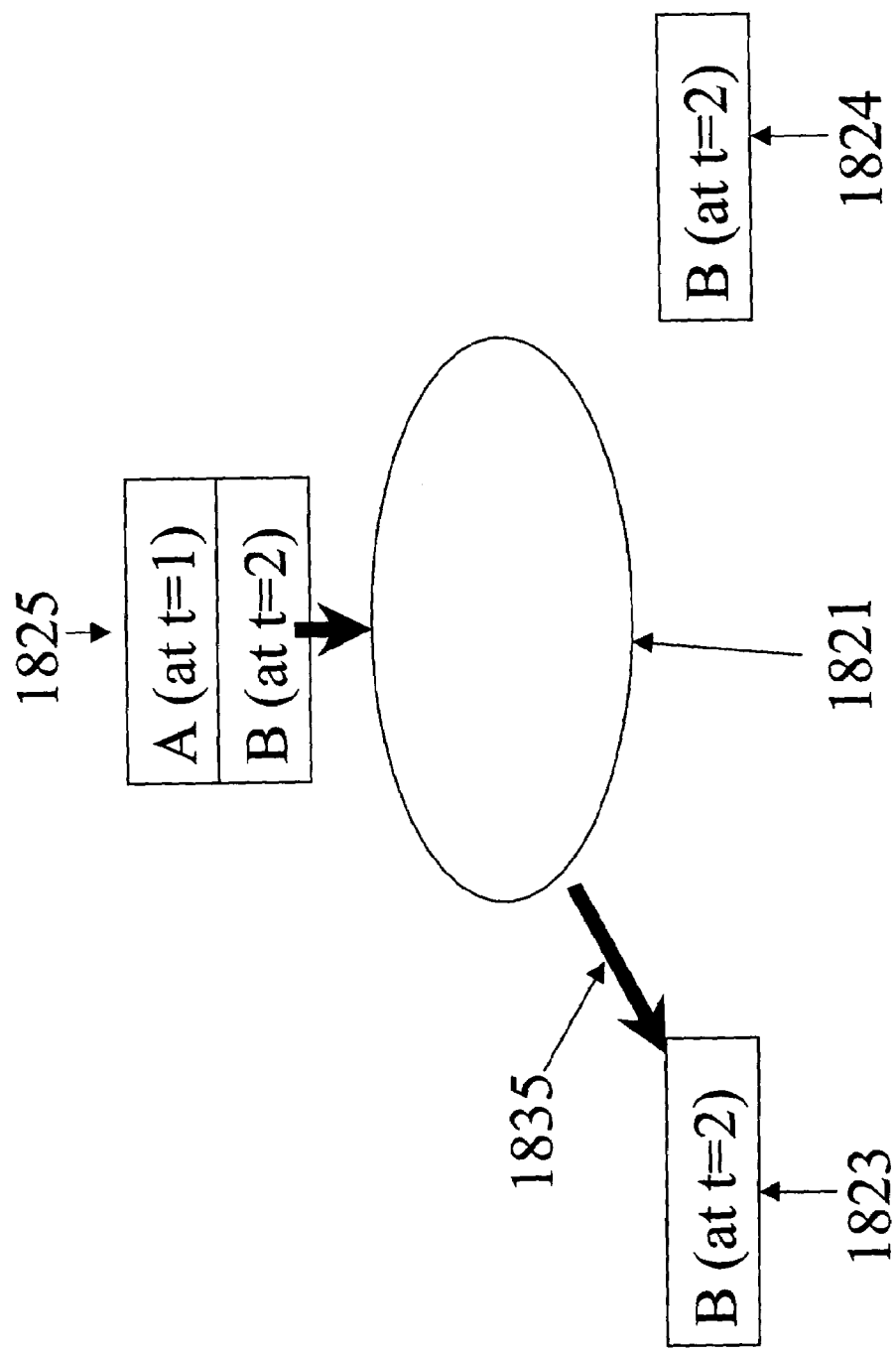

In FIG. 18o, user1 is allowed to change 1833 the attribute 1824 to value D at retained Y-Time t=1 because there are no locks on the attribute 1825. In FIG. 18p, note that, in a stateless architecture, even if user1 committed (FIG. 18l, 1830) then that data is not necessarily available for subsequent commits 1834. In FIG. 18q, user1 must reselect 1835 the attribute value B at t=2 stored 1825 in order to proceed.

Finally, the attribute 1825 value B at t=2 is available for selection by any user and so the cycle that started in FIG. 18h, can begin again.

A comprehensive Set of Actions and Referential Rules

One feature of many aspects of this invention is the comprehensive set of actions and referential rules that are needed to maintain temporal data integrity are defined in this invention. FIG. 25 shows all the actions and associated referential rules defined in the invention and supported by the Temporal Data Dictionary.

Non Temporal prior art database systems only deal with data at a point in time and so do not support the concept of Alter Insert Forward, Alter Insert Back, Alter Delete Forward, Alter Delete Back actions and referential rules.

Insert, Update and Delete actions are supported in Non Temporal prior art database systems, however FIG. 25 shows that of the 8 potential referential rules (Update Cascade, Update Restrict, Update Default, Update Nullify, Delete Cascade, Delete Restrict, Delete Default, Delete Nullify) only 2 referential rules (Delete Restrict, Delete Cascade) are fully supported in prior art databases and that 1 rule (Update Restrict) is partially supported, but only by the addition of bespoke application code written by an application developer and stored on the server.

X-Time Granularity

One feature of many aspects of this invention is X-Time granularity. The Temporal Data Dictionary holds values for this system parameter. In FIG. 33, X-Time 3301 is represented by contiguous periods of time called chronons 3302. The period of X-Time that each chronon represents is called the X-Time Granularity and is stored as a system parameter in the data dictionary.

For example, in some application set-ups it may be appropriate to set the X-Time granularity to 1 day, whereas in other applications 1 second or less may be used.

Start of X-Time and End of X-Time

One feature of many aspects of this invention is start and end of X-Time. The Temporal Data Dictionary holds values for these system parameters. In FIG. 33, X-Time 3301 has a defined beginning 3303 and ending 3304 chronon. These values are stored as system parameters in the data dictionary.

Y-Time Granularity

One feature of many aspects of this invention is Y-Time granularity. The Temporal Data Dictionary holds values for this system parameter. In FIG. 33, Y-Time 3305 is represented by contiguous periods of time called chronons 3306. The period of Y-Time that each chronon represents is called the Y-Time Granularity and is stored as a system parameter in the data dictionary.

The values of X-Time and Y-Time granularity may differ depending upon the requirements of the system. The nature of the data held and how the application uses that data has a great influence on the value of X-Time and Y-Time Granularity.

Start of Y-Time

One feature of many aspects of this invention is start of Y-Time The Temporal Data Dictionary holds values for this system parameter. In FIG. 33, Y-Time 3305 has a defined beginning 3307 chronon. This value is stored as a system parameter in the data dictionary.

Declarative Constraints

One feature of many aspects of this invention is the concept that all constraints are defined declaratively in a Temporal Data Dictionary. The Temporal Data Dictionary has an extended syntax to that of prior art data dictionaries. Data integrity means that the data in a database adheres to a predefined set of constraints or business rules.

The advantages of declarative integrity constraints are already implemented in many prior art solutions. This invention also takes advantage of the benefits that are afforded from adopting this approach including improved performance; ease of declaration; centralised rules; ease of maintenance; immediate user feedback; flexibility; full data documentation in the Data Dictionary;

There are three categories of data integrity rules in the embodiments of the invention described. Attribute Integrity, Entity Integrity and Referential Integrity are declared in the Temporal Data Dictionary.

Attribute Integrity Rules

One feature of many aspects of this invention is the Attribute Integrity Rules. The Attribute Integrity Rules are referenced by the Core Algorithm when an system event occurs which affects a particular attribute. The Temporal Data Dictionary in this invention includes rules for Transferability; Correctability; Optionality; Non Existence; Attribute Group Membership;

Updateability

One feature of many aspects of this invention is the concept of Updateability depicted in FIG. 8. Updateability is concerned with whether or not an attribute can have multiple values in X-Time 803.

The Temporal Data Dictionary ensures that Non-Updateable attributes only have one value in X-Time 803 between Insert Time 801 and Delete Time 802. A simple example of a non-updateable attribute is date of birth 804 of an employee entity 805.

Transferability

One feature of many aspects of this invention is the concept of Transferability depicted in FIG. 9. Transferability only pertains to foreign key attributes 904. Transferability is concerned with whether or not a foreign key attribute can have multiple values in X-Time 903.

The Temporal Data Dictionary ensures that Non-Transferable foreign key attributes, only have one value in X-Time 903 between Insert Time 901 and Delete Time 902.

In the special case of a foreign key attribute the Core Algorithm uses Transferability to determine the actions needed when building the Summary Position to maintain relational integrity between two entities. If a foreign key attribute is allowed to have more than one value in X-Time 903 within a Summary Position then it is declared as Transferable, if not then it is Non Transferable. An example of a Non Transferable foreign Key in an application would be an employee 905 who could not transfer or move between departments 904 over the time he/she worked for a company.

Correctability

One feature of many aspects of this invention is the concept of Correctability depicted in FIG. 10. Correctability is concerned with whether or not an attribute can have multiple values in Y-Time 103.

The Temporal Data Dictionary ensures that Non Correctable attributes only have one value in Y-Time 1003 for the life of the system.

An example of a Non Correctable attribute in an application could be a primary key 1004 of a department 1005.

Although standard database theory states that a primary key value should not change, it is unusual but logically possible for the primary keys to be made correctable. There is a subtle difference between i) transferabilty i.e. reconnect an employee to another department id and ii) primary key update i.e. change the department's id and cascading the change to all employee's in that department.

In the first case the employee has changed departments whereas in the second case the employee remains in the same department but the department id has been changed. The primary key of the department table has been updated, thus causing the update referential rule held on the employee/department relation to be activated.

Optionality

One feature of many aspects of this invention is the concept of Optionality as depicted in FIG. 11. Optionality is concerned with whether or not an attribute 1104 is allowed a Null value in X-Time 1103 between Insert Time 1101 and Delete Time 1102.

The Temporal Data Dictionary ensures that Non Optional attributes always have a value in X-Time within the lifespan of the Entity that they help to describe. Optional attributes may have a null value in X-Time.

Non Existence

One feature of many aspects of this invention is the concept of the Non Existence value as depicted in FIG. 12. All attributes (mandatory and optional) inherit this value 1204 for the periods in X-Time 1203 that occur before Insert Time 1201 and after Delete Time 1202.

Note that the Non Existence value is only used outside the lifespan of an entity and differs from the traditional NULL value. The NULL value is used within the lifespan of an entity for optional attributes.

Attribute Group Membership

One feature of many aspects of this invention is the concept of Attribute Group Membership as depicted in FIG. 13. Attribute Group Membership is declared in the Temporal Data Dictionary and is used to link two or more functionally related attributes within in the same entity.

A simple example of the use of Attribute Group Membership is that of Address lines 1304, 1305, 1306. The Core Algorithm ensures that the attribute integrity of all lines of the address is maintained with respect to X-Time 1303 such that if say the attribute Address line 1 1304 is updated in X-Time then all members of the attribute group 1307) are updated for the same X-Time.

Another use for Attribute Group Membership would be for managing multi-part keys i.e. primary, unique and foreign keys.

Entity Integrity Rules

One feature of many aspects of this invention are the Entity Integrity Rules. Entity Integrity Rules are used by the Core Algorithm when a system event occurs that alters the lifespan of an Entity or requires the resolution of a Foreign Key Gap, as described later in this document.

The Co Terminacy and Positive Lifespan rules are part of the code of the Core Algorithm because they apply universally to all entities whereas the Attribution rules are declared in the Temporal Data Dictionary and are referenced by the Core Algorithm when required.

Co Terminacy

One feature of many aspects of this invention is the concept of Co Terminacy as depicted in FIG. 14. Co Terminacy is maintained after any action that increases or reduces the overall lifespan of an entity in the system. This ensures that all attributes of an entity have the same lifespan in X-Time 1403. The system events that can cause this rule to take effect are Insert, Alter Insert Forward, Alter Insert Back, Delete, Alter Delete Forward and Alter Delete Back.

For example, the Insert Time of a department may be altered 1407. When this event occurs, the Core Algorithm ensures that all attributes of department 1404, 1405, 1406 have the same lifespan in X-Time.

Positive Lifespan

One feature of many aspects of this invention is the concept of Positive Lifespan as depicted in FIG. 15. Positive Lifespan is maintained after any action that reduces the overall lifespan of an entity in X-Time 1503 and ensures that chronology of the insert and delete time is correct i.e. the Insert Time 1501 of an entity is always before the Delete Time 1502. The system events that can cause this rule to take effect are Alter Insert Forward and Alter Delete Back.

For example, the Insert Time 1501 of a department may be altered to a future date. When this Alter Insert event 1504 occurs, the Core Algorithm ensures that the new Insert Time is before Delete Time 1502.

Also, the Delete Time 1502 of a department may be altered to a prior date. When this Alter Delete event 1505 occurs, the Core Algorithm ensures that the new Delete Time is after the Insert Time 1501.

Attribution

One feature of many aspects of this invention is the concept of Attribution as depicted in FIGS. 16a, 16b, 16c and 57.

Attribution rules are used by the Core Algorithm to provide a valid value for attributes when a system event occurs that cause Referential Boundary Conditions e.g. 5607, 5608 in FIG. 56 and 5709, 5710 in FIG. 57, to be crossed. The system events that cause this are ones that:

i) increase the lifespan of an entity as depicted in FIGS. 16a, 16b, 16c.

ii) or reduce 5705, 5706 the lifespan of an entity 5702 such that the Foreign Key Gaps 5707, 5708 appear in the related entity 5704, as depicted in FIG. 57.

The Attribution rules declared in the Temporal Data Dictionary ensure that all attributes in the Focus entity and the foreign key attributes of all affected related entities have valid values after an event is completed.

For example, the Insert Time of a department may be altered to a prior date. When this event occurs, the Core Algorithm ensures that all the attributes of the department entity have appropriate values within the extended lifespan of the department.

Also, the Delete Time of a department may be altered to a future date. When this event occurs, the Core Algorithm ensures that all the attributes of related employee's entities in that department have appropriate values within the extended lifespan of the employee.

Also, as in FIG. 57, when an Alter Insert Forward 5705 or Alter Delete Back 5706 occurs on an entity 5702 with a downstream transferable relation to an entity 5704. Note that potential foreign key gaps appear as a Referential Boundary Condition 5709, 5710 is crossed and when this occurs the Core Algorithm refers to the Attribution rule defined against the relevant foreign key attribute in order to determine an appropriate value for that foreign key attribute.

The settings available in the Temporal Data Dictionary for Attribution rules are:

Extend

One feature of many aspects of this invention is the concept of the Extend attribution rule.

In FIG. 16a the Extend rule ensures that the attribute in the new part of X-Time 1605 will inherit the existing attribute values from the adjacent Summary Position object 1606.

In FIG. 57 the Extend rule ensures that the part of the foreign key attribute 5707, 5708 will inherit the existing attribute values from the adjacent foreign key Summary Position objects related to entities 5701 and 5703. Note that this option is only available for Transferable foreign key attributes.

Default

One feature of many aspects of this invention is the concept of the Default attribution rule.

In FIG. 16b the Default rule ensures that the attribute in the new part of X-Time 1608 will inherit the value held in the Temporal Data Dictionary 1607 for that attribute 1609.

In FIG. 57 the Default rule ensures that the part of the foreign key attribute 5707, 5708 will inherit the value held in the Temporal Data Dictionary for the foreign key attribute of entity 5704. This option is only available for Transferable or Transferable Optional foreign key attributes.

Nullify

One feature of many aspects of this invention is the concept of the Nullify attribution rule.

In FIG. 16c the Nullify rule ensures that the attribute in the new part of X-Time 1610 will inherit the Null value 1611. This option is only available for Optional attributes in Temporal Data Dictionary.

In FIG. 57 the Nullify rule ensures that the part of the foreign key attribute 5707, 5708 will inherit the Null value held for the foreign key attribute of entity 5704. This option is only available for Transferable and Optional foreign key attributes.

Referential Integrity Rules

One feature of many aspects of this invention is the Referential Integrity Rules. The Referential Integrity rules are used by the Core Algorithm to determine the result of an action occurring on a Focus Entity when that action causes a Referential Boundary Condition e.g. 5607, 5608 in FIG. 56 and 5709, 5710 in FIG. 57, to be crossed.

The actions that may cause the Core Algorithm to use the Referential Integrity rules held in the Temporal Data Dictionary are those events that:

i) Alter the lifespan of the Focus Entity i.e. Insert, Alter Insert Forward, Alter Insert Back, Delete, Alter Delete Forward and Alter Delete Back.

ii) Alter the foreign key or primary key attribute of the Focus Entity in such a way as to affect the lifespan of related entities The Referential Integrity rules declared in the Temporal Data Dictionary against each relationship are there to ensure the Referential Integrity of the system data remains intact after any such action.

The settings available in the Temporal Data Dictionary for Referential rules are:

Cascade

One feature of many aspects of this invention is the concept of the cascade referential rule.

The cascade rule operates in conjunction with the value of the Attribution rule declared in the Temporal Data Dictionary against the foreign key attribute of the related entity.

i) If the Attribution rule defined against the foreign key attribute is set to Extend i.e. cascade (extend) then the action on the focus entity is allowed and related lifespans of the downstream entities are redefined appropriately.

ii) If the Attribution rule defined against the foreign key attribute is set to Default i.e. cascade (default) then the action on the focus entity is allowed and related downstream entities are, where appropriate, reconnected to a default focus entity for the X-Time period which constitutes the Foreign Key Gap.

iii) If the Attribution rule defined against the foreign key attribute is set to Nullify i.e. cascade (nullify) then the action on the focus entity is allowed and related downstream entities are, where appropriate, disconnected from any focus entity for the X-Time period which constitutes the Foreign Key Gap.

Bounded

One feature of many aspects of this invention is the concept of the bounded referential rule. This rule ensures that the final point in X-Time for Focus entity is inherited by the downstream entities however the X-Time values of the Referential Boundary Conditions determine the upper and lower limits of the effect of the action.

Restrict

One feature of many aspects of this invention is the concept of the restrict referential rule. This rule ensures that the action on the focus entity is not allowed if the Referential Boundary Conditions are crossed.

Upstream Temporal Splash

One feature of many aspects of this invention is the resolution of any potential Upstream Temporal Splash. The Core Algorithm is responsible for maintaining the referential integrity of the temporal data and in doing so must follow the Temporal Splash concept described in FIG. 17.

In special cases when the result of an action performed on an entity could cause upstream referential integrity problems i.e. an Upstream Temporal Splash, the Core algorithm either resolves the action into an equivalent downstream action or disallows the original action.

One feature of many aspects of the invention addresses the six cases where a potential Upstream Temporal Splash could occur and is therefore resolved:

Insert or Alter Insert of Upstream or Master Relation Where Requested Focus Insert Time<Upstream or Master Insert Time FIG. 50 depicts a requested Focus Insert (fi)<actual Upstream Insert (ui). According to the concept of Temporal Splash defined in this invention, this case must always result in an unchanged ui and so is equivalent to the case of a successful Downstream Lookup Alter Insert Forward 5018 from ui' to ui where ui'=requested fi.

FIG. 58a shows the psuedo code for each referential rule

Insert or Alter Insert of Upstream Relation Where Requested Focus Insert Time>=Upstream Insert Time FIG. 51 depicts a requested Focus Insert (fi)>=actual Upstream Insert (ui). This case does not activate any referential rules so the inert is allowed.

Insert of Master Relation Where requested Focus Insert Time>=Master Insert Time

FIG. 52 depicts a requested Focus Insert (fi)>=actual Master Insert (mi). According to the concept of Temporal Splash defined in this invention, this case must always result in an unchanged mi and so is equivalent to the case of a successful Downstream Lookup Alter Insert Back 5218 from mi' to mi where mi'=requested fi.

FIG. 58b shows the psuedo code for each referential rule

Delete or Alter Delete of Upstream or Master Relation Where Requested Focus Delete Time>Upstream or Master Delete Time FIG. 53 depicts a requested Focus Delete (fd)>actual Upstream Delete (ud). According to the concept of Temporal Splash defined in this invention, this case must always result in an unchanged ud and so is equivalent to the case of a successful Downstream Lookup Alter Delete Back 5318 from ud' to ud where ud'=requested fd.

FIG. 58c shows the psuedo code for each referential rule

Delete or Alter Delete of Upstream Relation Where Requested Focus Delete Time>=Upstream Delete Time FIG. 54 depicts a requested Focus Delete (fd)>=actual Upstream Delete (ud). This case does not activate any referential rules so the alter delete is allowed Delete or Alter Delete of Master Relation Where Requested Focus Delete Time<=Master Delete Time FIG. 55 depicts a requested Focus Delete (fd)<=actual Master Delete (md). According to the concept of Temporal Splash defined in this invention, this case must always result in an unchanged md and so is equivalent to the case of a successful Downstream Lookup Alter delete back 5518 from md' to md where md'=requested fd.

FIG. 58d shows the psuedo code for each referential rule

Referential Boundary Conditions

One feature of many aspects of this invention is the concept of Referential Boundary Conditions. The Core Algorithm is responsible for determining the X-Time positions of the Referential Boundary Conditions that apply to a particular action.

FIG. 56 shows the Referential Boundary Conditions 5607, 5608 for the Non transferrable Downstream case. In order to find the rows that dictate the X-Time positions of the Referential Boundary Conditions 5607 and 5608, for the non transferable case, the Core Algorithm must take into account:

i) all entities 5602, 5603, 5604 related to the focus entity 5601.
  ii) then across each related entity, the row 5603 with the earliest insert X-Time 5607, and the row 5604 with the latest delete X-Time 5608.
  iii) The referential rule defined against the relationship for governing row is then applied.
  iv) If the Referential rule is defined as a Cascade, then the Attribution rule defined against the foreign key attribute is used to determine the result of the action i.e. Extend, Default or Nullify.

FIG. 57 shows the Referential Boundary Conditions 5709, 5710 for the Transferable Downstream case. In order to find the rows that dictate the X-Time positions of the Referential Boundary Conditions 5709 and 5710, for the transferable case, the Core Algorithm must take into account:

i) all entities 5704 related to the focus entity 5702.
  ii) then across each related entity, the affected foreign key attribute value 5711.
  iii) The referential rule defined against the relationship for governing row is then applied.
  iv) If the Referential rule is defined as a Cascade, then the Attribution rule defined against the foreign key attribute is used to determine the result of the action i.e. Extend, Default or Nullify.

Foreign Key Gaps

One feature of many aspects of this invention is the concept of Foreign Key Gaps. Foreign Key Gaps are the periods of X-Time that occur when a Referential Boundary Condition is crossed in a transferable foreign key attribute.

The Core Algorithm is responsible for identifying and resolving such gaps which occur in transferable foreign key attributes as a result of an action as in FIG. 57 that reduces 5705, 5706 the lifespan of an entity 5702.

Potential Foreign Key Gaps 5707, 5708 can only appear if the Relational rule defined against a foreign key attribute is set to Cascade. The Core Algorithm provides an appropriate value for the Foreign Key Gap by referring to the Attribution rule values stored in the Temporal Data Dictionary against the foreign key attribute in question. As described earlier, the Attribution rule can be set to Extend, Default or Nullify and FIGS. 16a, 16b and 16c depict the affect that each Attribution rule has on the value of the attribute.

Action Result Diagrams

FIGS. 66-87 show a complete set of all the Action-Result cases that need to be considered for all actions that could occur on entities in a Temporal Database as defined in this invention.

The cases are annotated with codes for:
  i) Types of Relation (FIG. 61);
  ii) Relational Rules (FIG. 62);
  iii) Time Point Descriptions (FIG. 63);
  iv) Types of Relational Actions (FIG. 64);
  v) Types of Relational Results (FIG. 65);

Insert of a Focus Entity with Downstream Relations

FIG. 66 depicts a Focus entity. No Downstream entities can exist prior to the insert of a Focus entity. This Insert is a special case of Alter Insert Forward from Start of X-Time (xs).

Insert of a Focus Entity with Child Relations

FIG. 67 depicts a Focus entity. No Child entities can exist prior to the insert of a focus entity. This Insert is a special case of Alter Insert Forward from Start of X-Time (xs).

Insert of a Focus Entity with a Non Deleted Upstream Relation

FIG. 68a and FIG. 68b depict one (of many) Focus entities and a non deleted Upstream entity i.e. ud=fd/xe. This Insert is a special case of Alter Insert Forward from Start of X-Time (xs). Actions cannot affect the lifespan of the Upstream entity. According to the concept of Temporal Splash defined in this invention, this case must always result in an unchanged Upstream Insert (ui) (see FIGS. 50 and 51).

Insert of a Focus Entity with a Non Deleted Master Relation

FIG. 69 depicts one (of many) Focus entities and a Master entity i.e. md=fd/xe. This Insert is a special case of Alter Insert Forward from Start of X Time (xs). Actions cannot affect the lifespan of the Master entity. According to the concept of Temporal Splash defined in this invention, this case must always result in an unchanged Master Insert (mi) (see FIGS. 50 and 52).

Insert of a Focus Entity with a Deleted Upstream Relation

FIGS. 70a and 70b depict one (of many) Focus entities and a deleted Upstream entity i.e. ud<fd/xe. This Insert is a special case of Alter Insert Forward from Start of X-Time (xs). The Focus entity inherits the delete time of the Upstream entity. Actions cannot affect the lifespan of the upstream entity. According to the concept of Temporal Splash defined in this invention, this case must always result in an unchanged Upstream Insert (ui) (see FIG. 50).

Insert of a Focus Entity with a Deleted Master Relation

FIG. 71 depicts one (of many) Focus entities and a deleted Master entity i.e. md<fd/xe. This Insert is a special case of Alter Insert Forward from Start of X-Time (xs). The Focus entity inherits the delete time of the Master entity. Actions cannot affect the lifespan of the Master entity. According to the concept of Temporal Splash defined in this invention, this case must always result in an unchanged Master Insert (mi) (see FIGS. 50 and 52).

Alter Insert of a Focus Entity with Downstream Relations

FIGS. 72a and 72b depict a Focus entity and one (of many) Downstream entities. Foreign Key gaps can appear and will be resolved by the Core Algorithm as depicted in FIG. 57.

Alter Insert of a Focus Entity with Child Relations

FIG. 73 depicts a Focus entity and one (of many) Child entities.

Alter Insert of a Focus Entity with Upstream Relations

FIGS. 74a and 74b depict one (of many) Focus entities and an Upstream entity. Actions cannot affect the lifespan of the Upstream entity. According to the concept of Temporal Splash defined in this invention, this case must always result in an unchanged Upstream Insert (ui) (see FIGS. 50 and 51).

Alter Insert of a Focus Entity with a Master Relation

FIG. 75 depicts one (of many) Focus entities and the Master entity. Actions cannot affect the lifespan of the master entity. According to the concept of Temporal Splash defined in this invention, this case must always result in an unchanged Master Insert (mi) (see FIGS. 50 and 52).

Update of a Focus Entity with Downstream Relations

FIG. 76a depict a Focus entity and one (of many) Downstream entities. The only update action on a Focus entity that has a referential effect with respect to the Downstream relation entity is an update to a primary key attribute of the focus entity.

By definition, all primary key attributes in the Focus entity are mandatory, non transferable and non updateable in X-Time i.e. they always have the same value for the full lifespan of the focus entity. This means that an Attribute Integrity Rule in the Temporal Data Dictionary ensure that primary key has the same value for the full lifespan of the focus entity. The value of the foreign key in the downstream relation always matches the value of the primary key in the focus entity to which it is related.

FIG. 76b represents the result actions for Case 1 i.e. where the entity integrity allowed an update to the primary key then in all cases the Downstream relation is still related to the same Focus entity row even after an update to the Focus entity primary key value. However, the focus row is now identified by a different primary key id value. Therefore the result of an update action in this case is always allowed and does not activate any referential rules.

FIG. 76c represents the result actions for Case 2 i.e. where the entity integrity does not allow an update to the primary key therefore the action would be disallowed due to entity integrity rules.

Update of a Focus Entity with Child Relations

FIG. 77a depicts a Focus entity and one (of many) Child entities. The only update action on a Focus entity that has a referential effect with respect to the Child relation entity is an update to a primary key attribute of the Focus entity.

By definition, all primary key attributes in the Focus entity are mandatory, non transferable and non updateable in X-Time i.e. they always have the same value for the full lifespan of the Focus entity. This means that an Attribute Integrity Rule in the Temporal Data Dictionary ensure that primary key has the same value for the full lifespan of the Focus entity. The value of the foreign key in the Child relation always matches the value of the primary key in the Focus entity to which it is related.

FIG. 77b represents the result actions for Case 1 i.e. where the entity integrity allowed an update to the primary key then in all cases the Child relation is still related to the same Focus entity row even after an update to the Focus entity primary key value. However, the Focus row is now identified by a different primary key id value.

Therefore the result of an update action in this case is always allowed and does not activate any referential rules.

FIG. 77c represents the result actions for Case 2 i.e. where the entity integrity does not allow an update to the primary key therefore the action would be disallowed.

Update of a Focus Entity with Upstream Relation

FIGS. 78a and 78b depict a Focus entity and one (of many) Upstream entities. The only update action on a Focus entity that has a referential effect with respect to the Upstream relation entity is an update to a foreign key attribute of the Focus entity. After a foreign key update action the Focus entity is connected to a different Upstream relation row and so it is necessary for the system to check referential integrity. Therefore non transferable Upstream relations by definition are not applicable.

The potential referential effects of connecting to a new Upstream relation are the same as those for Insert of Upstream Relation Action Cases. See FIGS. 70a and 70b for Upstream Lookup Transferable Optional (ulto) and Upstream Lookup Transferable Mandatory (ultm) cases.

Update of a Focus Entity with a Master Relation

FIG. 79 depicts one (of many) Focus entities and the Master entity. The only update action on a Focus entity that has a referential effect with respect to the Master relation entity is an update to a foreign key attribute of the Focus entity. After a foreign key update action the focus entity is connected to a different Master relation row. Master relations are by definition non transferable and therefore this case is not allowed due to entity integrity rules.

Delete of a Focus Entity with Downstream Relations

FIG. 80 depicts a Focus entity and one (of many) Downstream entities. Prior to deletion, the Focus entity exists from Focus Insert (fi) to End of X-Time (xe). The act of deletion reduces the lifespan of the Focus entity i.e. from xe This case describes the initial deletion of a Focus entity and can be viewed as a special case of Alter Delete i.e. from xe to fd, therefore the descriptions for Downstream Relation—Alter Delete will cover this case (see FIG. 84a and FIG. 84b).

Delete of a Focus Entity with Child Relations

FIG. 81 depicts a Focus entity and one (of many) Child entities. Prior to deletion, the Focus entity exists from Focus Insert (fi) to End of X-Time (xe). The act of deletion reduces the lifespan of the Focus entity i.e. from xe. This case describes the initial deletion of a Focus entity and can be viewed as a special case of Alter Delete i.e. from xe to cd, therefore the descriptions for Child Relation—Alter Delete will cover this case (see FIG. 85).

Delete of a Focus Entity with Upstream Relations

FIG. 82 depicts a Focus entity and one (of many) Upstream entities. Prior to the deletion of a Focus entity with an Upstream, the Upstream relations Delete time (ud) must equal fd/xe i.e. must exist for the full lifespan of the Focus entity. When applicable, the deletion of a Focus entity can be viewed as a special case of Alter Delete i.e. from fd/xe, therefore the descriptions for Upstream Relation—Alter Delete will cover this case (see FIG. 86a and FIG. 86b).

Delete of a Focus Entity with a Master Relation

FIG. 83 depicts a Focus entity and the Master entities. Prior to the deletion of a Focus entity with a Master, the Master relations Delete time (md) must equal fd/xe i.e. must exist for the full lifespan of the focus entity. When applicable, the deletion of a Focus entity can be viewed as a special case of Alter Delete i.e. from fd/xe, therefore the descriptions for Master Relation—Alter Delete will cover this case (see FIG. 87).

Alter Delete of a Focus Entity with Downstream Relations

FIGS. 84a and 84b depict a Focus entity and one (of many) Downstream entities. Foreign Key gaps can appear and are resolved by the Core Algorithm as depicted in FIG. 57.

Alter Delete of a Focus Entity with Child Relations

FIG. 85 depicts a Focus entity and one (of many) Child entities.

Alter Delete of a Focus Entity with Upstream Relation

FIGS. 86a and 86b depict one (of many) Focus entities and the Upstream entity. Actions cannot affect the lifespan of the upstream entity. According to the concept of Temporal Splash defined in this invention, this case must always result in an unchanged Upstream Delete (ud). (see FIGS. 53 and 54).

Alter Delete of a Focus Entity with a Master Relation

FIG. 87 depicts one (of many) Focus entities and the Master entity. Actions cannot affect the lifespan of the master entity. According to the concept of Temporal Splash defined in this invention, this case must always result in an unchanged Master Delete (md). (see FIGS. 53 and 55).

Build Instructions for Action-Result Diagrams

The standard steps needed to build any Action-Result diagram are described here using the Alter Insert Forward action as an example.

FIG. 60 depicts the end result of an Alter Insert Forward action applied to the focus entity (6015) that is related to a downstream entity (6017) via a Downstream Lookup Transferable Optional (dlto) relation (6016) where the relational rule is set to Cascade (Nullify) (6021) in the temporal data dictionary.

In this case the diagram depicts the foreign key attribute implemented in the downstream entity (6017). Also note that case indicates that the action is allowed and so the referential rule is declared.

For the purpose of clarity the Figure shows only the primary key attribute of the focus entity e.g. department.id and the foreign key attribute of the downstream entity e.g. employee.department_id as these are the only attributes that are pertinent to the integrity of the relationship.

The system is aware of all defined downstream entities and their referential rules and thus determines the downstream entity 6017 with the overriding influence on the action i.e. the boundary conditions. In this case it is the employee with the earliest insert time.

See FIG. 56 for a description of how the Core Algorithm finds the particular rows in the related entities that determine the Referential Boundary Conditions.

See FIG. 57 for a description of how the Core Algorithm resolves any Foreign Key gaps The order in which the affected entities are processed is determined by the Core Algorithm by referencing the Temporal Referential Tree.

Step One—Draw the Vertical Time Lines
Start of X-Time (xs) translates to 6002.
Focus insert time (fi) translates to 6004.
Focus delete time (fd) translates to 6010.
Downstream insert time (di) translates to 6006.
Downstream delete time (dd) translates to 6008.
End of X-Time (xe) translates to 6012.

Step Two—Draw the Resulting Focus Entity
The new focus insert time 6020 is drawn between 6006 and 6008.
The focus delete time 6010 is unchanged.
Step Three—Draw the Resulting Downsteam Entity
The downstream insert time 6006 is unchanged.
The foreign key attribute in the downstream entity in set to null between 6006 and 6020.
The foreign key attribute in the downstream entity is unchanged between 6020 and 6008.
The downstream delete time 6006 is unchanged.

Step Four—Draw the Relation
The focus entity 6015 is related to many downstream entities 6017.
The relation rule 6016 is depicted as Cascade (Nullify).

Some Worked Examples of Action Result Diagram

The invention will now be described by way of example only, and with reference to some worked examples, with reference to the accompanying FIGS. 20 to 24. The example action described is that of Alter Insert on a Focus Entity with Downstream relations.

Alter Insert Back of Focus Entity with Downstream Relations (xs<Requested fi<fi)

In FIG. 20 2002 is the start of system time with 2012 being the end of system time. The periods of effect for all transactions being within the boundaries of 2002 and 2012.

FIG. 20 shows the relationship 2016 between a focus entity 2015 e.g. a department and a downstream entity 2017 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2015 is the defined by the focus entity insert time 2004 and the focus entity delete time 2010.

The lifespan of the downstream entity 2017 is the defined by the downstream entity insert time 2006 and the downstream entity delete time 2008.

When Focus entity insert time 2004 is altered to new focus entity insert time 2020 where New focus entity insert time 2020 is between start of x-time 2002 and original focus entity insert time 2004 then no relational rules take effect because relational integrity between focus entity 2015 and downstream entity 2017 is not compromised in this case.

Entity and Attribute rules are applied to focus entity 2015

Alter Insert Forward of Focus Entity with Downstream Relations (fi<Requested fi<di)

In FIG. 21 2102 is the start of system time with 2112 being the end of system time. The periods of effect for all transactions being within the boundaries of 2102 and 2112.

FIG. 21 shows the relationship 2116 between a focus entity 2115 e.g. a department and a downstream entity 2117 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2115 is the defined by the focus entity insert time 2104 and the focus entity delete time 2110.

The lifespan of the downstream entity 2117 is the defined by the downstream entity insert time 2106 and the downstream entity delete time 2108.

When Focus entity insert time 2104 is altered to new focus entity insert time 2120 where New focus entity insert time 2120 is between original focus entity insert time 2104 and downstream entity insert time 2106 then no relational rules take effect because relational integrity between focus entity 2115 and downstream entity 2117 is not compromised in this case.

Entity and Attribute rules are applied to focus entity 2115

Alter Insert Forward of Focus Entity with Downstream Relations Resulting in a Cascade (Extend) Rule (di<Requested fi<dd)

In FIG. 22A 2202 is the start of system time with 2212 being the end of system time. The periods of effect for all transactions being within the boundaries of 2202 and 2212.

FIG. 22A shows the relationship 2216 between a focus entity 2215 e.g. a department and a downstream entity 2217 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2215 is the defined by the focus entity insert time 2204 and the focus entity delete time 2210.

The lifespan of the downstream entity 2217 is the defined by the downstream entity insert time 2206 and the downstream entity delete time 2208.

The Core Algorithm is aware of all defined downstream entities and their referential rules and thus determines the downstream entity 2217 with the overriding influence on the action i.e. the Referential Boundary Condition as described in FIG. 56.

When Focus entity insert time 2204 is altered to new focus entity insert time 2220 where New focus entity insert time 2220 is between original downstream entity insert time 2206 and downstream entity delete time 2208 then the relational integrity of between focus entity 2215 and downstream entity 2217 is compromised.

If the referential integrity rule 2221 stored against the relationship 2216 is CASCADE and the attribution rule on the foreign key attribute is set to EXTEND then the new downstream entity insert inherits the value of the new focus entity insert time 2220.

Entity and Attribute rules are applied to focus entity 2215 and the downstream entity 2217.

See FIG. 56 for a description of how the Core Algorithm finds the particular rows in the related entites that determine the Referential Boundary Conditions.

See FIG. 57 for a description of how the Core Algorithm resolves Foreign Key gaps.

The order in which the affected entities are processed is determined by the Core Algorithm by referencing the Temporal Referential Tree.

Alter Insert Forward of Focus Entity with Downstream Relations Resulting in a Bounded Rule (di<Requested fi<dd)

In FIG. 22B 2202 is the start of system time with 2212 being the end of system time. The periods of effect for all transactions being within the boundaries of 2202 and 2212.

FIG. 22B shows the relationship 2216 between a focus entity 2215 e.g. a department and a downstream entity 2217 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2215 is the defined by the focus entity insert time 2204 and the focus entity delete time 2210. The lifespan of the downstream entity 2217 is the defined by the downstream entity insert time 2206 and the downstream entity delete time 2208.

The Core Algorithm is aware of all defined downstream entities and their referential rules and thus determines the downstream entity 2217 with the overriding influence on the action i.e. the Referential Boundary Condition as described in FIG. 56.

When Focus entity insert time 2204 is altered to new focus entity insert time 2220 where New focus entity insert time 2220 is between original downstream entity insert time 2206 and downstream entity delete time 2208 then the relational integrity of between focus entity 2215 and downstream entity 2217 is compromised.

If the referential integrity rule 2221 stored against the relationship 2216 is BOUNDED then the new focus entity insert time inherits the value of the downstream entity insert time 2206.

Entity and Attribute rules are applied to focus entity 2215.

See FIG. 56 for a description of how the Core Algorithm finds the particular rows in the related entites that determine the Referential Boundary Conditions.

See FIG. 57 for a description of how the Core Algorithm resolves Foreign Key gaps.

The order in which the affected entities are processed is determined by the Core Algorithm by referencing the Temporal Referential Tree.

Alter Insert Forward of Focus Entity with Downstream Relations Resulting in a Restrict Rule (di<Requested fi<dd)

In FIG. 22C 2202 is the start of system time with 2212 being the end of system time. The periods of effect for all transactions being within the boundaries of 2202 and 2212.

FIG. 22C shows the relationship 2216 between a focus entity 2215 e.g. a department and a downstream entity 2217 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2215 is the defined by the focus entity insert time 2204 and the focus entity delete time 2210.

The lifespan of the downstream entity 2217 is the defined by the downstream entity insert time 2206 and the downstream entity delete time 2208.

The Core Algorithm is aware of all defined downstream entities and their referential rules and thus determines the downstream entity 2217 with the overriding influence on the action i.e. the Referential Boundary Condition as described in FIG. 56.

When Focus entity insert time 2204 is altered to new focus entity insert time 2220 where New focus entity insert time 2220 is between original downstream entity insert time 2206 and downstream entity delete time 2208 then the relational integrity of between focus entity 2215 and downstream entity 2217 is compromised.

If the referential integrity rule 2221 stored against the relationship 2216 is RESTRICT then the action is not allowed.

Alter Insert Forward of Focus Entity with Downstream Relations Resulting in a Cascade (Default) Rule (di<Requested fi<dd)

In FIG. 22D 2202 is the start of system time with 2212 being the end of system time. The periods of effect for all transactions being within the boundaries of 2202 and 2212.

FIG. 22D shows the relationship 2216 between a focus entity 2215 e.g. a department and a downstream entity 2217 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

FIG. 22D also shows the relationship 2213 between a default entity 2214 e.g. a default department and a downstream entity 2217 e.g. an employee. For the purpose of clarity the Figure shows only the primary key attribute of the default entity e.g. department.id and the foreign key attribute of the downstream entity e.g. employee.department_id as these are the only attributes that are pertinent to the integrity of the relationship. The system does not allow changes to the lifespan of the default entity 2214.

The lifespan of the focus entity 2215 is the defined by the focus entity insert time 2204 and the focus entity delete time 2210.

The lifespan of the downstream entity 2217 is the defined by the downstream entity insert time 2206 and the downstream entity delete time 2208.

The lifespan of the default entity 2214 is the defined by the start of system time 2202 and the end of system time 2212.

The Core Algorithm is aware of all defined downstream entities and their referential rules and thus determines the downstream entity 2217 with the overriding influence on the action i.e. the Referential Boundary Condition as described in FIG. 56.

When Focus entity insert time 2204 is altered to new focus entity insert time 2220 where New focus entity insert time 2220 is between original downstream entity insert time 2206 and downstream entity delete time 2208 then the relational integrity of between focus entity 2215 and downstream entity 2217 is compromised.

If the referential integrity rule 2221 stored against the relationship 2216 is CASCADE and the attribution rule on the foreign key attribute is set to DEFAULT then the value of the downstream entity foreign key attribute (e.g. employee.department_id) inherits the value of the default entity primary key attribute (e.g. department.id) for the period between the downstream entity insert time 2206 and the new focus entity insert time 2220.

Entity and Attribute rules are applied to focus entity 2215 and the downstream entity 2217. Note that if the action is only allowed if the attribute rules of downstream entity foreign key are such that the foreign key is transferable I.e. is allowed more than one value during the lifespan of the entity.

See FIG. 56 for a description of how the Core Algorithm finds the particular rows in the related entities that determine the Referential Boundary Conditions.

See FIG. 57 for a description of how the Core Algorithm resolves Foreign Key gaps.

The order in which the affected entities are processed is determined by the Core Algorithm by referencing the Temporal Referential Tree.

Alter Insert Forward of Focus Entity with Downstream Relations Resulting in a Cascade (Nullify) Rule (di<Requested fi<dd)

In FIG. 22E 2202 is the start of system time with 2212 being the end of system time. The periods of effect for all transactions being within the boundaries of 2202 and 2212.

FIG. 22E shows the relationship 2216 between a focus entity 2215 e.g. a department and a downstream entity 2217 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2215 is the defined by the focus entity insert time 2204 and the focus entity delete time 2210.

The lifespan of the downstream entity 2217 is the defined by the downstream entity insert time 2206 and the downstream entity delete time 2208.

The Core Algorithm is aware of all defined downstream entities and their referential rules and thus determines the downstream entity 2217 with the overriding influence on the action i.e. the Referential Boundary Condition as described in FIG. 56.

When Focus entity insert time 2204 is altered to new focus entity insert time 2220 where New focus entity insert time 2220 is between original downstream entity insert time 2206 and downstream entity delete time 2208 then the relational integrity of between focus entity 2215 and downstream entity 2217 is compromised.

If the referential integrity rule 2221 stored against the relationship 2216 is CASCADE and the attribution rule on the foreign key attribute is set to NULLIFY then the value of the downstream entity foreign key attribute (e.g. employee.department_id) inherits the NULL value for the period between the downstream entity insert time 2206 and the new focus entity insert time 2220.

Entity and Attribute rules are applied to focus entity 2215 and the downstream entity 2217. Note that the action is only allowed if the attribute rules of downstream entity foreign key are such that the foreign key is transferable (i.e. is allowed more than one value during the lifespan of the entity) and Optional (i.e. Null values allowed)

See FIG. 56 for a description of how the Core Algorithm finds the particular rows in the related entites that determine the Referential Boundary Conditions.

See FIG. 57 for a description of how the Core Algorithm resolves Foreign Key gaps.

The order in which the affected entities are processed is determined by the Core Algorithm by referencing the Temporal Referential Tree.

Alter Insert Forward of Focus Entity with Downstream Relations Resulting in a Cascade (Extend) Rule (dd<Requested fi<fd)

In FIG. 23A 2302 is the start of system time with 2312 being the end of system time. The periods of effect for all transactions being within the boundaries of 2302 and 2312.

FIG. 23A shows the relationship 2316 between a focus entity 2315 e.g. a department and a downstream entity 2317 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2315 is the defined by the focus entity insert time 2304 and the focus entity delete time 2310.

The lifespan of the downstream entity 2317 is the defined by the downstream entity insert time 2306 and the downstream entity delete time 2308.

The Core Algorithm is aware of all defined downstream entities and their referential rules and thus determines the downstream entity 2317 with the overriding influence on the action i.e. the Referential Boundary Condition as described in FIG. 56.

When Focus entity insert time 2304 is altered to new focus entity insert time 2320 where New focus entity insert time 2320 is between downstream entity delete time 2308 and focus entity delete time 2310 then the relational integrity of between focus entity 2315 and downstream entity 2317 is compromised.

If the referential integrity rule 2321 stored against the relationship 2316 is CASCADE and the attribution rule on the foreign key attribute is set to EXTEND then the new downstream entity insert inherits the value of the new focus entity insert time 2320. This effectively means that the lifespan of the downstream entity is either deleted or disconnected from the focus entity (optional only)

Entity and Attribute rules are applied to focus entity 2315.

See FIG. 56 for a description of how the Core Algorithm finds the particular rows in the related entities that determine the Referential Boundary Conditions.

See FIG. 57 for a description of how the Core Algorithm resolves Foreign Key gaps.

The order in which the affected entities are processed is determined by the Core Algorithm by referencing the Temporal Referential Tree.

Alter Insert Forward of Focus Entity with Downstream Relations Resulting in a Bounded Rule (dd<Requested fi<fd)

In FIG. 23B 2302 is the start of system time with 2312 being the end of system time. The periods of effect for all transactions being within the boundaries of 2302 and 2312.

FIG. 23B shows the relationship 2316 between a focus entity 2315 e.g. a department and a downstream entity 2317 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2315 is the defined by the focus entity insert time 2304 and the focus entity delete time 2310.

The lifespan of the downstream entity 2317 is the defined by the downstream entity insert time 2306 and the downstream entity delete time 2308.

The Core Algorithm is aware of all defined downstream entities and their referential rules and thus determines the downstream entity 2317 with the overriding influence on the action i.e. the Referential Boundary Condition as described in FIG. 56.

When Focus entity insert time 2304 is altered to new focus entity insert time 2320 where New focus entity insert time 2320 is between downstream entity delete time 2308 and focus entity delete time 2310 then the relational integrity of between focus entity 2315 and downstream entity 2317 is compromised.

If the referential integrity rule 2321 stored against the relationship 2316 is BOUNDED then the new focus entity insert time inherits the value of the downstream entity insert time 2306.

Entity and Attribute rules are applied to focus entity 2315.

See FIG. 56 for a description of how the Core Algorithm finds the particular rows in the related entities that determine the Referential Boundary Conditions.

See FIG. 57 for a description of how the Core Algorithm resolves Foreign Key gaps.

The order in which the affected entities are processed is determined by the Core Algorithm by referencing the Temporal Referential Tree.

Alter Insert Forward of Focus Entity with Downstream Relations Resulting in a Restrict Rule (dd<Requested fi<fd)

In FIG. 23C 2302 is the start of system time with 2312 being the end of system time. The periods of effect for all transactions being within the boundaries of 2302 and 2312.

FIG. 23C shows the relationship 2316 between a focus entity 2315 e.g. a department and a downstream entity 2317 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2315 is the defined by the focus entity insert time 2304 and the focus entity delete time 2310.

The lifespan of the downstream entity 2317 is the defined by the downstream entity insert time 2306 and the downstream entity delete time 2308.

The Core Algorithm is aware of all defined downstream entities and their referential rules and thus determines the downstream entity 2317 with the overriding influence on the action i.e. the Referential Boundary Condition as described in FIG. 56.

When Focus entity insert time 2304 is altered to new focus entity insert time 2320 where New focus entity insert time 2320 is between downstream entity delete time 2308 and focus entity delete time 2310 then the relational integrity of between focus entity 2315 and downstream entity 2317 is compromised.

If the referential integrity rule 2321 stored against the relationship 2316 is RESTRICT then the action is not allowed.

Alter Insert Forward of Focus Entity with Downstream Relations Resulting in a Cascade (Default) Rule (dd<Requested fi<fd)

In FIG. 23D 2302 is the start of system time with 2312 being the end of system time. The periods of effect for all transactions being within the boundaries of 2302 and 2312.

FIG. 23D shows the relationship 2316 between a focus entity 2315 e.g. a department and a downstream entity 2317 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

FIG. 23D also shows the relationship 2313 between a default entity 2314 e.g. a default department and a downstream entity 2317 e.g. an employee. For the purpose of clarity the Figure shows only the primary key attribute of the default entity e.g. department.id and the foreign key attribute of the downstream entity e.g. employee.department_id as these are the only attributes that are pertinent to the integrity of the relationship. The system does not allow changes to the lifespan of the default entity 2314.

The lifespan of the focus entity 2315 is the defined by the focus entity insert time 2304 and the focus entity delete time 2310.

The lifespan of the downstream entity 2317 is the defined by the downstream entity insert time 2306 and the downstream entity delete time 2308.

The lifespan of the default entity 2314 is the defined by the start of system time 2302 and the end of system time 2312.

The Core Algorithm is aware of all defined downstream entities and their referential rules and thus determines the downstream entity 2317 with the overriding influence on the action i.e. the Referential Boundary Condition as described in FIG. 56.

When Focus entity insert time 2304 is altered to new focus entity insert time 2320 where New focus entity insert time 2320 is between downstream entity delete time 2308 and focus entity delete time 2310 then the relational integrity of between focus entity 2315 and downstream entity 2317 is compromised.

If the referential integrity rule 2321 stored against the relationship 2316 is CASCADE and the attribution rule on the foreign key attribute is set to DEFAULT then the value of the downstream entity foreign key attribute (e.g. employee.department_id) inherits the value of the default entity primary key attribute (e.g. department.id) for the lifespan of the downstream entity.

Entity and Attribute rules are applied to focus entity 2315 and the downstream entity 2317.

See FIG. 56 for a description of how the Core Algorithm finds the particular rows in the related entities that determine the Referential Boundary Conditions.

See FIG. 57 for a description of how the Core Algorithm resolves Foreign Key gaps.

The order in which the affected entities are processed is determined by the Core Algorithm by referencing the Temporal Referential Tree.

Alter Insert Forward of Focus Entity with Downstream Relations Resulting in a Cascade (Nullify) Rule (dd<Requested fi<fd)

In FIG. 23E 2302 is the start of system time with 2312 being the end of system time. The periods of effect for all transactions being within the boundaries of 2302 and 2312.

FIG. 23E shows the relationship 2316 between a focus entity 2315 e.g. a department and a downstream entity 2317 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2315 is the defined by the focus entity insert time 2304 and the focus entity delete time 2310.

The lifespan of the downstream entity 2317 is the defined by the downstream entity insert time 2306 and the downstream entity delete time 2308.

The Core Algorithm is aware of all defined downstream entities and their referential rules and thus determines the downstream entity 2317 with the overriding influence on the action i.e. the Referential Boundary Condition as described in FIG. 56.

When Focus entity insert time 2304 is altered to new focus entity insert time 2320 where New focus entity insert time 2320 is between downstream entity delete time 2308 and focus entity delete time 2310 then the relational integrity of between focus entity 2315 and downstream entity 2317 is compromised.

If the referential integrity rule 2321 stored against the relationship 2316 is CASCADE and the attribution rule on the foreign key attribute is set to NULLIFY then the value of the downstream entity foreign key attribute (e.g. employee.department_id) inherits the NULL value for the lifespan of the downstream entity.

Entity and Attribute rules are applied to focus entity 2315 and the downstream entity 2317. Note that the action is only allowed if the attribute rules of downstream entity foreign key are such that the foreign key is optional (i.e. Null values allowed)

See FIG. 56 for a description of how the Core Algorithm finds the particular rows in the related entities that determine the Referential Boundary Conditions.

See FIG. 57 for a description of how the Core Algorithm resolves Foreign Key gaps.

The order in which the affected entities are processed is determined by the Core Algorithm by referencing the Temporal Referential Tree.

Alter Insert Forward of Focus Entity with Downstream Relations (fd<Requested fi<xe)

In FIG. 24 2402 is the start of system time with 2412 being the end of system time. The periods of effect for all transactions being within the boundaries of 2402 and 2412.

FIG. 24 shows the relationship 2416 between a focus entity 2415 e.g. a department and a downstream entity 2417 e.g. an employee. For the purpose of clarity the Figure shows only the primary key attribute of the focus entity e.g. department.id and the foreign key attribute of the downstream entity e.g. employee.department_id as these are the only attributes that are pertinent to the integrity of the relationship.

The lifespan of the focus entity 2415 is the defined by the focus entity insert time 2404 and the focus entity delete time 2410.

The lifespan of the downstream entity 2417 is the defined by the downstream entity insert time 2406 and the downstream entity delete time 2408.

When Focus entity insert time 2404 is altered to new focus entity insert time 2420 where New focus entity insert time 2420 is between focus entity delete time 2410 and end of system time 2412.

The Entity Integrity of the focus entity is compromised by breaking the Positive lifespan rule and so the action is not allowed.

SOME BENEFITS OF THE INVENTION

The Insert only nature of the invention delivers significant benefits. Once the data is managed using an Insert only approach combined with a Summary Position and Time Cubes then it becomes possible to simplify many aspects of existing client/server and internet system architectures.

The invention offers the potential to fundamentally affect all layers of existing system and application architectures and at the same time provide additional implicit functionality that is not currently available.

We now consider the many potential advantages offered by the invention as they relate to the various layers found in many existing system and application architectures.

Internet Connectivity

The Insert only model improves the ability for systems to support transactions over a stateless protocol such as the internet. Existing webbased applications have to cope with the remote, stateless nature of internet connections typically accessed by a browser, such as Microsoft Internet Explorer or Netscape Navigator.

The invention implements update and delete actions as logical inserts into the Time Cube. This means that the algorithms and techniques used to maintain multi version read consistency between different users accessing the same data over a stateless protocol can potentially be simplified as the data itself is never physically updated or deleted.

Enhanced Concurrency

FIG. 19 shows that two separate user processes 1901, 1902 (either statefull or stateless) can be acting on different attributes say surname 1903, department name 1904 and location 1905 of the same on entity at the same time without locking each other out.

In the past, standard databases technologies provided table level locking. This was rather inefficient when delivering data concurrency within multi user systems and was eventually improved upon with the introduction of row level locking. The ability to provide row level locking technology had a massive influence on the success of vendors who offered such facilities. This invention delivers further improvements over and above that of row level locking by delivering attribute level locking. Attribute level locking provides a very high level of concurrency in multi user applications. For example, it would be possible for, say, two application modules to be acting on different attributes of the same row of an entity within the same system or database.

The ability to provide concurrency at the attribute level introduces many benefits to applications built on this basis. For example it would be possible for separate processes to be acting on different attributes of the same sales ledger row or employee row. This means that the functional scope of system modules could be designed to take advantage of this benefit.

Another example would be say Internet applications that provide booking facilities, for example for Airlines or the theatre. Each seat would be identified by an attribute. Multiple internet users could be viewing and booking the same set of Airline seats without locking each other out. Also, because of attribute level locking, if a user chooses a seat that has just been booked by another user, then the system would only have to refresh the attribute that corresponded to that seat rather than downloading the whole row of seats again. This improves speed of refresh, reduces telecommunications traffic, and may be cheaper for the operator.

Web Caching

Within the industry, the topic of caching is large and well documented. Ultimately caching for internet based applications is largely concerned with avoiding unnecessary reads of the data. For example, if a user has already read (and cached) the data from a source system then until the data has actually changed through update or delete actions the subsequent reads can be delivered from cache.

Reading from cache (processor memory based or disk based) is much faster than reading from the source data, however the caching system must ensure delivery of consistent results to the user. Various caching techniques already exist e.g.
  i) Expiry based caching, where a time limit is set on the validity of the cache, it is good for slowly changing data and does not require a source check until the expiry period expires.
  ii) Validation based caching, where a source ping is needed each time to check to see if the source system has flagged a change in the data.
  iii) Invalidation based caching, where the cache is used until a source system event marks the cache as invalid.

This invention uses the insert only paradigm and so offers the potential to create new, simpler and faster caching techniques because the data in the source system is never deleted or updated.

The invention in some aspects may provide methods of caching, and processes, and software, adapted to manage caching.

Application Lifecycle, Maintenance and Upgrade

As well as using the invention to store application data, it is possible to extend the use of a Time Cube into the storage of both code and data schema so that the actual code and data structure in use at a point in time are determined by valid time.

Once the structure and code base of a system is based upon this invention then activities such as upgrades to schema and code can be set up ahead of time thus simplifying maintenance, migration and testing cycles normally associated with existing systems.

All the advantages of modelling data in time also apply to the modelling of the structure of the data. For example moving to a new version of the schema would simply involve applying changes to the data dictionary at the appropriate valid time. This means that multiple versions of the same application can co exist on the same system and upgrades to a new application schema could be applied ahead of time. In traditional systems a change over to a new application schema is accompanied by a shutdown, data migration and upgrade after which the old schema is unavailable. Being able to change to an updated schema without shutdown, possibly whilst users are still using the old schema, can have great benefits, and methods and apparatus to do this are provided by some aspects of the invention.

In this invention the Temporal Data Dictionary, and the Temporal Relational Tree, can also be managed within a Time Cube. This means that the STRUCTURE of an application schema is modelled in time. As application transactions occur they apply to the data structure as defined by the valid time of the transaction. The Temporal Data Dictionary itself would be held in its own Time Cube so that the metadata of system objects are held relative to time. This would also mean that, for example, design changes with respect to application schemas could be applied well ahead of go-live time unlike in traditional relational systems where a change in the structure of a schema would typically be implemented by creating a new version of the schema.

The schema or structure of a traditional system is fixed for the duration of a particular version. Migration to another version typically requires that the system undergoes a transition during which data is converted to the new structure. In a typical application the entities and relations are defined according to the business needs. In the prior art once in go-live/production, the entities and their referential connections are static and remain so until the next development cycle: that is not necessarily so once we can show a way to have the structure/content of the application schema as time dependent (i.e. the system selects whichever schema is applicable for a given time)

Application Development

The invention augments the existing modelling structures available within traditional analysis techniques. For example, Entity Relationship Diagrams (ERD) still apply, but with additional events affecting the entity relationships (i.e. Alter Insert Forward, Alter Insert Back, Alter Delete Forward and Alter Delete Back, see FIG. 25). This means that developers and analysts will be able to quickly adopt the new approach, and thus leverage the existing skills base within the industry.

Also, unlike prior art, this invention does not require new Structured Query Language syntax in order to support data query and manipulation.

Also, the Data Dictionaries in standard RDBMS's only declaratively implement a subset of the potential relational rules i.e. Update Restrict, Delete Restrict and Delete Cascade (see FIG. 25). This means that it is left to the application developer to implement, if possible, the other integrity rules in triggers or in a business logic layer. This invention offers an extended and complete set of relational rules declared in a Temporal Data Dictionary. Additional logic is not required at the application layer in order to provide a full set of all attribute, entity and relational integrity constraints (see FIG. 25).

It should be noted, for example, that in a standard RDBMS the Update Cascade rule cannot be implemented due to the well-known problem of Mutating tables. This is because a logical inconsistency arises when the update action is applied to an object.

Embodiments of this invention do not suffer from such inconsistencies because they are based on an Insert Only model such that logical Update actions are implemented as inserts into a new Summary Position in a Time Cube.

Application Migration from Existing Applications

Current data from existing non temporal database applications can be easily migrated into Summary Positions in a Time Cube.

FIG. 30 depicts the migration 3001 of a row in a non temporal application 3002 into a Time Cube 3003 with X-Time 3004 and Y-Time 3005.

In a typical non temporal application design:
i) Attribute data 3008, 3009, 3010 would create summary position data 3014, 3015, 3016 with a X-Time and Y-Time of now. Where now is the date that the migration took place.
ii) In systems where insert timestamps are not stored then temporal data would inherit the start of system time value 3006 for an insert time.
iii) In systems where insert timestamps 3011 are stored then this would be used to determine an insert time in X-Time.
iv) In systems where last updated timestamps are stored this would be used to create a subsequent Y-Time summary positions.
v) In systems where logical deletion has been implemented using, say, a delete flag and timestamp e.g. in mainframe databases, this would be used to determine a delete time in X-time in a subsequent Y-Time summary position.
vi) In systems where historical data has been stored then an loading algorithm could be devised to read through the historical data and build further Y-Time summary positions.
vii) Where logical deletion is not implemented then data would inherit the end of system time value 3007 for a delete time.

After a migration has been performed the number of Y-Time positions created would, of course, depend upon how many timestamp attributes 3008, 3009, 3010 existed on the source non temporal system.

Once the data has been loaded into the Summary Positions in the Time Cubes, then a combination of existing modified modules and newly design temporal modules could act on the data in parallel. Existing modules would need to minor modifications to replace the location of stored data.

With a controlled change process, one could eventually replace all the traditional modules with temporally enhanced modules.

Version Control Applications

In a typical development environment the data structure and source code of a system is stored within a version control repository. Source code is checked in and out of these repositories during the development lifecycle. The efficient storage of multiple object versions and histories is crucial to the success of the system. Version Control applications built on a Time Cubes using could take advantage of the implicit use of time to store and retrieve code and data structures.

Methods, apparatus and software, for version control are provided by some aspects of the invention.

Backup and Restore

Another key element in the creation of a resilient application is the ability to support the backup and recovery of application data. Backup and recovery routines for applications built on Time Cubes would be very efficient and easy to build.

FIG. 31 depicts in Y-Time 3105, how a backup 3104 is performed by indicating the Y-Time value 3101 from which to backup Summary Positions in the Time Cube up to the most recent Summary Position 3102 in the Time Cube. For simplicity, FIG. 31 only shows one attribute of one row in one entity in the Time Cube.

The recovery would be performed by re inserting the Summary Positions from a known backup Summary Position 3103. The system could easily be configured to perform automatic backup and recovery routines.

Methods, apparatus and software for back up and restore are provided by some aspects of the invention.

Archiving

Another key element in the creation of a resilient application is the ability to support the archiving of application data. As with backup and recovery routines, archiving routines for applications built on Time Cubes would be very efficient and easy to build.

FIG. 32 depicts in Y-Time 3205, how an archive 3203 is performed by indicating the first Summary Position in the Time Cube 3201 up to the Summary Position at Y-Time value 3202. For simplicity, FIG. 32 only shows one attribute of one row in one entity in the Time Cube.

If for any reason the system needs to read archived data then the data can easily be reinserted into the Time Cube For example it would be straightforward to archive summary position data where transaction time is earlier than 2 months from today's date.

Methods, apparatus and software for archiving are provided by some aspects of the invention.

Transaction Control, Rollforward, Rollback and Indexing

This invention is based on an Insert Only model and as such does not need to support Update and Delete actions on system data. The only actions being performed by the core processes are Select and Insert. This means that the memory structures and techniques found in existing database technologies are greatly simplified. Techniques used to support existing database technologies, such as database buffer cache, redo logs, rollback segments, checkpoints and btree indexing are all potentially simplified or removed and so the database engine is made more efficient as a result.

This approach means that the core code of this invention does not need the elaborate disk and memory management techniques found in traditional systems.

The simplification of the core code allows for improvement in speed and use of system resources and at the same time inherently provides enhanced temporal application functionality Methods, apparatus and software for Transaction Control, Rollforward, Rollback and Indexing are provided by some aspects of the invention.

Business Applications

The implicit capability of the invention to maintain complete data integrity with respect to both transaction time and valid time means that a broad scope of benefits is delivered to a number of industry areas. To specifically name a few, the invention will provide significant benefits to retail, financial, medical, airline, versions in CAD/CAM applications, econometrics, inventory control, statistical and scientific data, and insurance industries as well as to future developments in spatial systems such as Geographic Information systems and weather mapping. In the area of retail, the invention will allow all data to be managed with complete integrity in respect to transaction time and valid time. For example, the price for goods can be set to change at specified times in the future. Thus allowing business decisions to be taken by retailers that can influence consumers purchasing habits. Additionally, price changes set for the future can be changed without constraint prior to the date and time of change. The invention delivers this functionality by using the present time to determine the price at which goods are offered for sale. In effect, when a price is looked up on the database holding this information, the invention implicitly uses the present time to determine the price to be used for the transaction.

There is a threefold benefit to the ability to set prices in the future as customers are then able to commit to purchases and budget for the future accordingly whilst retailers can schedule their buying and supply with a view of future demand. This will then have knock on benefits to manufacturers who are able to schedule production accordingly.

In the financial industry, the invention implicitly provides functionality that allows buyers and/or sellers of shares to specify share prices in the future that trigger transactions to be initiated at that point in time. Additionally, complex buy/sell strategies for share portfolios may be set up using the implicit functionality of the invention without the requirement for prohibitive volumes and complexity of application level programming.

The invention provides significant benefits to the requirements for business financial reporting in that data is stored with complete entity, attribute and referential integrity thereby allowing complex comparative reporting to be undertaken. For example, the business question such as to why a forecast has changed from one period to another can be readily addressed as the invention implicitly makes data available for specified points in time. Thus, a comparative report for the same forecast period in the future, but generated from different points in time in the past, would comprise:

i) a set of data where the information has not changed
ii) a set of data which existed at both reporting points in time but information values have changed
iii) and a set of data where information did not exist at both reporting points in time.

The provision of such information then allows the business investigation of why and how information has changed or not changed. This is particularly beneficial in respect to the financial activity undertaken within organisations as all transactions are carried out in the context of the financial applications and database with the invention implicitly providing a complete audit.

To exemplify this diagrammatically, FIG. 28 shows two sets of data depicted by the oval shapes 2808 and 2810. The area where the two oval shapes overlap 2804 depicts the data that is common to both data sets. For example this data could be product IDs that are common to both data sets. The area 2806 depicts the data that is present in the data set 2810 but is not present in the data set 2808. Conversely, the area 2802 depicts the data that is present in the data set 2808 but is not present in the data set 2810. The invention therefore provides implicit reporting functionality to answer such questions in relation to the reporting parameters as:

i) What has changed since the previous report?
ii) What has not changed since the previous report?
iii) What is new since the previous report?
iv) What is in the previous report that is not in the latest report?

To further exemplify the reporting capability of the invention FIG. 29 depicts two data sets for the same point in X-Time 2916 but compared at different points in Y-Time 2918. An example of this would be the comparison of two forecasts for the same future period but assessed from different points in Y-Time e.g. the forecast for next year's budget as assessed today 2908 compared with next year's budget as assessed 6 months ago 2906. The output of data for such a query would in normal circumstances resemble the two data sets depicted in FIG. 28.

In FIG. 29, the implicit functionality of the invention allows the querying of any number of datasets based on the required points in, or periods of, X-Time and Y-Time. For example 2912 and 2914 represent two data sets from the same point in Y-Time but at different points in X-Time. For example this could be the price of a product at two different points in X-Time (say, 6 months ago and 3 months in the future) as recorded in the database at 2910 in Y-Time (say 2 months ago). Such querying on data is achieved through standard querying languages.

In quite simple ways, the invention implicitly provides important customer benefits. For example, in the instance where a person's name changes through marriage, the invention provides the facility to set the name change for a point in the future. Prior to this date, any correspondence generated for the person would be presented in their pre marital name whilst correspondence after the wedding date would be presented in the new marital name. Additionally, such references as peoples' titles can be managed in respect to time thereby ensuring high customer service levels are maintained as correct information is always used. To extend the example given here, were a person to be sent correspondence that was known to be received at a later date, the invention implicitly provides the functionality to use the name as recorded in the system for a future point in time. Extending this example further, the invention implicitly manages all data in a database with respect to time such that address details and other contact details can be profiled over time ensuring that the appropriate information is always available for use. In this example, the invention can implicitly provide the appropriate contact details for a person who has various points of residence over a calendar period.

This example shows the benefits of the invention in managing attribute data over time. Additionally, the invention provides the functionality to implicitly manage the integrity of information held in look up tables or in referenced information. For example, a typical organisational requirement is to store information on departments and the employees working in them. Consider the situation where a department has a specified lifetime. Without integrity checks it is possible that employees could be recorded as being in a department that no longer exists. With present approaches, the integrity check for this may require application level programming code to ensure that the system does not allow this incorrect record of information to occur. Such an integrity check is an implicit function of the invention that therefore removes the requirement to undertake additional application level programming. This implicit capability of the invention is provided against all data that is held in referential relationships.

One significant consideration in business decision making is the amount of cost involved in delivering solutions. The implicit features of this invention mean that certain requirements that presently require specific development of a solution (for example, additional Structured Query Language syntax needs writing to solve specific issues) can be delivered with much smaller resourcing. Specifically, the invention provides an implicit audit trail for all information thereby removing the requirement for a module and table structure to support auditing in the typical system development process.

IN CONCLUSION

The invention enables the provision of a:
i) Temporal database system based on an Insert only model.
ii) Database system providing methodology for logical Insert, Update and Delete operations via and physical insert operations.
iii) Database system providing methodology for enhancing concurrency using attribute level locking.

The premise for this invention is that data can be stored with time as a fundamental core element. The Insert only approach represents the natural/real world much more closely than do existing system approaches that store data at an instant in time. In existing systems, subsequent information about the state of data causes update and delete operations on the original data. With existing approaches, where historical records of information are required, a separate routine, normally comprising a series of application programs or set of application code routines, are built to store the information in the database. With existing approaches the storage of historical or future data values requires specific database implementation design to accommodate this requirement.

In the Insert only model, data is continually being added to the system by creating attribute objects grouped together into a Summary Position that is held in a container (or containers) called a Time Cube. The history and predicted future of data can be re evaluated by the addition of new Summary Positions. The old view of history and predicted future still exists in previously created Summary Positions, however it is superseded by the most recent Summary Position. In this regard, the invention provides an implicit capability to hold all data in respect to the present point in time (now) as well as historical and future points in time. FIG. 5 depicts how the invention uses time as the core reference for all information within the system. Additionally, FIG. 5 depicts how all changes in information i.e. the logical update, deletion or insertion data is accommodated through the insert only model.

A simple analogy would be that of a newspaper where time is split into one day intervals:
i) Today's paper describes events in context of the current (most recent) view of history and/or predicted future.
ii) An event occurs which causes the re evaluation of historical and/or future context
iii) Subsequent events use the current historical/future perspective.
iv) Old copies of the paper still exist and can be read at any time.

The old copies still retain the context in which they were written.

The unique features of this invention combine in such a way that a system can be built which maintains complete attribute, entity and relational integrity of its objects.

Whilst there are numerous data models and system designs that address the management of temporal data in respect to both valid time and transaction time, these designs do not implicitly address the issues of attribute integrity, entity integrity and referential integrity. In present implementations these requirements are satisfied for the most part at the application level requiring the programming of application code that validates the integrity of data changes or data additions to the temporal database. The function of the Core Algorithm and Temporal Data Dictionary included as part of this invention means that integrity of data is defined declaratively thereby removing the need for temporal integrity checks at the application level.

One way of looking at an embodiment of the invention is that great advantages are achieved by the combination of:
1. Insert Only Model and—
2. Two time dimensions inherent in the DBMS—
   a. Transaction ("Y") Time
   b. Valid ("X") Time Insert Only Model This has been extensively discussed, but another example will not hurt. Imagine a financial ledger. Each transaction is entered in the order it happens. Corrections are made to the data by adding further transactions. Thus the current state of affairs is easily derived from the sum of all transactions. Nothing is changed. Therefore it is always possible to query the database as at a given time.

Two Time Dimensions

Again, this has been discussed, but it is important, and another way of expressing the concept follows.
a. "Y" Time To determine the state of affairs at an historical time, simply take the sum of all transactions to that moment. Do not allow any post-"Y" dated transactions. Do not allow any pre-"Y" dated transactions. The only time to be recorded as the transaction ("Y") time is "Now" (we refer to this as "system time").

b. "X" Time

Values are allowed to change through history. We would like to state, in a single transaction (a single value of "Y" Time, let's say 10:35 on Monday 05 January) that the address history of Mr Smith is from 1967 to 1974, he lived at 32 Acacia Ave from 1974 to now, he lived at 102 Waterloo Crescent from a week next Wednesday his address will be 9 Winterbottom Gardens.

Querying the database for "Where do I send the post to send to Mr Smith?" will return 102 Waterloo Crescent, up until a week next Wednesday when it returns 9 Winterbottom Gardens.

However, if at 22:00 Tuesday 06 January, Mr Smith reports that his house purchase has fallen through, and we correct his address history on the database, such that from 1967 to 1974, he lived at 32 Acacia Ave from 1974 to now, he lives at 102 Waterloo Crescent Now when we ask the system "Where do we send the post?" We get the answer 102 Waterloo Crescent, even after a week next Wednesday. HOWEVER: We can also ask the database "Where did we send the letter we posted at 14:00 on Monday 05 January, welcoming Mr Smith to his new home we thought he was going to be moving in to? Answer=9 Winterbottom Gardens.

OVERVIEW

All the prior art discussions refer to physically updating "rows in tables", "tuples in relations" and/or "occurrences of entities". This leads to phenomenal complications that are then worked around by almost cosmic mathematics. The present invention, in some embodiments, brings the whole subject back to the realms of reality by the simplicity of combining.

1. Never throwing anything away (Insert Only) with
2. Tracking the times at which entries were made to the database ("Y" Time) and the time for which those entries are valid ("X" Time).

In many embodiments the invention allows for a method and apparatus for the implementation of a fully functional Temporal Database. This extends and combines the prior art techniques of normalisation, timestamping, denormalisation and insert-only to provide a temporal database that is easy to maintain and preserves the attribute, entity and referential integrity of the data contained within.

Normalisation

This has not been discussed in such explicit terms before. The technique of normalisation is employed in the prior art (and in same but not all embodiments of the present invention) during analysis of data in order to simplify maintenance and reduce storage requirements caused by duplication of data. The classical approach to data analysis is based upon the decompositions of relations to irreducible components. This approach is known as 'Normalisation'. Beginning with first normal form (or 1NF), data is decomposed through various stages until the final 'normal form' i.e. 'projection/join' normal form (or 5NF) is achieved (see FIG. 7g 716).

The concept of further decomposition beyond 5NF has often been proposed in prior art Non-Temporal research, however it is generally agreed in the prior art that such decomposition cannot be done in a 'non-loss' way and so an accepted definition of a further normal form (or 6NF) has not emerged (see FIG. 7g 717).

Dr. E. F. Codd, as discussed previously, took mathematical set theory and defined relational database theory which represented data in 2 dimensions i.e. attributes (columns) and tuples (rows) but a single point in time. Computers store information on disks. The 2D relational model maps well onto disks, which are of course 2D physical devices. However, Codd's relational theory does not represent the two extra time dimensions of valid time (x-time) and transaction time (y-time) defined within temporal database research. We have determined that in order to adequately deal with the 4 dimensions of temporal relations i.e. attributes (columns), tuples (rows), Valid Time and Transaction Time one must rationalise these 4 dimensions into a new 2D form (and of course we are the first to decide to approach things using both Valid Time and Transaction Time for values of attributes).

Prior art temporal researchers have also considered further decomposition of relations to 6NF. With temporal data, attributes can vary independently and at differing rates over both valid time (or x-time) and transaction time (or y-time) and it is this special nature of temporal data that lends itself to further decomposition or normalisation.

Embodiments of the present invention, looked at in yet another way, deal with time dimensions in a fundamentally different way by normalising in an orthogonal direction to that of classical normalisation. We have realised that normalisation to a Temporal normal form (FIG. 7g 719) can be applied, regardless of the level to which classical normalisation has been achieved.

For our purposes, Temporal normal form is not another sequential step after 5NF, it is in fact an orthogonal normal form that can be applied to any classical normal form (FIG. 7g 718). For example, it may be sufficient for the analysis to stop at 3NF and then from that point apply the orthogonal Temporal normalisation to achieve Temporal normal form (FIG. 7g 719).

Therefore, one aspect of many embodiments of this invention is an orthogonal relational decomposition in order to adequately cater for the time varying nature of the data i.e. 'Temporal' normal form.

Timestamping

In prior art, the technique of timestamping is often used to record the time varying nature of data. The two dimensions of time typically considered are Valid time (similar to x-time in this invention) and Transaction time (similar to y-time in this invention). Other time dimensions have been proposed in some research e.g. Recorded Time, however this data is more commonly thought of as just another attribute that just happens to be of datatype date. In the prior art there are several choices available for the actual datatypes used for timestamps e.g. point, interval or cyclic datatypes.

Once the normalisation process is complete and the data is in its irreducible state, timestamps are applied to the relations. In prior art, regardless of the level of normalisation achieved, a relation can hold one or more attributes and so there is a choice of techniques to chose from i.e. Tuple stamping (FIG. 7a 705) and Attribute Timestamping (FIG. 7a 706).

One aspect of some embodiments of this invention is Attribute Value Timestamping, wherein relations are normalised to Temporal NF, and so each tuple is used to store an attribute value of one attribute.

Within Attribute Value Timestamping there are two choices available for the Valid Time (or x-time in this invention) timestamps. The first is to store both start x-time and end x-time in the tuple (FIG. 7b 708, 709). The second is to only store the start x-time timestamp in the tuple (FIG. 7c 711) and determine the end x-time by reading the start x-time from an adjacent tuple. Both techniques can be considered to be providing an end time for an attribute value. If there is no adjacent tuple then the system interprets that as the attribute having the value for all x-time.

There is a trade off between efficiency of storage of timestamps less processing resources and less memory used (achieved through the second choice) and speed of access to timestamps (achieved through the first choice). Data input and data extraction have mutually contradictory requirements for memory usage and the desired degree of normalisation. Our system may have one database as a data input transactional system and data from that may be stored as a data warehouse database (e.g. transferred overnight). The manager of our database may be able to set the level of normalisation of the system.

In many embodiments of this invention the datatype used for all timestamps is a point type e.g. date, datetime or timestamp depending upon the granularity required.

Denormalisation

Denormalisation can be thought of as a partial reversal of normalisation and is a technique used during data design in order to improve database performance.

There are three classical ways to denormalise data: a) eliminate table joins between related entities b) create summary tables of changes to data and c) store detail records in a master table. However, one could also regard the data structures traditionally associated with Data Warehouses (e.g. star schemas) as yet another form of denormalisation.

Again, there is a trade-off to be made in between efficiency of processing time/power and memory used in the storage of data (achieved through normalisation) and speed of access to data (achieved through denormalisation).

In one aspect of some embodiments of this invention resides in the data structures, views and other objects used to implement the Time Cube. As a metaphorical comparison with a star schema in Data Warehousing, a Time Cube is a denormalisation of the Temporal normal form (FIG. 7g 719) described above.

The Time Cube gives developers a very simple mechanism to select and maintain the underlying temporal data. For example a view of data knowing both x-time and y-time, or just y-time, or just x-time is available.

Insert Only

One aspect of many embodiments of this invention is the use of an insert-only model for manipulation of temporal data within the underlying objects that make up the database while still providing end-users, developers and applications full Insert, Update, Delete and Select capabilities.

Within the insert-only model there are two choices available for the way in which a new summary position is created in the Time cube. The first choice is that when a logical insert, update or delete event occurs at a particular transaction time (y-time) then the Time Cube is populated with a complete set of valid time (x-time) tuples. This effectively creates a Time Cube with a 'flat' base (FIG. 7d 713).

The second choice is that when a logical insert, update or delete event occurs at a particular transaction time (y-time) then the Time Cube is populated with a partial set of the affected valid time (x-time) tuples, but unaffected/unchanged values/tuples holding values are not changed/written to. This effectively creates a Time Cube with a 'jagged' base (FIG. 7e 714).

Yet again there is a trade-off between efficiency of storage of temporal data in the Time Cube (achieved through the second choice) and speed of access to temporal data in the Time Cube (achieved through the first choice). It is quicker and uses less memory to change only those tables that have been effected when making a change: but it is quicker to read data from a flatbased Time Cube when querying the database.

Non-Existence

There are choices for how the concept of 'non-existence' is implemented in the Time Cube. One option is to represent the X time periods outside a lifespan i.e. 'before-insert' and 'after-delete', with a tuple (or object) that has a special value of 'non-existence' (similar to 'null' in the prior art). Another option is not to store an object to represent 'non-existence' at all and instead determine the boundaries of a lifespan by inference. This effectively creates a Time Cube with a 'jagged' side (FIG. 7f 715). It is also quite possible that within the same implementation one may chose different methods for the 'before-insert' non-existence and the 'after delete' non-existence.

This is yet another trade-off between efficiency of storage of temporal data in the Time Cube (achieved through inferring lifespan boundaries) and speed of access to temporal data in the Time Cube (achieved storing objects to represent 'non-existence').

According to another aspect the invention provides a database having data entity entries for attributes of an entity, each time that data relating to a data entity is changed there being a transaction time created on the database indicative of from when each value of each attribute applies, and there being for each value of each attribute a start point in valid time and optionally an end point in valid time: the database being such that a query to identify a value for an attribute specifies what transaction time will be selected, thereby specifying for what portion of valid time an associated value will apply.

According to another aspect the invention provides a data processing system for satisfying a temporal query comprising:

i. one or more storage devices collectively containing a database for resolving temporal queries, comprising: a plurality of time planes associated respectively with a plurality of data entities; each time plane comprising one or more rows in Y time, each Y time row representing a summary position for a specific attribute of said item at a particular transaction time, and each Y time row having one or more different values for its said specific attributes in X time, X time being valid time at which values of said attribute are, when Y time is associated with that particular Y time row, valid;

ii. a query receiver that receives temporal queries each specifying an effective, transaction, time; and iii. a query processing subsystem that satisfies temporal queries received by the query receiver by using the database to identify a selected transaction time summary position and a selected valid time value for said attribute, and wherein a temporal data dictionary is provided accessible by said query processing subsystem, said temporal data dictionary having a set of temporal rules which are used by said processing subsystem to ensure data integrity when processing said database in response to a query.

According to another aspect the invention provides a computer based temporal database management system including a plurality of Time Cubes associated with a respective one of a plurality of items or groups of items; each Time Cube having an effective transaction time dimension, a valid time dimension specifying a start for at least one value of a specific attribute, and an attribute dimension representative of one or more attributes.

According to another aspect the invention provides a method of providing data entities of a database with a time dependent value for an attribute of the entity, the method comprising:

i. having values of attributes of said entities in said database;

ii. for said entities providing a valid time start time associated with each said value of said attribute;

iii. for said entities providing a transaction time associated with said valid time start time for each said value; whereby iv. when querying said database an appropriate said transaction time is used so as to ensure that an appropriate value for said attribute is used.

Preferably, attributes are managed using at least one of, or any combination of any number of:—(i) an Updateability Attribute Integrity rule determining whether or not an attribute can have multiple values in X-Time, a Temporal Data Dictionary ensuring that Non-Updateable attributes only have one value in X-Time between Insert Time and Delete Time; (ii) a Transferability Attribute Integrity rule which determines whether or not a foreign key attribute can have multiple values in X-Time; (iii) a Correctability Attribute Integrity rule which determines whether or not an attribute can have multiple values in Y-Time; (iv) Optionality Attribute Integrity rule determining whether or not an attribute is allowed Null values in X-Time; (v) Attribute Group Membership Attribute Integrity rule concerned with linking two or more functionally related attributes within the same entity such that if the attribute value of one member of the group is altered then a corresponding alteration is made for the other members for the same X-Time period; (vi) a Co Terminacy Entity Integrity rule which ensures that all attributes of an entity have the same lifespan in X-Time following any action that increases or reduces the overall lifespan of an entity in the system; (vii) Positive Lifespan Entity Integrity rule which ensures the Insert Time of the entity is always before the Delete Time of the entity following any action that reduces the overall lifespan of the entity in X-Time; (viii) Attribution Entity Integrity rule which ensures that a valid value is provided for attributes when a system event occurs that causes a Referential Boundary Condition to be crossed, ensuring that all attributes in a Focus Entity and the foreign key attributes of all affected related entities have valid values after an event is completed; (ix) a Non Existence rule wherein attributes may be given a value of Non Existence for the periods in X-Time that occur before Insert Time and after Delete Time; (x) a Cascade Referential Integrity rule to determine the result of an action occurring on a Focus Entity when that action causes a Referential Boundary Condition to be crossed; (xi) a Bounded Referential Integrity rule which ensures the final point in X-Time for the Focus Entity is inherited by downstream entities however the X-Time values of the Referential Boundary Conditions determine the upper and lower limits if the effect of an action; (xii) a Restrict Referential Integrity rule which ensures that an action on the Focus Entity is not allowed if the Referential Boundary Conditions are crossed.

Preferably, a system according to any previous aspect wherein when a user enters a new data entity in said memory said software requires the association of valid time and transaction time entries associated with values of attributes of said entity, said software not allowing said new data entity to be held in said memory without said valid and transaction time entries; and wherein said software automatically generates transaction time values and automatically generates values for valid time if no valid time value is input by a user for a data entity; and wherein said software generates a message conveyed to a user that values for said valid time are needed and/or have been system-generated; and wherein said software generates a message conveyed to user that a requested change would, if allowed, cause referential inconsistency and therefore has not been allowed or that the request has been modified to an allowable request, preferably informing the user of the identity of the modified request; and wherein said software comprises data record enquiry software runable on said processor, said data renewal enquiry software requiring a transaction time to be selected, said transaction time effectively setting a time in a transaction timeline at which said data records are to be interrogated; and wherein a user selects is capable of selecting and inputting in a query said transaction time; and wherein software selects said transaction time in default of a user inputting a user-specified transaction time in a query; and wherein a user can input a valid time that is in the future, beyond a current time indicated by a system accessible computer clock.

According to another aspect the invention provides a computer processor having access to a temporal relational database held in memory, and database creation software runable on the processor, the software allowing insert only operations on the database.

According to another aspect the invention provides a method of handling time varying attribute values in a database comprising using an insert-only model and tracking the times at which entries of values for attributes are made in the database and tracking the time period for which those entries are valid.

According to another aspect the invention provides a method of storing data in a database comprising denormalising the data so as to store time with each attribute value.

The invention claimed is:

1. A computer-implemented method of updating and deleting values of attributes in a database, the database having stored in it a summary position in which attributes have associated with them a valid start time from which the value of the attribute will hold true and a valid end time up to which the value of the attribute will hold true, and a transaction time associated with the summary position at which transaction time the valid start time and valid end time of the value of the attribute are true, the method comprising performing updating and deleting logical operations on the values of attributes by inserting into the database a new insert summary position with a new particular transaction time without altering any existing summary position, logical update and delete of valid start time and valid end time for a value of an attribute being achieved by inserting the new summary position with a different valid start time or valid end time that is to be true for the new particular transaction time, wherein data relating to each attribute is held in corresponding data-entity associated Time Cubes that comprise valid and transaction time related values for different attributes in different attribute-slices of said Time Cube.

2. A method according to claim 1 wherein said valid end time is provided by either:
  (i) storing said valid end time entered in said database associated with said value for said attribute; or
  (ii) determining said valid end time from a valid start time of another value of said attribute stored in said database.

3. A method according to claim 1 comprising providing said values for data entries in a relational database.

4. A method according to claim 1 wherein for each Time Cube there is a single primary key attribute having associated values over transaction and valid time, and wherein in the Time Cubes there is another, or a plurality of other foreign key attributes having a value, or values, which are valid and/or transaction time dependent.

5. A database recorded on a computer-readable medium, said database having a model of entities in which each entity has an associated Time Cube: i) said Time Cubes comprising at least one attribute having allowable values in X-Time and an associated Y time, X time being the whole system time from start of system time to end of system time within which valid time will exist for said entity, and Y-Time being system-generated time representative of transaction time at which specific allowable values are true, and wherein there are start times in X-time for attributes and end times in X-times for attributes stored in computer-readable memory, there being a plurality of start and end times simultaneously stored in said computer-readable memory in the database for at least one value of at least one attribute, the plurality of start and end times for said attribute being associated in said computer-readable memory with respective different Y-times, and wherein said model allows insert only events, with update and delete functions being achievable by insert events into said computer-readable memory.

* * * * *